May 29, 1956     E. H. PLACKE ET AL     2,747,794
ZERO PRINTING CONTROL MECHANISM
Filed April 4, 1952                                     41 Sheets-Sheet 1

INVENTORS
EVERETT H. PLACKE
WILLIS E. EICKMAN
BY
THEIR ATTORNEYS

May 29, 1956 E. H. PLACKE ET AL 2,747,794
ZERO PRINTING CONTROL MECHANISM
Filed April 4, 1952 41 Sheets-Sheet 2

INVENTORS
EVERETT H. PLACKE
WILLIS E. EICKMAN
BY
THEIR ATTORNEYS

May 29, 1956  E. H. PLACKE ET AL  2,747,794
ZERO PRINTING CONTROL MECHANISM
Filed April 4, 1952  41 Sheets-Sheet 3

INVENTORS
EVERETT H. PLACKE
WILLIS E. EICKMAN
BY
THEIR ATTORNEYS

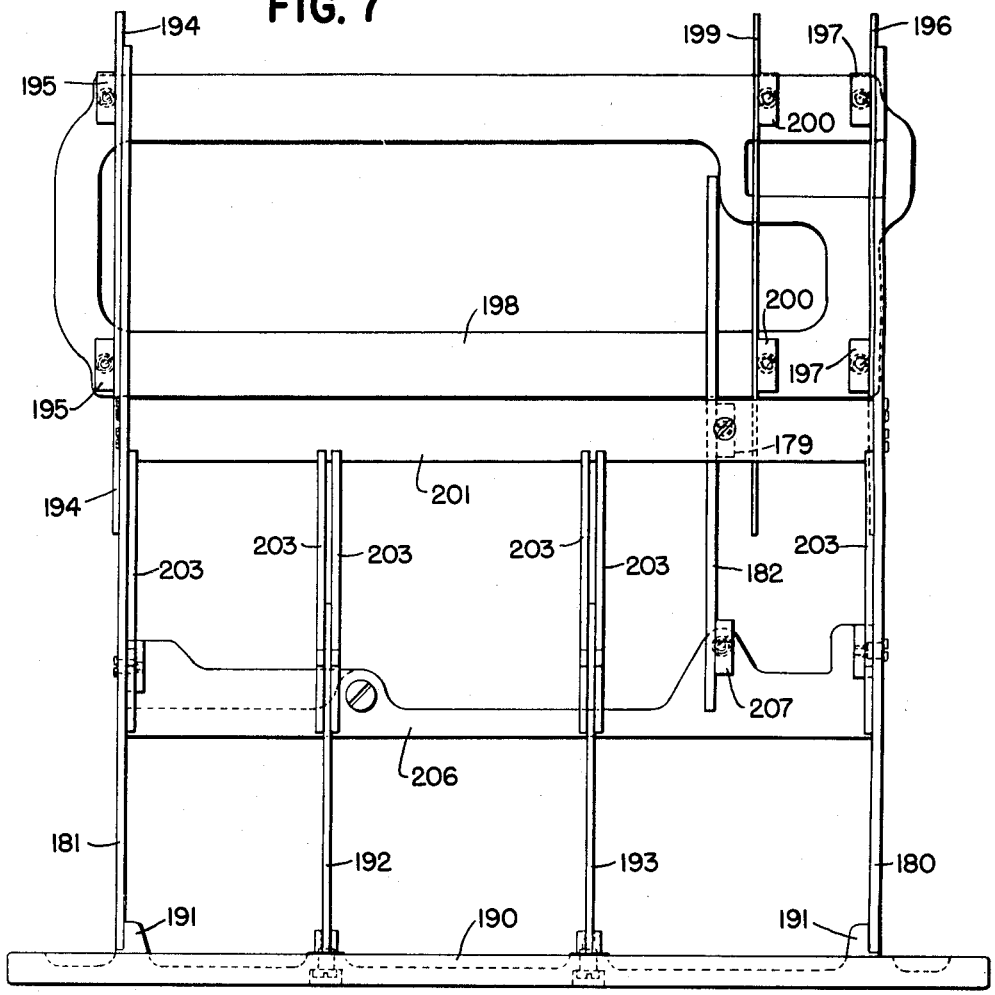

May 29, 1956  E. H. PLACKE ET AL  2,747,794
ZERO PRINTING CONTROL MECHANISM
Filed April 4, 1952  41 Sheets-Sheet 5
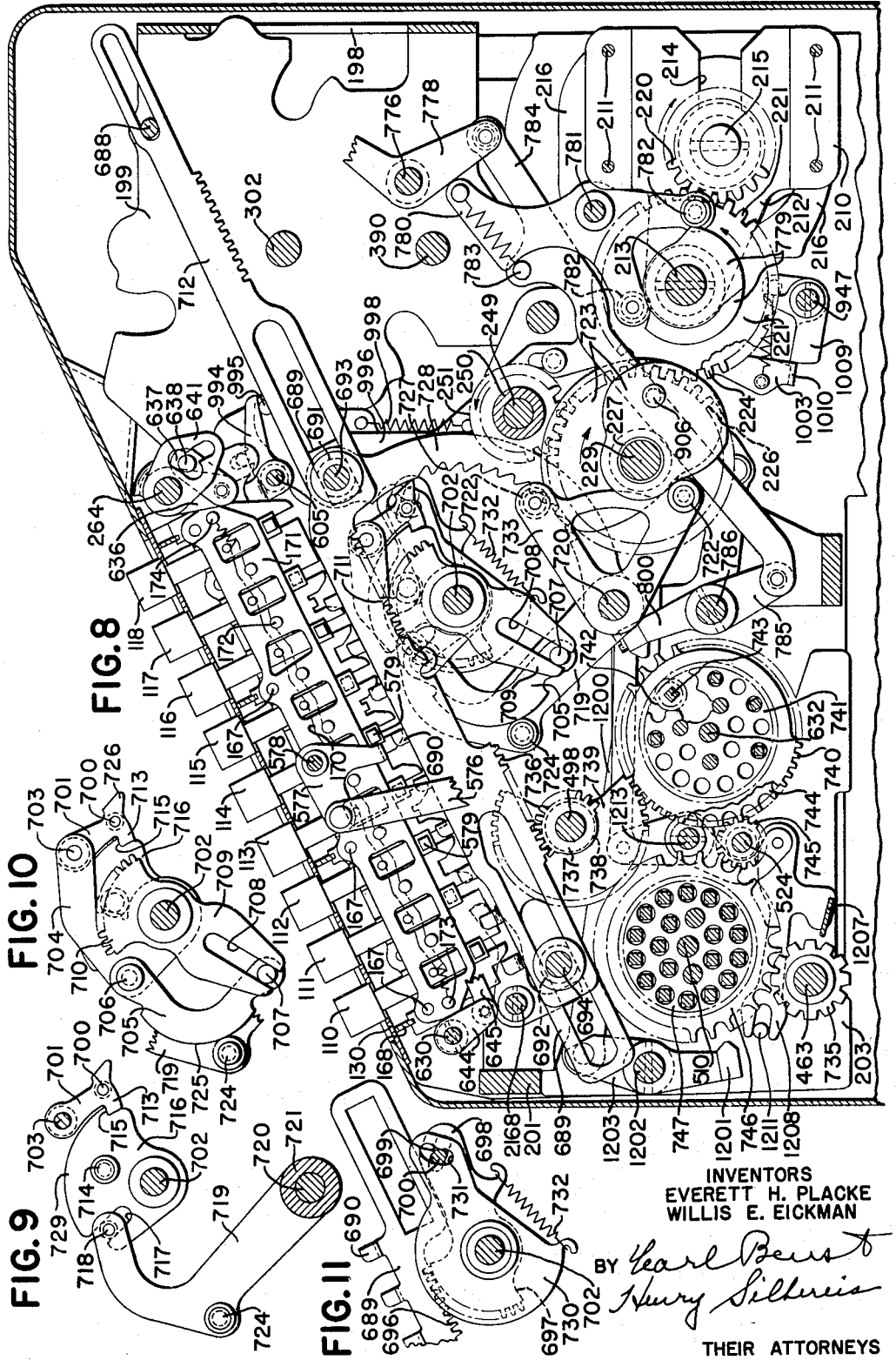
INVENTORS
EVERETT H. PLACKE
WILLIS E. EICKMAN
BY
THEIR ATTORNEYS May 29, 1956 E. H. PLACKE ET AL 2,747,794
ZERO PRINTING CONTROL MECHANISM
Filed April 4, 1952 41 Sheets-Sheet 6

INVENTORS
EVERETT H. PLACKE
WILLIS E. EICKMAN
BY Carl Berst
Henry Silberis
THEIR ATTORNEYS May 29, 1956     E. H. PLACKE ET AL     2,747,794
ZERO PRINTING CONTROL MECHANISM
Filed April 4, 1952     41 Sheets-Sheet 7
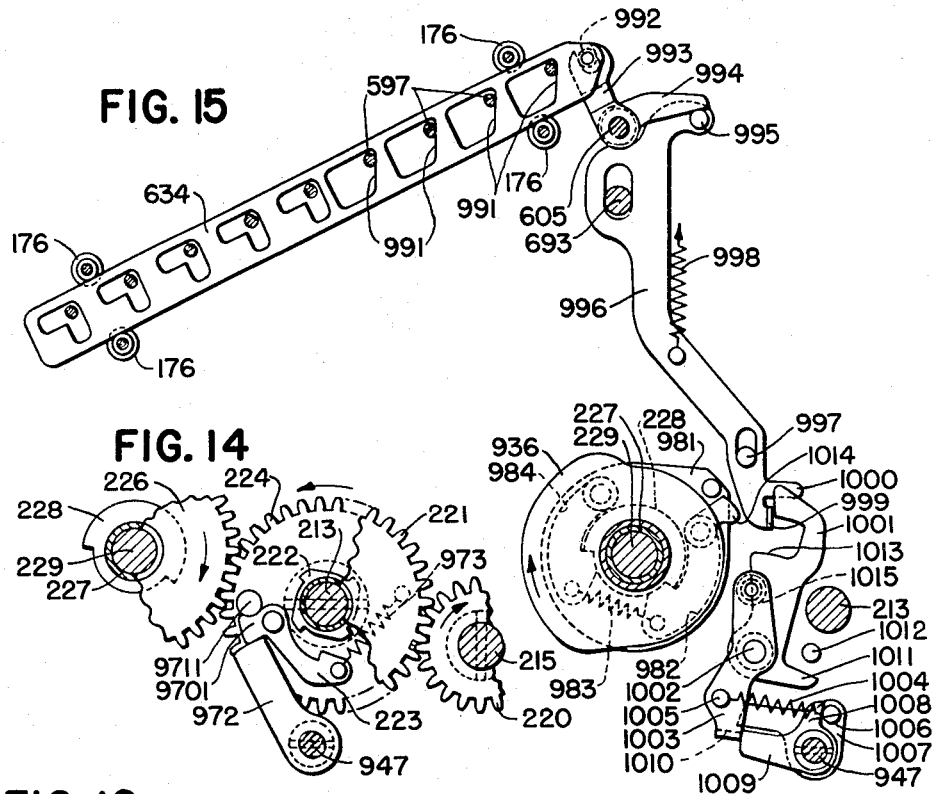
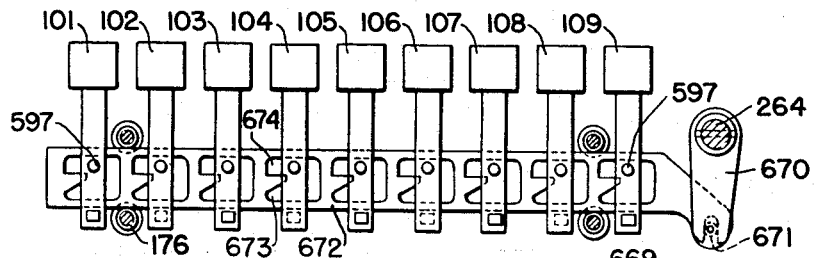
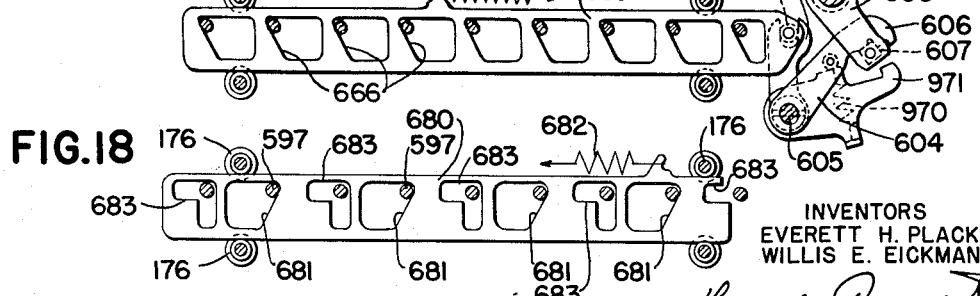
INVENTORS
EVERETT H. PLACKE
WILLIS E. EICKMAN
THEIR ATTORNEYS

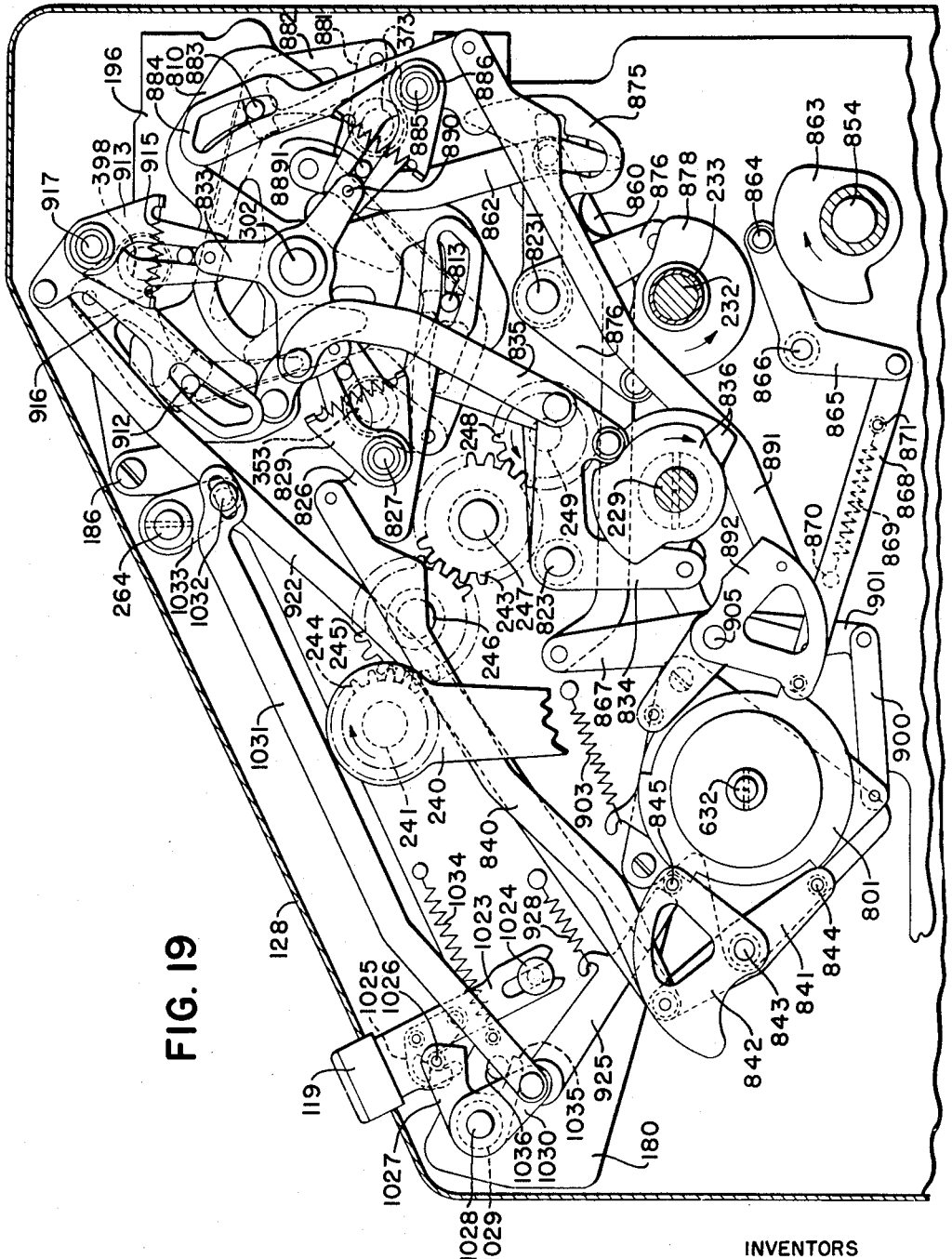

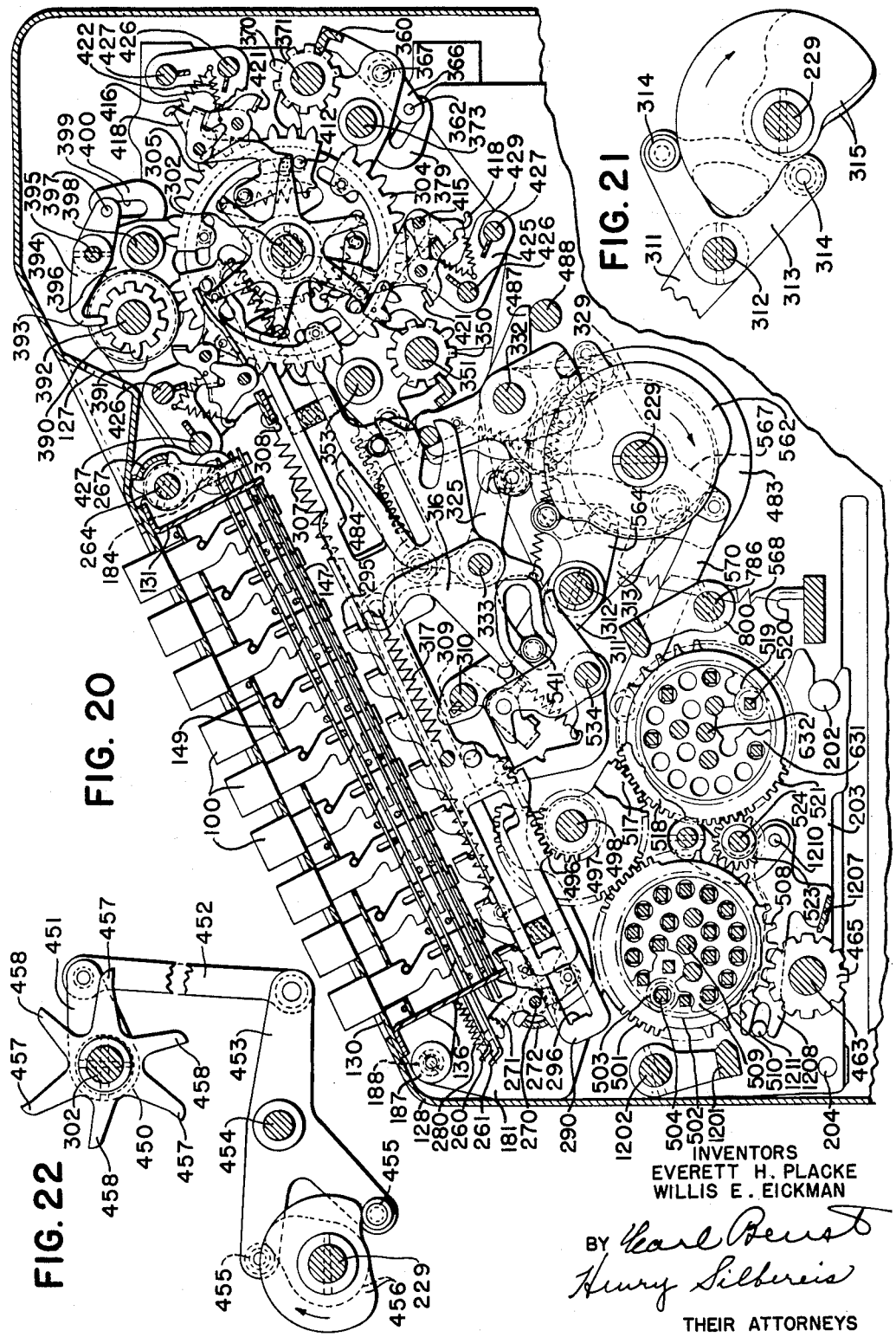

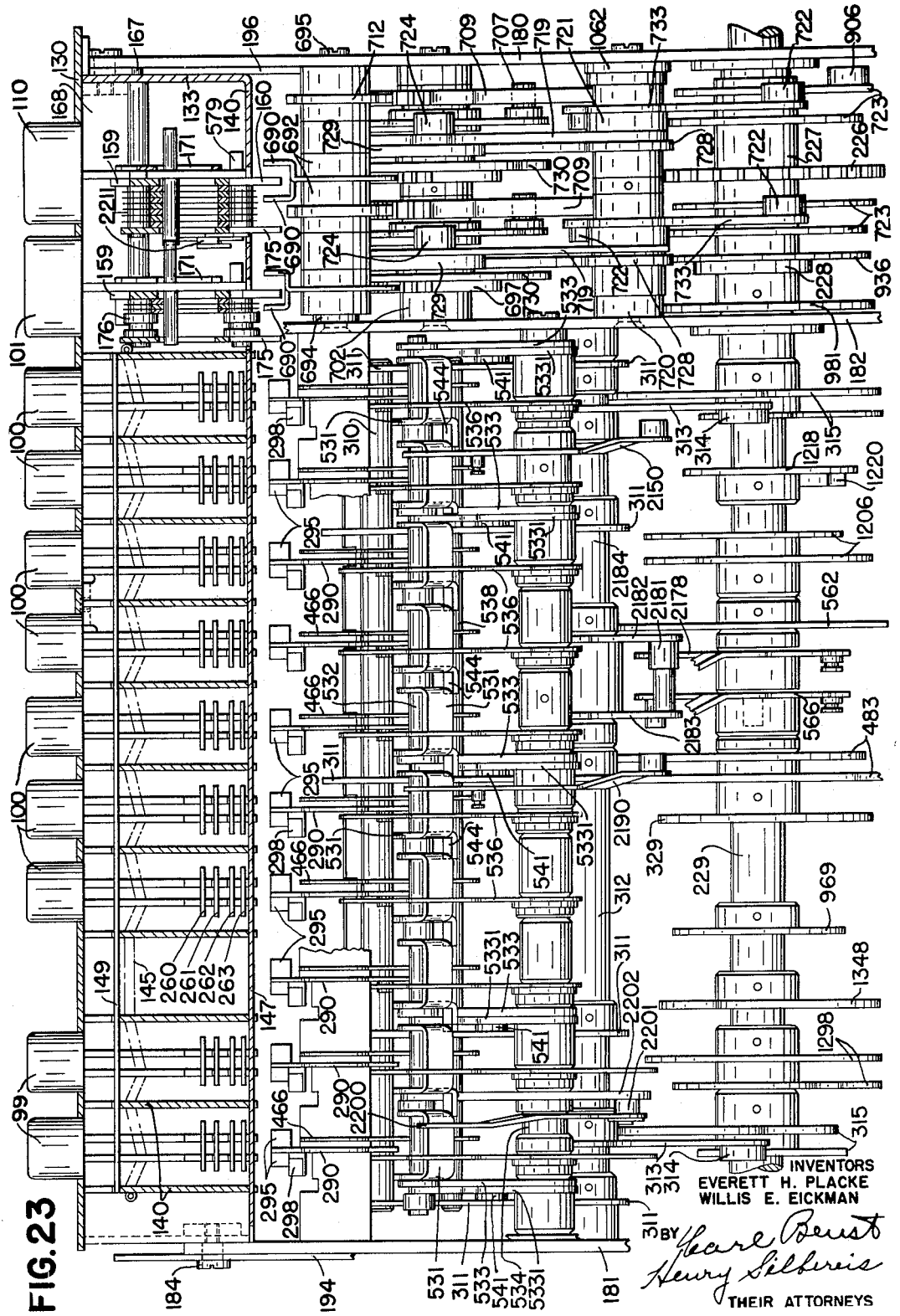

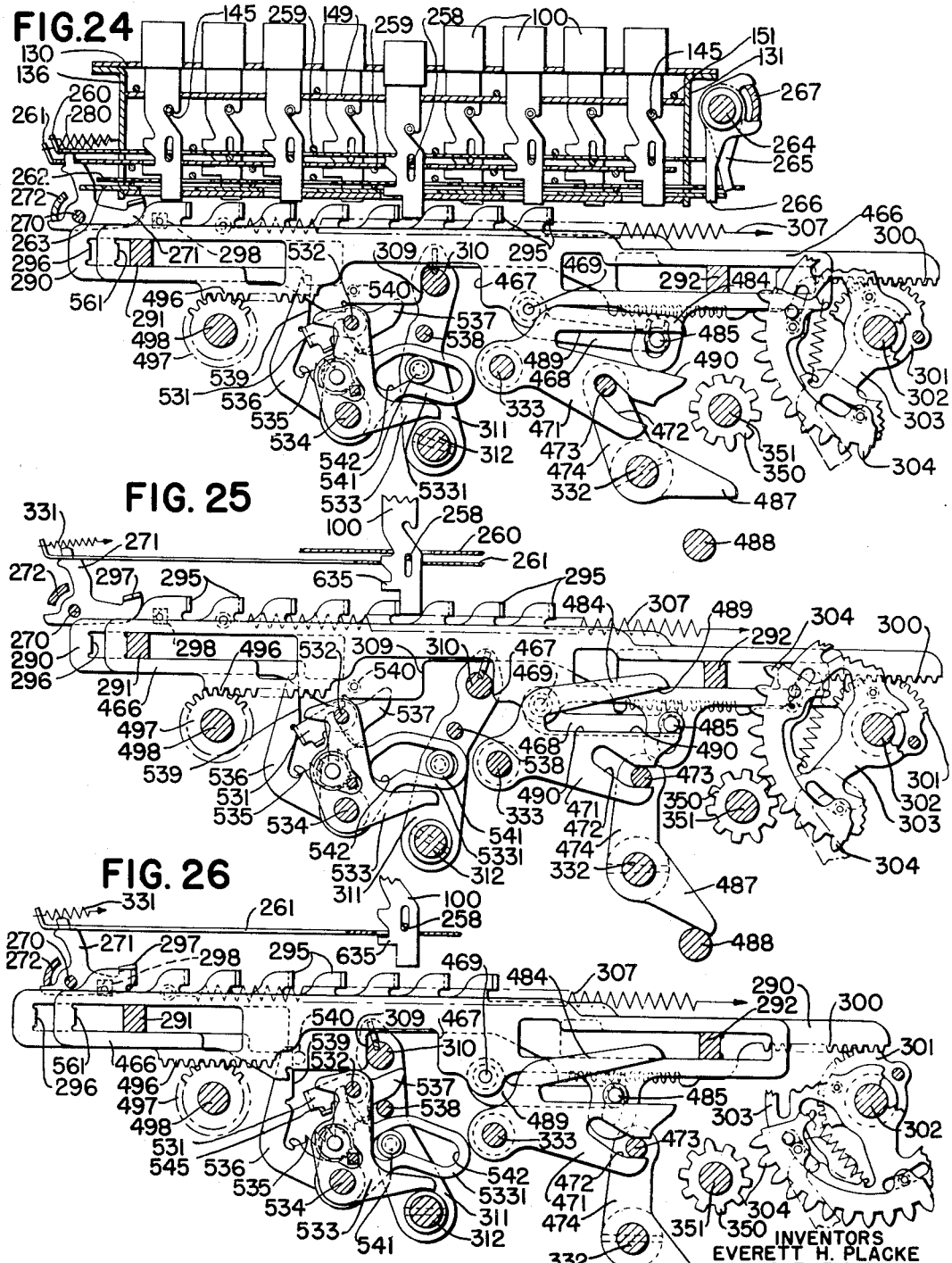

May 29, 1956 E. H. PLACKE ET AL 2,747,794
ZERO PRINTING CONTROL MECHANISM
Filed April 4, 1952 41 Sheets-Sheet 12

INVENTORS
EVERETT H. PLACKE
WILLIS E. EICKMAN
BY
THEIR ATTORNEYS

May 29, 1956 E. H. PLACKE ET AL 2,747,794
ZERO PRINTING CONTROL MECHANISM
Filed April 4, 1952 41 Sheets-Sheet 13

INVENTORS
EVERETT H. PLACKE
WILLIS E. EICKMAN
BY
THEIR ATTORNEYS

May 29, 1956  E. H. PLACKE ET AL  2,747,794
ZERO PRINTING CONTROL MECHANISM
Filed April 4, 1952  41 Sheets-Sheet 14

INVENTORS
EVERETT H. PLACKE
WILLIS E. EICKMAN
BY Earl Berst
Henry Silberis
THEIR ATTORNEYS

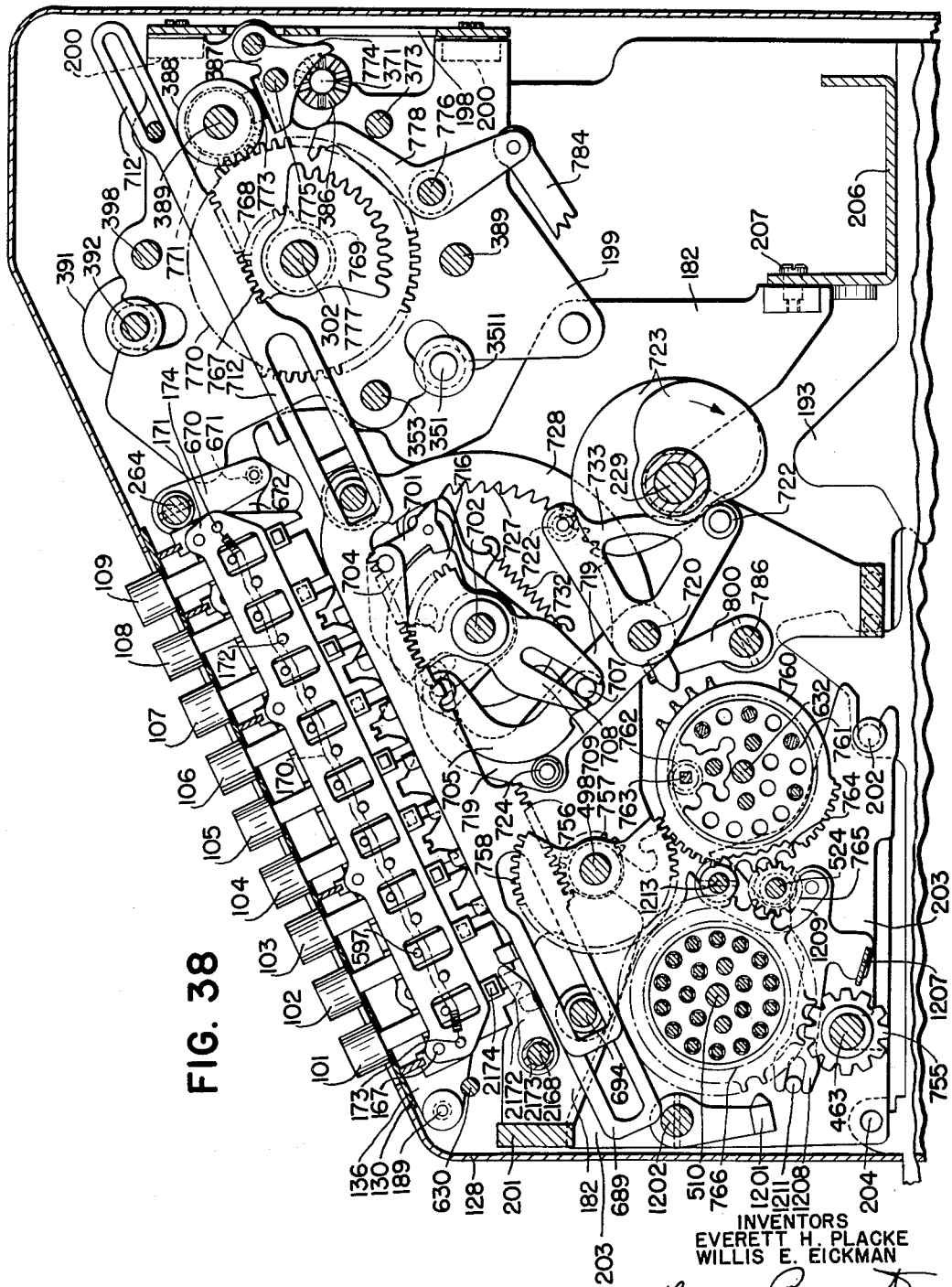

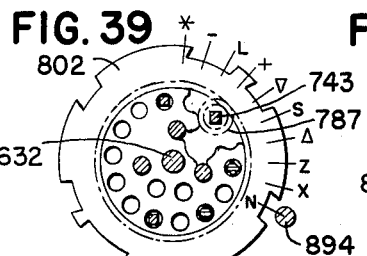
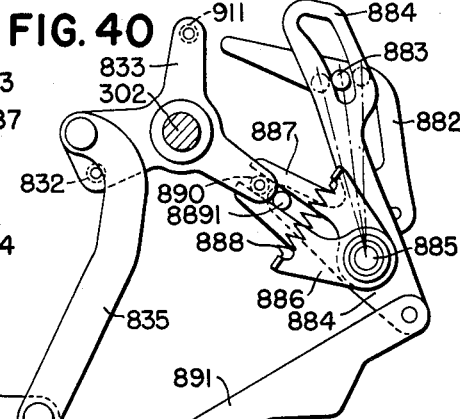
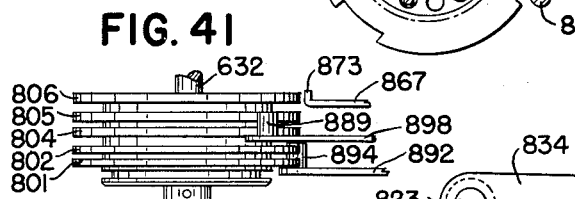
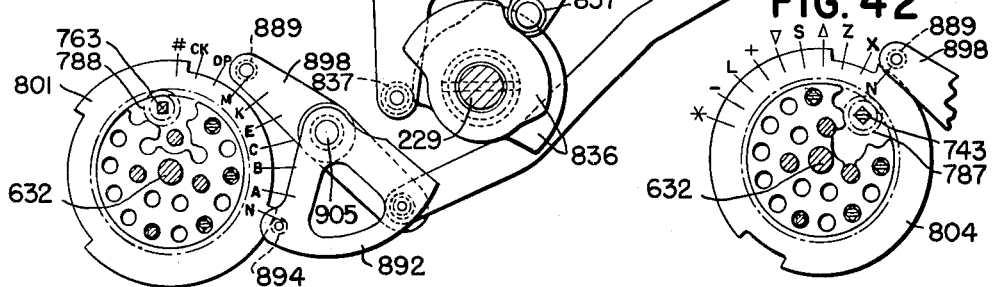
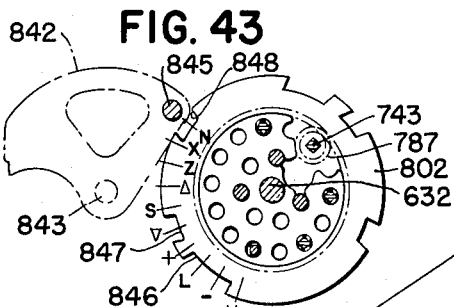
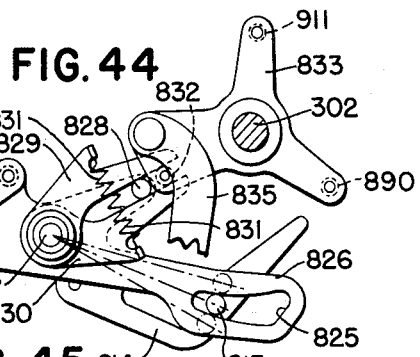
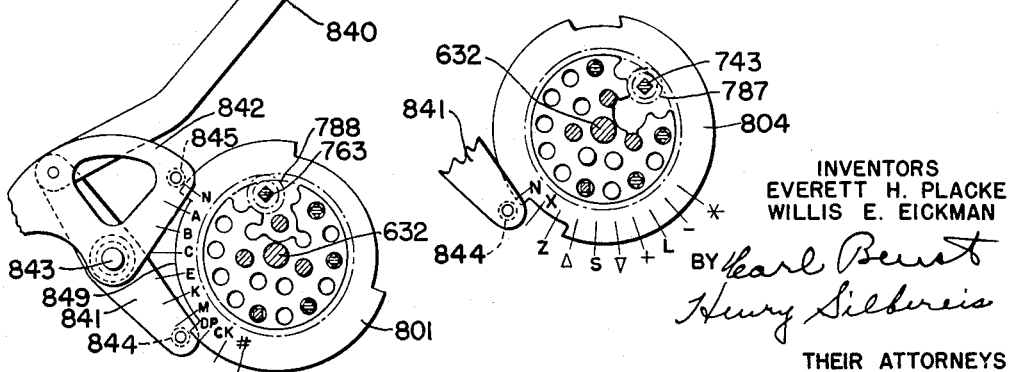

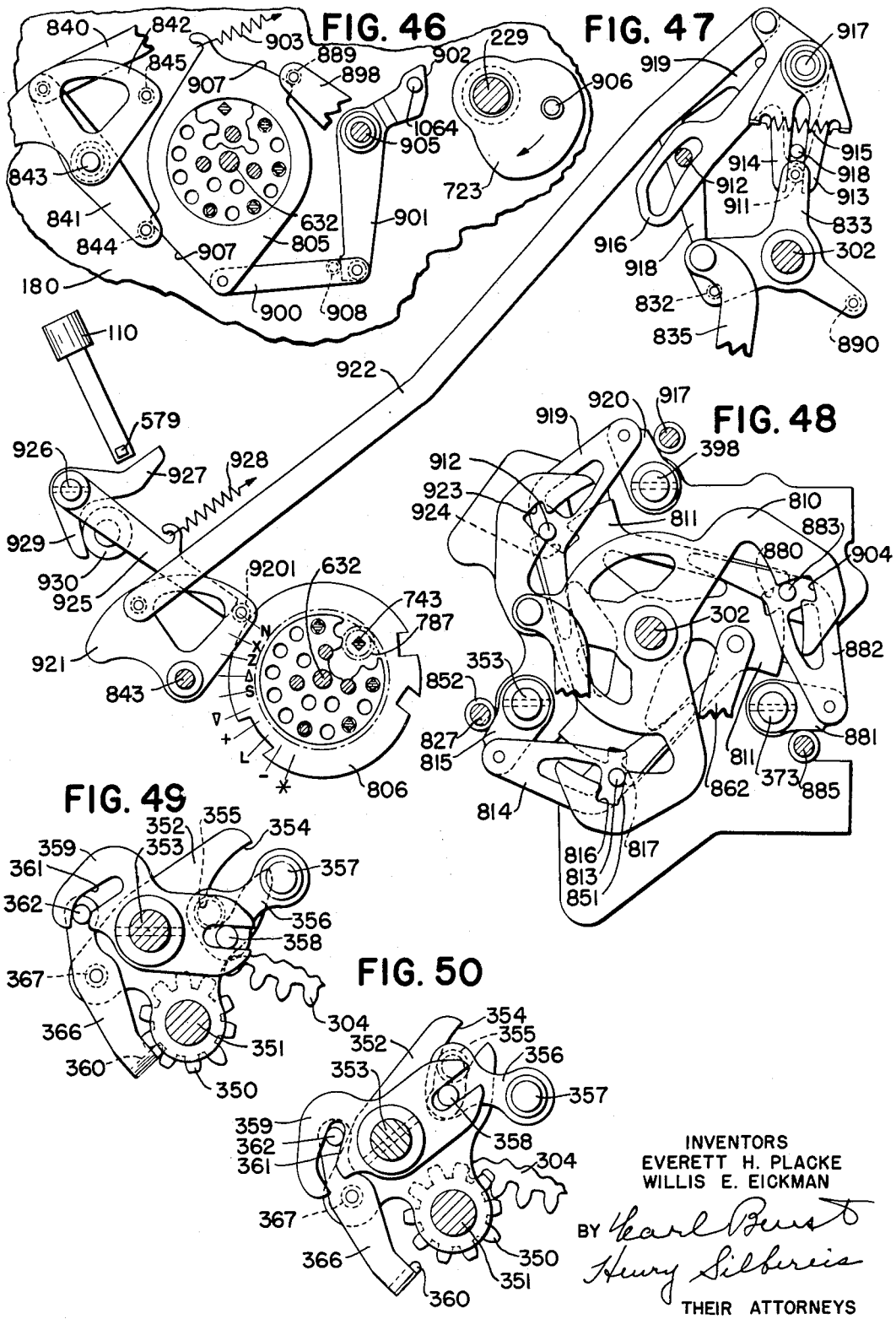

May 29, 1956  E. H. PLACKE ET AL  2,747,794
ZERO PRINTING CONTROL MECHANISM
Filed April 4, 1952  41 Sheets-Sheet 18

INVENTORS
EVERETT H. PLACKE
WILLIS E. EICKMAN
BY Earl Beust
Henry Silberis
THEIR ATTORNEYS

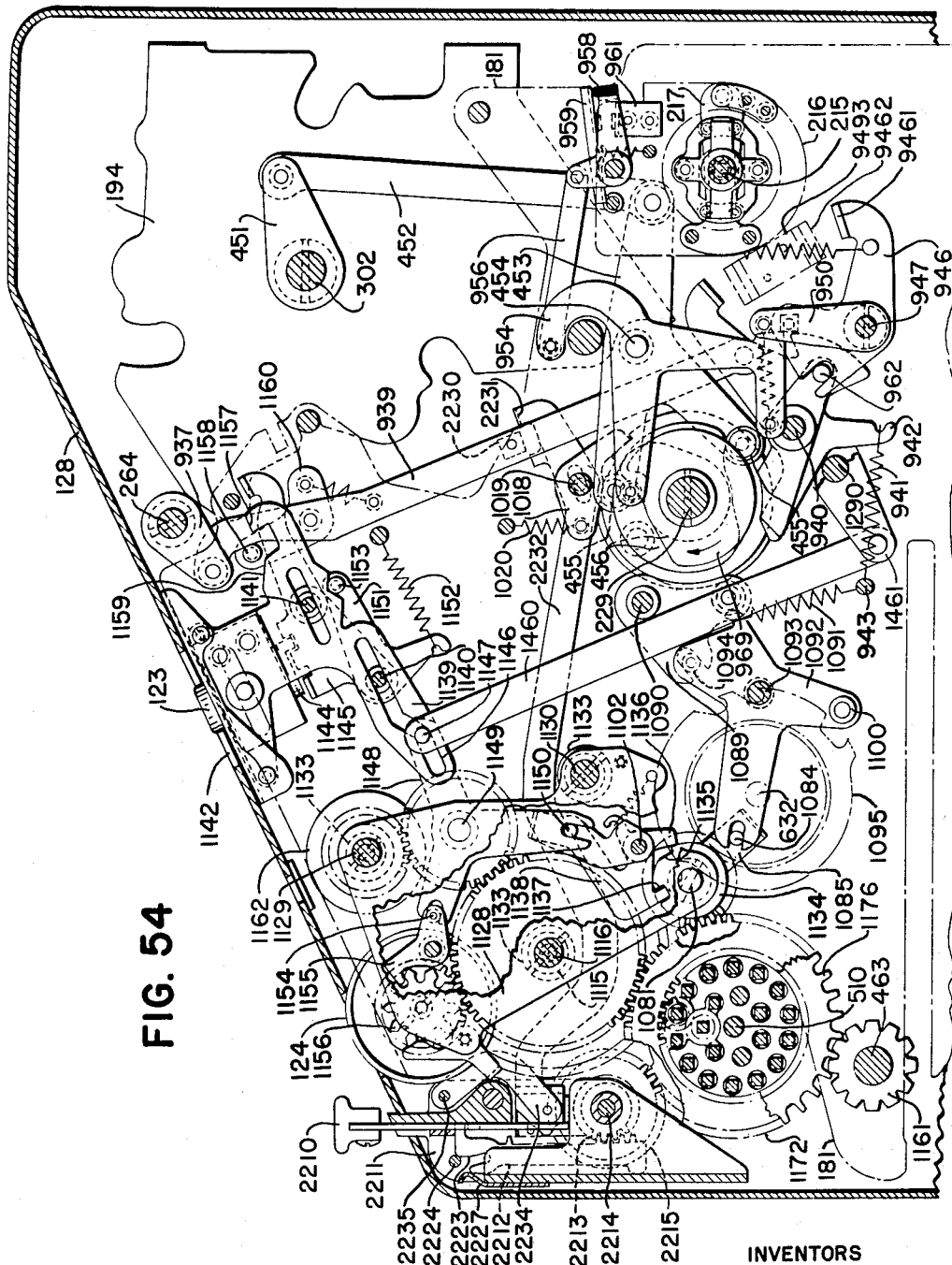

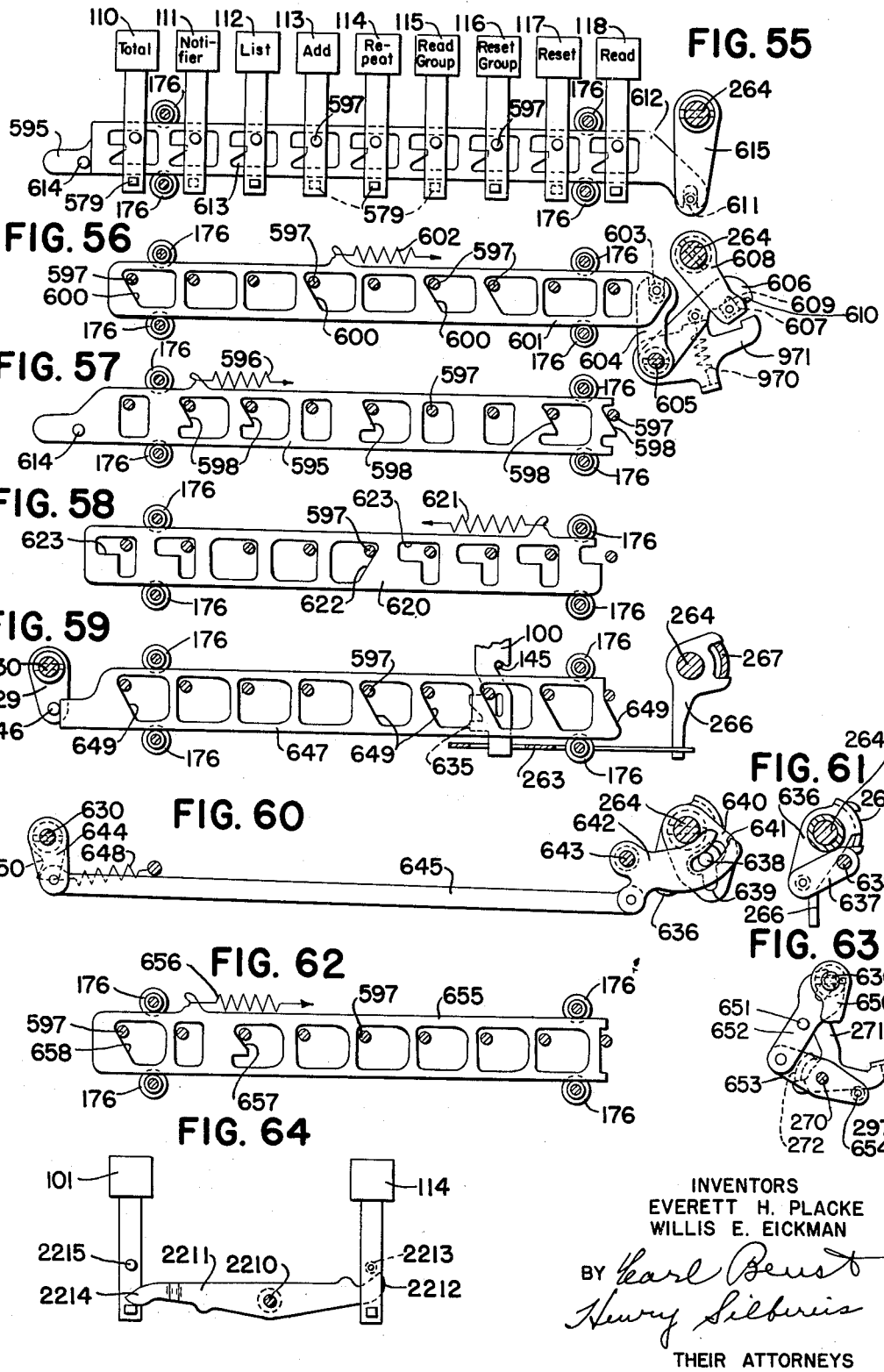

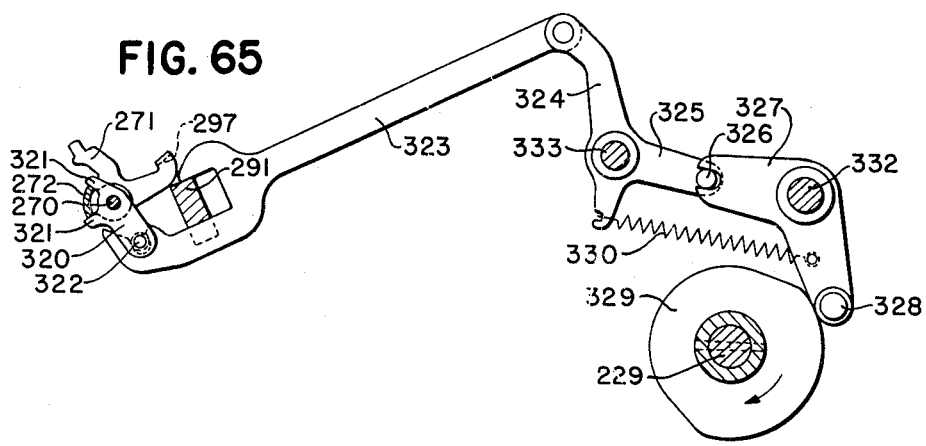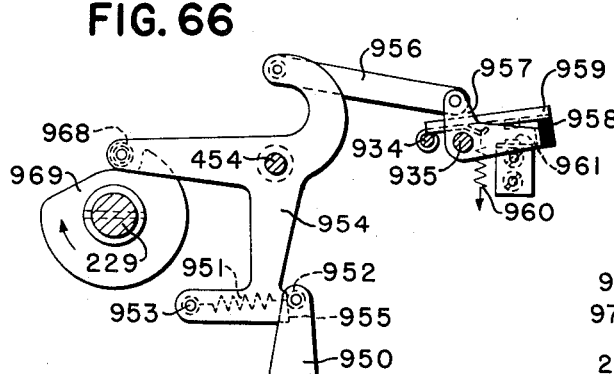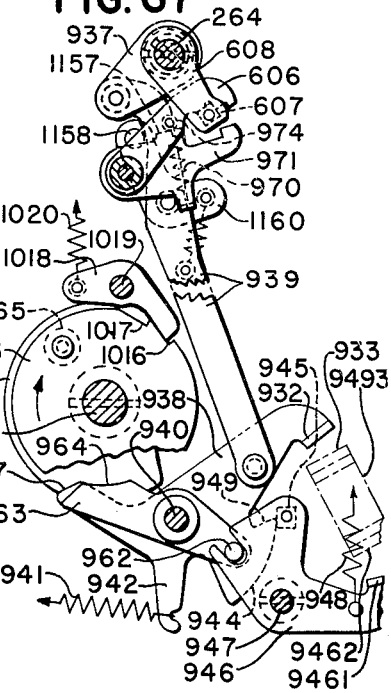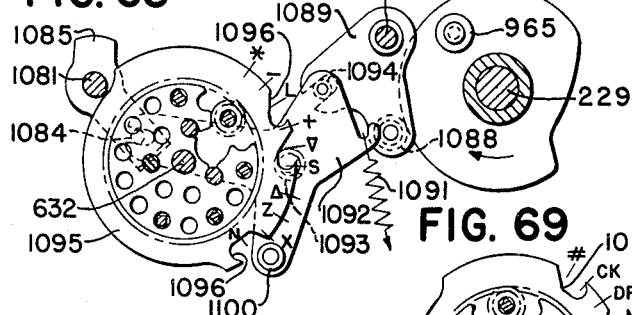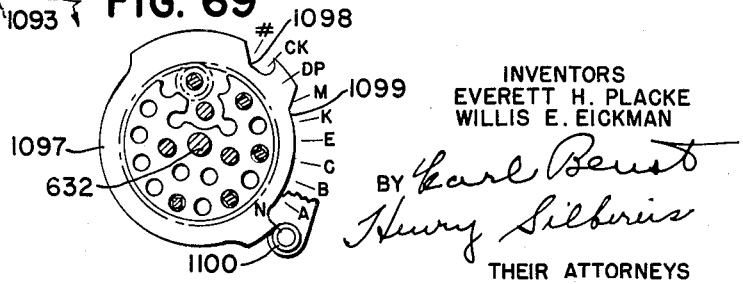

May 29, 1956  E. H. PLACKE ET AL  2,747,794
ZERO PRINTING CONTROL MECHANISM

Filed April 4, 1952  41 Sheets-Sheet 22

INVENTORS
EVERETT H. PLACKE
WILLIS E. EICKMAN

BY *Carl Beust*
*Henry Silbereis*

THEIR ATTORNEYS

May 29, 1956 — E. H. PLACKE ET AL — 2,747,794
ZERO PRINTING CONTROL MECHANISM
Filed April 4, 1952 — 41 Sheets-Sheet 23
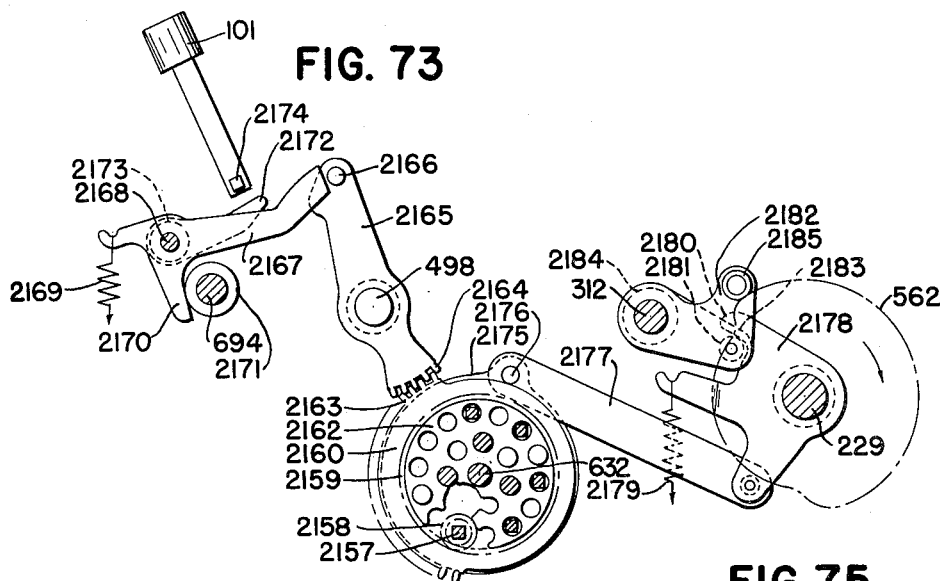
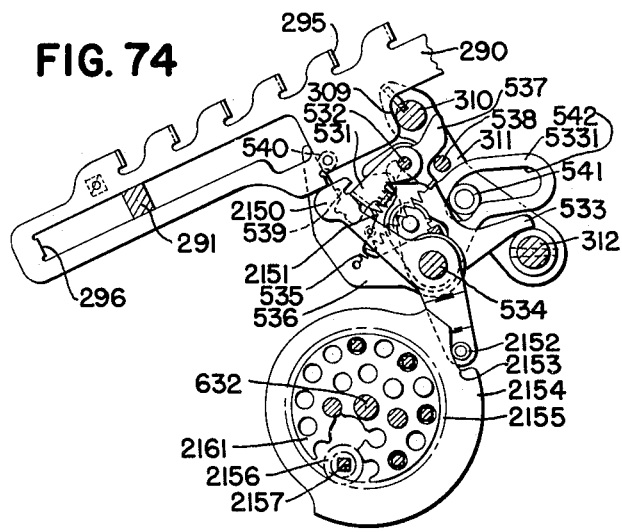
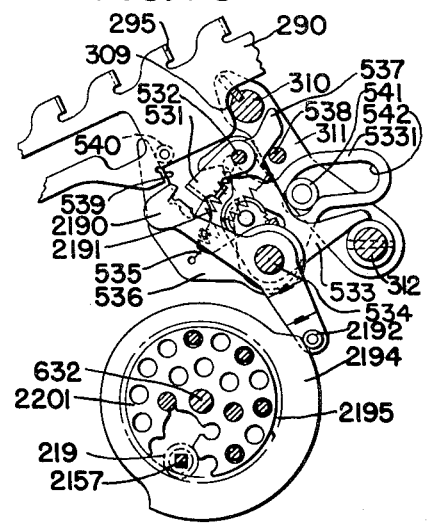
INVENTORS
EVERETT H. PLACKE
WILLIS E. EICKMAN
THEIR ATTORNEYS May 29, 1956 E. H. PLACKE ET AL 2,747,794
ZERO PRINTING CONTROL MECHANISM
Filed April 4, 1952 41 Sheets-Sheet 24

INVENTORS
EVERETT H. PLACKE
WILLIS E. EICKMAN

BY
THEIR ATTORNEYS

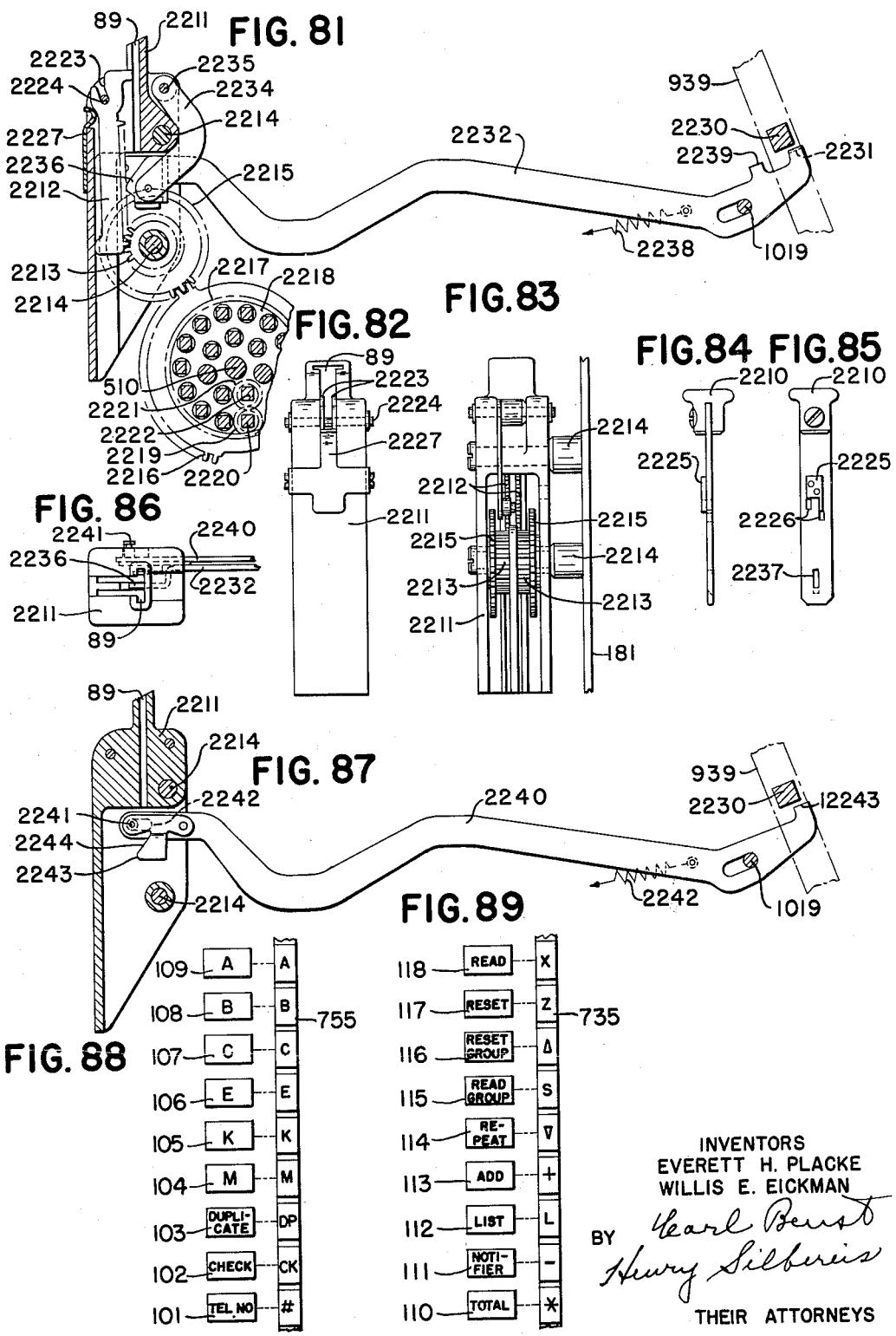

May 29, 1956  E. H. PLACKE ET AL  2,747,794
ZERO PRINTING CONTROL MECHANISM
Filed April 4, 1952  41 Sheets-Sheet 26

INVENTORS
EVERETT H. PLACKE
WILLIS E. EICKMAN
BY
THEIR ATTORNEYS

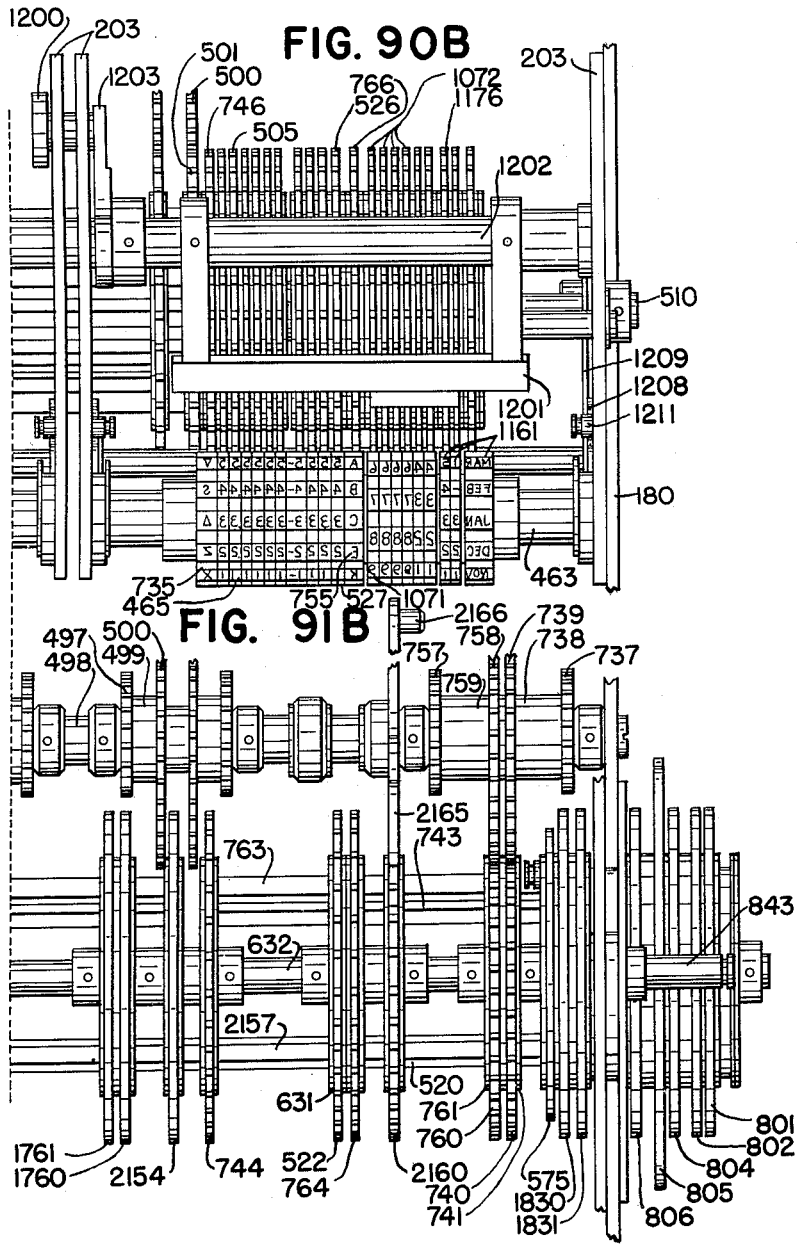

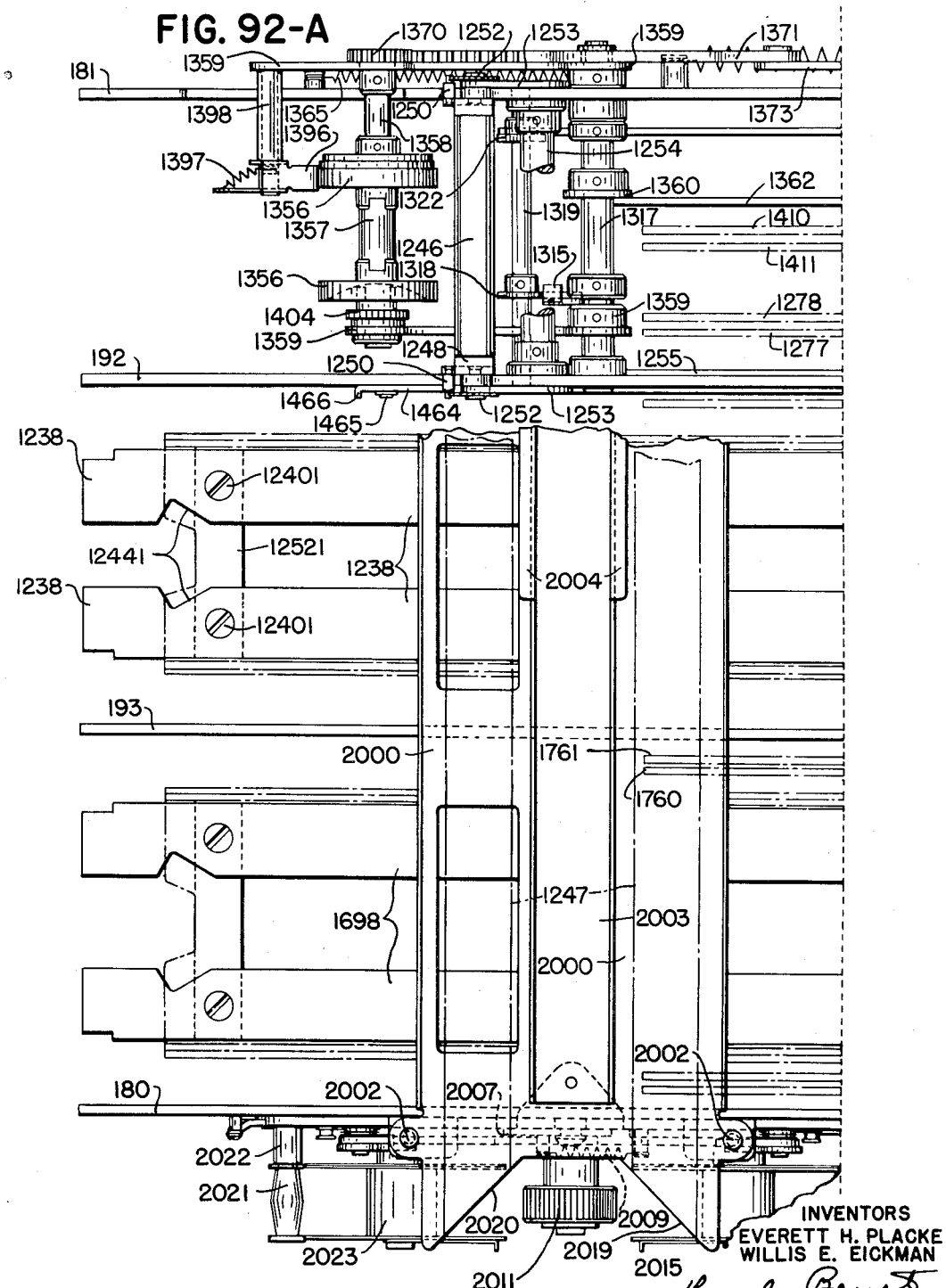
May 29, 1956  E. H. PLACKE ET AL  2,747,794
ZERO PRINTING CONTROL MECHANISM
Filed April 4, 1952  41 Sheets-Sheet 28
FIG. 92-A
INVENTORS
EVERETT H. PLACKE
WILLIS E. EICKMAN
BY
THEIR ATTORNEYS

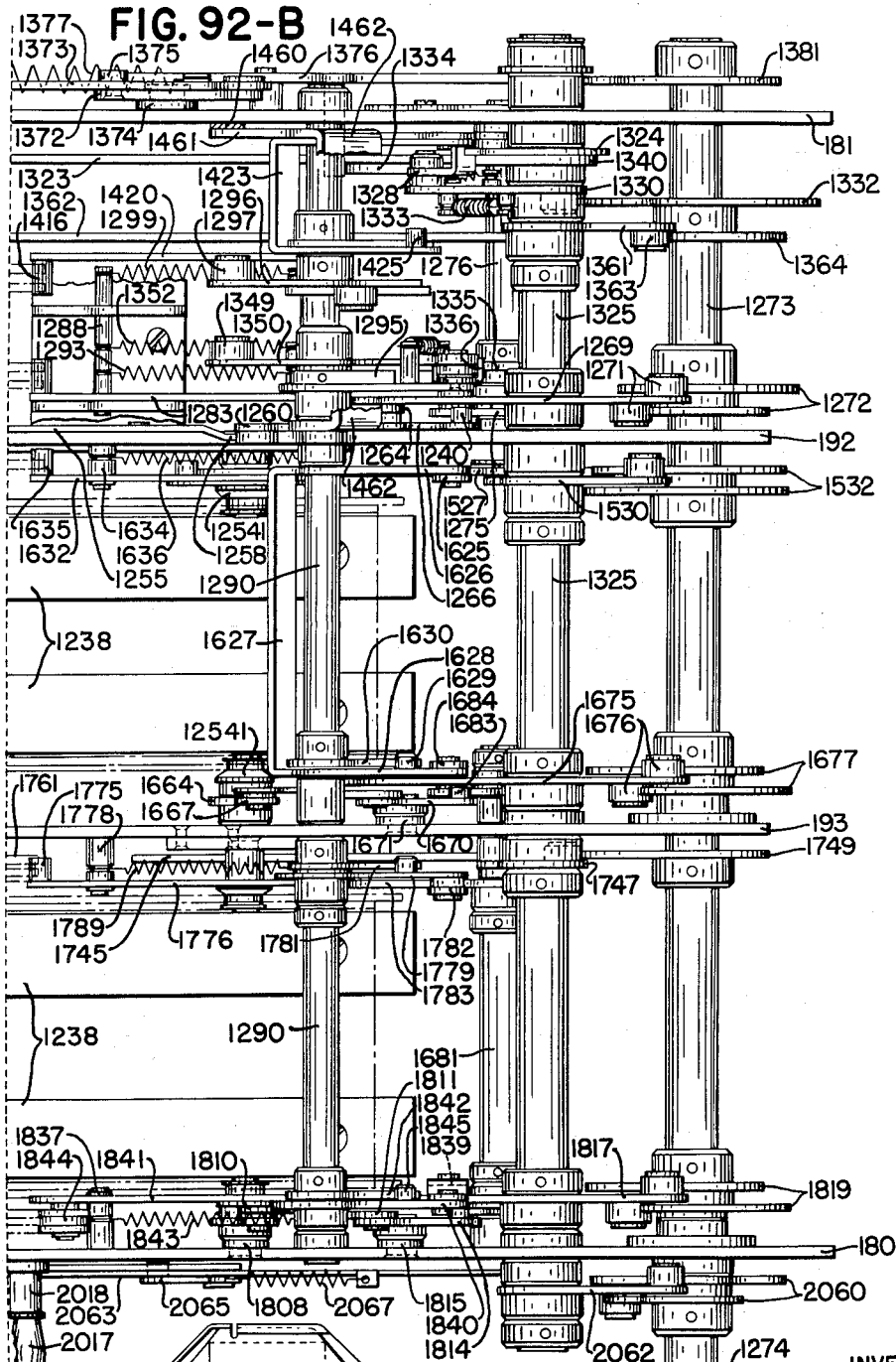

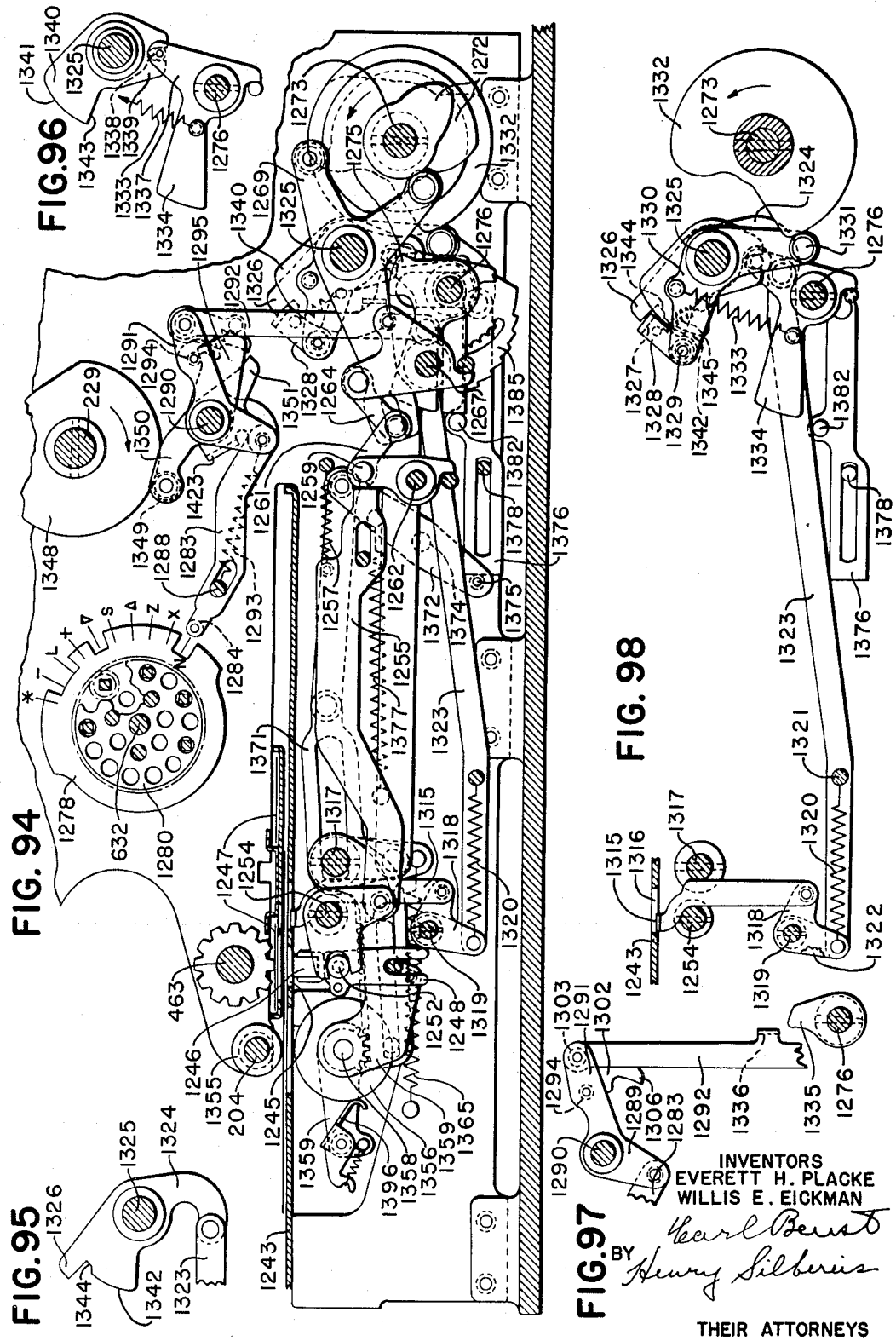

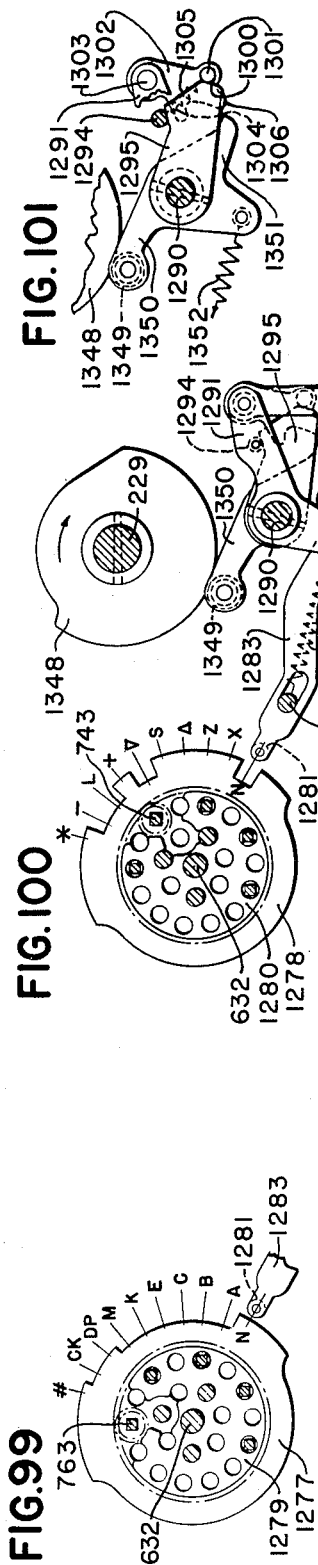

May 29, 1956     E. H. PLACKE ET AL     2,747,794
ZERO PRINTING CONTROL MECHANISM
Filed April 4, 1952     41 Sheets-Sheet 32
FIG. 103
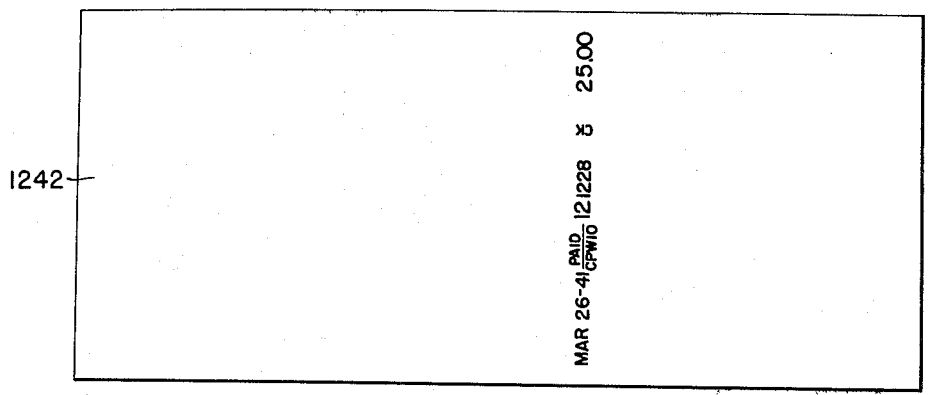
FIG. 104
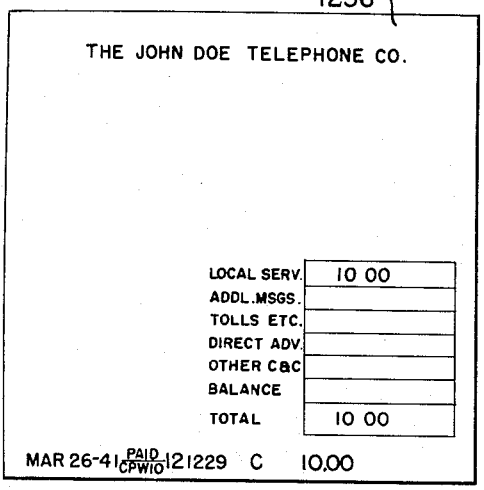
FIG. 105
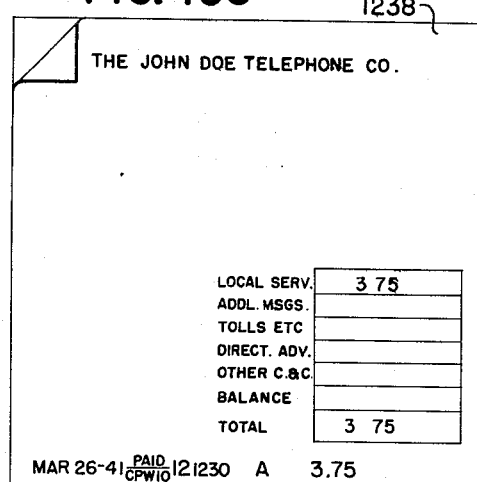
FIG. 106
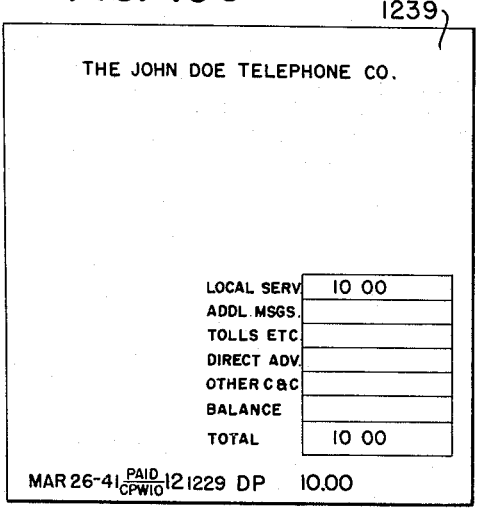
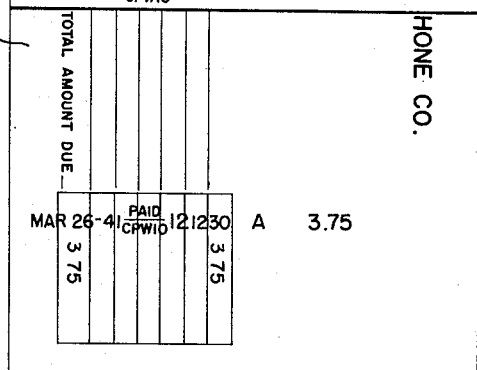
INVENTORS
EVERETT H. PLACKE
WILLIS E. EICKMAN
BY
THEIR ATTORNEYS

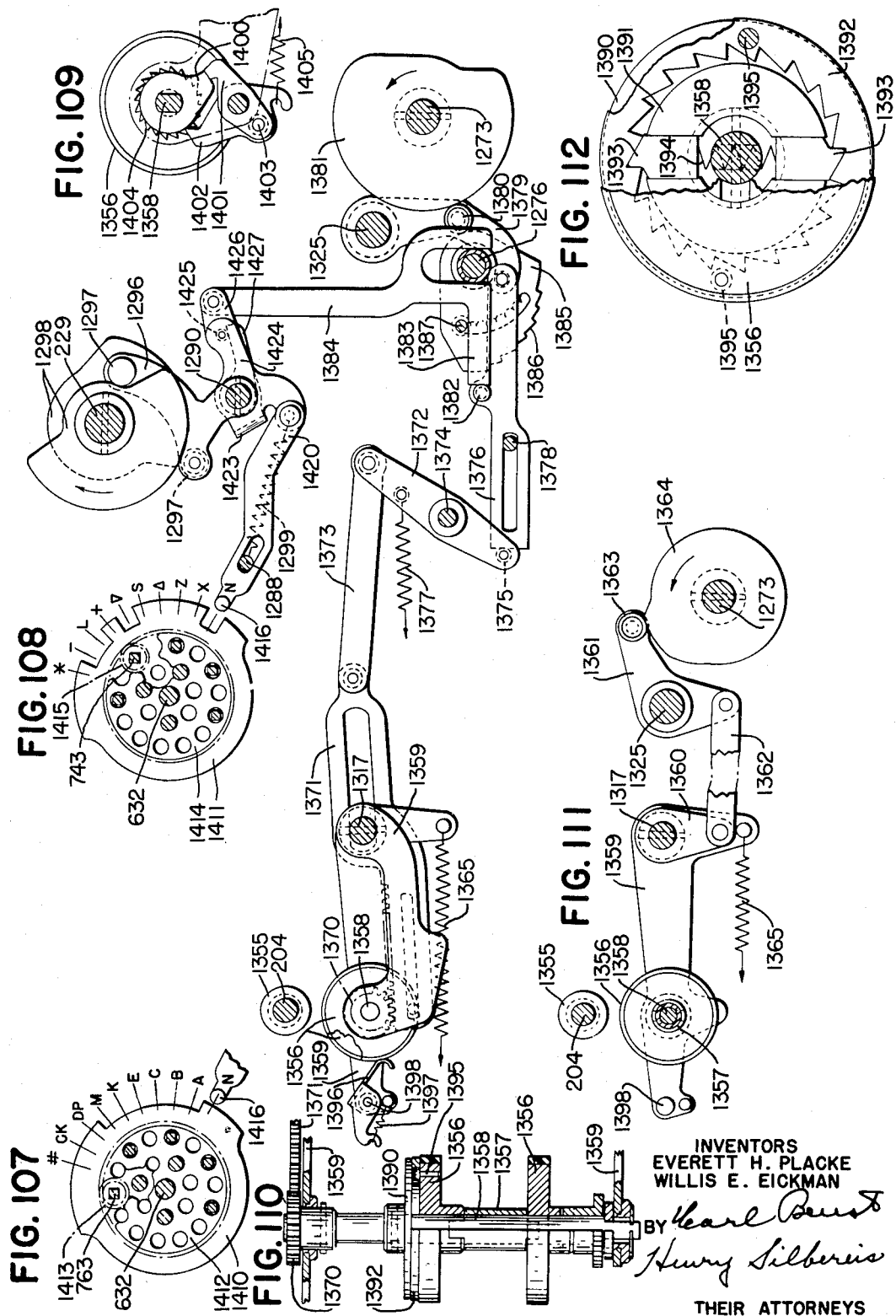

INVENTORS
EVERETT H. PLACKE
WILLIS E. EICKMAN
BY
THEIR ATTORNEYS

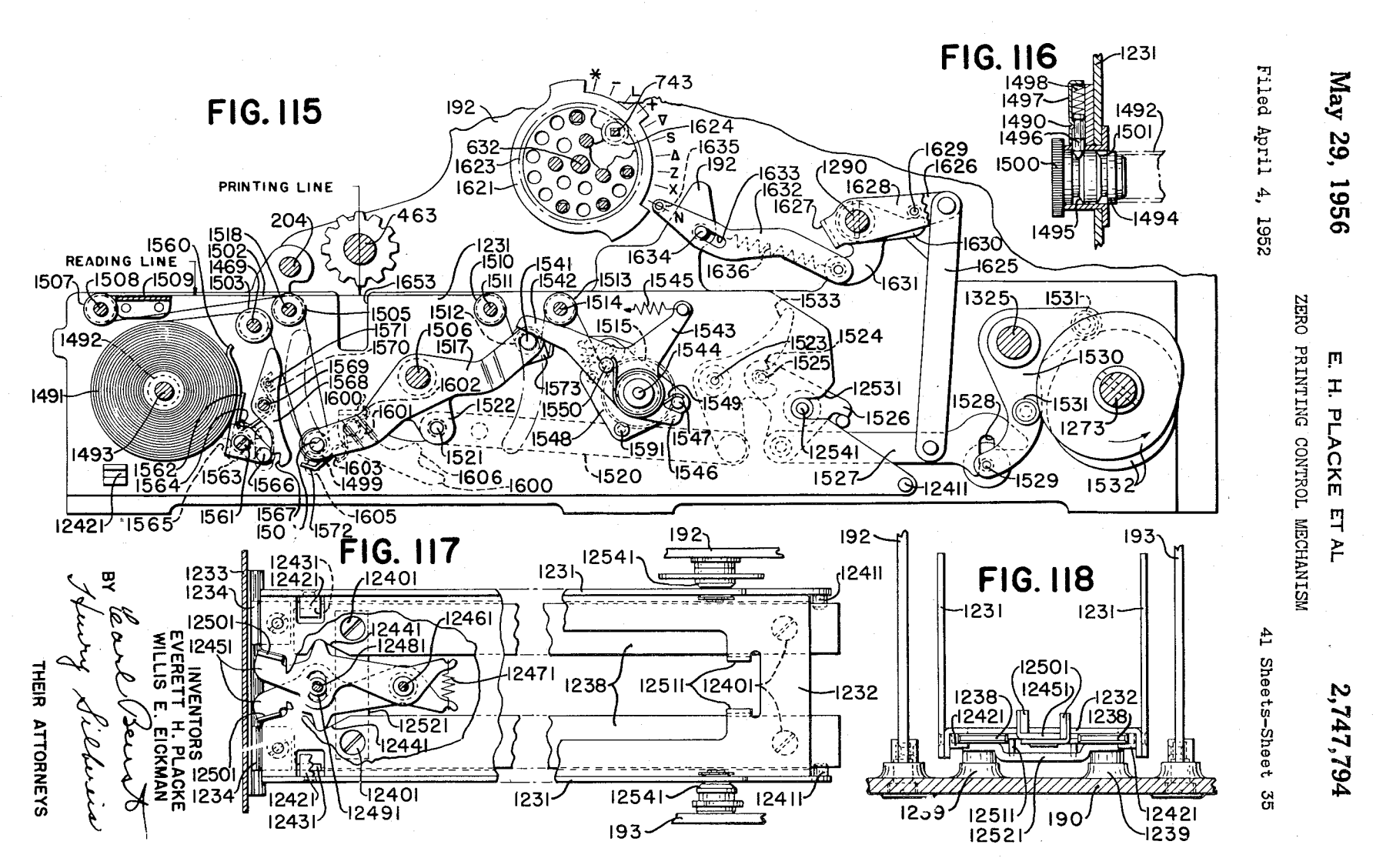

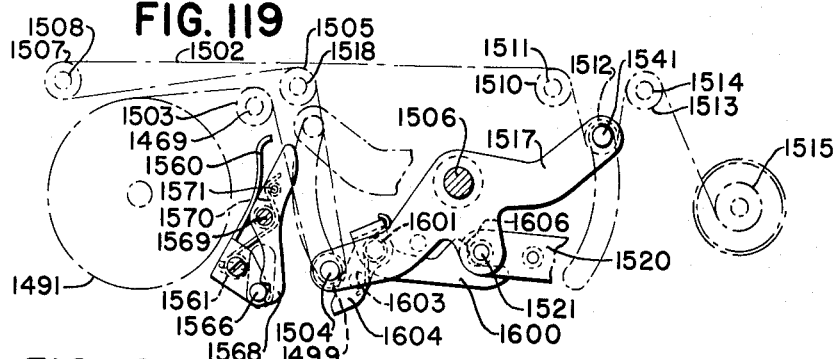
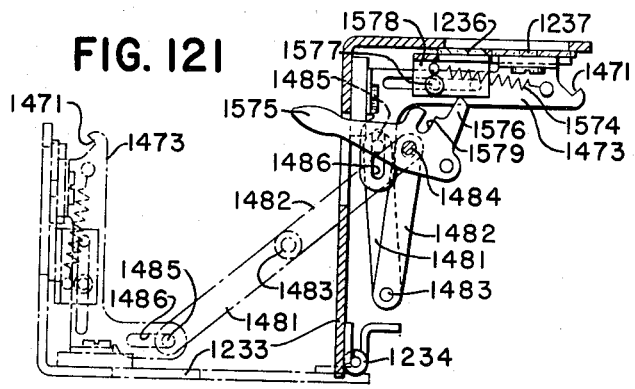
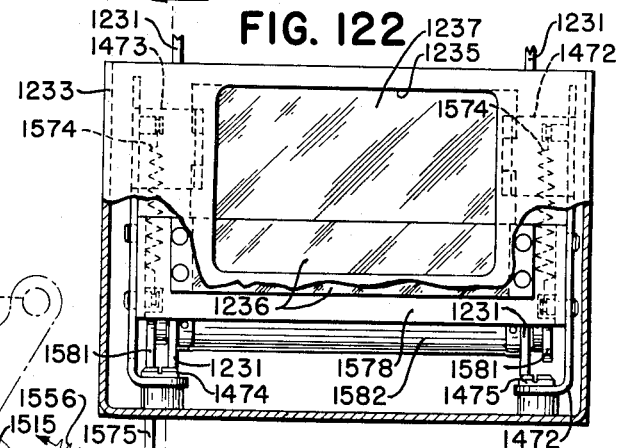
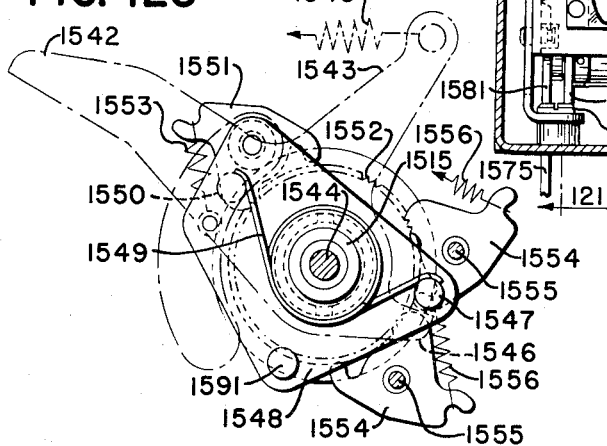

May 29, 1956  E. H. PLACKE ET AL  2,747,794
ZERO PRINTING CONTROL MECHANISM
Filed April 4, 1952  41 Sheets-Sheet 37
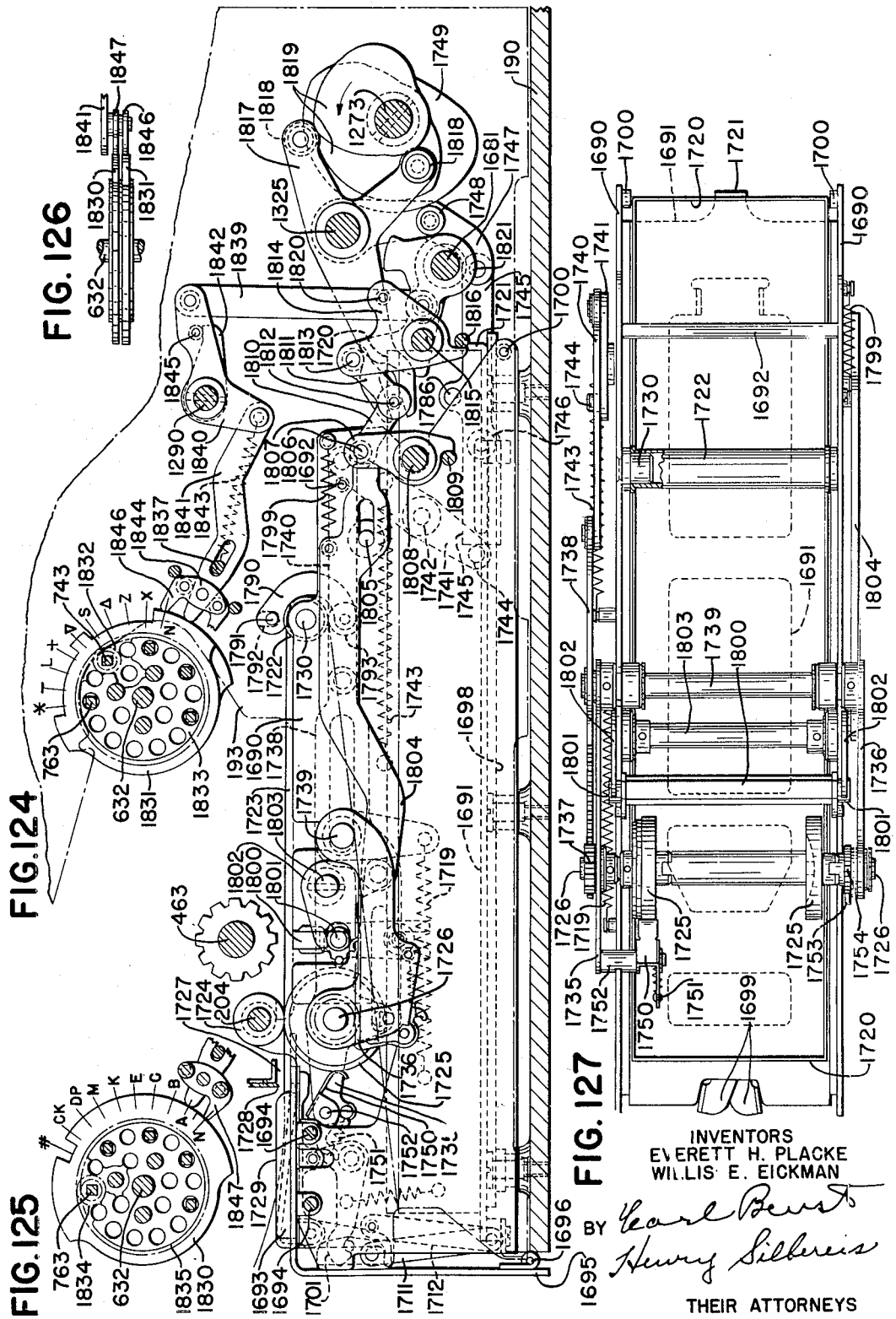
INVENTORS
EVERETT H. PLACKE
WILLIS E. EICKMAN
BY
THEIR ATTORNEYS

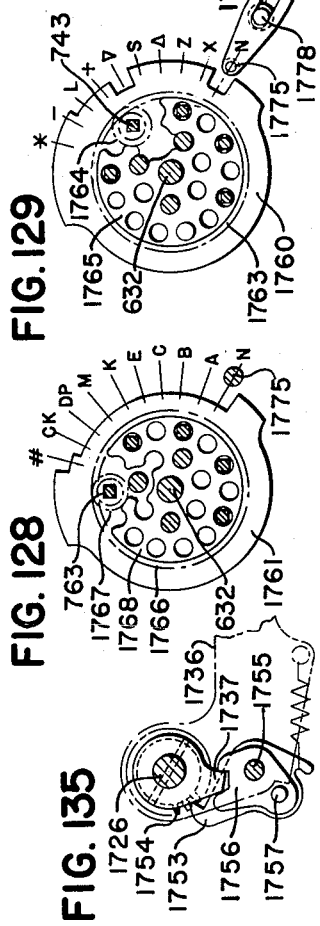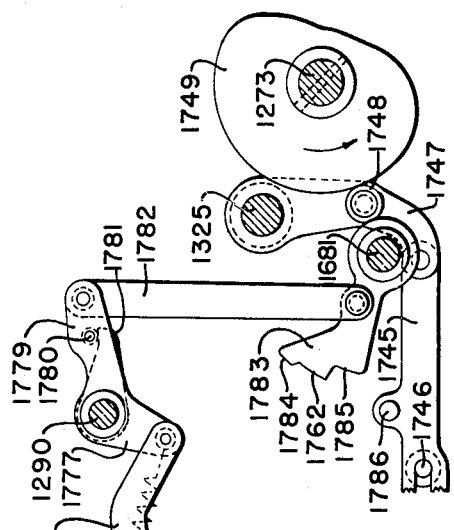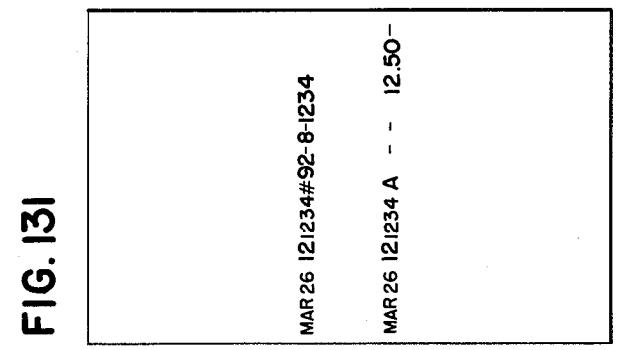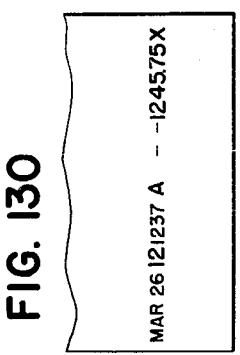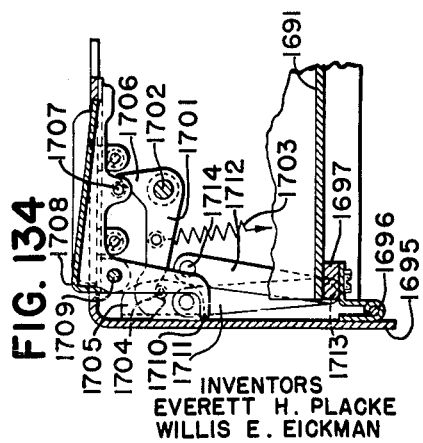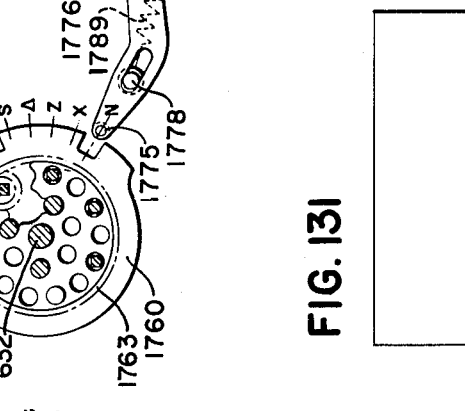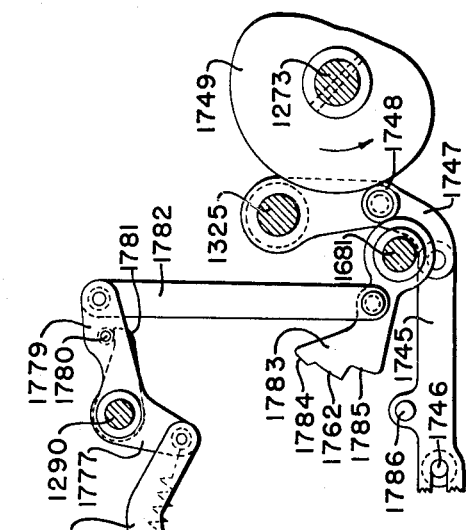

May 29, 1956  E. H. PLACKE ET AL  2,747,794
ZERO PRINTING CONTROL MECHANISM
Filed April 4, 1952  41 Sheets-Sheet 39
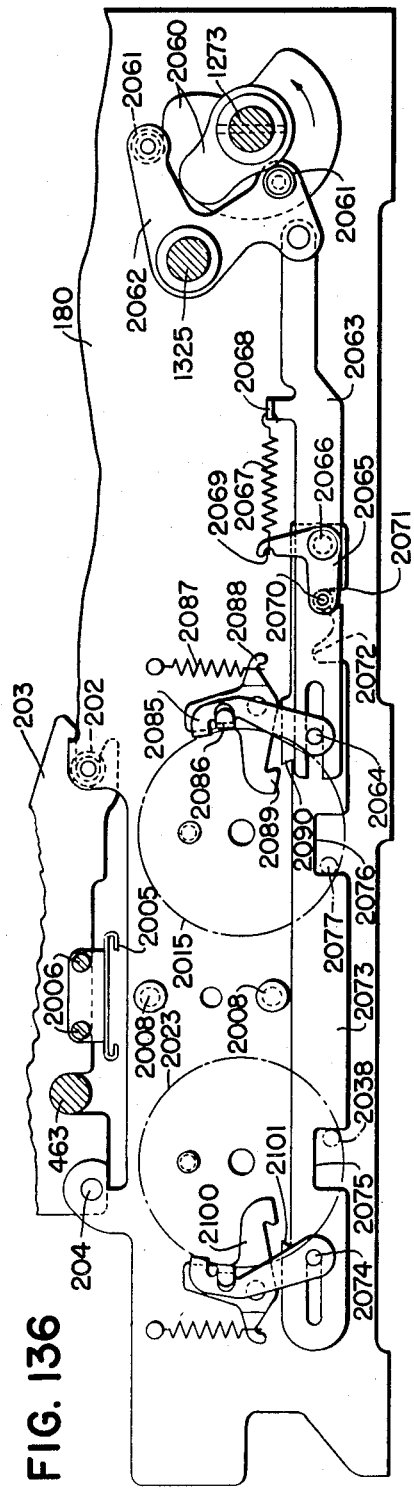
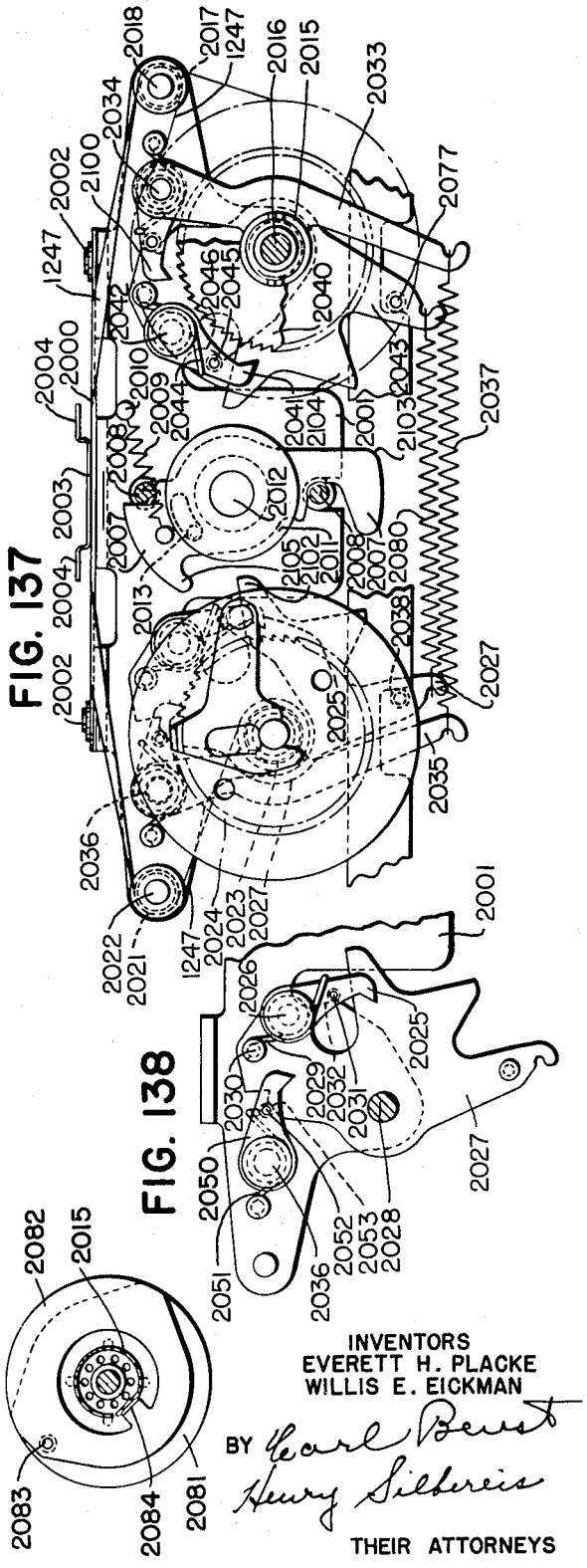
INVENTORS
EVERETT H. PLACKE
WILLIS E. EICKMAN
BY
THEIR ATTORNEYS

| | 0 | 40 | 80 | 120 | 160 | 200 | 240 | 280 | 320 | 360 |
|---|---|---|---|---|---|---|---|---|---|---|
| KEY LOCK LINE STUD 965 FIG. 68 | TRIP | | | | | Releases Keys 195 | Return Home 230  255 | | | |
| CLUTCH RELEASE LINE STUD 965 FIG. 68 | Releases Clutch Start Motor | | | | | Restores 175 | Returns to Home 230  255 | | | |
| MOTOR SWITCH PLATE CAM 968 FIG. 66 | | | | | | Retains Switch 175 | | | Releases Switch 357 352 | |
| REPEAT SELECTION CAM 562 FIG. 31 | Selects 5  20 | | | Returns 125 | 170 | | | | | |
| AMOUNT TYPE SETTING COUPLING PAWL CAMS 483 FIG. 32 | Disengages 25  50 | | Engages 100  125 | | | | | | | |
| ZERO STOP LEVERS CAM 329 FIG. 65 | Zero Stop Pawls In 10  45 | | | | | Zero Stop Pawls Out 235 | | | | |
| AMOUNT DIFFERENTIAL CAMS 315 FIG. 21 | Actuators Positioned— Type Wheels to Eliminated Pos. 45 | | 95 | Add— Type Wheels Set 150 | | | | | | |
| ZERO ELIMINATION SELECTION. STUDS 538 & 541 MOVED BY CAMS 315. FIGS. 27, 28, & 29 | Stud 538  55  68 45 60 | | Stud 541 Returns Actuator Home 85 | | | | | | | |
| ZERO ELIMINATION CAMS. 315 FIG. 21 | | | 95 85  Type Wheel to Eliminated Positioned | | | | | | | |
| TRANSACTION DIFFERENTIAL CAMS 723 FIGS. 8 & 38 | Shift Totalizer— Position Type Wheel 5 | | 95 | Returns | | | | | | |
| TRANSACTION DIFFERENTIAL LINER CAMS 779 FIG. 8 | | | In 90  110 | | | | | | Out 335  355 | |
| TYPE WHEEL LINER CAM. 1206 FIG. 71 | | | | | | In 195  215 | | | Out 335  355 | |
| TYPE WHEEL SNAP ALINER CAMS 1218 FIG. 72 | | | | | | Snap In 215 | | | Out 335  355 | |
| TOTALIZER SELECTION CAM 772 FIG. 12 | Select to Read or Reset 5  20 | | Select to Add or Transfer 100  125 | | | | Return Home 260  285 | | | |
| TOTALIZER ENGAGING-ADD CAMS 820 FIG. 53 | | | Totalizer In  Liner Out 125  145 | | | Liner In  Totalizer Out 220  235  255 | | | | |
| TOTALIZER ENGAGING-READ CAMS 878 FIG. 52 | Totalizer In 20 | Liner Out 40  55 | | | | Liner In  Totalizer Out 220  235  255 | | | | |
| TOTALIZER ENGAGING-RESET CAMS 855 FIG. 51 | Totalizer In 20 | Liner Out 40  55 | Liner In 115 | Totalizer Out 130  150 | | | | | | |
| TENS TRANSFER RESTORING CAM 456 FIG. 22 | Completes Return 20 | | | | | | Restores Transfer 250 | | Starts Return 330  340 | |
| READ SELECTION CAM 836 FIG. 52 | | | Selection For Read 95  110 | | | | Return 270 | | 330 | |
| SELECTION FOR RESET ON FRONT & BACK TOTALIZERS ROLL 906 ON TRANS. DIFFERENTIAL CAM FIG. 46 | | | Releases Reset Totalizer Yoke Moves Plate 147 | 178 Returns 168 | | | | | | |

FIG. 140

INVENTORS
EVERETT H. PLACKE
WILLIS E. EICKMAN

BY

THEIR ATTORNEYS

FIG. 141

| | 0 | 40 | 80 | 120 | 160 | 200 | 240 | 280 | 320 | 360 |
|---|---|---|---|---|---|---|---|---|---|---|
| CONSECUTIVE NUMBER FEED. CAM 975. FIG. 68 | | | | Selects 105 — 125 | 140 | Add | | | | |
| IMPRESSION SELECTION FOR SINGLE IMPRESSION ON SLIP. CAM 1348. FIG. 94 | | | | Selects 110 — 136 | | | Returns 239°30' — 258°30' | | | |
| SELECTION FOR PRINT & FEED ALL PRINTERS. CAM 1298. FIG. 108 | | | | Selects 110 — 136 | | | | | | Returns 330 — 356 |
| SLIP IMPRESSION. CAMS 1272. FIG. 100 | | | | | | 195 | Print 225 — 245 275 | | Print 295 — 325 | |
| PRINTING HAMMER CAMS – AUDIT TAPE 1677, FIG. 113 – ISSUING TAPE 1819, FIG. 124 | | Idle 50 — 110 | | | | 195 | Print 225 — 255 | | | |
| AUDIT TAPE SHIFT & FEED CAM 1532. FIG. 115 | | Shift to Print Position, Feed Receiving Roll. 135 | | | | | 210 235 | Shift To Visible Position-Pulls Paper from Supply Roll. 330 | | |
| ISSUING TAPE FEED CAM 1749. FIG. 124 & 129 | | | | | Back Up 135 | | 205 235 | Feed 330 | | |
| SLIP TENSION CAM 1364. FIG. 111 | On 5 — 20 | | | | | | | | Off 300 — 330 | |
| SLIP FEED CAM 1381. FIG. 108 | | | | | Back Up 135 | | 205 235 | Feed 265 | | |
| RIBBON FEED CAM 2060 FIG. 136 | Feed Left Spool. 20 — 70 | | Feed Right Spool. 130 | | | | | | | |
| SLIP FEELER CAM 133 FIG. 98 | Feels For Paper. 5 — 45 60 | Returns Feeler, Blocks Print & Feed. (No Slip) 110 | | | | | | | | |
| TWO CYCLE CONTROL CAM 936. FIG. 15 | | | | 110 — 137 | | | | 248 — 286 | | |

FIG. 142

ONLY CAMS LISTED BELOW MAKE 2 CYCLES
CAM LINE STOPS AT 20° FIRST CYCLE; COMPLETES MOVEMENT ON SECOND CYCLE.

| | 0 | 80 | 160 | 240 | 320 | 360 | 400 | 480 | 560 | 640 | 720 |
|---|---|---|---|---|---|---|---|---|---|---|---|
| TRANSACTION DIFFERENTIAL SHIFTING CAM 723. FIG. 38 | Shift Tot. Sets T.W. 5 | Return 95 120 | 200 | | | 365 | 455 | | | | |
| SELECTION FOR RESET ON FRONT & BACK COUNTERS ROLLS 906 FIG. 46 | Moves Plate Selecting Totalizer, To Reset. | 178 147 168 | 200 | | | | | 538 507 528 | | | |
| TRANSACTION DIFFERENTIAL ALINER CAMS 779 FIG. 8 | | In 90 110 | | | Out 355 335 | | In 450 470 | | | | Out 715 695 |
| TWO CYCLE CONTROL CAM 936 FIG. 15 | Trip Restores Arm Retained by Pawl 110 137 | | Return 248 286 | | | | 470 497 | | 608 646 | | |

INVENTORS
EVERETT H. PLACKE
WILLIS E. EICKMAN

THEIR ATTORNEYS

United States Patent Office 2,747,794
Patented May 29, 1956

2,747,794
ZERO PRINTING CONTROL MECHANISM

Everett H. Placke and Willis E. Eickman, Dayton, Ohio, assignors to The National Cash Register Company, Dayton, Ohio, a corporation of Maryland Application April 4, 1952, Serial No. 280,534

20 Claims. (Cl. 235—60.28)

This invention relates to improvements in accounting machines.

One object of the invention is to provide a machine for use in handling public utility accounts, and the machine illustrated herein is for use by a telephone company.

Another object of the invention is to construct an accounting machine which is capable of receiving entries of the amounts paid on a bill and also to print the telephone number from a common keyboard.

A specific object of the invention is to provide a keyboard for an accounting machine with amount keys for recording amounts and with controls to provide means to use the same keys for recording telephone numbers.

Another object of the invention is to provide a zero setting control mechanism to eliminate zero printing to the left of the highest significant number of the amounts when monetary data is entered, and to eliminate the printing of zeros to the right of the lowest order telephone number when telephone numbers are printed.

Another object of the invention is to provide two banks of keys having thereon symobls corresponding to the symbols used on a dial telephone system for dialing a telephone exchange, which banks of keys are adapted to control the setting of symbols representing the exchange, whereby such symobls can be recorded on a printed record.

Still another object of the invention is to provide a novel insertable cashier's key mechanism for setting up an identifying symbol in the printing mechanism and to control the release of the machine.

With these and incidental objects in view, the invention includes certain novel features of construction and combinations of parts, preferred forms or embodiments of which are hereinafter described with reference to the drawings which accompany and form a part of this specification.

Of said drawings:

Fig. 7 is a detail view showing the main framework of the machine as viewed from the front of the machine.

Fig. 8 is a sectional view taken at the right of the first transaction bank, showing the transaction differential mechanism and certain mechanisms adjusted thereby.

Fig. 9 is a detail view of the driving mechanism for the first transaction bank differential mechanism.

Fig. 10 is a detail view of the beam-setting mechanism for the first transaction bank.

Fig. 11 is a detail view of certain parts of the first transaction bank differential mechanism.

Fig. 14 is a detail view of the clutch mechanism for starting the maching in operation.

Fig. 15 is a detail view showing the cycle control mechanism.

Fig. 16 is a detail view of the detent for maintaining the keys of the second transaction bank depressed during the machine operation.

Fig. 17 is a detail view of the second transaction bank release detent.

Fig. 18 is a detail view of an interlocking control plate to prevent the simultaneous depression of two adjacent keys in the second transaction bank.

Fig. 19 is an elevational view, looking at the machine from the right side, and shows the totalizer engaging and disengaging mechanism, together with the hand operating mechanism for the machine.

Fig. 20 is a cross-sectional view of the machine taken just to the right of the ten-cent amount bank.

Fig. 21 is a detail view showing the amount differential operating cams.

Fig. 22 is a detail view showing the operating mechanism for restoring the tripped tens transfer mechanism to normal position.

Fig. 23 is a sectional view of the machine, as viewed from the front, and shows the relationship of the keyboard to the telephone number, amount, and transaction bank differentials, together with the main cam line for operating the machine.

Fig. 24 is a detail view of the amount differential mechanim shown in the position in which it is arrested by the five-cent key in the early part of the machine operation, and also shows the corresponding position of the zero setting and repeat mechanisms.

Fig. 25 is a detail view of the mechanism shown in Fig. 24, with the universal rod in its fully moved positon.

Fig. 26 is a detail view of the mechanism shown in Fig. 24, with the parts in the position which they assume with the machine at rest, after "five" has been added in the totalizer.

Fig. 38 is a sectional view taken just to the right of the second transaction bank and shows the second transaction bank differential mechanism and the connections for shifting the interspersed totalizer.

Fig. 39 is a detail view of one of the control plates set by the first transaction bank for controlling the engagement of the rear totalizer line.

Fig. 40 is a detail view of the engaging mechanism for the rear totalizer and shows the control plate therefor, adjusted under control of the second transaction bank.

Fig. 41 is a top plan view of the control plates for controlling the engagement of the totalizer.

Fig. 42 is a detail view of a control plate adjusted by the first transaction bank for controlling the engagement of the rear totalizer line.

Fig. 43 is a detail view showing a control plate adjusted under control of the first transaction bank, for controlling the engagement of the front totalizer line.

Fig. 44 is a detail view of the mechanism for controlling engagement of the front totalizer line and shows a control plate set by the second transaction bank for controlling said mechanism.

Fig. 45 is a detail view of a control plate set by the first transaction bank for controlling engagement of the front totalizer line.

Fig. 46 is a detail view of the mechanism for controlling the time at which the engaging control feelers for the rear and the front totalizer lines are operated.

Fig. 47 is a detail view of the mechanism for controlling the engagement of the upper totalizer and includes a control plate therefor set under control of the first transaction bank.

Fig. 48 is a detail view of the add and total-taking engaging mechanism for the three totalizer lines.

Fig. 49 is a detail view of a part of the totalizer engaging mechanism for the front totalizer line.

Fig. 50 is a detail view of the mechanism shown in Fig. 49, shown in the moved or totalizer-engaging position.

Fig. 54 is a sectional view, taken just to the right of the left side frame of the machine, and shows the locking control slide, the consecutive number mechanism, the date-setting mechanism, and certain of the machine release mechanisms.

Fig. 55 is a detail view of the detent for holding the keys of the first transaction bank depressed during the machine operation.

Fig. 56 is a detail view showing the machine release control slide in the first transaction bank and the mechanism controlled thereby for releasing the machine for operation.

Fig. 57 is a detail view of the flexible detent in the first transaction bank for holding certain transaction keys in their depressed position.

Fig. 58 is a detail view of the interlocking control slide in the first transaction bank for preventing depression of certain transaction keys in said first transaction bank after the repeat key has been depressed and to prevent depression of the repeat key after any of said certain keys have been depressed.

Fig. 59 is a detail view of the control slide in the first transaction bank forming a part of an interlock between the total-taking keys and the amount keys.

Fig. 60 is a detail view of the mechanism in the first transaction bank for preventing the release of the machine with amount keys depressed and for controlling the operation of the zero stop mechanism in the amount banks, when a total-taking key has been depressed.

Fig. 61 is a detail view of a part of the mechanism shown in Fig. 60.

Fig. 62 is a detail view of the detent in the first transaction bank for maintaining the list key in depressed position until released by depression of the balance key.

Fig. 63 is a detail view showing the mechanism in the first transaction bank for blocking movement of the zero stop pawls in the amount differential banks when a total key has been depressed.

Fig. 64 is a detail view of the interlock between the telephone number key in the second transaction bank and the repeat key in the first transaction bank.

Fig. 65 is a detail view of the mechanism for controlling the setting of the zero stops in the amount banks.

Fig. 66 is a detail view of the motor switch operating mechanism.

Fig. 67 is a detail view of part of the machine release mechanism.

Fig. 68 is a detail view of the consecutive number operating control mechanism.

Fig. 69 is a detail view of a control plate adjusted under control of the second transaction bank for controlling the operation of the consecutive number device.

Fig. 73 is a detail view showing the mechanism under control of the telephone number key in the second transaction bank for controlling the zero-setting mechanism for supplying lower order zeros when telephone numbers are printed.

Fig. 74 is a detail view showing a control cam located adjacent the 10-cent bank of keys, to control the zero printing in the units and tens of cents amount orders, when amounts are printed.

Fig. 75 is a detail view showing a control cam located adjacent the thousand-dollar bank of keys which is set under control of the telephone number key to control the zero printing in the lower order amount banks when telephone numbers are printed.

Fig. 81 is a detail view showing the mechanism operated by the cashier's key for unlocking the machine release mechanism and simultaneously setting identifying symbols in the printing mechanisms.

Fig. 82 is a front elevational view of the chute for receiving the cashier's key.

Fig. 83 is a rear elevational view of the chute for receiving the cashier's key and shows an end view of the transmitting gears for setting the type symbols.

Fig. 84 is an edge view of a cashier's key.

Fig. 85 is a front view of a cashier's key.

Fig. 86 is a top plan view of the cashier's-key-receiving chute.

Fig. 87 is a detail view of a part of the machine release control which is actuated by the cashier's key.

Fig. 88 is a diagrammatic view illustrating the symbols set at the printing line under control of the keys in the second transaction bank.

Fig. 89 is a diagrammatic view illustrating the symbols set at the printing line under control of the keys in the first transaction bank.

Figure 90A:
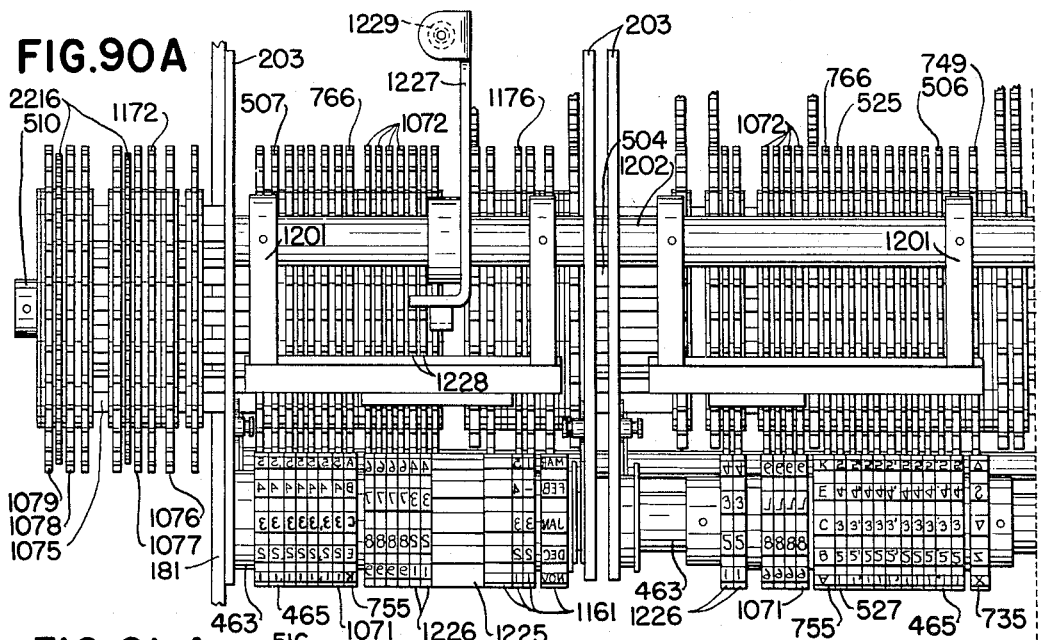

Figs. 90A and 90B, taken together, constitute a front elevational view of the transmission mechanism for setting the type wheels in the three printer sections of the machine.

Figure 91A:
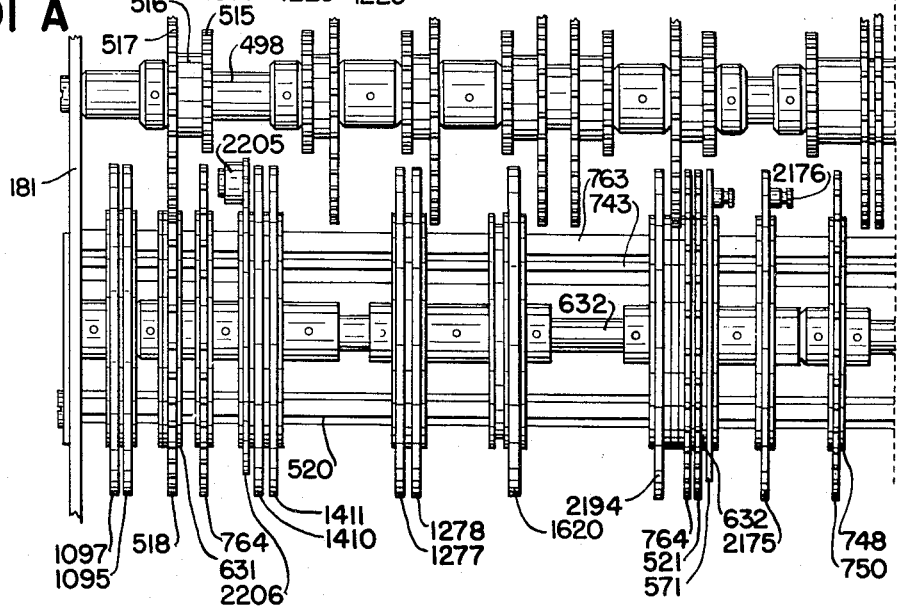

Figs. 91A and 91B are a front elevational view of the connections between the amount and transaction differential mechanisms and the type-setting transmission gears.

Figs. 92A and 92B together form a top plan view of the three printer sections, showing the cam lines and the mechanisms operated thereby, with the audit tape and issuing tape printers removed from the machine.

Fig. 93 is a detailed top plan view of one end of the ink ribbon frame.

Fig. 94 is a cross-sectional view taken through the slip printer mechanism.

Fig. 95 is a detail view of a part of the slip feeler operating mechanism.

Fig. 96 is a detail view of a part of the slip printer control mechanism.

Fig. 97 is a detail view of a part of the slip feeler mechanism for controlling the slip printing and feeding mechanisms.

Fig. 98 is a detail view of the slip feeler and the actuating mechanism therefor.

Fig. 99 is a detail view of the control disc set under control of the second transaction bank of keys for controlling the operation of the printing hammer for the deposit slip printer.

Fig. 100 is a detail view showing the slip printing hammer mechanism, together with the control disc set under control of the first transaction bank of keys, for controlling the hammer mechanism.

Fig. 101 is a detail view of a part of the mechanism shown in Fig. 100.

Fig. 102 is a facsimile of a telephone bill printed in the slip-printing section of the machine.

Fig. 103 is a facsimile of the back of a bank check, showing the method of endorsing, or validating, a check tendered in payment of a bill.

Fig. 104 is a facsimile of a customer's receipt printed in the slip printer section of the machine.

Fig. 105 is a facsimile of a statement receipted in the slip printer section of the machine.

Fig. 106 is a facsimile of a voucher printed in the slip printer section of the machine, which voucher is used in the accounting department.

Fig. 107 is a detail view showing the control discs set under control of the second bank of transaction keys for controlling the feed of the deposit slip.

Fig. 108 is a detail view showing the slip-feeding mechanism and a control disc set under control of the first bank of transaction keys for controlling the feeding mechanism.

Fig. 109 is a detail view showing a lock for the feed mechanism for the slip.

Fig. 110 is a top plan view showing the slip-feeding rollers.

Fig. 111 is a side view showing the mechanism for controlling the slip feed tensioning mechanism.

Fig. 112 is a detail view, shown in an enlarged scale, of the clutch mechanism for operating the slip feed rollers.

Figures 113, 114:
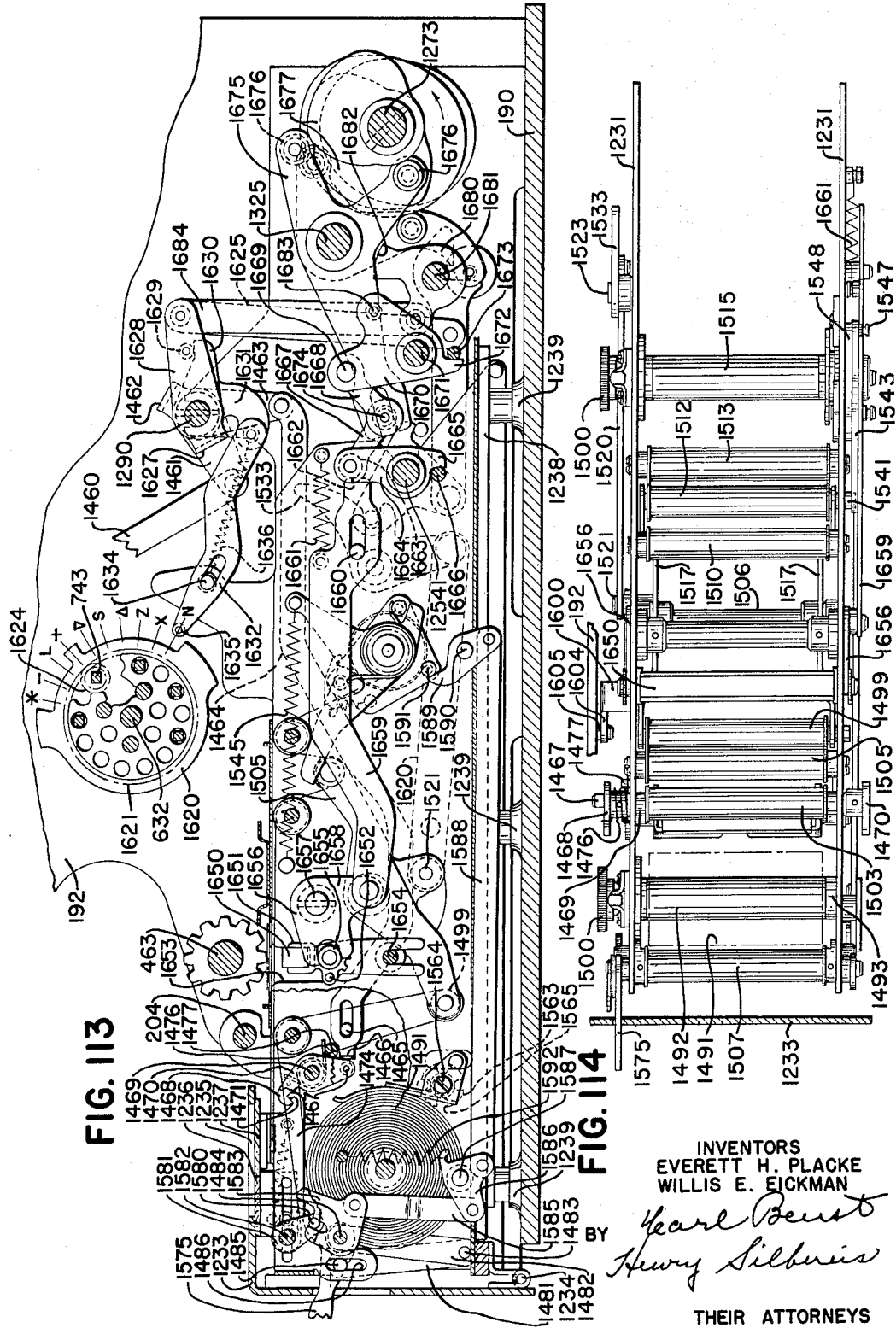

Fig. 113 is a cross-sectional view taken through the audit tape printing mechanism.

Fig. 114 is a top plan view of the audit tape printer carriage as it appears when removed from the machine, and with the audit tape removed therefrom.

Fig. 115 is a cross-sectional view of the audit tape paper shifting mechanism and certain controls therefor.

Fig. 116 is a detail view showing the mechanism for clutching the supply roll spool in position in the audit tape carriage.

Fig. 117 is a top plan view showing the audit tape printer carriage latches for holding the carriage in the machine.

Fig. 118 is a front elevation showing the latches for the audit tape printer carriage shown in Fig. 117.

Fig. 119 is a detail view of the mechanism for latching the audit tape shifting frame in an inactive position.

Fig. 120 is a facsimile of an audit tape produced by the audit tape printer.

Fig. 121 is a detail view showing the door for the audit tape printer carriage in the closed position in full lines, and in the open position in chain lines.

Fig. 122 is a top plan view showing the door for the audit tape printer, and illustrating the autograph slide opening mechanism.

Fig. 123 is a detail view of the feed mechanism for the audit tape.

Fig. 124 is a cross-sectional view taken through the issuing tape printing mechanism.

Fig. 125 is a detail view of a control disc set under control of the second transaction bank of keys for controlling the feed of the issuing tape.

Fig. 126 is a top plan view of the notched discs for controlling the issuing tape feeding mechanism.

Fig. 127 is a top plan view of the issuing tape carriage, illustrating it as it appears when removed from the machine and with the supply tape removed.

Fig. 128 is a detail view of the notched disc set under control of the second transaction bank of keys for controlling the extent of feeding movement of the issuing tape.

Fig. 129 is a detail view showing the notched disc set under control of the first bank of transaction keys for controlling the feed of the issuing tape, together with a part of the feeding mechanism coacting therewith.

Fig. 130 is a facsimile of a ticket issued when totals are printed from the transaction totalizer.

Fig. 131 is a facsimile of the "Notifier" ticket.

Fig. 132 is a facsimile of the issuing tape prepared under control of the "List" key.

Fig. 133 is a facsimile of the issuing tape prepared under control of the "Add" key.

Fig. 134 is a detail view showing the latch mechanism for the door of the issuing tape printer.

Fig. 135 is a detail view showing a lock for the feed mechanism for the issuing tape.

Fig. 136 is a side view of the ink ribbon feed and reversing mechanisms.

Fig. 137 is an elevational view, shown in enlarged scale, of the ribbon feed and reversing mechanism, together with the latch for latching the ink ribbon frame in the machine.

Fig. 138 is a detail view of certain ribbon feed and retaining latch mechanisms.

Fig. 139 is a detail side elevation showing the construction of the collapsible flanges of the ribbon spool.

Fig. 140 is a time chart showing the time of operation of certain of the mechanisms of the machine.

Fig. 141 is a time chart showing the time of operation of the various printer feed and control cams.

Fig. 142 is a time chart showing the time of operation of certain of the cams and mechanisms of the machine for two-cycle operations in total operations.

GENERAL DESCRIPTION

The invention is illustrated applied to a machine for use in handling the payments of telephone bills, and comprises a system in which a complete record is made of a plurality of phases of entries necessary for a complete record of various kinds of collections.

The illustrated machine is provided with a keyboard having seven registering amount banks of keys and two number banks of keys, which, in combination with the higher denomination amount banks of keys, are used to set up and control the printing of telephone numbers on an issuing slip, referred to herein as a "Notifier," which is used in connection with the entry of delinquent accounts, in the manner described hereinafter. Two rows of transaction, or control, keys are provided to control the various entry operations.

In business systems to which the present machine is adapted, entries are classified into two general classes; namely, the entry of those items which are paid on time, and delinquent accounts. The entries of payments which are made on time present no special problem to a public utility company, but those which are delinquent do present a special problem. The reason for the special problem is that the utility company is reluctant to discontinue service to a customer until the last possible day. The decision to discontinue service is complicated by the fact that many subscribers wait until the last day possible to pay for service. In handling delinquent payments, the usual procedure is for the accounting department of the telephone company to notify the service department when an account is delinquent, so that the service will be cut off. However, if the customer pays the bill before the service department actually cuts off the service, it is important that the service department be notified at the earliest possible moment to prevent cutting off the service after the bill has actually been paid; or, if the bill is paid after the service is cut off, the service department can reinstate the service without delay.

Another problem presented to a public utility company is to avoid mailing a second statement when an account nears the delinquent date, if the customer presents the first statement for payment on or near the date on which the second statement is usually mailed. When such a statement is presented to a cashier, she notes the due date. If the second statement date is near, she causes a "Notifier" slip to be printed and issued at the time the entry is made, and the "Notifier" is immediately sent to the accounting department, where the customer's ledger card is removed from the files of accounts about to become delinquent. This brings the payment of the first statement to the attention of the accounting department, and they will not send out the second statement.

The "Notifiers" are sent to the accounting department at regular intervals, such as every hour, or any other convenient time during the day, and, when closing time approaches, special messengers are provided to be certain that all "Notifiers" are delivered to the accounting department on the day they are issued.

The method of handling delinquent accounts in the past was to make a hand-written "Notifier" slip at the teller's window when a delinquent account was paid, and periodically deliver the "Notifiers" to the accounting department. These hand-written "Notifiers" not only caused considerable delay at the teller's window but also caused delays due to errors and illegible writing.

The present invention includes a means for printing and issuing a "Notifier" slip by the machine as an incident to the payment of the bill, which slip has printed thereon all the data necessary to handle the transaction speedily and accurately. The data printed on the "Notifier" slip includes the telephone number of the subscriber, the amount paid, the date, the number of the machine issuing the "Notifier," a serial number, and a symbol identifying the teller who made the entry in the machine.

To issue a "Notifier" requires two machine operations, one for printing the telephone number and one for printing the amount. A novel arrangement in the present machine is to use certain amount key banks during both of said operations. This requires novel zero suppressing means, one for suppressing zero printing in the decimal orders to the right of the lowest digit of the telephone number, and one for suppressing the zero printing to the left of the highest order when the amount of the bill is printed.

Two rows of keys are provided at the left side of the keyboard, having thereon alphabetical indicia to correspond to telephone dial designations. However, the printing characters set up under control of these keys are numerical. This arrangement will provide for the setting up of any exchange number through the country. For example, if the exchange to be identified is "Walnut," the keys "W" and "A" in the respective key banks will be depressed, but the number "92" will be printed on the "Notifier." This will represent the number of the proper exchange in the area where the machine is in use. When "Sterling" is set up, the respective keys "S" and "T" are depressed, and the code number "78" is printed. When "National" is set up, the respective keys "N" and "A" are depressed, which sets the code number "62" at the printing line. Thus any exchange indicia set up in the area where the machine is used can be set up in code readily identified by the accounting or service departments, since only a small number of exchanges are used in any given area.

The machine is also illustrated herein as having a slip printer, below the keyboard, at the left side thereof, and includes a table on which the bills are placed. The slip printer is also used to endorse the amount credited to an account on the back of bank checks when bank checks are used in the payment of bills. The data is printed on a bill in duplicate, once on the main portion of the bill, which is given to the customer as a receipt, and once on a stub portion, which is sent to the accounting department. The number of printing operations of the slip printer is controlled by a slip feeler in connection with the keys of the two control rows of keys. Certain keys may arrest both operations or only one printing operation, and the feeler prevents one printing operation when no slip is in the machine; or, when a short slip is in the machine, the slip feeler arrests the second printing operation, even though a control key may control for two printing operations.

The data printed by the slip printer includes the date, the word "Paid" above a symbol designating the office where the bill is paid, the machine number in which the data was entered, a serial number of the transaction, a clerk's initial, and the amount paid.

The feeding mechanism for the inserted bill can be controlled to cause the extent of feeding movement between the printing operations to be adjusted in accordance with the form used.

An audit tape mechanism is provided below the keyboard near the center of the machine, just to the right of the slip printer. The tape on which the data is printed is of the autographic type. The last six lines of the printed data on the audit tape are visible through a glass window, which window can be opened to permit handwritten entries to be made on the audit tape. A hand bar is provided to manually space the audit tape after a handwritten entry has been made thereon. The data printed on the audit tape in entries other than the issuing of a "Notifier" includes the machine number, a consecutive number, a clerk's symbol, the amount of the transaction, and a symbol identifying the kind of entry made. When a "Notifier" slip is produced, the entry on the audit tape includes the machine number, the consecutive number, and the telephone number of the account involved.

An issuing tape printer is located to the right of the audit tape printer, below the keyboard. The isusing tape printer mechanism is used to prepare three kinds of records.

1. It is used to prepare and issue a "Notifier" slip for use in the delinquent account department.

2. It is used to prepare and issue a list of items added on the "List" totalizer.

3. It is used to prepare and issue a list of items when the "Add" key in one of the control rows of keys is used.

In the preparation of a "Notifier" slip, the telephone number is set up on the keyboard, the "Notifier" key is depressed, and the machine is released by depression of the appropriate clerk's key. The data printed during this operation includes the date, the machine number, the consecutive number of the transaction, and the telephone number. During this operation, the tape is fed 3⅜ inches to space the next line of printed data from the data printed during the operation. During the next operation, the data printed includes the date, the machine number, the same consecutive number as in the previous operation, the symbol of the clerk making the entry, and the amount of the transaction. After this data has been printed, the leading end of the tape is fed out of the machine, where the operator can grasp it and tear it off, whereupon he sends it to the delinquent account department.

In "Listing" or "Adding" a group of items, the issuing tape is line-spaced after each item is printed, and a total of the items is printed. After this total has been printed, the issuing tape is fed out of the machine, where the operator tears it off. A slip may also be issued for each total read or taken from one of the classification totalizers to form a ticket having the data pertinent thereto printed thereon.

The machine is provided with eight (8) individual totalizers, a group totalizer, and a "List" or visible totalizer. The totalizers are selected by the various keys in the control banks in the manner described below.

The automatic controls effected by each key of the two control banks are briefly outlined below.

Keys A to M—Row 2

These keys release the machine for operation and may be used either alone or with the "Notifier," "List," "Repeat," "Read," or "Reset" keys in row 1.

When used alone, or with the "Repeat" key, keys "A" to "M" control the totalizer selection to cause the entry of amounts into a totalizer assigned to the respective key and also into the group totalizer. The data entered is printed on the audit tape and once or twice on an inserted slip, depending on the form present on the slip table. During the machine operation, the consecutive number is advanced one step.

Duplicate key—Row 2

This key releases the machine for operation and normally is used in combination with the "Repeat" key of row 1. This key is used to obtain a duplicate print on the slip printer when the forms used are too small to be inserted to get two prints during one machine operation. This key controls the selection of a totalizer assigned thereto and causes one impression to be made on an inserted slip and also on the audit tape. The consecutive number mechanism is not advanced.

"Check key—Row 2

This key releases the machine for operation and is used to print a consecutive number and an amount on the back of a check ot identify the check with a receipted statement. When the amount of the check is the same as the amount of the receipted bill, the "Check" key is used with the "Repeat" key of row 1. If the amount of the check is not the same as the amount of the receipted bill, the amount of the check is set up on the keyboard. This key controls the selection of a totalizer assigned thereto, so that a total of the amounts of checks received will be had. The data is also entered on the audit tape, and the consecutive number is not advanced.

"Telephone number" key—Row 2

This key releases the machine for operation and is used to control the printing of telephone numbers on a notice, herein referred to as a "Notifier," for use in the delinquent accounts department. This key does not select a totalizer and is therefore used as a control for printing and for controlling the suppression of the printing of zeros to the right of the highest digit of the telephone number. The key controls the printing mechanism to print data on the audit tape and on an issuing tape. In the machine illustrated herein, the issuing tape is fed five-eighths of an inch. The key also controls the advancement of the consecutive number.

"Read" key—Row 1

This key does not release the machine for operation and is used in combination with the eight upper keys of row 2 to read the individual totals assigned to them. This key controls the printing mechanism to print on the audit tape and on the issuing tape, and the feed for the issuing tape is controlled to feed 3⅜ inches in the illustrated machine. This key is under lock and key to prevent unauthorized reading of totals. The consecutive number is not advanced.

"Reset" key—Row 1

This key does not release the machine for operation and is used in combination with the eight upper keys in row 2 to reset the individual totalizers, assigned to them, to zero. The controls over the printing mechanism are the same as in the case of the "Read" key.

"Reset group" key—Row 1

This key releases the machine for an operation to reset the group totalizer to zero and controls the printing mechanism to cause the total to be printed on the audit tape and on the issuing tape. In the illustrated machine, the issuing tape is fed 3⅜ inches. The consecutive number is not advanced, and the key is under control of the same lock as the "Reset" key.

"Read group" key—Row 1

This key is used to release the machine for operations in which the total on the group totalizer is read, and the totals are printed on the audit tape and on the issuing tape. In the illustrated machine, the issuing tape is fed 3⅜ inches, and the consecutive number is not advanced.

"Repeat" key—Row 1

This key does not release the machine for operation and is used in combination with the eight upper keys in row 2, or with the "Add" key in row 1, to repeat the last previous operation without depression of an amount key. The printer controls are governed by the key controls in combination with the "Repeat" key.

"Add" key—Row 1

This key releases the machine for operation; is used when the machine is used as an adding machine; and can be used with the "Repeat" key to repeat the entry of the last entered item without setting the amount on the keyboard. The "Add" key selects the visible totalizer and controls printing mechanism to print on the issuing tape only. The issuing tape feeding mechanism is controlled to line-space the printed items. The consecutive number is not advanced.

"List" key—Row 1

This key does not release the machine for operation and is used in connection with any one of the keys "A" to "M" in row 2 when more than one statement is presented for payment at one time. During such operations, the items are entered into the visible totalizer, and the items are printed on the issuing tape, which is line-spaced during each operation. During such operations, the keys "A" to "M" control the machine in the same manner as explained above when these keys are depressed alone.

"Notifier" key—Row 1

This key does not release the machine for operation and is used in connection with keys "A" to "M" in row 2. During such operations, the keys "A" to "M" exercise the same controls listed above, and, in addition, the "Notifier" key controls the issuing tape printing mechanism to print once and feed the issuing tape out of the machine. As illustrated herein, the extent of feed is 3⅜ inches. The consecutive number mechanism is not advanced.

*"Total" key—Row 1*

This key releases the machine for operation, during which the visible totalizer is reset to zero and the total is printed on the audit tape and on the issuing tape. As illustrated herein, the extent of feed of the issuing tape is 3⅜ inches. The consecutive number mechanism is not advanced.

DETAILED DESCRIPTION

*Keyboard*

Figure 1:
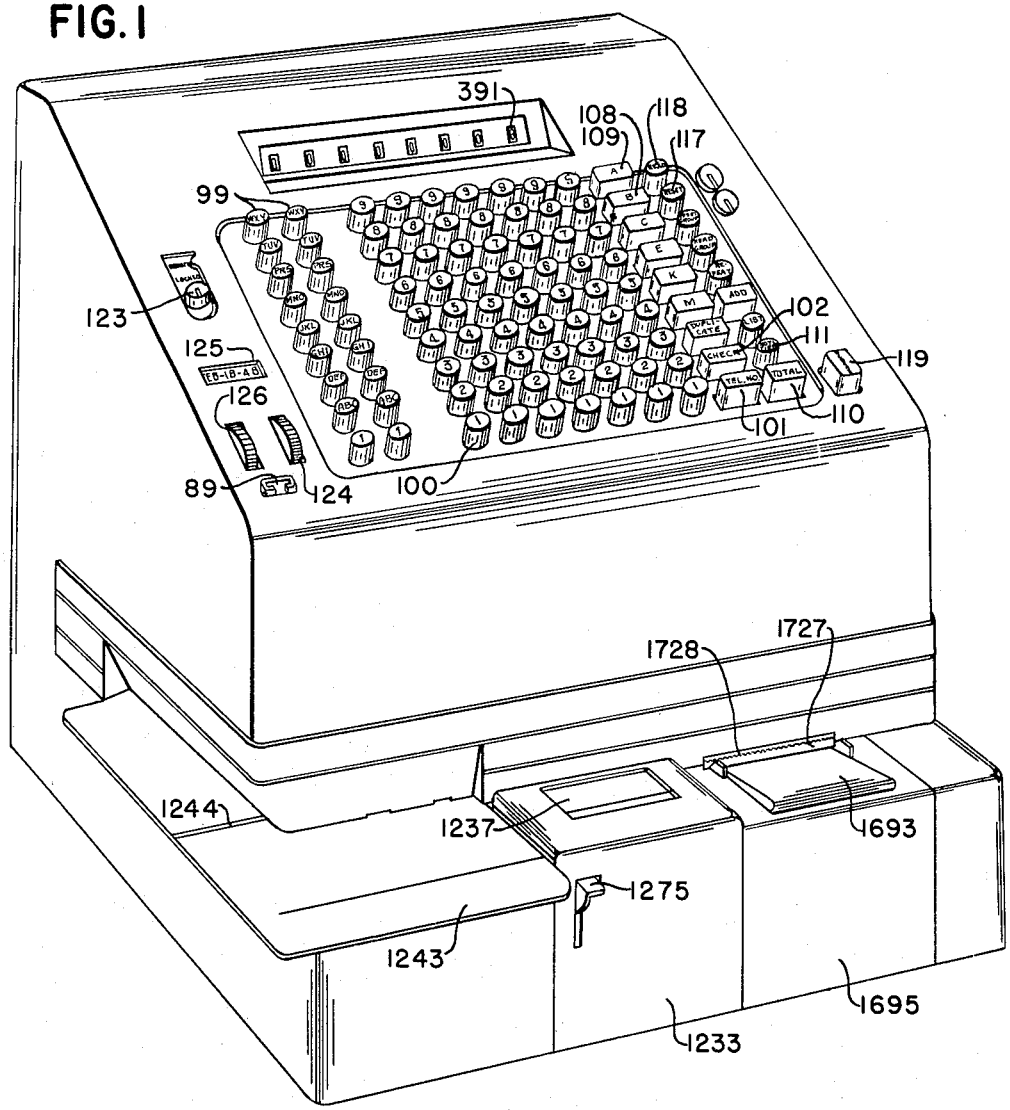
Fig. 1 is a perspective view of the machine, showing the keyboard and the cabinet in which the machine is inclosed.
Figure 2:
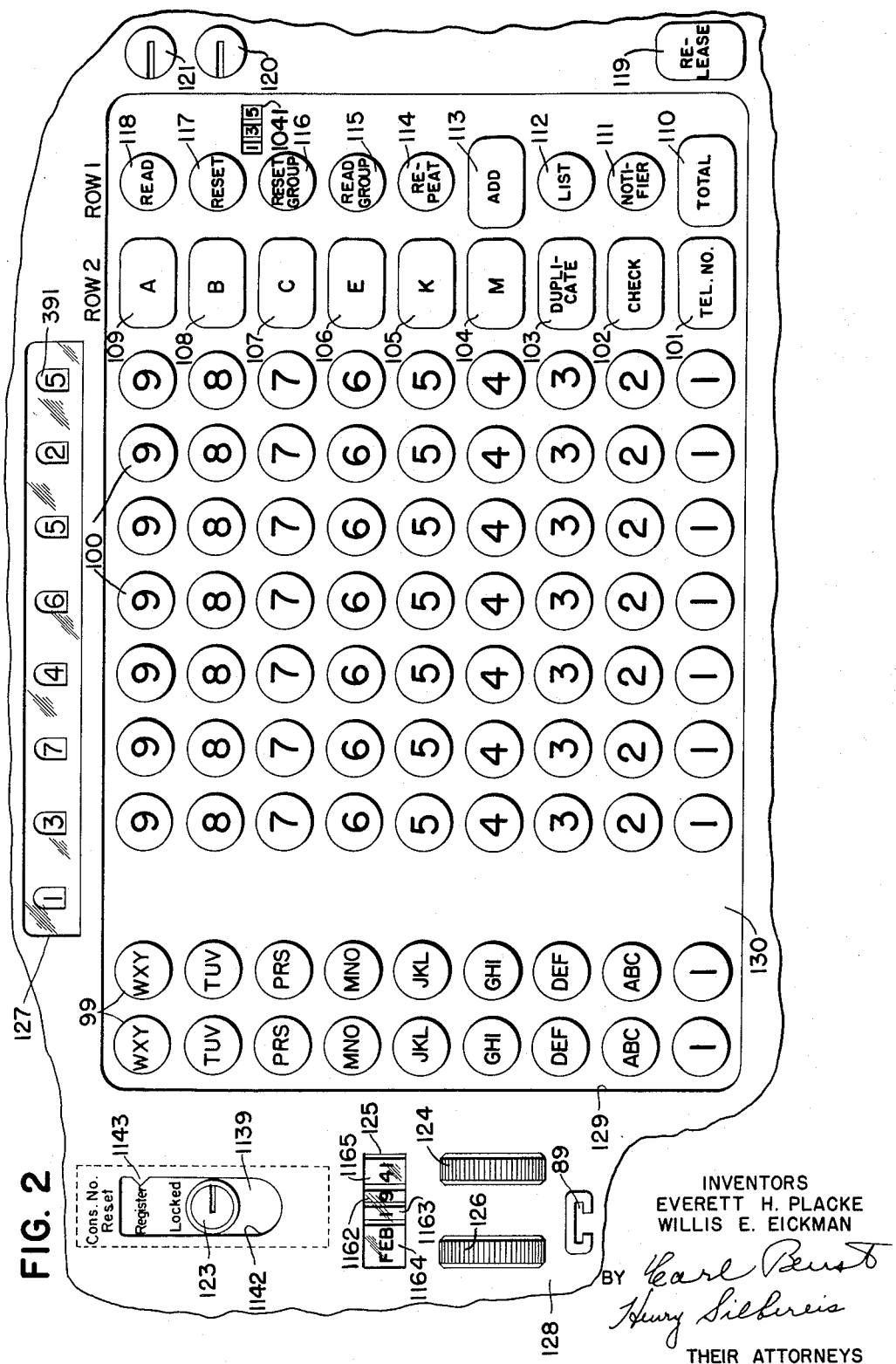
Fig. 2 is a diagrammatic view of the keyboard.
Figure 3:
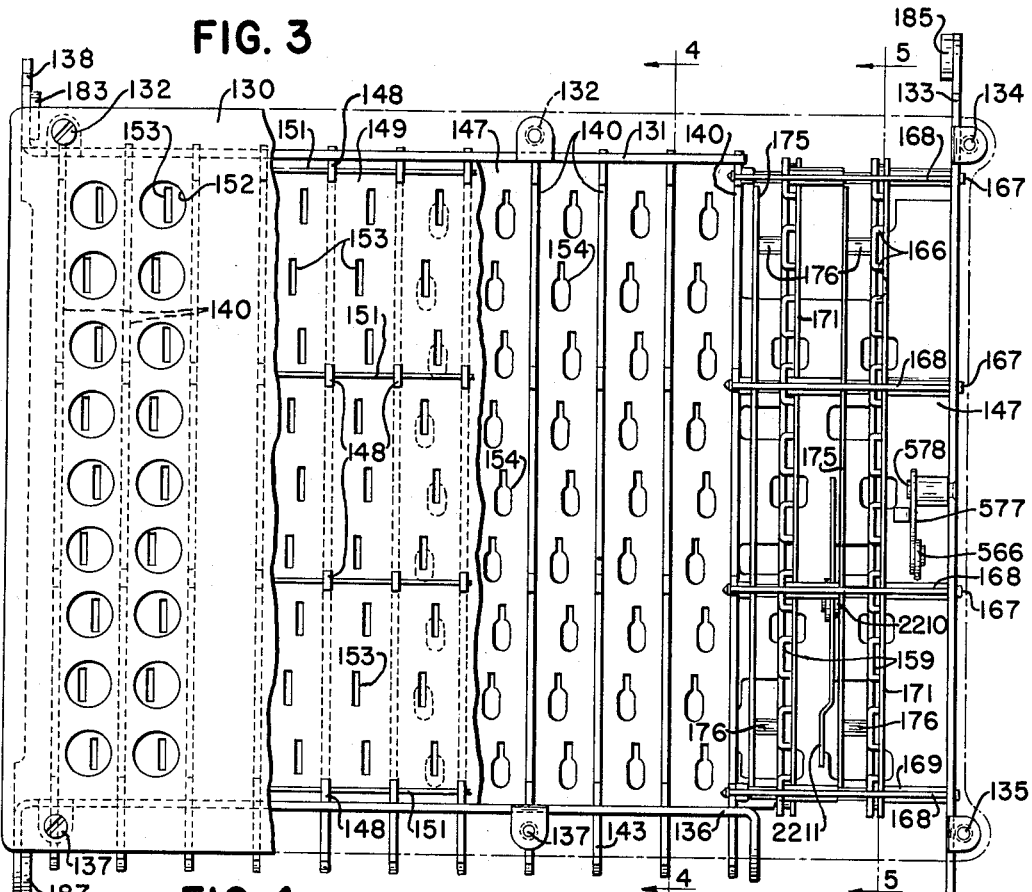
Fig. 3 is a top plan view of the keyboard frame with certain parts broken away for clearness.
Figure 4:
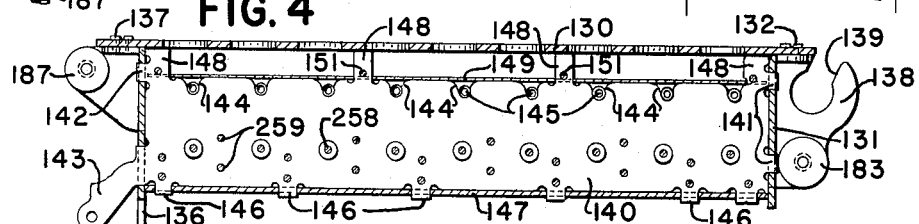
Fig. 4 is a sectional view taken on line 4—4 of Fig. 3.
Figures 5, 6:
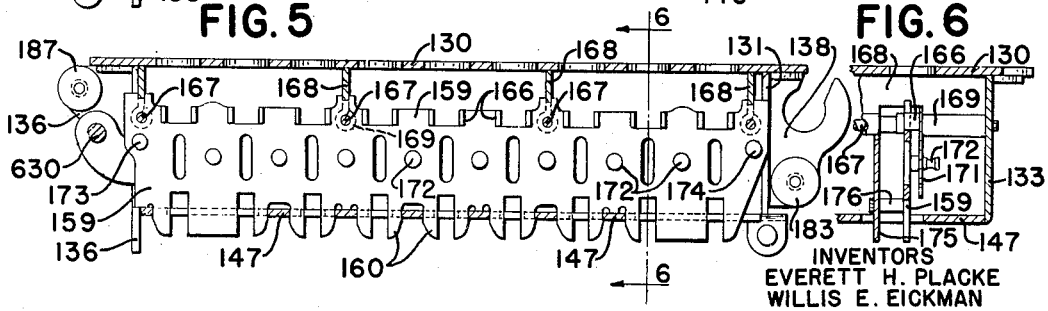
Fig. 5 is a sectional view taken on line 5—5 of Fig. 3.
Fig. 6 is a sectional view taken on line 6—6 of Fig. 5.

As shown in Figs. 1 and 2, the keyboard of the machine, as illustrated herein, is provided with two rows of telephone number keys 99, seven rows of amount keys 100, and two banks of control, or transaction, keys 101 to 118 inclusive. The keys 101 to 118 inclusive are provided with legends to aid in their selection for controlling the machine in its operations. In addition to the controls indicated by the legends thereon, keys 101 to 108 inclusive, 110, 113, 115, and 116 are what is known in the art as motor keys; that is, in addition to controlling the machine in accordance with the legends thereon, these keys also release the machine for operation. Keys 111, 112, 114, 117, and 118 inclusive do not release the machine for operation, and therefore they must be depressed in combination with one of the motor keys. Near the lower right-hand corner of the keyboard is a release key 119, which is used to release the keys on the keyboard if for any reason it is desired to release them after they have been depressed and before the machine has been released for operation. The reset group key 116 and the reset key 117 are provided with a lock 120, whereby an authorized person may lock the reset keys during his absence. A similar lock 121 is provided for the read key 118.

A control slide lock 123 (Figs. 2 and 54) is provided near the left side of the machine for locking the machine, controlling resetting of the consecutive number means, changing the date, and unlocking the audit tape door. The slide lock 123 has three positions. With the slide in its middle position, shown in the drawings, the consecutive number and the date cannot be changed, but the machine can be operated to enter items and to reset the totalizers. When the slide lock 123 is in its uppermost position, the machine is locked against operation, the date and the consecutive number means cannot be operated, and the audit tape door cannot be opened. When the slide lock 123 is in its lowermost position, the machine is locked against operation, but the consecutive number can be reset, the date can be changed, and the audit tape door can be opened.

Figure 80:
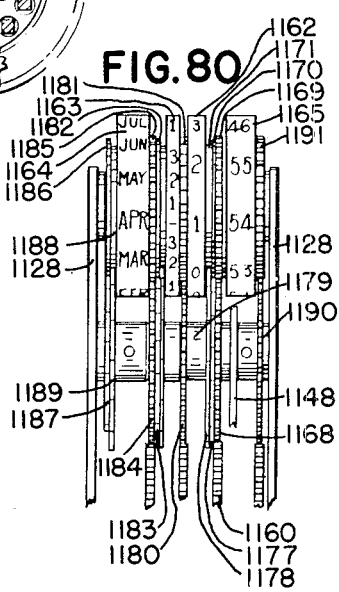
Fig. 80 is a detail end view of the date-setting indicators.

A date-setting wheel 124 (Figs. 2, 54, and 77) projects through the cabinet of the machine for setting the date on type wheels in the printer, and on indicators 1162, 1163, 1164, and 1165 (Fig. 80) visible through a window 125. The wheel 124 is normally locked and is unlocked by moving the slide lock 123 into its lowermost position. This one wheel 124 sets all of the date wheels. The dates are advanced by rotation of the wheel 124 toward the top of the machine. The dates are turned backward by downward rotation of the wheel. Transfer mechanism between the date wheels controls the setting of the higher order wheels.

A wheel 126 (Figs. 2 and 76) is provided on the keyboard for resetting the consecutive number wheels to zero. In order to reset the consecutive number wheels to zero, it is necessary to move the slide lock 123 to its lowermost position, then rotate the wheel 126 downwardly until it is stopped, and then rotate the wheel 126 upwardly again until it comes to a second stop. Restoration of the slide lock 123 into either the middle position or the uppermost position locks the consecutive number resetting mechanism against resetting operation by wheel 126. An interlock is provided between the lock slide 123 and the reset wheel 126, so that the register cannot be locked unless the reset wheel 126 is again restored to its normal position.

Seven amount banks are shown in Fig. 2. However, there are eight totalizer wheels shown in the window 127. This provides one overflow wheel for the List totalizer. A cabinet 128 is provided to enclose the entire machine. An opening 129, through which the keys of the keyboard project, is provided.

A slot 89 is also provided on the keyboard for receiving a cashier's key, described later.

*Unitary keyboard assembly*

The telephone number keys 99, the amount keys 100, and the control keys 101 to 118 inclusive are mounted in a frame which consists of a unit which may be removed from the machine in its entirety. This unit construction provides an economical and convenient production method, since the keyboard can be assembled separately and then assembled into the machine as a separate entity. The unitary keyboard frame is best shown in Figs. 3, 4, 5, and 6 and consists of a top plate 130, secured to a back frame 131 by screws 132 and to an end plate 133 by screws 134 and 135. The top plate is also secured to a front plate 136 by two screws 137. The left-hand end of the back frame 131 is bent at right angles to form a flange 138 having an open slot 139 to receive a shaft on which certain control elements are assembled, as will be described hereinafter. Eleven partition plates 140 are provided to form compartments in which the telephone number keys 99 and the amount keys 100 are mounted (see also Fig. 23). The rear ends of the partition plates 140 are provided with ears 141, which project into slots in the back frame 131, and with ears 142, projecting into slots in the front plate 136. After being inserted into said slots, the ears 141 and 142 are riveted over to hold them firmly in place. Also projecting into slots in the plate 136 is an ear 143 on each plate 140. The plates 140 are provided with notches 144 to receive key restoring springs 145 stretched between the two end partition plates 140 (see also Fig. 23). The functions of the springs 145 will be described in connection with the consideration of the operation of the keys. Each partition plate 140 is provided with six ears 146 on its bottom edge, which projects through and is riveted into a bottom plate 147. Each partition plate 140 is also provided on its top edge with four upstanding ears 148, which project up to the under side of the top plate 130 and provide a rest for said top plate. An intermediate plate 149 is provided, which rests on the partition plates 140, and the plate 149 is held in position by wires 151 projecting through openings in the upstanding ears 148 of the partition plates 140. The wires are long enough to span all the partition plates 140 and are held in place by friction.

The partition plates 140 support a series of rods for supporting the detents for the amount bank in a manner described hereinafter.

The top plate 130 is provided with round openings 152 to accommodate the keys 99 and 100. Slots 153 are provided in the plate 149, through which the body of each key 99 and 100 moves, and the bottom plate 147 is provided with slots 154, through which the bottom ends of the keys 99 and 100 move when they are depressed. Thus the slots 153 and 154 form means for guiding the keys in their up-and-down movements.

Near the right-hand end of the keyboard frame are two partition plates 159 (Figs. 3 and 23), which form a support for the control keys. The bottom edge of the partition plate 159 is provided with projections 160 (see Fig. 5), which fit into slots in the bottom plate 147. Along the upper edge of each plate 159, nine pairs of flanged ears 166 are bent to form a guideway for the control keys. Four rods 167, extending through the right side plate 133, through the partition plates 159, and into the right partition plate 140, provide supports for four spacer plates 168, each being formed to provide a bearing 169, through which the rod 167 is passed. The spacer plates 168 extend upwardly to engage the under side of the top plate 130 in the transaction and control key section of the keyboard frame. The rods 167 are held in place by friction.

An auxiliary plate 171 (see also Fig. 8) is mounted on each partition plate 159 by means of studs 172, 173, and 174. The auxiliary plates 171 are held against the ears 166 by the ends of bearings 169 to provide a runway for the control keys. The heads of the control keys project through the openings 152 provided in the top plate 130 and shaped to fit the outlines of the respective keys. The eight studs 172, mounted on each partition plate 159 and projecting through its associated auxiliary plate 171, provide supports for a coil spring 170 (Figs. 8 and 38), stretching from the stud 173 near the front end of the auxiliary plate to the stud 174 near the rear end of the auxiliary plate, to form a means for restoring and holding the keys in their upper, or undepressed, positions. A third plate 175, carried by and spaced from the partition plate 159 by four rollers 176 (see also Figs. 56 to 60 inclusive), forms a runway for the control detents described hereinafter.

The keyboard assembly, consisting of the top plate 130, the bottom plate 147, the front plate 136, and the back frame 131, together with the partition plates 140 and 159, forms a unitary assembly which can be inserted into the machine after it has been assembled, together with all of the amount and control keys, their control slides and detents, and certain other control elements which are operated by the keys as they are depressed, to be described later.

After the keys and slides have been assmbled into the keyboard, the keyboard frame is mounted on the side frames 180 and 181 (Fig. 7) at the front and rear thereof. To provide for such mounting of the keyboard frame in the machine, the flange 138 (Figs. 3, 4, and 5) is provided with a block 183, which is tapped to receive the threads of a screw 184 (Fig. 20), which passes through an opening in the side frame 181 and into the threads in the block 183. The key frame end plate 133 is provided with an extension to which a block 185 (Fig. 3) is secured and which also is tapped to receive a screw 186 (Fig. 19) to anchor the key frame to the right side frame 180 at its upper right-hand corner. The front keyboard plate 136 is bent at right angles at its left end and is provided with a block 187, through which threads are tapped to receive a screw 188 (Fig. 20) to anchor the lower left-hand corner of the key frame to the side frame 181. At its lower end, the end plate 133 is also provided with an extension through which a screw 189 (Fig. 38) is inserted, to anchor the lower right-hand corner of the keyboard frame to the right side frame 180.

Main framework

Fig. 7 illustrates the main frames of the machine. The left side frame 181 and the right side frame 180 are mounted on a base 190, having lugs 191 thereon. Located intermediate the frames 180 and 181 are a left printer frame 192 and a right printer frame 193, suitably secured to lugs on the base 190. Secured to the left side frame 181 is an auxiliary frame 194, which is provided with two blocks 195. Secured to the right side frame 180 is an auxiliary frame 196, provided with blocks 197. The blocks 195 and 197 are tapped to receive screws projecting through a back frame 198. Another auxiliary frame 199 is provided with blocks 200, threaded to receive screws passing through the back frame 198, by means of which the auxiliary frame 199 is supported on the back frame 198. A shouldered stud 202 (Fig. 20) is provided on each side of the printer frames 192 and 193, on one side of the left side frame 181, and on one side of the right side frame 180. Near the front of the machine, a series of six auxiliary plates 203 (Figs. 7, 20, and 38) for supporting the type carrier and the setting mechanism are provided. Each auxiliary plate 203 has, on its lower rear end, a slot which is adapted to straddle the small diameter of a shouldered stud 202 when the type carrier unit, which unit is separately assembled, is inserted into the machine. A cross bar 201 is provided with a series of six notches, into which the upper edge of each plate 203, as best shown in Fig. 38, is inserted. After the type carrier unit has been separately assembled, in the manner described hereinafter, the entire unit is placed in the machine by inserting the notches of the auxiliary plates 203 over the small diameters of the shouldered studs 202, sliding the upper edges of the auxiliary plates 203 into the notches in the cross bar 201, and inserting a shaft 204 (Fig. 20) through the right side frame 180, through all of the auxiliary plates 203, through the printer frames 192 and 193, and finally through the left side frame 181. Near the rear of the machine, a cross bar in the shape of a formed channel 206 (Figs. 7 and 38) is mounted between the side frames 180 and 181. The auxiliary frame 182 is formed at its rear end with a flatted surface, to which is welded a threaded block to receive a screw 207 to form a support for the auxiliary frame 182. Near the rear of the machine, at its right, a bracket 210 (Fig. 8) is secured to the right side frame 180 by means of four screws 211. The bracket 210 is provided with a forwardly-extending ear 212 to support a cam shaft 213, forming one of the main shafts for driving the mechanism of the machine. The bracket 210 is also provided with a slot 214 for supporting a shaft 215 of an electric motor 216, which motor is one means for operating the machine. The motor 216 is carried by the cross bar 206 (Figs. 7 and 38).

Machine driving mechanism

Figures 12, 13:
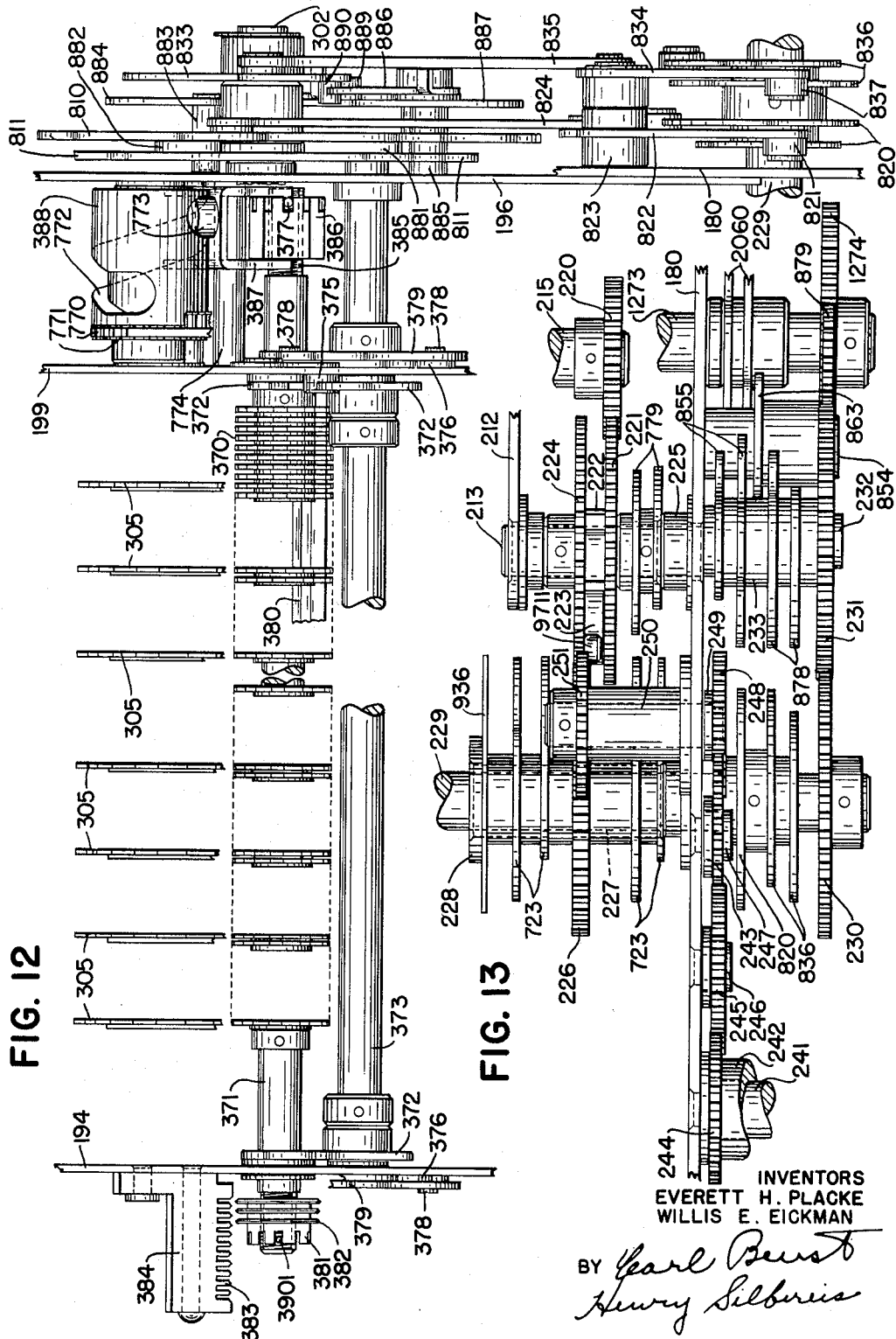
Fig. 12 is a top plan view of the rear totalizer line and shows the shifting mechanism and certain of the engaging and disengaging mechanisms therefor.
Fig. 13 is a detail view of a part of the two cam lines of the machine.

The machine may be operated by the electric motor 216 or by a hand crank. The motor shaft 215 (Fig. 8) has secured thereon a gear 220, which meshes with a gear 221 (Figs. 8, 13, and 14), loosely mounted on the cam shaft 213. Secured to the gear 221 is a clutch member 222, with which a clutch pawl 223 engages when the machine is released for operation. The clutch pawl 223 is pivotally mounted on a gear 224 secured to the shaft 213. The shaft 213 (Fig. 13) is supported at one end by the ear 212, on the motor bracket 210, and at the other end by a bearing 225 in the right side frame 180. Also meshing with the gear 224 is a gear 226, secured to a sleeve 227, which is mounted to rotate on a cam shaft 229 and upon which are mounted two pairs of cams 723 for operating the first and second control differential mechanisms. Also secured on the sleeve 227 is a clutch member 228 (see Figs. 13 and 14), which is controlled to operate the cam shaft 229 selectively in accordance with certain types of operation of the machine to be described later. The shaft 229 also has fast thereon certain cams, to be described later, and a gear 230 (Figs. 8, 13, and 23). The gear 230 meshes with a gear 231 mounted on a sleeve 233 carrying cams for operating certain mechanisms of the machine, which sleeve is mounted to rotate on a stud 232, carried by the right side frame 180.

If desired, the machine may be operated by a hand crank 240 (Fig. 18), which is slidably mounted on a stud 241 on the right side frame 180. When it is desired to operate the machine by the hand crank, the handle 240 is slid endwise on the stud 241 to engage it with a hub 242 (see also Fig. 13), also rotatably mounted on the stud 241. Secured to the hub 242 is a gear 244 meshing with an intermediate pinion 245, rotatably mounted on the right side frame 180. Meshing with the pinion 245 is a gear 243 rotatably mounted on a stud 247 supported in the right side frame 180. Meshing with the gear 243 is a gear 248 secured to the end of a shaft 249 rotatably mounted in a bearing 250 carried by the right side frame 180. Also fixed on the shaft 249 is a gear 251 (Figs. 8 and 13), meshing with the before-mentioned gear 226 (see also Fig. 14).

Rotation of the hand crank 240 rotates the gear 226 through the train of gears 244, 245, 243, and 248, the shaft 249, and the gear 251 in the same manner as described in the description of these connections as driven by the motor shaft 215. In a hand operation, the clutch pawl 223 ratchets idly over the ratchet teeth of the clutch member 222.

Amount key banks

Each bank of amount keys includes a full complement of nine keys 100 (Figs. 1, 2, 20, 23, and 24). Coacting with each bank of amount keys are four control members including a flexible detent 260, a zero stop actuating plate 261, a locking detent 262, and an interlocking plate 263 that provides a means for preventing the release of the machine by the depression of certain control keys after an amount key has been depressed. The manner in which the four plates 260 to 263 inclusive are operated will be described hereinafter.

In assembling each key bank, the four control members 260, 261, 262, and 263 are first inserted into the keyboard frame by being inserted through suitable openings in the front plate 136 and between four rows of rods 259, which extend between the partition plates 140 so as to extend across the entire keyboard, on which rods the four control members of each bank of keys slide. Each control member 260, 261, 262, and 263 is provided with a slot in line with each key shank 100. After the four control members are inserted into the keyboard frame, the keys 100 are inserted through openings 152 (Fig. 3) in the top plate 130, through the slots 153 in the upper guide plate 149, then through the slots in the control members, and through appropriate slots in the bottom plate 147 of the keyboard frame. By reference to Figs. 23 and 24, it will be observed that the key shanks of the keys 100 are in staggered alignment, and the slots in the keyboard frame and the control members are arranged to register with the key shanks when the keys are inserted into the key frame. After the keys 100 for each digit are assembled into the keyboard frame, rods 258 are inserted through the keyboard frames and through slots provided in the keys.

The rear end of each key is notched, as shown in Fig. 23, to receive the spring 145, which spring stretches across the keyboard frame from right to left, as viewed in Fig. 22, and from the front of the machine, in the manner hereinbefore described. The rods 258 limit the upward and downward movements of the keys 100.

Rotatably supported in the flange 138 of the back frame 131 of the keyboard frame, and by the end plate 133 of said keyboard frame, is a machine release shaft 264 (Fig. 24), which carries a pair of arms 265 and 266 for each bank of keys 100. The arms 265 are pinned to the shaft 264, and the free ends of each arm 265 project into a suitable slot in the locking detent 262. Also mounted on the shaft 264 is a yoke 267, which is engaged by two ears of each arm 266. The free end of each arm 266 projects into a slot in an interlocking plate 263. After the control members 260, 261, 262, and 263 have been assembled into the keyboard frame, the shaft 264, together with the arms 265 and 266 and the yoke 267, is assembled in the keyboard frame.

Mounted near the front of the keyboard frame on the ears 143 of the plates 140 is a zero stop control shaft 270, on which the zero stops 271, one for each amount bank, are pivotally mounted. The upper end of each zero stop pawl 271 has a finger projecting into a slot of its associated zero control plate 261. Also pivotally carried by the shaft 270 is a yoke 272, which normally engages the tails on the forward extensions of the zero stop pawls 271, by which the zero stop pawls are controlled, in the manner described hereinafter.

The flexible detent 260 (Figs. 20, 23, 24, and 25) is normally held with its slots, through which the amount keys 100 project, in engagement with a cam edge formed on each key, by a spring 280. When an amount key 100 is depressed to the position shown in Figs. 24 and 25, the flexible detent is first cammed toward the left, and, after a shoulder at the end of the cam edge of the key passes out of the slot in the flexible detent, the spring 280 moves the detent 260 to the right to position the detent over the top of the shoulder on the key, to hold the key in its depressed position. Depression of another key in the same bank will cause its appropriate cam shoulder to again cam the flexible detent 260 toward the left to withdraw the detent from engagement with the shoulder of the depressed key and permit the spring 145 to restore the depressed key to its undepressed position. At the same time, the flexible detent moves over the top of the shoulder of the second depressed key to lock it in its depressed position. Near the end of the machine operation, the arm 265 on the shaft 264 is given a clockwise movement to engage the end of the flexible detent 260 and shift it toward the left (Fig. 24) to release the depressed key 100. The mechanism for rocking the shaft 264 and the arm 265 is described hereinafter.

The locking detent 262 (Figs. 20, 23, and 24) is provided to prevent depression of an amount key after the machine has been released for operation, and also to prevent accidental release of said key during said machine operation. To obtain these results, each amount key 100 has a forwardly-extending square shoulder which is normally just above the locking control detent 262. The slot in the locking control detent 262 is wide enough to permit any key in the bank to be depressed. After the key is fully depressed and the machine is released for operation, the arm 265 moves the locking detent 262 to the right (Fig. 24), thus moving it over the square shoulder near the bottom of the depressed key, to the position shown in Fig. 23. Simultaneously therewith, the locking detent 262 is moved beneath the square shoulders of all of the undepressed keys 100, thus preventing any undepressed key from being depressed after the machine has been released for operation. The mechanism for rocking the arm 265 is described hereinafter.

After all the keys 100, the control members 260, 261, 262, and 263, the shafts 264 and 270, together with the arms on the shaft 264, and the zero stop pawls 271 are assembled into the keyboard frame, together with the two control banks of keys and their control slides, the entire keyboard unit is assembled into the machine in the manner described hereinafter.

Amount differential mechanism

Located beneath each bank of keys 100 (see Fig. 23) in a position midway between the staggered keys, and so as to be controlled thereby, is a differential actuator slide 290. Each actuator slide is suitably slotted to be supported by, and slide on, two cross bars 291 and 292 (Figs. 20 and 24 to 29) suitably supported in the machine framework. The slide 290 has, along its top edge, eight projections having flanges 295 bent at right angles thereto, and alternately to the right and left, into alignment with the shanks of the keys 100. The flanges 295 are so located on the slide 290 that they are controlled by the digit keys 1 to 8, respectively. The slide 290 is provided with a stop surface 296 near its front end, which engages the cross bar 291 to arrest the slide 290 in its "9" position. When no amount key is depressed, a flange 297 on the zero stop pawl 271 moves into the path of a square stud 298 on the slide 290 to arrest the slide 290 in zero position, which zero position is one step from the home position of the slide. Thus the flange 295 and the stud 298 and the surface 296 provide means to selectively and differentially arrest the slide 290 in any one of ten positions out of its home position, the position to which the slide 290 is moved depending upon whether or not a key has been depressed, or which key has been depressed. Thus it is clear that the differential slide 290 is capable of assuming any one of eleven positions; that is, a home position and ten positions of adjustment.

The slide 290 has, near its rear end, teeth 300, meshing with a differential segment 301, rotatably mounted on a shaft 302 supported by the framework of the machine. Secured to the segment 301 is an actuator-supporting member 303 (see also Figs. 36 and 37); slidably mounted on the actuator-supporting member 303 are three actuator racks 304, 305, and 306, each located to be engaged by totalizer wheels to be described later.

Upon operation of the machine with an amount key 100 depressed, the actuator slide 290 moves a distance commensurate with the value of the depressed key and, through the teeth 300, rocks the segment 301 and the actuator-supporting member 303 a like distance. This sets the actuator racks 304, 305, and 306 to an extent representing the value of the depressed key. After the actuators have thus been set, one or more of the totalizers are engaged therewith, and the slide 290 is thereafter returned to its home position. In returning to home position, the segment 301 and the actuators 304, 305, and 306 are rotated backwardly a number of steps corresponding to the value of the depressed key, thus entering said amount in whichever totalizer, or totalizers, have been engaged therewith. After the amount has been entered therein, the totalizers are disengaged from the actuators.

The timing of movement of the differential slide 290 is controlled by a leading frame including a universal rod 310 (Figs. 20, 23, and 24 to 29). A spring 307, secured to the slide 290 at one end, and to a cross plate 308 at its other end, supported by the machine framework, normally maintains a shoulder 309 of the differential slide 290 against the universal rod 310. The rod 310 is supported by five arms 311, as best shown in Fig. 22, secured to a shaft 312. Also secured to the shaft 312 are two cam follower arms 313 (see also Fig. 21), each having two rollers 314 coacting with a pair of plate cams 315 secured on the main cam shaft 229.

During the operation of the machine, the cam plates 315 rotate clockwise (Fig. 21) to rock the arm 313 first clockwise and then counter-clockwise to move the universal rod 310 first to the right (Fig. 20) and then back to the left. When the rod 310 moves toward the right, the spring 307 moves the differential slide 290 towards the right until the slide is arrested by a flange 295 thereon coming into contact with a depressed key 1 to 8, or the surface 296 engages the cross bar 291 in the "9" position, or the zero stop pawl 271 arrests the slide in zero position, whereupon the rod 310 completes its rearward movement. Near the end of the machine operation, when the universal rod 310 is restored to its home position by the cams 315, the rod 310 picks up the differential slide 290 and restores it to its home position, which position is one step beyond its zero position, and during this return, or movement toward home position, the differential slide 290, through the connections described above, rocks the actuator racks 304, 305, and 306 backwardly a number of steps commensurate with the value of the depressed key, thus entering the amount into the totalizer wheels which were engaged therewith.

A spring-actuated member 316 (Fig. 20) is pivotally mounted on a shaft 333 to balance the load exerted by the differential springs 307. When the differential slides are released, they have a tendency to move too fast. The member 316 offsets this action by retarding the movement of the universal rod 310, by cooperation with a roller 541 on the arm 311.

One object of mounting the actuator racks 304, 305, and 306 slidably on the member 303 is to permit relative movement thereof for entering tens transfers, when needed, in a manner to be described hereinafter.

Another object of mounting the actuator racks 304, 305, and 306 slidably on the member 303 for relative movement thereof is to compensate for the movement of the differential slide 290 while it moves from its normal or home position into its zero position. The actuator rack 304 (Fig. 36) is provided with two studs 410 projecting into slots 409 in the member 303. When in home position, the studs 410 are located midway between the ends of the slots 409. A spring 411, stretched between the actuator 304 and the member 303, tends to move the actuator 304 toward the right-hand ends of the slots 409 but is arrested by a stud 412 engaging the end of an arm 413, described later. When the differential slide begins its differential movement from its home position, the member 303 rocks clockwise (Fig. 36), but the actuator 304 is restrained from taking part in this initial movement of the member 303 by the spring 411. When the member 303 moves to a position corresponding to the zero position of the differential slide 290, the right-hand ends of slots 409 are in engagement with the studs 410, and thereafter the actuator rack 304 partakes of any further movement of the member 303. The racks 305 and 306 are controlled in a like manner.

Telephone number key banks

Two banks of keys 99 (Fig. 2) are provided near the left side of the keyboard. These keys are provided to set up the symbols designating the telephone exchange corresponding to the bill being paid. Whenever an exchange number is to be recorded, the machine is released for operation by depression of the "Tel. No." key 101, which prevents engagement of the various totalizers with the actuators. However, to set the symbol-bearing character properly, a standard differential mechanism like that provided for the amount banks is provided in each of these two banks. Since the construction is the same as for the amount banks and amount differentials, the same reference numerals are applied to the parts thereof, and the description of the amount banks and amount differentials given above will suffice for these two banks.

Figure 70:
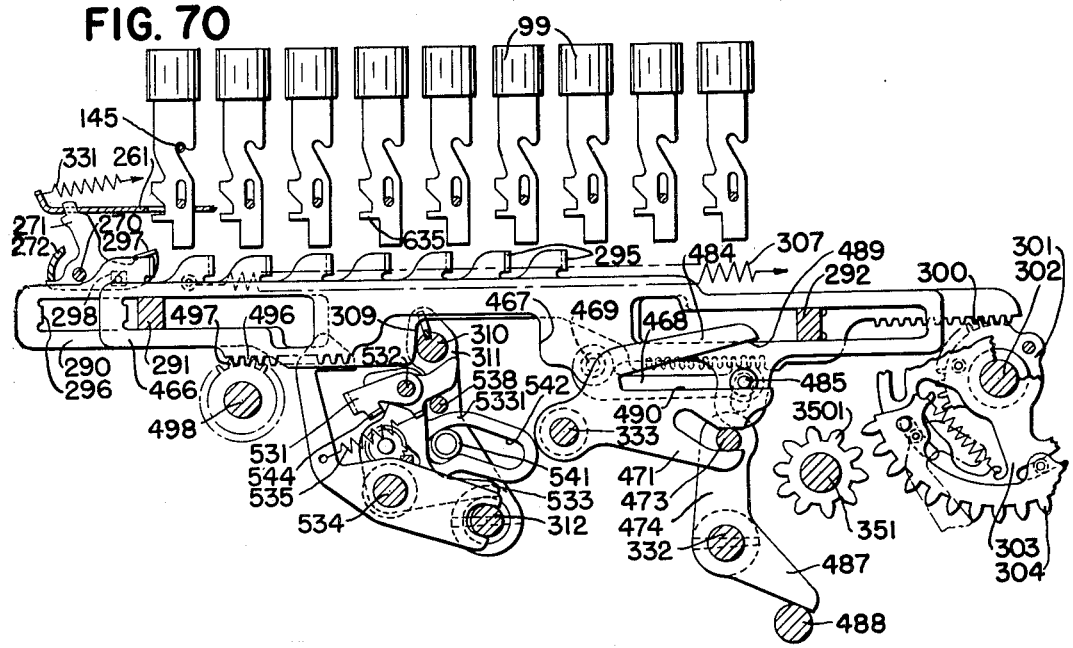
Fig. 70 is a detail view showing one of the telephone number key banks and the differential mechanism controlled thereby.

There are two departures from the amount banks, as follows:

The totalizer wheels 3501 (Fig. 70) have ten zero stop teeth, instead of one zero stop tooth, as in the case of the totalizer wheels 350 and 370. The purpose of these ten teeth is to arrest the differential actuators in these two banks at zero during total-taking operations, in the manner hereinafter described.

The zero elimination mechanism is slightly modified, as will become apparent from the description below.

Zero stop mechanism

A zero stop pawl 271 (Fig. 27) is provided for each amount and telephone number differential to arrest the differential slide 290 in the zero position, in the event no amount key is depressed. This zero stop pawl 271 is normally in an ineffective position; that is, the flange 297 thereon is normally out of the path of the stud 298 (Fig. 27) of the differential slide. The yoke 272, mounted on the shaft 270, normally maintains the pawl 271 in said ineffective position by engaging a forwardly-extending toe on the zero stop pawl 271. The yoke 272 is maintained in its normal position by an arm 320 (Fig. 33) loosely mounted on the shaft 270 and having two toes 321 straddling the yoke 272 near its center. The lower end of the arm 320 has mounted thereon a stud 322, which projects into a notch in the forward end of a slide 323 bifurcated to engage and slide on the cross bar 291. The rear end of the slide 323 is pivoted to a bell crank 324 pivoted on a shaft 333, said bell crank having a rearwardly-projecting arm 325 carrying a stud 326 projecting into a notch in the forward end of a lever 327. The lever 327 has a roller 328, which is normally held in engagement with a cam 329 (see also Fig. 23) by a spring 330 stretched between one arm of the bell crank 324 and a stud on the lever 327. The cam 329 is secured to the main cam shaft 229.

Near the beginning of the operation of the machine (see Fig. 139), when the main cam shaft 229 and the cam 329 rotate clockwise (Fig. 65), the spring 330 rocks the lever 327 clockwise. This movement of the lever 327, through the bell crank 324, shifts the slide 323 to the left (Fig. 65), thus rocking the arm 320 and the yoke 272 clockwise. Clockwise movement of the yoke 272 permits the zero stop pawl 271 to be rocked by a spring 331, to position its flange 297 into the path of the stud 298 on the differential slide 290. The spring 331 is stretched between one end of the zero stop control plate 261 and the keyboard front plate 136. When no key is depressed, the plate 261 is free to move in the manner described later. When the differential slide 290 is released by movement of the universal rod 310, the flange 297, having been moved into the path of the stud 298, arrests the differential slide 290 in zero position. By reference to the time chart (Fig. 141), it can be seen that the cam 315 starts the slide 290 moving immediately after the zero stop pawl is positioned in its effective position.

During an operation of the machine with an amount key depressed, the zero stop control plate 261, coacting with the depressed key, prevents the zero stop pawl 271 from moving into its effective position at the time the yoke 272 is actuated.

Figure 27:
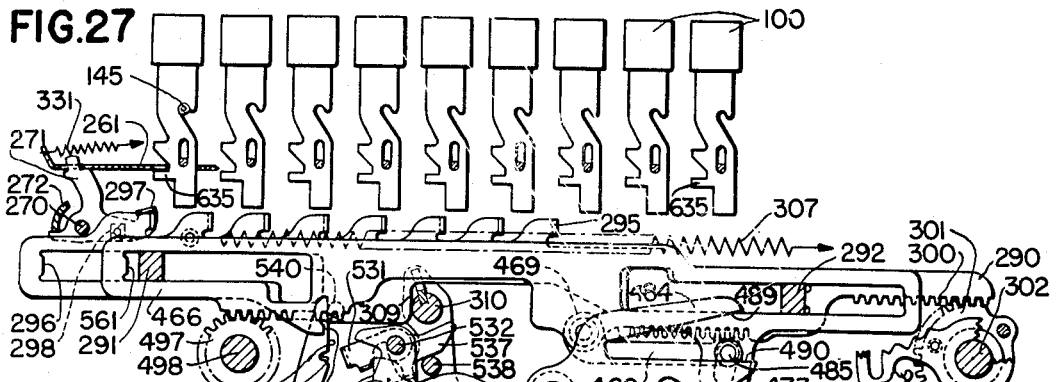
Fig. 27 is a detail view of the mechanism shown in Fig. 24, with the parts in home position, with no key depressed.
Figure 33:
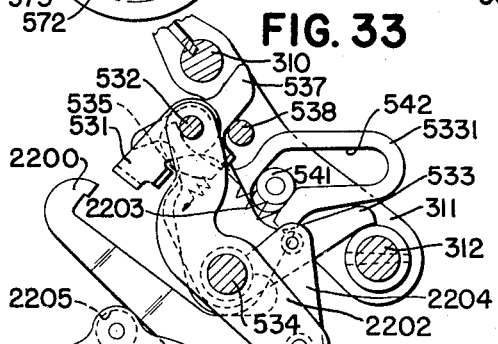
Fig. 33 is a detail view of the zero setting control mechanism and shows the controls therefor in normal position.

By reference to Fig. 27, it can be observed that the slot in the zero stop slide 261, through which the amount key 100 projects, is long enough to permit free movement of the key 100 therein, without affecting any movement of the zero stop control plate 261. However, when a key 100 is depressed, as shown in Fig. 24, the upper shoulder on the depressed key 100 moves into position to engage the left wall of the slot in the control plate 261 to prevent any movement thereof. The upper end of the zero stop pawl 271 has a toe projecting into a notch in the zero stop control plate 261, and therefore the zero stop pawl cannot move when released by the yoke 272 whenever a key 100 is depressed and blocks movement of the plate 261. Therefore, when an amount key is depressed and the plate 261 cannot move, the zero stop pawl 271 is maintained in its ineffective position at the time the yoke 272 is moved by its cam 329 (Fig. 33). Under these conditions, the yoke 272 rocks back and forth idly in the space between the toe on the zero stop pawl 271 and its upstanding arm (see Fig. 25).

When no key is depressed in the amount bank, the zero stop control plate 261, not being blocked by any key, is free to move to the right (Fig. 24) when the yoke 272 is rocked. Clockwise rocking movement of the yoke 272 permits the plate 261 to be so moved by the spring 331 connected to one end of the slide. Since the plate 261 can now be moved by the spring 331, the zero stop pawl 271 is rocked clockwise at the beginning of the machine operation to lower its flange 297 into the path of the stud 298 on the differential slide 290 (see Fig. 27).

From the above it is clear that the zero stop pawl 271 is normally in its upper, or ineffective, position and is lowered into an effective position to arrest the differential slide 290, only when no key is depressed. Depression of the key 100 prevents movement of the plate 261 and therefore prevents the zero stop pawl 271 from moving into its effective position, thus permitting the differential slide to be moved under control of the depressed key.

The above arrangement is novel in that it places a minimum load on the amount keys. By moving the zero stop pawl into its effective position by spring 331, and into its normal ineffective position by power supplied by the motor, the extra load usually required to move the zero stop pawl by depression of the amount keys is eliminated.

The zero stop pawl, being spring-actuated, may under some unusual condition fail to move into position in the path of the stud 298 before the differential slide 290 passes its zero position. If such an operation should by some unforeseen circumstances occur, then, upon return movement of the differential member, the stud 298 might conceivably strike the flange 297 and damage the machine. As a safety measure to prevent such an improper operation from occurring, the square stud 298 is beveled on its left face to form a cam, which would engage the flange 297 upon return movement thereof and cam the zero stop pawl 270 out of the way of the stud. Normally such misoperation should not occur, and this construction is provided merely as a safety device to prevent any accidental misoperation.

TOTALIZERS

The machine as illustrated herein has ten totalizers. The number of totalizers in a machine depends upon the system in which the machine is to be used. As disclosed herein, the upper totalizer, also referred to herein as the "List" totalizer, consists of a single set of eight wheels, which may be visibly read through the openings 127 (Figs. 1 and 2) in the cabinet of the machine. The rear totalizers, also referred to herein as the "Transaction" totalizers, are what are known in this art as "interspersed" totalizers and accumulate items credited to the entries indicated by the legends on the keys 102 to 109 inclusive (Fig. 2). The front totalizer, also referred to herein as the "Group" totalizer, consists of one set of totalizer wheels and is a non-shifting totalizer. If more than one totalizer is needed for a particular system, this line may be constructed like the rear totalizer, in which case the line would be shifted for selecting totalizers. The "List" totalizer is a non-shifting totalizer, and therefore no shifting mechanism is required for selection. Since no shifting is required, totals may be taken from this totalizer in a single cycle of operation, as distinguished from the two-cycle total-taking operations usual in this art.

The interspersed totalizer on the rear line requires shifting for selecting the proper totalizer into which amounts are to be added, or from which totals are to be taken. For this reason, the usual two-cycle operation is required for clearing the selected totalizer on the rear totalizer line. Mechanism is provided which is hereinafter described for automatically controlling the machine for either one-cycle or two-cycle total-taking operations.

*Front, or "Group," totalizer*

The Group totalizer comprises a single set of eight totalizer elements 350 (Figs. 20, 35, 49, 50, and 70) and two elements 3501 associated with the telephone number banks. The totalizer elements 350 and 3501 are rotatably mounted on a totalizer shaft 351. The shaft 351 is mounted in bearings carried by a pair of engaging arms 352 located adjacent the frame plates 194 and 199 (see also Figs. 7 and 12). The engaging arms 352 are mounted on a shaft 353 so as to rock thereon. Each arm 352 is provided with a cam slot 354. Engaging each cam slot 354 is a roller 355 carried by an arm 356 mounted on a stud 357, one carried by each side frame 194 and 199. Each arm 356 is also provided with a stud 358 projecting into an open slot in each arm 359 secured on the rock shaft 353. The rock shaft 353 is actuated during the machine operation in either adding or total-taking timing in a manner described hereinafter.

A collar 3511, pinned to each end of the shaft 351 adjacent the arms 352, maintains the shaft 351 in position to aline the totalizer elements with the actuators 304. The collars 3511 have annular grooves which engage guide slots 3512 in the frames 194 and 199 when the totalizer elements 350 are moved into engagement with the actuators 304, in the manner described hereinafter.

Front, or "group," totalizer aligner

When the totalizer wheels 350 and 3501 are in their disengaged positions, as shown in Fig. 49, an aligner 360, engaging between the teeth of the wheels 350, maintains the totalizer wheels against rotation. The aligner 360 is long enough to span the entire totalizer line and extends from the frame 194 to the frame 199. This aligner is in the form of a yoke, having a bail and two arms 366, pivoted on the respective frames 352, each of the arms 366 having a stud 362 projecting into a cam slot 361 of the corresponding arm 359. Upon rocking of the shaft 353, the cam slots 361, engaging studs 362 on aliner arms 366, disengage the aligner 360 from the totalizer elements 350, after the totalizer elements are propertly engaged with the actuator racks 304.

Rear, or "transaction," totalizer line

The rear totalizer line includes eight sets of interspersed totalizer wheels 370 (Fig. 12), comprising eight decimal orders each, together with two ten-tooth wheels associated with the "Tele. No." keys 99. A ninth totalizer is shown in Fig. 12 to illustrate the maximum number of totalizers which can be provided. However, the ninth totalizer is shown in the position corresponding to the "Tele. No." key, which key, in the present disclosure, prevents the rear totalizer from becoming engaged with its actuators. Therefore, as disclosed herein, nothing will ever be entered into the ninth totalizer. Therefore, for the purpose of this description, it is assumed that only eight totalizers on the rear totalizer line are actually used, which is adequate for the application illustrated.

The engagaing mechanism for the rear totalizer line is identical with that described for the front totalizer line. The totalizer wheels 370 are mounted on a shaft 371, shiftably mounted in bearings in a pair of arms 372, rotatably mounted on a rock shaft 373. The arms 372 are provided with notches similar to the notch 354 (Figs. 49 and 50), with which rollers 375 (Fig. 12) of arms 376, similar to the arm 356 (Fig. 50), engage. The arms 376 have rollers 378 (Fig. 12), similar to the rollers 358, which project into open slots in rocking arms 379 pinned to the shaft 373. When the shaft 373 is rocked in the manner described hereinafter, the cam arms 379, through rollers 378, rock arms 376, which, through rollers 375, rock the arm 372 to engage the totalizer wheels 370 with the actuator racks 305.

An aligner 380, similar to the aligner 360, is provided for the rear totalizer line and is operated by the arms 379 in like manner.

During the operation of the machine, the totalizer shaft 371 is shifted laterally in bearings of arms 372, under ocntrol of the transaction keys, to align the proper set of totalizer wheels 370 with the actuators 305. Thereafter the shaft 373 is given a rocking movement, by mechanism described hereafter, to engage the selected set of totalizer elements 370 with the actuators 305 in the proper timing, so that either adding or total-taking operations may be performed in the totalizer.

The totalizer shaft 371 has a novel means for adjusting the totalizer elements in respect to the actuators 305, so that accurate alignment can be obtained. This mechanism is best disclosed in Fig. 12.

The left-hand end of the shaft 371 (Fig. 12) is provided with threads to receive an adjustable aligner member 381. The aligner member 381 consists of a castellated nut having aligner discs 382 thereon, arranged to engage aligning slots 383 in an aligning block 384 mounted on the left side frame 194. The right-hand end of the shaft 371 is threaded at 385 to receive an adjusting nut 386. A yoke 387 straddles the nut 386, and the yoke is differentially shifted sidewise by a drum cam 388 under control of the transaction keys in row 2, in a manner to be described hereinafter, to selectively shift the totalizer wheels 370 in relation to the actuators 305 for selecting a totalizer. When the totalizer shaft 371, together with the totalizer wheels 370, is assembled in the machine, the shaft 371 is adjusted endwise by turning the nut 386 to properly align the selected set of totalizer wheels 370 with the actuator racks 305. Thereafter, a cotter pin 377 is inserted through notches in one face of the nut 386 and through an opening in the shaft 371. This holds the selected totalizer elements 370 in alignment in respect to the shifting drum cam 388. After the first adjustment has been made by means of the nut 386, the aligner member 381 is properly adjusted to align the aligner discs 382 with the aligner slots 383.

After the aligner member 381 properly aligns the discs 382 with the slots 383 in accordance with the adjustment of the nut 386, a cotter pin 3901 is inserted through the notches in the aligner member 381 and through an opening in the shaft 371.

The novel arrangement including the two nuts 381 and 386 provides a fine adjustment for accurately aligning the interspersed totalizer wheels 370 with respect to the actuator racks 305.

Upper, or "list," totalizer

The upper, or "List," totalizer is a visible totalizer and has only one set of eight wheels; therefore it is not shifted laterally for selection. This totalizer is controlled for engaging the actuators 306 in add timing under control of the "List" key 112 or the "Add" key 113, and for engagement with the actuators 306 in total-taking timing by the "Total" key 110.

Figure 36:
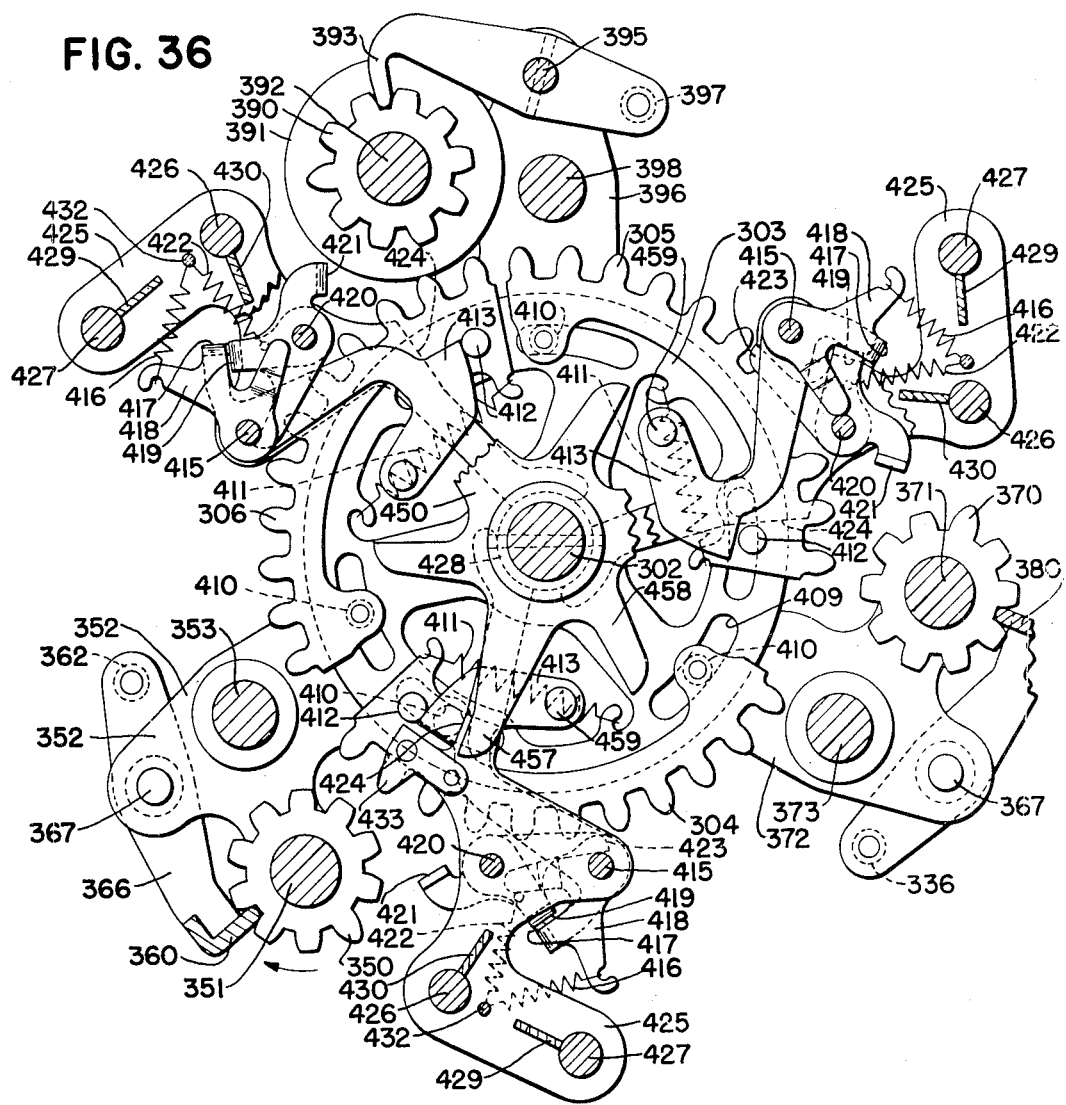
Fig. 36 is an enlarged detail view of the amount differential mechanism.

The upper totalizer includes a plurality of totalizer wheels 390, each one of which has secured thereto an indicating or reading dial 391 (Figs. 2, 20, and 36). The totalizer wheels 390 are rotatably mounted on a shaft 392, and spacing collars between the wheels properly space them in relation to the actuators 306. The shaft 392 is carried by an arm 396 at each end thereof, similar to the arms 352 (Fig. 49). The shaft 392, together with the two supporting arms 396, is rocked to engage the totalizer wheels 390 with the actuator 306 by mechanism similar to that shown in Figs. 49 and 50.

An aligner mechanism including an aligner arm 393 (Fig. 36) for each totalizer wheel 390 is provided. The arms 393 are pinned to a shaft 395, supported by the rocking arms 396. The two end arms 393 (one shown in Fig. 20) are provided with rollers 397, which project into cam slots 399 in rocking arms 400 pinned on a rocking shaft 398. The rocking arms 400 are similar to the rocking arms 359 (Figs. 49 and 50).

At the proper time during the machine operation, the shaft 398 is rocked by mechanism described hereinafter to actuate arms 400 to thereby rock the totalizer arms 396 to engage the totalizer wheels with the actuators 306 and to disengage the aligners 393 therefrom. When the totalizer is disengaged, the aligners are again moved into engagement with the totalizer wheels 390 to properly hold the totalizer wheels 390 in alignment so that upon a subsequent rocking movement into engagement with the actuators 306 the totalizer will engage the teeth thereof in proper relationship.

TENS TRANSFER MECHANISM

Each of the three totalizer lines has a tens transfer mechanism whereby "1" is carried to the next higher order wheel when a lower order wheel passes from "9" to "0." Inasmuch as the tens transfer mechanisms for all three of the totalizer lines are identical, only the one associated with the front totalizer will be described herein. The tens transfer mechanisms are shown in Figs. 20, 36, and 37.

The carry-over of one unit into the next higher order wheel is effected by permitting movement of the actuator rack 304 mounted on the differential plate 303 one step, in addition to the extent of movement that this actuator moves under control of the amount keys. This extra step of movement is relative to the actuator plate 303. The actuator rack is provided with the above-mentioned two studs 410, projecting into slots 409 in the differential plate 303. The spring 411, connected to one end of the rack 304, tends to move the rack counterclockwise, as viewed in Fig. 36. When the differential plate 303 is in its normal position—that is, the position in which the plate 303 comes to rest after an operation of the machine—the stud 412 on the actuator 304 rests against the forward end of the arm 413, as shown in Fig. 36. When in this position, the actuator rack is in its home or normal position; that is to say, no transfer has been effected. When a tens transfer is to be effected, the arm 413 is rocked clockwise to withdraw its free end out of the path of the stud 412 to permit the actuator 304 to move one step farther, thus adding an extra unit in the totalizer wheel engaged therewith. This tripped condition is illustrated in Fig. 36 with reference to the rear totalizer rack 305.

Figure 37:
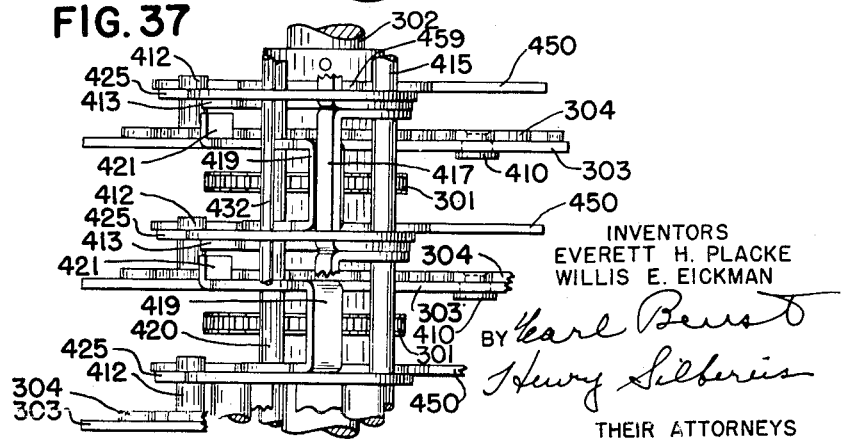
Fig. 37 is a detail view showing the tens transfer mechanism for the totalizers, looking from the under side thereof.

The front totalizer transfer mechanism is shown in side spacing in Fig. 37, as viewed from the under side thereof. In Fig. 37, the lower order is shown at the top, and the next higher orders are shown progressively toward the bottom. The arms 413 are mounted to pivot on a rod 415 carried by a plurality of frame members 425, one arm 413 and one frame 425 being provided for each order of the totalizer. A spring 416, connected at one end to the lower end of an arm 418 and at its other end to a rod 432 carried by all the frame members 425, normally maintains a flange 417, forming a yoke between the arm 413 and the arm 418, in contact with a yoke 419. The yoke 419 is carried on a rod 420, also supported by frame members 425. The forward end of the arm 413 is in the path of movement of the stud 412 on the actuator 304 when the flange 417 contacts the yoke 419. One arm of the yoke 419 is provided with a flange 421 projecting into the path of a long tooth of a totalizer wheel 350. The yoke 419 is spring-urged clockwise by a spring 422, stretched between one arm of the yoke and the rod 432, to maintain a tail 423 on one arm of a yoke 419 against the rod 415. When the totalizer wheel 350 is engaged with the actuator 304, and the actuator 304, traveling counter-clockwise, rotates the totalizer wheel 350 from its "9" position to its zero position, the long tooth on the totalizer wheel 350 strikes the flange 421 and rocks the yoke 419 counter-clockwise against the action of the spring 422. This counter-clockwise movement of the yoke 419 withdraws it from contact with the flange 417 and permits the spring 416 to rock the arm 413 clockwise out of the path of movement of the stud 412 on the actuator 304 for the next higher order. Thereupon, when the actuator plate 303 in the next higher order moves its associated actuator 304 to its home position, the actuator 304 moves one extra step to enter "1" in said next higher order wheel.

If the actuator 304 of the said next higher order wheel is in home position—that is, with the stud 412 against the free end of the arm 413—when the next lower order wheel 350 passes from "9" to "0" at the time the yoke 419 is moved out of contact with the flange 417, the arm 413 of the next higher order is moved out of contact with the stud 412. Thereupon the spring 411 moves the actuator 304 one step, thus entering "1" in said next higher order wheel. When released to enter a unit in the said next higher order wheel, the rack 304 is limited in its movement of one step by engagement of the stud 412 with an edge 424 on its associated frame member 425.

The entire tens transfer mechanism for each totalizer is carried by the plurality of frames 425, so as to constitute a unit assembly which is separately assembled and thereafter inserted into the machine as a unit. Each frame member 425 has an inwardly-extending arcuate foot 428, which rests on a sleeve on the shaft 302. At the outer ends, the frame members 425 are supported by rods 426 and 427.

Before mounting the frame members 425 on the rods 426 and 427, spacing bars 429 and 430 are inserted into position. These spacing bars 429 and 430 are notched to engage over each frame member 425. In assembling the spacing bars 429 and 430, they are inserted into the openings for the rods 426 and 427 and are slid into position over the frame. Thereafter the rods 426 and 427 are inserted into the openings provided therefore and are shifted into position, where they maintain the spacing bars against any movement, thus forming a completely assembled unit ready to be inserted into the machine. After the rods 426 and 427 are in position to maintain the transfer unit properly assembled, the unit is inserted into the machine with the arcuate feet 428 resting against the sleeve on the shaft 302. The ends of the rods 426 and 427 are tapped to receive screws which project through holes in the frames 194 and 199, and into said tapped ends of the rods 426 and 427, to maintain the tens transfer unit assembly firmly in position.

Secured to each of the frame members 425 is an aligner bar 433 to maintain all of the totalizer wheels 350 which are not engaged with an actuator rack against rotation. A space is provided at the point of engagement with the actuator 304 to permit free rotation of the engaged totalizer wheel 350.

TENS TRANSFER RESTORING MECHANISM

Immediately after the amounts, including the tens transfers, have been entered into the totalizer, the totalizer wheels are disengaged from the actuators, and thereafter all the tripped tens transfer arms 413 and actuators 304 are restored to their normal positions.

The normal position of the restoring mechanism is shown in Figs. 20, 22, and 54, and the position which it assumes at the time the tens transfers are entered is shown in Fig. 36.

The means for restoring the tens transfer mechanism and the actuators 304 comprises a multi-armed plate 450 for each order of the totalizer. All of the plates 450 are pinned to the shaft 302, together with an arm 451 (Fig. 54), which has pivoted thereto the upper end of a link 452. The lower end of the link 452 is pivoted to an arm 453 pivotally mounted on a stud 454 carried by the left side frame 181. The arm 453 has two anti-friction rollers 455 coacting with a two-plate cam 456 pinned on the main cam shaft 229 near its left end and adjacent the left side frame 181.

At the beginning of a machine operation, the cams 456 rock the arm 453 slightly counter-clockwise, thus raising the link 452 and rocking the multi-armed plates 450 counter-clockwise to the position shown in Fig. 36. When the plates 450 are in this position, the tens transfers may be freely entered into the totalizer wheels. After the amounts have been entered into the totalizer wheel and the appropriate tens transfers have been entered, the totalizer is disengaged from the actuators. Immediately thereafter, the cams 456 rock the arm 453 clockwise. This imparts a clockwise movement to the shaft 302 to rock the multi-armed plate 450 clockwise, to cause an arm 457 thereon to engage the stud 412 of the rack 304 to restore the rack to its normal position. A second arm 458 of the multi-armed member 450 engages a stud 459 on the transfer arm 413 and restores it to its normal position, whereupon the yoke 419 is restored to its normal position by its spring 422 to maintain the transfer arm 413 in its normal position. After all the tripped transfer pawls have been restored, and near the very end of the machine operation, the cams 456 again rock the arm 453 counter-clockwise, thus rocking the shaft 302 counter-clockwise to position the multi-armed plate 450 into the position shown in Fig. 20.

Two arms like the arms 457 and 458 are provided on the multi-armed plate adjacent the upper and back totalizer lines to restore the actuator racks 305 and 306, together with their tripped transfer members, in the same manner as described hereinbefore.

The above-described tens transfer restoring mechanism is timed to operate so that the tens transfer tripping arms 413 are always in their cocked positions when the machine comes to rest; that is to say, in a position ready to be tripped during the next machine operation. The restoring movement takes place near the end of the operation in which the tens transfer arms 413 are tripped. In this respect, the tens transfer restoring mechanism differs from the usual tens transfer restoring mechanisms, which in the prior art are usually restored at the beginning of the succeeding operation. This timing of the restoration of the tens transfer arms 413 becomes important when a single-cycle total-taking operation is made, as will become apparent hereinafter.

AMOUNT AND TELEPHONE NUMBER TYPE SETTING MECHANISM

To provide for printing the amounts entered into the totalizers on the deposit slip, the audit tape, and the issuing tape, and for printing telephone numbers on the "Notifier," three groups of type elements are mounted on shafts 463, as shown in Figs. 90A and 90B. A shaft 463 is supported in bearings carried by each pair of auxiliary plates 203, so as to provide a separate group of type wheels for each printer section. Each amount type wheel 465 (the tens order type wheel 465 being shown in Fig. 20) is adjusted in accordance with the amount entered into the totalizer by the amount differential mechanism. The amount differential mechanism controls the setting of a slide 466 (Figs. 20 and 24 to 29 inclusive). The slide 466 is slotted to be supported by the cross bars 291 and 292. The slide 466 is adjusted during each operation to represent the item entered into the totalizer and remains in the set position until readjusted during the next succeeding operation. During each operation, when the universal rod 310 is rocked clockwise around the shaft 312 to release the differential member 290, the universal rod 310 strikes a surface 467 on the slide 466 and moves it to the right (Fig. 29) into a position which will be hereinafter referred to as the "eliminated" position. The term "eliminated position" is applied to the position that the slide 466 occupies when the type wheel 465 (Fig. 20) is in the zero eliminated position; that is, in a position in which a blank position on the type wheel is at the printing line. After the differential slide 290 has been adjusted differentially under control of the amount keys 100 or the zero stop pawl 271, as hereinbefore described, and after the slide 466 has been moved to its "eliminated" position, the two slides are coupled together by a coupling arm 468 pivoted to the slide 466 by a stud 469. The coupling arm 468 has two coupling teeth 470 (see also Figs. 31 and 32), which teeth engage teeth on the lower edges of the slide 290. Normally the teeth 470 are in engagement with the teeth on the slide 290, but, before the universal rod moves, the teeth 470 are withdrawn from engagement with the slides 290, so that the slides may be adjusted independently of each other. After the slides 290 and 466 assume their new positions, the coupling arm 468 is rocked clockwise to again couple the two slides together. After the slides have been coupled together, the universal rod 310 is rocked counter-clockwise, whereupon the rod 310 picks up the differential slide 290 from the position into which it was adjusted under control of a key or the zero stop, and returns it to its normal position in a manner described hereinbefore. During this movement, the type adjusting slide 466, being coupled to the differential slide 290, is moved from its "eliminated" position into a position corresponding to the amount entered into the totalizers by the differential slide 290.

The disengagement and the reengagement of the coupling arm 468 are effected by a cam arm 471 (Fig. 32) mounted on the shaft 333. The cam arm 471 is provided with a cam slot 472, into which projects a universal rod 473 extending across the machine so as to project into a cam slot 472 in an arm 471 for each amount and telephone number differential mechanism. The universal rod 473 is carried by three arms 474 pivotally mounted on the shaft 332. Secured to the shaft 332, near the center of the machine and adjacent the middle arm 474, is an arm 475 (see also Fig. 31) bifurcated at its upper end to engage the universal rod 473. A coupling pawl 476 is pivoted to the arm 475 by a stud 477 (Fig. 31) having a nose 478 lying in the path of a shoulder 479 (Fig. 32) of an arm 480, sleeved to a bell crank 481. The bell crank 481 has two rollers 482, which are in contact with a pair of cams 483 mounted on the main cam shaft 229 (see also Fig. 23).

When, during the operation of the machine, the main cam shaft 229 is rotated clockwise (Fig. 32), the cams 483, coacting with the rollers 482, rock the bell crank 481 first counter-clockwise and then clockwise. During the counter-clockwise movement of the bell crank 481 and the arm 480 sleeved thereto, the shoulder 479 on the latter engages the nose 478 of the pawl 476 and rocks the arm 475, the shaft 332, and the universal rod 473 counter-clockwise, which, acting on the cam slot 472, rocks the arm 471 clockwise. Clockwise movement of the arm 471 brings a finger 484 thereon into contact with a stud 485 on the coupling arm 468 and rocks the coupling arm 468 clockwise to disengage the teeth 470 from the corresponding teeth on the differential slide 290. After the differential slide 290 has been adjusted under control of the amount keys, or the zero stop pawl, and the type setting slide 466 has been moved to its "eliminated" position, the cams 483 rock the bell crank 481 and the arm 480 clockwise and, acting through a finger 486 on the arm 480, engages the universal rod 473 and restores it clockwise to the position shown in Fig. 32. This movement of the universal rod 473, acting on the cam slot 472, raises the arm 471 and, through the stud 485, reengages the teeth 470 with the teeth on the under side of the differential slide 290.

After the coupling arm 468 is reengaged with the slide 290, the universal rod 310 restores the differential slide 290 to its home position. Inasmuch as the two slides are coupled together by the coupling arm 468 at the time the slide 290 is restored to its home position, the amount type setting slide 466 is moved into a position represented by the amount entered into the totalizer.

Each arm 474 has a tail 487, which normally engages a rod 488 to maintain the arms 474 and the universal rod 473 in home position.

Figure 28:
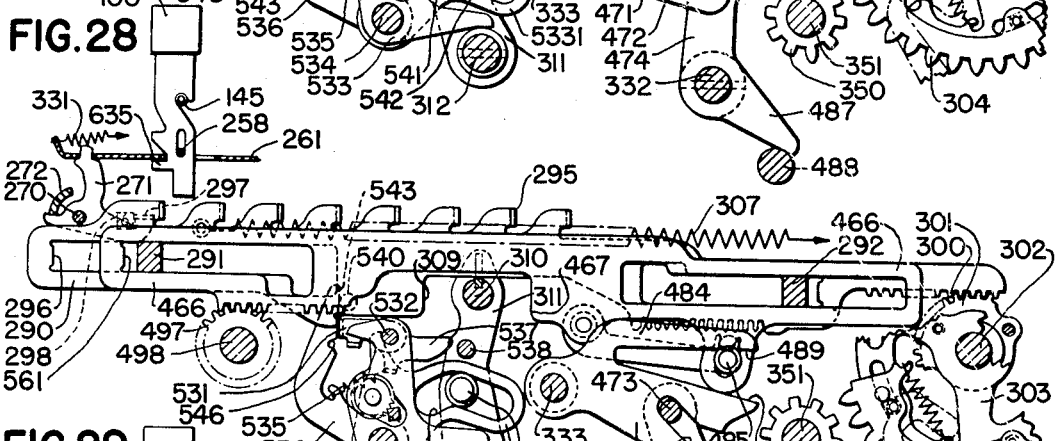
Fig. 28 is a detail view of the parts shown in Fig. 27, shown in the position in which the amount differential slide is arrested by the zero stop pawl in the early part of the machine operation.

By referring to Fig. 27, it will be noted that an edge 490 of the arm 471, which normally supports the stud 485, lies in a plane parallel with the movement of stud 485, thus permitting free movement of the stud 485. When the arm 471 is in its moved position, as shown in Fig. 28, a lower edge 489 of the finger 484 is in a plane to permit free movement of the stud 485. In either of the two positions of the arm 471, the respective edges 489 and 490 maintain the pawl in disengaged, or engaged, position throughout their entire movement. Thus the edges 489 and 490 provide a locking means for locking the coupling arm 468 in either its engaged position or its disengaged position.

Figure 29:
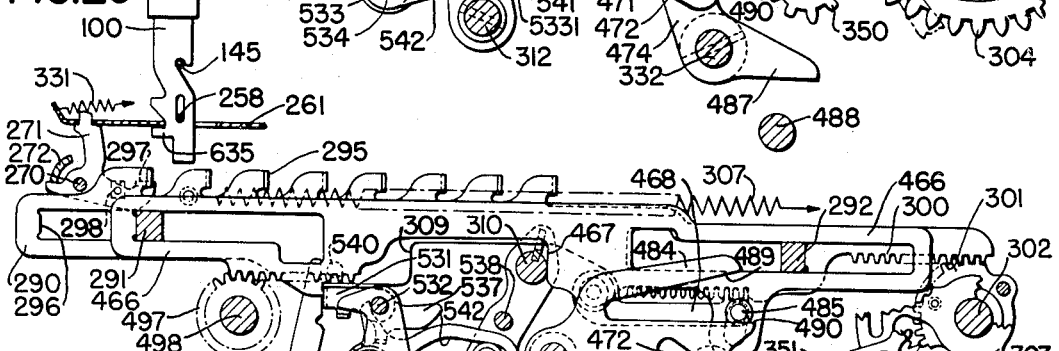
Fig. 29 is a detail view of the amount differential mechanism shown in Fig. 27, with the amount slide in the zero eliminated position and the type setting slide moved to its zero eliminated setting position.

In order to better point out how the amount type setting slide is adjusted during an operation of the machine, reference may be had to Figs. 20, 27, 28, and 29, where the movements of the various parts are shown during the operation in which nothing is entered into the totalizer wheel. The normal position of the differential mechanism is shown in Figs. 20 and 27. When the machine is operated without an amount key depressed, the zero stop pawl 271 controls the positioning of the differential slide 290. At the very beginning of this operation (see the time chart, Fig. 140), the universal rod 473 is rocked counter-clockwise to disengage the coupling arm 468 from the slide 290, and the zero stop pawl 271 is lowered into the path of the stud 298, as shown in Fig. 28. Upon movement of the universal rod 310, the differential slide 290 is released to the action of the spring 307 and is moved until the stud 298 thereon engages the flange 295 on the zero stop pawl. This arrests the differential slide 290 while the universal rod continues to move clockwise. This condition is shown in Fig. 28. Upon further movement of the universal rod 310, the rod engages the surface 467 on the type setting slide 466 and moves the latter to the "eliminated" position, shown in Fig. 29. After the type setting slide 466 is positioned in its "eliminated" position, the coupling arm 468 is again rocked into engagement with the teeth on the differential slide 290, as shown in Fig. 29. During the return movement of the universal rod 310, the major part of its initial movement is idle, and, when it strikes the shoulder 309 on the differential slide 290, it picks up this slide and then returns it to its home position. During this movement, the type wheel setting slide 466 is adjusted to the same extent that the differential slide 290 was moved out of its home position, because during this setting movement the two slides are coupled together by the coupling arm 468. Since the differential slide 290 in the operation being described is moved one step out of its normal position into its zero position, the amount type setting slide 466 is moved one step from its "eliminated" position into its zero position.

The setting of the type setting slide 466 for setting up a "5" is illustrated in Figs. 24, 25, and 26. If the machine is operated with the "5" key depressed, as shown in Fig. 24, after the coupling arm 468 has been disengaged from the teeth in the slide 290, the differential slide 290 moves to the right until arrested by the depressed "5" key, as shown in Fig. 24. Upon further movement of the universal rod 310, it engages the surface 467 of the slide 466 and moves it into the position shown in Fig. 25, where the amount type wheel setting slide 466 is shown in its eliminated position, and the amount differential slide 290 is in its "5" position. After this setting has been completed, the coupling arm 468 is raised by the universal rod 473 to the position shown in Fig. 25. After the coupling arm 468 has been engaged with the slides 290, the universal rod 310 is restored to its normal position and during this movement engages the shoulder 309 on the differential slide 290 and moves the differential slide back to its home position. During this movement, the two slides, being coupled together by the coupling arm 468, are moved together, and the slide 466 receives the same extent of movement as the differential slide 290, which is equal to six steps, thus moving the type setting slide 466 from its "eliminated" position into the "5" position, as shown in Fig. 26.

At the end of the machine operation, the coupling arm 468 remains in engagement with the teeth on the slide 290 until uncoupled during the first part of the next machine operation. Advantage is taken of this condition for repeat operations in a manner to be described hereinafter.

The tens order type wheel 465 (Fig. 20) in each group of type wheels shown in Figs. 90A and 90B is adjusted by the type setting slide 466 in a manner now to be described. The amount setting slide 466 has teeth 496 (Figs. 20 and 24 to 29 inclusive), which engage a pinion 497 rotatably mounted on a shaft 498 (see also Fig. 90B). Connected to the pinion 497 by a hub 499 is a segment 500. The segment 500 meshes with a ring gear 501. The ring gear 501 is provided with internal teeth 502, meshing with a pinion 503 on a square shaft 504.

The square shaft 504 extends through all of the ring gears, as shown in Figs. 90A and 90B. Located in alignment with each type wheel 564 for the three groups of type wheels are ring gears 505, 506, and 507. Mounted on the square shaft 504 in alignment with each of the ring gears 505, 506, and 507 is a pinion similar to the pinion 503 (Fig. 20), which meshes with internal teeth of the ring gears 505, 506, and 507. Each ring gear 505, 506, and 507 is provided with teeth 508, which mesh with tooth-like notches in the type wheels 564 whereby the type wheels are adjusted an extent equal to the adjustment of their corresponding ring gears.

From the above it is apparent that adjustment of the type setting slide 466 by means of its teeth 496, the pinion 497, the segment 500, the ring gear 501, the pinion 503, the shaft 504, and the ring gears 505, 506, and 507 adjusts the type wheel 465 in each group of type wheels in accordance with the amount entered into the totalizer.

The amount type wheel for each amount bank and the right-hand exchange number symbol wheel are adjusted by similar trains of mechanism.

In the case of the exchange number banks in the present disclosure, no type wheel is provided for printing the telephone exchange symbols in the "Slip" printing section, and therefore only eight ring gears 507 are provided in this section. The connections for setting these symbols in the "Audit Tape" and "Issuing Tape" sections for the left-hand symbol number of the exchange banks are as follows:

Meshing with teeth similar to the teeth on the pinion 497 (Fig. 20) in the left-hand exchange bank is a pinion 515 (Fig. 91A) connected to a segment 517 by a hub 516. The segment 517 meshes with a ring gear 518 mounted to rotate on a disc 631, secured to a shaft 632, and said ring gear 518 has internal teeth meshing with a pinion 519 on a square shaft 520. The square shaft 520 extends between the two side frames of the machine, as shown in Figs. 91A and 91B, and has mounted thereon two pinions, one inside of each ring gear 521 and 522 on discs 631, so as to drive these ring gears an extent commensurate with the the movement of the ring gear 518. Each gear 521 and 522 meshes with an idler pinion 523 (Fig. 20) on a shaft 524. Each pinion 523 meshes with a respective ring gear 525 (Fig. 90A) and 526 (Fig. 90B), which mesh with the left-hand exchange number type wheels 527.

The two groups of ring gears, one group including the ring gears 501 and the discs 509, mounted on the shaft 510, and the other including the ring gears 521 and the discs 631, mounted on the shaft 632, provide a flexible construction for arranging and assembling the machine to fit various systems. The type wheels can be assembled on the type wheel shafts in any position throughout the width of the machine. If desired, an additional type line can be provided beneath the ring gears 521 so that, if some system or application requires two printing lines, two printing lines can be provided in the present machine without the necessity of redesigning the entire type setting mechanism.

TELEPHONE EXCHANGE NUMBER PRINTING

As illustrated in Fig. 2, each exchange number bank of keys 99 is provided with symbols adopted by telephone companies on the dial type of telephones. Thus, in each bank, the first key has the numeral "1" thereon, the second key has the letters "ABC," the third has the letters "DEF," etc., to the ninth key, which has the letters "WXY" thereon. The keys are used to index the exchange letters of a telephone number in the same manner as is done when they are indexed on a dial telephone. The numerals of a telephone number are indexed on the higher order amount keys 100, and five "dollar" key banks are used to index the highest number commonly in use. The type wheels 465, which are adjusted under control of the keys 99, have numerals 1 to 9 engraved thereon, and each numeral represents three letters of the alphabet in the same manner as in the case of dial telephones. For example, if the telephone exchange is identified by the name "Sterling," the "S" and the "T" keys in the respective bank 99 are depressed. The "S" key, being in the seventh position, will control the type carrier to set up a "7" at the printing line, and the "T" key, being in the eighth position, will control the type carrier to set up an "8" at the printing line. The numerals of the telephone numbers are indexed in the highest order amount keys. When four digits are used, the four lowest dollar key banks are used, and, when five digits are used, the five lowest dollar key banks are used.

Certain of the type wheels adjusted under control of the overflow bank and the amount banks are engraved differently in the audit tape printer from the issuing tape printer sections. In the audit tape printer section, the type wheel for the overflow bank has a "—" engraved in the "eliminated" position. The type wheel for the highest order bank of keys has no engraving in the "eliminated" position. The type wheel for the second highest bank of keys has a "," engraved in back of each numeral. Thus, if the number WA 81234 is indexed on the keyboard, the printed record on the audit tape reads 92–81,234.

The type wheels for the overflow bank in the issuing tape printer section have a "—" in the "eliminated" position, and the highest order dollar type wheel has a "dash" in the "eliminated" position and also a "dash" behind each digit "1" to "9." The telephone number WA 81234 will be recorded on the "Notifier" as follows: 92–8–1234.

When amounts are entered on the issuing slips, two dashes will be printed in the columns corresponding to the overflow and highest order banks, as illustrated in Figs. 130, 131, 132, and 133.

If only four numerical digits are to be indexed, the numerals are indexed on the lowest order dollar banks. For example, if the telephone number Sterling 9200 is indexed on the keyboard, the printing on the "Notifier" will read 78—9200, and the printing on the audit tape will read 78—9,200.

In the first example, it was necessary to eliminate the printing of three zeros to the right of the lowest digit, and in the second example it was necessary to eliminate only two zeros.

Normally—that is, when amounts are set up on the keyboard—all the zeros to the left of the highest order digit are eliminated, except in the pennies and dimes banks. Thus, in order to obtain the correct setting of the data in both kinds of operations, it is necessary to provide a novel control over the zero setting mechanism. The normal setting of zeros—that is, when amounts are entered—will be described first, and thereafter the zero setting for the telephone numbers will be described.

ZERO SETTING CONTROLS

When entering amounts, as distinguished from printing telephone numbers, the type setting slides 466 are controlled in their movement so that zeros are not printed above the highest significant order. As pointed out above, the slide 466 is moved to its "eliminated" position during each operation of the machine prior to being readjusted by the universal rod 310 by the slide 290 and the coupling arm 468. In order to eliminate the printing of zeros where no zero printing is desired, it is only necessary to prevent adjustment of the slide 466 out of its "eliminated" position when the universal rod 310 is restored to its normal position. As explained above, the differential slide 290 is moved from a normal position to a "zero" position when no amount key is depressed, which movement consists of one step of movement. In order to prevent the type setting slide 466 from being moved out of its "eliminated" position during machine operation, it is only necessary to move the differential slide 290 to its normal position before the coupling arm 468 is moved into its coupling position, wherein the differential slide 290 and the type setting slide 466 are coupled together. If the differential slide 290 is restored to its normal position before the coupling arm 468 becomes effective, then, upon subsequent restoring movement of the universal rod 310 to its normal position, no movement of the type setting slide 466 will take place. This leaves the type wheels standing with a blank or a dash at the printing line, as explained above.

To move the differential slide 290 (Figs. 27, 28, and 29) from its zero position to its normal position prior to the engagement of the coupling arm 468 with the slides 290 and 466, a yoke-shaped pawl 531, pivoted on a rod 532 supported by five arms 533 (see also Fig. 23) loosely mounted on a shaft 534, is provided. Each arm 533 is adjustably connected to a cam arm 5331, so that they will move as a unit. A spring 535, stretched between a flange on a downwardly-extending arm of the pawl 531 and an arm 536, also pivoted on the shaft 534, normally maintains a tail 537 of the pawl 531 in engagement with a rod 538 carried by the five arms 311 (see also Fig. 23). One pawl 531 is pivotally mounted on the rod 532 for each amount and exchange number bank. An arm 536 is provided for each bank of amount and exchange number keys, and each has an upwardly-extending finger with a flat surface 539 normally bearing on a stud 540 carried on the differential slide 290. The spring 535 normally maintains the surface 519 in engagement with the stud 540.

Carried by each of the five arms 311 (Fig. 23) are rollers 541 (see also Figs. 27, 28, and 29), which project into cam slots 542 of the cam arms 5331. When the machine is in its normal, or home, position, the rollers 541 are in the left-hand ends of the cam slots 542 (Fig. 27), and, when the arms 311 are moved clockwise to move the universal rod 310 clockwise to release the differential slides 290, the rollers 541 travel in the cam slots 542 and rock the cam arms 5331 and the arms 533 counter-clockwise. During this movement of the arms 311, the rod 538 is withdrawn from beneath the tails 537 on the pawls 531, which permits the springs 535 to rock the pawls 531 clockwise. If, as illustrated in Fig. 28, the differential slide 290 is arrested in its zero position by the zero stop pawl 271, the pawl 531, upon being released by movement of the rod 538 from beneath the tail 537 thereon, moves behind a shoulder 543 formed on the lower edge of the differential slide 290. The position of the parts at this stage of the machine operation is shown in Fig. 28. Continued movement of the universal rod 310 moves the type setting slide 466 to its "eliminated" position, and the rollers 541 on the arms 311, moving in the cam slots 542, rock the cam arms 5331 and the arms 533 counter-clockwise, whereby the differential slide 290 is moved to the left by the pawl 531 to its home position, as shown in Fig. 29. After the differential slide has been moved to its home position, the coupling arm 468 is moved to engage the teeth on the lower edge of the slide 290, as shown in Fig. 29. When the universal rod 310 is now restored to its home position, it does not change the setting of the differential slide 290, inasmuch as this slide has already been restored to its home position by the pawl 531. Inasmuch as the differential slide 290 is not moved at this time, the type setting slide 466 is also not moved and therefore remains in its "eliminated" position. When moved into this "eliminated" position, the slide 466, through the connections hereinbefore described, positions a blank on the type carrier at the printing line for each bank except the highest order dollar bank and the overflow bank between the highest order amount bank and the right-hand exchange number bank. The type wheel 465 for these banks has a "—" engraved at its "eliminated" position for the reasons explained above.

Figure 30:
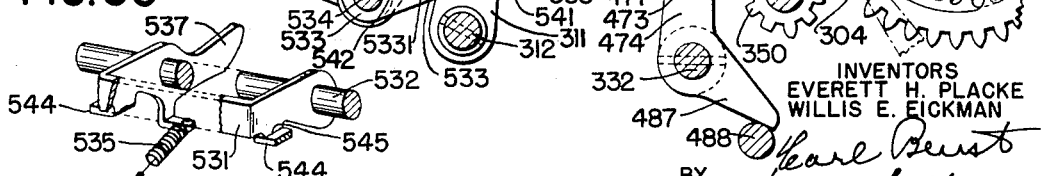
Fig. 30 is a perspective detail view, with the parts partly broken away, showing certain ones of the zero setting control yokes.

The above description points out how one differential unit is controlled to prevent zero printing. If, however, an amount is set up in an amount bank higher than a lower order bank in which no amount has been set up, it is desired to set a zero in said lower bank. In order to control the lower order banks to print zeros, it is only necessary to prevent the pawl 531 in said lower order from moving into position to engage the shoulder 543 on the differential slide 290 in said lower bank. To accomplish this, a flange 544 (Fig. 30) is provided on each pawl 531, which underlies a shoulder 545 of the next highest order pawl 531. If a higher order pawl 531 is prevented from moving into the path of the shoulder 543, the flanges 544 of all the orders lower than the one prevented from rising will also be held depressed. Therefore, even though no amounts are set up on the lower order differential slides 290, the pawls 531 for said lower orders are nevertheless held in depressed position.

When the pawls 531 for said lower orders are held in their depressed positions and the universal rod 310 and the arms 311 pass through their middle positions (shown in Fig. 28) to rock the cam arms 533 counterclockwise, the pawls 531 are ineffective to adjust the said lower order differential slides 290 from their zero positions into their home positions. After the coupling arm 468 is moved into engagement with the slide 290, the universal rod 310 is moved to its home position. As the universal rod 310 moves to its home position, it restores the differential slide 290 to its home position, thereby moving the type setting slide 466 one step from its "eliminated" position into its "zero" position, thus filling in zeros in the said lower orders.

The means for preventing the pawls 531 from rising into the path of the shoulders 543 in those orders in which an amount is set up is illustrated in Figs. 24, 25, and 26. As illustrated in Figs. 24 and 25, the "5" key is shown depressed and the differential slide 290 moved to the "5" position. When the differential slide 290 moves to its "5" position, the stud 540 is withdrawn from contact with the shoulder 539 of the arm 536, thus permitting the spring 535 to rock the arm 536 clockwise until a notch 546 therein engages over the flange of the pawl 531, to latch the pawl 531 against rising under the action of the spring 535.

From the above it becomes apparent that all of the pawls 531 in those orders in which the differential slide 290 passes beyond zero position are latched down by arms 536, and therefore all of the pawls 531 in the orders lower than the order in which a differential slide 290 passes beyond zero are held down by the interaction between the shoulder 545 and the flange 544 on the pawls 531. The flange 544 on the yoke 531 in the dimes bank does not extend below the yoke 531 in the units of dollars bank, but the yoke in the dimes bank is held depressed by another means for reasons now to be described.

TELEPHONE NUMBER ZERO SETTING

The telephone numbers are indexed on the keyboard by depression of keys 99 and 100, and the machine is released for operation by depression of the "Tel. No." key 101. The key 101 controls the totalizer-engaging mechanism to prevent all three totalizers from engaging the actuators 304, 305, and 306 and controls the zero setting mechanism so that no zeros will be set up and printed to the right of the lowest significant number thereof. Normally—that is, when amounts are being added—the zero setting is controlled to prevent zeros from being set to the left of the highest significant digit. Thus depression of the "Tel. No." key 101 reverses the zero setting controls, in the manner explained above.

The position on the keyboard where the numerical digits of the telephone number are set is in a measure determined by the type of telephone number being printed. To illustrate this, the following four types of numbers are given as examples:

1. ST 9200
2. WA 8-1234
3. KE 0034
4. FU 2343-8

*Example 1.*—The appropriate keys 99 in the exchange banks are depressed, and the numeral keys 100 in the fifth and sixth row amount banks, counting from the right, are depressed. The zero setting mechanism automatically sets the zeros for two lowest orders of the number, and zeros in the three remaining lower orders are suppressed. In the issuing tape printer section, the left-hand dash between the exchange letters and the numerical digits is filled in by the highest order differential mechanism type wheel, which has a dash engraved in the "eliminated" position. The second dash is engraved beside the digit set up. In the tape printer section, the comma is engraved back of the numerical character for the thousand-dollar type wheel. The printed records on the issuing tape and audit tape, respectively, will read 78—9200 (issuing tape)
78—9,200 (audit tape)

*Example 2.*—The appropriate keys 99 in the exchange banks are depressed, and the numeral keys in the 3, 4, 5, 6, and 7 rows are depressed. In this operation, the records on the issuing tape and the audit tape, respectively, will read 92–8–1234 (issuing tape)
92–81,234 (audit tape)

*Example 3.*—The appropriate keys 99 in the exchange banks are depressed, and the numeral key in the 3 and 4 rows are depressed. In this operation, the records on the issuing tape and the audit tape, respectively, will read 53—0034 (issuing tape)
53—0,034 (audit tape)

*Example 4.*—The appropriate keys 99 in the exchange bank are depressed, and the numeral keys in the 1, 3, 4, 5, and 6 rows are depressed. In this operation, the zero in row 2 is automatically suppressed, and a dash is set up in the issuing tape printer. In this operation, the records on the issuing tape and the audit tape, respectively, will read 38—2343–8 (issuing tape)
38—2,343–8 (audit tape)

As is well known in the art, it is usually desirable to set zeros in the dimes and pennies banks, even though no amount key is depressed in any one of the higher order banks. This is so that zeros will be printed in these two columns to indicate that no amount was entered and also to fill in a zero in the dimes column when a key in the penny bank has been depressed. For example, if five (5) cents is entered, the printed record will be indicated as .05, instead of 5. Hence, only the zeros above the dimes bank are eliminated when amounts are entered. In the present disclosure, the zeros in the dimes and pennies bank are free to print when amounts are entered, but these two zeros are eliminated when a telephone number is printed. Therefore, when amounts are printed, the zeros above the highest significant dollar amount are eliminated, whereas, when telephone numbers are printed, all the zeros below the lowest digit of the telephone number are eliminated. For example, when the telephone number Sterling 9200 (Example 1, above) is printed, no zeros should appear below the units order of the telephone number. The number 9200 is set up on the four lowest order dollar banks of keys, and the zeros of the two lower order banks—that is, the dimes and pennies banks—must be eliminated.

The controlling means for obtaining these results are shown in Figs. 23, 73, 74, and 75 and are under control of the "Tele. No." key 101.

When the "Tele. No." key 101 is in its undepressed position, a latch 2150 (Figs. 23 and 74) is in position to arrest the yoke 531 in the dimes bank when the yoke is released during a machine operation. The latch 2150 is pivoted on the shaft 534, and a spring 2151 normally holds the upper end of the latch 2150 in engagement with the said yoke 531 to position a roller 2152 on the lower end of the latch in a notch 2153 on the periphery of a disk 2154. The disk 2154 has internal teeth 2155, meshing with a pinion 2156 on a square shaft 2157, similar to, and supported like, the shafts 463 (see also Fig. 91B). A pinion 2158 is located near the right end of the shaft 2157 opposite the row 2 key bank, and the pinion meshes with internal teeth 2159 of a ring gear 2160. The disk 2154 and the ring gear 2160 are rotatably supported by disks 2161 and 2162, respectively, both being supported on the shaft 632. The ring gear is provided with external teeth 2163 meshing with teeth 2164 of a segment 2165 pivoted on the before-mentioned shaft 498. The upper arm of the segment 2165 is provided with a stud 2166 adjacent the end of stop pawl 2167 pivoted on a rod 2168 supported by the side frames 180 and 182. A spring 2169 normally maintains the end of the stop pawl 2167 in the path of movement of the stud 2166, the stop pawl being located by a finger 2170 on the stop pawl engaging a collar 2171 on the shaft 694. The stop pawl 2167 is connected to an arm 2172 by a hub 2173 (see also Fig. 38). The "Tel. No." key 101 is provided with a stud 2174 overlying the arm 2172, and, when the key 101 is depressed, the arm 2172 and the stop pawl 2167 are rocked to withdraw the end of the stop pawl 2167 out of the path of movement of the stud 2166, to permit the segment 2165 to be rotated during operations in which the key 101 is depressed. When the key 101 is not depressed, the stop pawl 2167 prevents rotation of the segment 2165.

Figure 31:
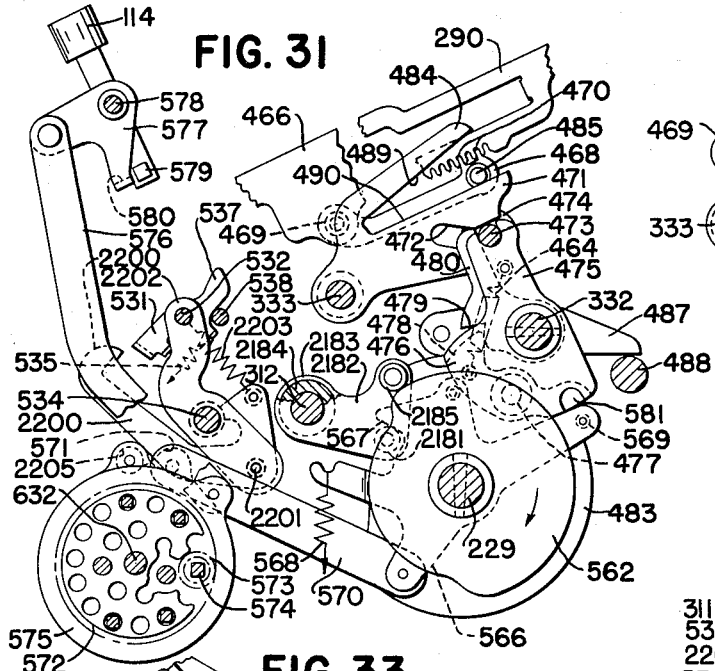
Fig. 31 is a detail view showing the repeat mechanism.

The time of rotation of the segment 2165 is controlled by a cam 562 (Figs. 23, 31, and 73). To obtain this timing control, a ring gear 2175 (Figs. 73 and 91A) is mounted on a disk similar to the disk 2162, carried on the shaft 632. The ring gear 2175 has internal teeth meshing with a pinion like pinion 2158 on square shaft 2157. The ring gear 2175 is located near the center of the machine and has a stud 2176, to which the upper or left-hand end of a link 2177 is connected. The lower or right-hand end of the link 2177 is connected to a spring-actuated arm 2178, loosely mounted on cam shaft 229, adjacent the cam 562. A spring 2179 urges the arm 2178 counter-clockwise (Fig. 73) to maintain a finger 2180 thereon in contact with a stud 2181 carried between two arms 2182 and 2183 connected to move as a unit by a hub 2184 (see also Fig. 31). The arm 2182 has a roller 2185 engaging the cam 562, whereby the assembly including the rod 2181, the arms 2182 and 2183, and the hub 2184 is controlled in its time movements.

When amounts are entered into the totalizers, the "Tel. No." key 101 is not depressed, and therefore the stop pawl 2167 (Fig. 73) remains in the path of movement of the stud 2166. During an operation of the machine in which the "Tel. No." key 101 is not depressed, when the cam 562 begins to rotate to release arms 2182 and 2183, the arm 2178, the link 2177, the ring gears 2175 and 2160, and the disk 2154 will be arrested by the stud 2166 contacting the end of the pawl 2167. This results in the roller 2152 remaining in the notch 2153 of the disk 2154, and the latch pawl 2150 prevents the yoke 531 in the dimes bank from rising. Therefore, even though the differential members 290 in the dimes and pennies bank are arrested in zero position, the yokes 531 for those two banks cannot move into position to return the differential member 290 to prevent zeros from being set at the printing line, and therefore, in amount entry operations, the yokes 531 in the dimes and pennies banks are rendered ineffective.

When telephone numbers are printed, the amount keys 100 are used to set up the numerals of the number, the overflow bank is used to print a dash, and the two exchange banks of keys 99 are used to set up the exchange symbols. In this type of operation, it is necessary to prevent zero setting in the dimes and pennies banks. This is accomplished by withdrawing the latch pawl 2150 to permit the yokes 531 on the dimes and pennies banks to function to prevent zeros from being set in these two banks, and to latch the yokes 531 in the four lowest dollar banks. The highest dollar bank 100 and the overflow bank are used to print two "—" when a four-digit numeral is set up. The dashes are engraved in the "eliminated" positions of the type carriers for these two banks.

A latch arm 2190 (Figs. 23 and 75) is provided to latch the four lowest order dollar bank yokes 531 in ineffective position. A spring 2191 normally urges the latch arm 2190 toward the yoke 531, associated in the sixth row of keys 100, and is held out of contact therewith by a roller 2192 on the lower end of the latch arm engaging a control disk 2194. The control disk 2194 has internal teeth 2195 meshing with a pinion 2196 on the above-mentioned square shaft 2157. The control disk 2194 is rotatable on a disk 2201 mounted on the above-mentioned shaft 632.

The two control disks 2154 and 2194 are operated in unison through the shaft 2157, and therefore, when the "Tel. No." key 101 is depressed and the machine operated, when the cam 562 releases arm 2182, the spring 2179 rotates arm 2178, to move the link 2179 and the ring gears 2175, and, through shaft 2157, rotates control disks 2154 and 2194, to disengage latch pawl 2150 from engaging yoke 531 in the dimes order, and to latch the yoke 531 in the sixth, or thousand-dollar, order.

During an operation of the machine, the dimes and pennies yokes 531 will be free to function, and the yokes 531 for the four lower order dollar banks will be latched down.

Therefore, when the "Tel. No." key 101 is depressed, the zeros for the two lower order type setting control members are under control of the zero elimination mechanism, and the four lower order amount type setting control members are not under control of the zero elimination mechanism. Therefore zeros are set at the printing line whenever no key in one of these banks is depressed. The yokes 531 for the highest order amount bank, the overflow bank, and the two exchange banks are not controlled by latch 2190 and therefore function to control the zero elimination when no key is depressed in one of these banks.

REPEAT MECHANISM

The amount differential slide 290 can be controlled to repeat a previous entry operation. At the end of an operation of the machine, the type setting slide 466 remains in its set position, and the coupling arm 468 remains in its coupled position to maintain the differential slide 290 and the type setting slide 466 coupled together. For repeat operations, the coupling arm 468 is maintained in its coupling position throughout the operation, and, since no amount keys 100 can be depressed for repeat operations, the type setting slide 466 controls the movement of the differential slide 290. When the machine is released for a repeat operation and the universal rod 310 is rocked clockwise (Fig. 24), the universal rod engages the surface 467 of the type setting slide 466 and moves the slide and the differential slide 290 to the right in unison until the slide 466 is arrested by the engagement of a surface 561 (Fig. 24) with the cross bar 291. This movement is of an extent to move the differential slide in accordance with the amount that was previously set on the type slide 466. When the universal rod 310 is moved counter-clockwise (Fig. 24) to restore the actuator slide 290 and the type setting slide 466 to their original positions, the amount which was standing on the slide 466 is entered into the totalizer.

This mechanism can also be used for transferring totals from one totalizer to another. This is accomplished by first resetting a totalizer in a manner to be described hereinafter, at the end of which operation the type setting slide 466 is set to represent the total taken from the totalizer. If a selecting key for selecting another totalizer is depressed in combination with the Repeat key and the machine is released for operation, the total standing on the slides 466 will be entered into the newly-selected totalizer.

An interlock, described later, prevents depression of the Repeat key if an amount key is depressed, and vice versa. A means, also described later, prevents the zero stop pawl 271 from becoming effective during a repeat operation.

Figure 32:
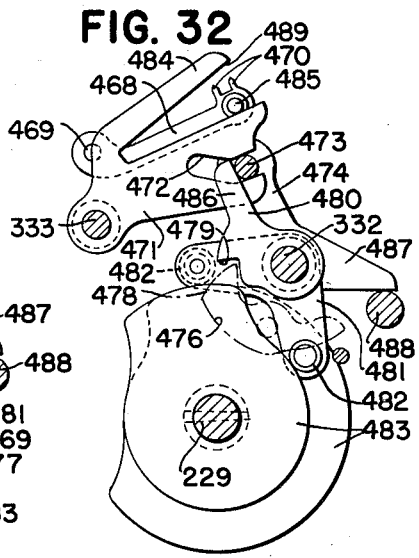
Fig. 32 is a detail view of a part of the mechanism shown in Fig. 31.

The mechanism for maintaining the coupling arm 468 in engagement with the differential slide 290 and the type setting slide 466 throughout the repeat operation is shown in Figs. 31 and 32. This mechanism consists of a means under control of the Repeat key 114 to rock the coupling pawl 476 from the path of the shoulder 479 on the arm 480. The mechanism for controlling this uncoupling of the pawl 476 includes the cam 562 (Figs. 22 and 31) mounted on the main cam shaft 229. As above mentioned, the roller 2185 coacts with the cam 562 for controlling the zero setting mechanism when telephone numbers are printed, and the arm 2182 is connected to a similar arm 2183 by a hub 2184 and the rod 2181 (see Fig. 23). The rod 2181 projects into a notch in a lever 566 similar to the lever 2182. The lever 566 is pivotally mounted on the shaft 229. A spring 568, connected to the lever 566 and the framework of the machine, normally maintains a finger 567 thereof in engagement with the rod 2182. The springs 568 and 2178 individually hold the roller 2185 in engagement with the cam 562, and the notches in the levers 566 and 2178 are wide enough to allow either spring to operate the arms 2182 and 2183 independently of each other. The lever 566 has a stud 569 projecting into the plane of the coupling pawl 1476. A third arm on the three-armed lever has pivoted thereto a link 570, the other end of which is pivoted to a disk 571 carried in the ring gear assembly previously described. The location of the disk 571 is shown in Fig. 91A. The disk 571 is provided with internal teeth 572 meshing with a pinion 573. The pinion 573 is carried by a square shaft 574 and extends across the machine and supports a second pinion 573 in mesh with internal gears of a disk 575. See also Fig. 91B. The disk 575 has pivoted thereto a link 576 (Fig. 31), the upper end of which is pivoted to a bell crank 577 mounted on a stud 578 on the keyboard end plate 133 (Fig. 3), adjacent the first transaction bank. Mounted in the first transaction bank is the Repeat key 114, having a square stud 579 located near its bottom end. A flange 580, formed on the bell crank 577, is so located that, upon movement of the bell crank 577 in a counter-clockwise direction, the flange 580 strikes the stud 579 when the Repeat key is in its undepressed position. Depression of the Repeat key 114 moves the stud 579 out of the path of movement of the flange 580.

During the operation of the machine, following depression of the Repeat key 114, when the cam 562 receives its initial movement, the spring 568 rocks the arm 564 clockwise. Clockwise movement of the arm 564, through the stud 565, rocks the three-armed lever 566 counterclockwise (Fig. 31). This counter-clockwise movement of the three-armed lever 566 is permitted during this type of operation because the flange 580 on the bell crank 577 passes over the stud 579 of the depressed Repeat key 114, under action of the spring 568. Counter-clockwise movement of the three-armed lever 566 causes the stud 569 thereon to engage and rock the coupling pawl 476 counterclockwise about the stud 477 on the arm 475 to withdraw the nose 478 of the coupling pawl 476 from the path of the shoulder 479. Simultaneously with the counter-clockwise movement of the pawl 476, the stud 569 enters a notch 581 on the lower edge of the arm 475 and locks the arm 475 against movement. With the arm 475 locked by the stud 569 and the nose of the pawl 476 withdrawn from the shoulder 479, when the cams 483 rock the arm 480, the movement of the latter is idle, and therefore the arms 474, carrying the rod 473, remain stationary. With the rod 473 remaining stationary in the cam slot 472 of the arm 471, the coupling pawl 468 is held in engagement with the differential slide 290 and the type setting slide 466 throughout its forward and backward movements.

Previous to the return of the universal rod 310, the cams 483 again rock the arm 480 to its normal position, shown in Fig. 32, and thereafter the cam 562, engaging the roller 2185, rocks the arm 564 back to its normal position, shown in Fig. 31, thereby withdrawing the stud 569 from the notch 581, and, at the same time, the flange 580 is restored to its normal position, shown in Fig. 31.

During a machine operation in which the Repeat key 114 is not depressed, the coupling pawl 476 is controlled to remain in its effective position in the path of the shoulder 479 by the flange 580 on the bell crank 577 engaging the stud 579 of the undepressed Repeat key 114 when the cam 562 is rotated to release the arm 564 to the action of the spring 568. During this operation, when the flange 580 strikes the stud 579 of the undepressed Repeat key, only slight movement under action of the spring 568 is permitted, which slight movement is not sufficient to move the stud 569 into the notch 581 of the arm 475. Therefore the coupling pawl 476 remains in its effective position, and the cams 483 operate the arm 475 in a manner described hereinbefore to withdraw the coupling pawl 468 before the initial movement of the differential slide 290.

At the beginning of a repeat operation, the type setting slides 466 are all in the previously set position. This includes the setting of those which were controlled by the zero printing control mechanism. It is necessary that the slides 466 control the movement of the differential slide 290 to repeat the previous setting. This makes it desirable to prevent any control over the setting of the slides 290 and 466 by the zero setting mechanism. To prevent any such controls, a special means is provided to disable the zero setting control mechanism.

To disable the zero setting controls during repeat operations, a latch arm 2200 (Figs. 23, 31, 33, and 34) is moved into the path of movement of the yoke 531 of the left-hand "Tel. No." bank, to hold disabled all the yokes to the right thereof, except the dimes and pennies banks. This control is effected by the flanges 544 which are engaged by the yokes of the higher orders. Since the flange 544 in the dimes bank does not project into the path of the one-dollar bank yoke 531, the latter does not control the dimes bank yoke 531. However, as pointed out above, the latch arm 2150 disables the yoke 531 in the dimes bank whenever the machine is operated with the "Tel. No." key 110 undepressed. To prevent misoperation of the machine by depression of both the "Tel. No." key 110 and the "Repeat" key 114 for the same operation, an interlock, described later, is provided, so that both keys cannot be operated at the same time.

The latch arm 2200 is pivoted on a stud 2201 on an arm 2202 supported on the shaft 534. The beforementioned rod 532 is also supported in the upper end of arm 2202. A spring 2203 normally maintains a toe 2204 of the latch arm 2200 in contact with a sleeve on the shaft 534 to hold the latch arm out of engaging position with the yoke 531. A roller 2205 (see also Fig. 91A) on a ring gear 2206 lies in the plane of the latch arm 2200. The ring gear is provided with internal teeth 2207 meshing with the teeth of a pinion 2208 also mounted on the aforesaid square shaft 574.

Figure 34:
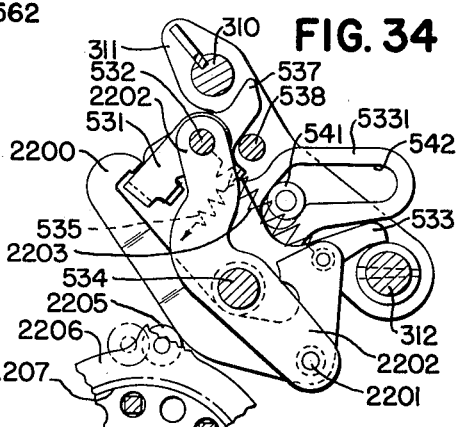
Fig. 34 is a detail view of the zero setting control mechanism and shows the parts in a position to which they are moved under control of the telephone number key during the initial part of the machine operation.
Figure 35:
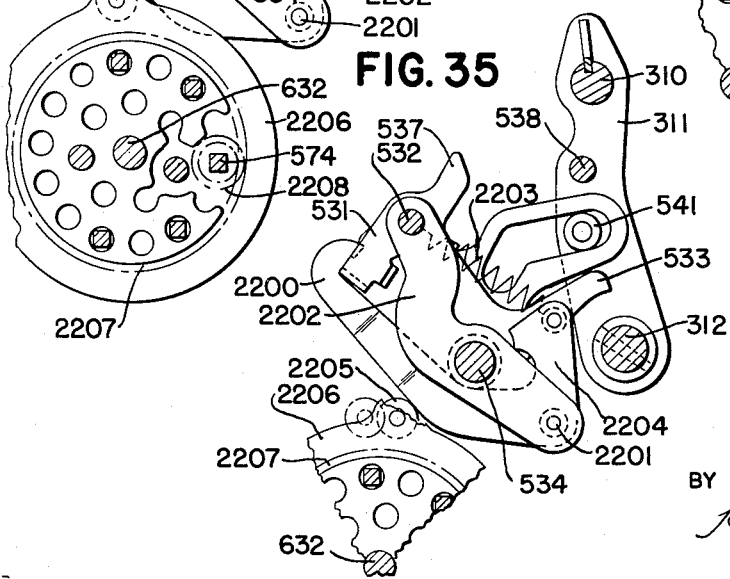
Fig. 35 is a detail view of the mechanism shown in Figs. 33 and 34 and shows the parts in the positions which they assume near the middle of the machine operation.

When, during repeat operations, the ring gears 571 and 575 are rotated by spring 568, the ring gear 2206 is rotated through shaft 574 and pinion 2208 from the position shown in Fig. 33 to the position shown in Figs. 34 and 35. During this movement of the ring gear 2206, the roller 2205 engages the latch arm 2209 and moves it into a position to disable the left-hand yoke 531 (Fig. 31).

TRANSACTION KEYS

The transaction keys for controlling the various functions of the machine are arranged in two banks, as shown in Figs. 1 and 2. The keys 102 to 109 inclusive control the selection of totalizers into which amounts are to be added, and the key 101 controls the engaging mechanism so that no totalizers are engaged with the actuators, in addition to controlling other operations in the printer section of the machine in the manner described hereinafter. This bank of keys will be referred to herein as the second transaction bank, or row 2. The keys 110 to 118 inclusive control the time and manner of operation of the totalizer engaging and disengaging mechanism, together with controlling certain functions of the printing mechanism described hereinafter. The bank of keys 110 to 118 will be hereinafter referred to as the first transaction bank, or row 1.

Keys 110, 115, and 113 and 116 of the first transaction bank, and keys 101 to 109 inclusive of the second transaction bank, in addition to controlling totalizer selection, also act to release the machine for operation. Keys 111, 112, 114, 117, and 118 do not release the machine for an operation.

*Interlock between "Tel. No." and "Repeat" keys*

As before mentioned, an interlock is provided to prevent the simultaneous depression of the "Tel. No." key and the "Repeat" key 114. This interlock is illustrated in Fig. 64.

Pivoted on a stud 2210, supported on the plate 175 (see also Fig. 3), is an interlocking lever 2211. The right-hand end 2212 of the lever 2211 lies beneath a stud 2213 on the Repeat key 114, and the left-hand end 2214 lies beneath a stud 2215 on the "Tel. No." key 101.

Depression of the Repeat key 114 raises the left end of the lever into contact with the stud 2215 and locks the "Tel. No." key 101 as long as the Repeat key 114 remains depressed. Depression of the "Tel. No." key 101 raises the right-hand end 2212 of the lever 2211 into contact with the stud 2213 on the Repeat key 114 to lock the Repeat key against depression as long as the "Tel. No." key 101 remains depressed.

*First transaction bank—control slides*

The release of the machine for operation, and the operation of certain interlocks, are controlled by a plurality of slides in the first transaction bank, shown in detail in Figs. 55, 56, 57, 58, 59, and 62. The specific controls effected by each of these slides will be described hereinafter in connection with the description of the mechanism for obtaining the functions which they control.

*First transaction bank detent*

One of the control slides in the first transaction bank consists of a detent 595 (Fig. 57) supported by the before-mentioned four rollers 176, for maintaining certain keys of the first transaction bank in depressed position. A spring 596, attached to an ear on the upper edge of the detent 595, normally maintains cam edges 598 of the slide against studs 597, one stud 597 being supported by each key 111, 112, 114, 117 and 118. Depression of one of these keys wipes its respective stud 597 on its associated cam edge 598 to cam the detent to the left (Fig. 57) until the stud 597 passes beyond the cam edge 598, whereupon the spring 596 snaps the detent 595 to the right and over the stud 597 to maintain the respective key in depressed position. Near the end of the machine operation, the detent 595 is moved to the left by means described hereinafter to release the depressed key.

The keys 111, 112, 114, 117 and 118, which are held in depressed position by the detent 595, are non-motorized keys; that is, keys which do not release the machine for operation. The detent 595 is provided to hold these keys in depressed position until a motorized key can be depressed.

*First transaction bank—machine release control slide*

After one of said keys 111, 112, 114, 117 and 118 is depressed, and held in its depressed position by the detent 595, one of the motorized keys in the bank may be depressed. These motorized keys are keys 110, 113, 115 and 116.

Depression of the key 110, 113, 115 or 116 wipes its stud 597 against a cam edge 600 on a control slide 601 (Fig. 56) supported on the four studs 176 and moves this slide toward the left against the action of a spring 602. The right end of the control slide 601 (Fig. 56) is provided with a stud 603, which projects into the bifurcated end of an arm 604, pinned to a shaft 605 carried by the keyboard frame. Also secured to the shaft 605 is a latching arm 606, which normally latches over a square stud 607 on an arm 608 pinned to the machine release shaft 264. Upon depression of a key 110, 113, 115 or 116, the control slide 601 is shifted to the left (Fig. 56), thus rocking the arms 604 and 606 counter-clockwise to withdraw a shoulder 609 of the arm 606 from contact with the square stud 607. This releases the arm 608 and the shaft 264 to the action of a spring described hereinafter to move the arm and the shaft counter-clockwise. Counter-clockwise movement of the shaft 264 releases the machine for operation in the manner described hereinafter.

*First transaction bank—locking control slide*

Also pinned to the release shaft 264 (Fig. 55) is an arm 615 having a stud 611 projecting into the bifurcated end of a locking control slide 612 slidably mounted between the four studs 176.

Counter-clockwise movement of the arm 615 and the moving of the control slide 612 toward the right (Fig. 55) moves an associated notch 613 of the slide 612 over the stud or studs 597 of the key or keys which have been depressed in the first transaction bank to lock the depressed key or keys in their depressed positions.

Near the end of the machine operation, the shaft 264 receives a clockwise rocking movement, by means described hereinafter, to shift the slide 612 to the left (Fig. 55) to withdraw the notches 613 from engagement with the studs 597 of the depressed keys, thus permitting the keys to be restored to their normal undepressed position by the spring 170.

During the leftward movement of the locking slide 612, it engages a stud 614 on the before-mentioned detent 595 (Fig. 57) to disengage the detent 595 from its engagement with the stud 597 of the depressed key to permit the depressed key to be restored to its home position.

*First transaction bank—interlocking slide between repeat key and total-taking keys*

When the Repeat key 114, is depressed for a repeat operation, it is desired to prevent subsequent depression of the Total key 110, the Notifier key 111, the Read Group key 115, the Reset Group key 116, the Reset key 117, and the Read key 118, so that no Reset or Total-Taking key can be depressed in the first bank in combination with the Repeat key. In order to prevent such combination of keys from being depressed in the first transaction bank, an interlocking control plate 620 (Fig. 58) is provided, which plate lies adjacent to the detent 595. A spring 621, connected to an ear on the upper edge of the interlocking control plate 620, normally maintains a cam edge 622 therein in contact with the stud 597 of the Repeat key 114. When the Repeat key 114 is depressed, the stud 597, engaging the cam edge 622, shifts the control plate 620 toward the right (Fig. 58) against the action of the spring 621. The studs 597 of the keys 110, 111, 115, 116, 117 and 118 project into inverted L-shaped openings in the plate 620. When the plate 620 is moved to the right by depression of the Repeat key 114, the horizontal leg 623 of the L-shaped opening for each of these keys passes over the studs 597 and prevents their depression after the Repeat key has been depressed. In the normal position, the vertical leg of the L-shaped slot is in the path of movement of the studs 597 on those keys, and therefore the keys may be depressed prior to depression of the Repeat key 114. If one of the keys is depressed prior to depression of the Repeat key 114, the stud 597 of the depressed key being in the vertical leg of the L-shaped opening, the plate 620 is prevented from moving toward the right, and therefore depression of the Repeat key is prevented after one of said keys is depressed.

The stud 597 of the List key 112 and the Add key 113 project through square openings in the plate 620, and therefore the plate 620 can be moved either before or after depression of the List key 112 or the Add key 113.

*First transaction bank—interlocking slide between total-taking keys and amount keys*

An interlock (Figs. 59, 60 and 61) is provided between the keys 110, and 114 to 118 of the first transaction bank and the amount keys 100 to prevent release of the machine if an amount key 100 is depressed before a total key is depressed. This interlock is provided to prevent misoperation when totals are taken, since, during total-taking operations, the actuator racks 304 must be free to be set under control of the totalizer wheels.

When an amount key 100 is depressed, a projection 635 thereon (Fig. 59) is positioned into the path of movement of the before-mentioned control plate 263. The control plate 263 is connected, by the arm 266, to move with the yoke 267. One arm 636 (Fig. 61) of the yoke 267 has pivoted thereon a link 637, the free end of which supports a stud 638 (see also Fig. 60). The stud 638 projects through a bayonet slot 639 in an arm 640 secured to the machine release shaft 264. The stud 638 also projects into an open slot 641 of a bell crank 642 pivoted on a stud 643 carried by the keyboard frame. The bell crank 642 is connected to an arm 644 by a link 645. The arm 644 is secured to a short shaft 630 carried by the right keyboard end plate 133 and an ear on the keyboard front plate 136. Also secured to the shaft 630 (Fig. 59) is an arm 629 having a stud 646 held in engagement with the end of a control slide 647 by a spring 648 (Fig. 60) stretched between the arm 644 and a stud in the keyboard frame. The spring 648, acting through the arm 644, the shaft 630, the arm 629, and the stud 646, normally maintains cam edges 649 of the control slide 647 in engagement with studs 597 of the total-taking keys 110, 111, 115, 116, 117 and 118, and with the stud 597 of the Repeat key 114.

When a key 110, 111, or 114 to 118 is depressed, the respective stud 597 of the depressed key wipes along the cam edge 649 coacting therewith and thereby shifts the control slide 647 leftwardly (Fig. 59). The end of the control slide 647, acting on the stud 646, rocks the arm 629, the shaft 630, and the arm 644 clockwise (Figs. 59 and 60), thus shifting the link 645 leftwardly to rock the bell crank 642 clockwise to shift the stud 638 into the lower vertical, section of the bayonet slot 639 of the arm 640, secured to the release shaft 264. When the release shaft 264 is thereafter rocked by the depression of a motorized key, the arm 640, acting through the slot 639, carries the stud 638, the link 637, the arm 636, and the yoke 267 counter-clockwise. However, if, at the time the release shaft 264 is released, an amount key 100 is in depressed position, the yoke 267, the arm 266, and the plate 263 are held against movement by the projection 635 on the amount key 100 being in engagement with the plate 263. If no amount key 100 is depressed, the plate 263 is free to move, and therefore the release shaft 264 can rock to release the machine for operation.

*First transaction bank—zero stop pawl controls for total-taking operations*

It is necessary to hold the zero stop pawls 271 out of effective positions during total-taking operations. This is accomplished by a stop arm 650 (Figs. 60 and 63) secured to the shaft 630. When the shaft 630 is rocked by the depression of a total-taking key, by the slide 647, the stud 646, and the arm 629, the stop arm 650 is moved into the path of a stud 651 on a pitman 652. The pitman 652 is bifurcated at its upper end to engage and slide on the shaft 630, and its lower end is pivoted to an arm 653 secured to the hub of the yoke 272. A rivet 654 also fastens the yoke 272 and the arm 653 together, the rivet being provided to give the yoke greater rigidity in respect to the arm 653.

If, when the yoke 272 (see also Figs. 20 and 65) is released, in the manner described hereinbefore, by the spring 330, under control of the cam 329, a total key has been depressed and the arm 650 overlies the stud 651, the yoke 272 cannot follow, since it is arrested by the stop arm 650, acting through the stud 651, the pitman 652, and the arm 653. Therefore, the zero stop pawls 271 cannot rock into their effective positions, even though no amount key 100 has been depressed and the actuators 290 are free to move so as to be set under control of the wheels of the selected totalizer.

*First transaction bank—list key detent*

When the List key 112 is depressed, it is convenient to maintain it in depressed position until a total is printed. The Total key 110 is used to control the machine for taking the total of a list of items under control of the "List" key. To maintain the List key in depressed position, a detent 655 (Fig. 62) is provided in the first transaction bank, which detent is slidably mounted on the four rollers 176. A spring 656 normally maintains a cam edge 657 against the stud 597 of the List key 112, and a cam edge 658 against the stud 597 of the Total key 110.

Depression of the List key 112, acting through its stud 597, shifts the detent 655 to the left (Fig. 62) against the action of the spring 656 until the stud 597 passes the end of the cam edge 657, whereupon the spring 656 snaps the detent 655 back to engage over the stud 597 of the depressed List key. The detent 655 can thereafter be shifted only by depression of the Total key 110, which key, acting through its stud 597, wipes on the cam edge 658 to shift the detent leftwardly far enough to disengage the detent from the stud 597 of the List key 114. The spring 170 (Fig. 8) thereupon restores the List key into its normal undepressed position.

*First transaction bank—cycle control detent*

To control the machine for two-cycle total-taking operations, a control slide 634 (Fig. 15) is provided, which also slides on the four rollers 176. This slide and its control over the cycling mechanism are described later.

*Second transaction bank control slides*

Keys 101 to 109 inclusive (Figs. 2, 16, and 38) in the second transaction bank release the machine for operation. The keys of the second transaction bank are provided with studs 597, which project into openings in, and cooperate with, certain detent slides.

To release the machine for operation, a detent 665 (Fig. 17) is provided in the second transaction bank, which has nine cam edges 666 coacting with the studs 597 on the nine machine release keys 101 to 109 inclusive. A spring 667 normally holds the cam edges 666 in engagement with the studs 597, and, upon depression of a key 101 to 109 inclusive, the detent 665 is shifted to the left (Fig. 17). The detent 665 is provided with a stud 668 near its right-hand end, which engages in a bifurcated end of an arm 669 secured to the beforementioned shaft 605, which arm is like the arm 604 (Fig. 56). Leftward movement of the detent 665 rocks the arms 604 and 669 counter-clockwise to rock the latch arm 606 likewise to release the arm 608 and the release shaft 264, in a manner to be described hereinafter, to rock counter-clockwise. Counter-clockwise movement of the release shaft 264 rocks an arm 670 thereon counter-clockwise (Fig. 16). The arm 670 has at its lower end a stud 671, which engages in a bifurcated projection of a locking slide 672 adjacent the keys of the second transaction bank. When the release shaft 264 is rocked in said counter-clockwise direction, the arm 670 shifts the locking slide 672 to the right (Fig. 16) to position a notch 673 over the stud 597 of the depressed key and a notch 674 over the studs 597 of the undepressed key. The slide 672, therefore, holds the depressed key in its depressed position and the undepressed keys in their undepressed positions until the release shaft 264 is restored to its home position, whereupon the spring 170 restores the depressed key to its undepressed position.

The keys 101 to 109 have large caps, which are close enough together to make it possible to accidentally depress two keys at one time. To prevent such an accidental operation, an interlocking detent 680 (Fig. 18) is provided in the second transaction bank. The detent 680 is slidably mounted on the four studs 176 adjacent the control plates 665 and 672. The interlocking detent is provided with alternating cams 681 and L-shaped openings 683. If two adjoining keys are depressed in the second transaction bank at the same time, the studs 597 of the keys being depressed will be arrested either by the horizontal leg of the L-shaped opening coacting with the stud of one key, or by the cam 681 coacting with the stud 597 of the other key. A spring 682, connected to a finger on the detent 680 and a stud on the keyboard frame, normally holds the detent 680 in its left-hand position. The detent 680 has no connection with the release shaft 264, and therefore this key is not released by the machine release shaft.

*Transaction bank differential mechanisms*

The depressed keys in the first and second transaction banks control the differential movement of actuators which control the various functions of the machine, control the selection of the proper totalizer for engagement with the amount actuators, and set symbols at the printing line in the three printer sections. The symbols illustrated for use in the present disclosure are indicated in the diagrammatic showing in Figs. 88 and 89. Inasmuch as both differential mechanisms are alike, only one will be described herein in detail. Figs. 8 to 11 inclusive and 23 will be referred to in the description of the transaction bank differential mechanism. These figures illustrate the differential mechanism for the first transaction bank, otherwise referred to as row 1.

*First transaction bank differential mechanism*

Coacting with the studs 579 of the keys 110 to 118 inclusive is a differentially settable slide 689 (Figs. 8, 11 and 23). The studs 579 on the transaction keys alternately project to the right and left (Fig. 23) into the path of alternately-arranged ears 690 formed on the slide 689. The relationship between the studs 579 and the ears 690 is such that, on operation of the machine with a key depressed, the slide 689 is arrested in a position commensurate with the position of the depressed key. The slide 689 is slotted at its front and rear ends to be supported by, and slide on, collars 691 and 692 carried by studs 693 and 694, respectively. The studs 693 and 694 are riveted on the frame 182 (Fig. 23) and are provided with tenons projecting into the side frame 180, and a screw 695, entering a tapped hole in each stud 693 and 694, maintains the frame 180 in proper relationship with the studs 693 and 694. Suitable spacing collars are provided to properly space the slide 689 on the studs 693 and 694, as clearly shown in Fig. 23.

The slide 689 is provided with teeth 696 (Fig. 11) meshing with a segment 697 of an arm 698 having a slot 699, into which projects a stud 700 of a latch 701 (Figs. 9 and 10). The arm 698 is rotatably mounted on a stud 702 carried by the frame 182 and by the side frame 180. The latch 701 is pivotally mounted on a stud 703 carried by an arm 704 also pivotally supported on the stud 702. A beam 705 is pivotally mounted on the arm 704 by a stud 706. The free end of the beam 705 is provided with a stud 707, which projects into a slot 708 of an arm 709, also pivoted on the stud 702. The arm 709 is provided with a segment 710 meshing with teeth 711 (Fig. 8) of a type setting and control slide 712. The control slide 712 is slidably mounted on the aforesaid collars 691 and 692, and at its upper end by a stud 688 mounted between the frames 196 and 199 (Fig. 7).

The latch 701 (Figs. 9 and 10) is provided with a toe 713 normally engaging with a notch 715 of a differential driver 716. The differential driver 716 is pivoted on the stud 702 and is provided with a notch 717, into which projects a stud 718 on the free end of a lever 719 pivoted on a stud 720 carried by the frames 180 and 182. The lever 719 is secured to an arm 733 (Fig. 8) by a hub 721. The arm 733 is provided with a pair of rollers 722, which coact with a pair of cam plates 723 (Figs. 8 and 23) secured to, so as to be rotatable by, the aforementioned sleeve 227 (Figs. 13, 14, 15 and 23). The lever 719 (Figs. 8, 9 and 10) is provided with a roller 724, which is movable into engagement with a surface 725 of the beam 705 in a manner to be described presently.

When the cam plates 723 are rotated, upon rotation of the sleeve 227, the arm 733 is rocked clockwise (Fig. 8) to rock the lever 719 clockwise. Clockwise movement of the lever 719, through the stud 718 and the notch 717, rocks the differential driver 716 also clockwise. Clockwise movement of the driver 716 carries with it the latch 701 and, through the stud 700, rocks the arm 698 (Fig. 11) clockwise. Clockwise movement of the arm 698, by the segment 697, moves the slide 689 to the right (Fig. 8) until an ear 690 thereon comes into contact with the stud 579 of a depressed key. This arrests the slide 689 in a position commensurate with the depressed key and at the same time positions the arm 698 (Fig. 11) in a corresponding position. Arresting of the arm 698, through its cam slot 699 acting on stud 700, cams the latch 701 counter-clockwise around its stud 703, thus withdrawing the toe 713 from the notch 715 to arrest further movement of the arm 704. Counter-clockwise movement of the latch 701 (Fig. 10) cams an ear 726 thereon into a corresponding notch 727 (Fig. 8) of a locking plate 728 supported by the studs 693 and 720. Continued movement of the driver 716, after the latch 701 has been disengaged therefrom, moves a concentric surface 729 (Fig. 9) thereof beneath the toe 713 and positively locks the latch 701 and the arm 704 in adjusted position, with the result that the stud 706 for the beam 705 is also locked in an adjusted position corresponding to the depressed key.

During the clockwise rocking movement of the lever 719, the roller 724 thereon comes into engagement with the surface 725 of the beam 705 and rocks the beam 705 around the stud 706 as a center. Movement of the beam 705 around the stud 706 cams the stud 707 on the lower end thereof into the slot 708 and rocks the arm 709 and the segment 710 into a position corresponding to the position in which the arm 704 has been adjusted and locked by the latch 701. This adjustment of the segment 710, through the teeth 711 on the slide 712, positions the slide 712 corresponding to the adjusted position of the differential slide 689.

After the control slide 712 has been positioned by the beam 705 in the manner just described, the cams 723 return the levers 719 counter-clockwise to restore the differential driver 716 into its home position. During this counter-clockwise movement of the driver 716, when the notch 715 again comes beneath the toe 713, the toe 713 drops behind the notch 715, and, upon continued clockwise movement, the driver 716, acting through a roller 714 thereon, engages the arm 704 and restores the arm 704 and the latch 701 to their home positions. During this movement, the segment 710 and the control slide 712 are held in their adjusted positions by means described hereinafter, and therefore the beam 705 pivots around the stud 707. The segment 710 remains in the adjusted position until readjusted during the next succeeding cycle of operation.

A counterbalancing plate 730 (Fig. 11) is pivotally mounted on the stud 702 adjacent the slide 698 and has a slot 731, through which the stud 700 on the latch 701 projects. A spring 732, stretched between the counterbalancing plate 730 and the arm 698, normally maintains the parts in the positions shown in Fig. 11. If, during the operation of the machine, the latch 701 has a tendency to withdraw prematurely from the notch 715 due to centrifugal force, the plate 730 prevents such movement. When the arm 698 is positively arrested, upon an ear 690 on the slide 689 coming into contact with the stud 579 of a depressed key, the stud 700, operating in the cam slot 699, rocks the latch 701 counter-clockwise in the manner described above. Counter-clockwise movement of the latch 701 moves the stud 700 thereon in the cam slot 731 to rock the counterbalancing plate 730 clockwise against the action of the spring 732. Since it is necessary to stretch the spring 732 to move the stud 700 in the cam slot 699, the spring 732 and the plate 730 act to prevent premature disengagement of the latch 701 from its driver 716.

*Second transaction bank differential mechanism*

The differential mechanism for the second transaction bank is identical with the differential mechanism just described for the first transaction bank, and, therefore, the same reference numerals are applied in Fig. 38. The description of the first transaction bank differential mechanism applies to the second transaction bank differential mechanism.

*First transaction bank type wheel setting mechanism*

Two type wheels 735 (Figs. 8, 88, 90A and 90B) are provided to print symbols on the audit tape, and on the issuing strip, indicating the kind of operation being performed. The control slide 712 controls the positioning of the type wheels 735 mounted on the shafts 463 in the audit tape printing section and in the issuing strip printing section. No type wheel 735 is provided in the slip printing section.

Formed on the underneath side of the control slide 712 are teeth 736 (Fig. 8), which mesh with a segment 737 rotatable on the shaft 498. See also Fig. 91B. Connected to the segment 737 by a hub 738 is a segment 739, which meshes with a ring gear 740 on a disc 741 carried by the shaft 632. A pinion 742 meshes with the inner teeth of the ring gear 740 and is mounted on a square shaft 743 extending between the side frames 180 and 181. Lying within a ring gear 744 and carried by the shaft 743 is a pinion similar to the pinion 742, which meshes with an intermediate pinion 745 on the shaft 524. Also meshing with the pinion 745 is a ring gear 746 carried by a disc 747 supported on the shaft 510. The ring gear 746 meshes with the type wheel 735 (Fig. 90B) in the group of type wheels for printing on the issuing strip. The type wheel 735 lies adjacent the units order type wheel for printing amounts.

Also mounted on the square shaft 743 is a pinion, similar to the pinion 742, which lies within a ring gear 750 (Fig. 91A) mounted on a disc 748 carried by the shaft 632. The ring gear 750 meshes with a pinion, similar to the pinion 745, which in turn meshes with a ring gear 749 (Fig. 90A) in mesh with the type wheel 735 adjacent the units order amount type wheel in the audit tape printing group of type wheels.

Also connected to the square shaft 743, so as to be driven by the first transaction bank differential mechanism, are a series of control discs for controlling the totalizer engaging and disengaging mechanisms and other functions of the machine, in a manner described hereinafter.

*Second transaction bank type wheel setting mechanism*

The control slide 712 (Fig. 38) for the second transaction bank controls the setting of a type element 755 in each of the three groups of type elements (Figs. 89, 90A and 90B). The symbol-printing type wheel 755, in each group of type wheels, lies adjacent the highest amount type wheel.

Formed on the under side of the control slide 712 (Fig. 38) are a series of teeth 756, meshing with a pinion 757 (see also Fig. 91B), which is connected to a segment 758 by a sleeve 759. The segment 758 meshes with a ring gear 760 carried by a disc 761 mounted on the shaft 632. The ring gear 760 has inner teeth meshing with a pinion 762 carried by a square shaft 763. Also carried by the square shaft 763 are pinions, similar to the pinion 762, adjacent each one of the three ring gears 764, one being provided for each group of type wheels. Meshing with each ring gear 764 is an intermediate pinion 765 on the shaft 524. Meshing with each intermediate pinion 765 is a ring gear 766 meshing with the respective type wheels 755. Through the connections just described, the setting of the control slide 712 adjusts the type carrier 755 into a position corresponding to the position to which the control slide 712 is adjusted by the differential mechanism under the control of the depressed keys 101 to 108 of the second transaction bank to set a symbol at the printing line to identify the key which was depressed.

TOTALIZER SELECTING MECHANISM

The interspersed totalizer line—namely, the rear totalizer line on the shaft 371 (Figs. 12 and 20), is shifted to select a totalizer under control of the keys 101 to 108 in the second transaction bank through the control slide 712.

Near the upper, or right-hand, end of the control slide 712 (Fig. 38), and formed on its under side, are a series of teeth 767 in mesh with a segment 768 rotatably supported on the shaft 302. Connected with the segment 768, by a hub 769, is a gear 770 (see also Fig. 12). The gear 770 meshes with a pinion 771 secured to the drum cam 388. The totalizer shifting cam 388 is rotatably mounted on the shaft 389. The drum cam 388 is provided with a cam race 772, into which projects a roller 773 of the before-mentioned yoke 387.

When the control slide 712 is adjusted under control of a depressed key 101 to 109, the drum cam 388 is rotated an extent commensurate with the depressed key. The cam race 772, acting on the roller 773, slides the corresponding yoke 387 endwise on a shaft 774 an extent sufficient to select the proper totalizer on the interspersed totalizer line, as described hereinbefore, aligning the proper sets of totalizer wheels 370 with the actuator racks 305.

After the control slide 712 (Fig. 38) has been properly adjusted under control of the depressed key 101 to 109, an aligner 778, mounted on a shaft 776, is rocked to engage the aligning segment 777, also secured to the hub 769, to maintain the drum cam 388 in its proper adjusted position during the time the totalizer is engaged with the actuator racks 305.

To actuate the aligner 778, a pair of cams 779 (Figs. 8 and 13) are provided on the cam shaft 213. The cams 779 act on rollers 782 of a member 780, having an upwardly-extending arm, which arm is bifurcated to engage a stud 783 carried by a link 784 pivoted at one end to the aligner 778 and at the other end to an arm 785 on a shaft 786 supported in the frame of the machine.

After the control slide 712 and the drum cam 388 is properly adjusted under control of the second transaction bank of keys, the cams 779 rock the member 780 clockwise (Fig. 8), which, through the link 784, rocks the aligner 778 counter-clockwise to engage the aligning teeth of the aligner segments 777. At the end of the machine operation, the cams 779 rock the member 780 and the aligner 778 back to their normal positions, thus releasing the slide 712 and the drum cam 388 for readjustment during the next operation of the machine.

Simultaneously with the aligning of the segments 777, an aligner 800 (Fig. 38), in the form of a yoke secured to the shaft 786, is rocked into engagement with the aligning teeth on the ring gears 744 and 764, to maintain these ring gears and their connecting mechanism in adjusted positions.

TOTALIZER ENGAGING MECHANISM

As described hereinbefore, the three totalizer lines are rocked into engagement with, and disengagement from, the actuator racks 304, 305 and 306 by rocking the shafts 353, 373, and 398, respectively (Figs. 36, 49 and 50). These three shafts may be rocked in adding or total-taking timing, and the total-taking timing may be in either read or reset timing. The rocking movement of the three shafts for engaging the totalizers with the actuators is under control of a series of notched discs adjusted by the first and second transaction banks. The setting of these discs determines which totalizer line is to be engaged with the actuators and also whether the engaging movement is to be in the adding, read, or reset timing. The control is effected by a series of feelers which engage the peripheries of the notched discs to determine the proper connections to obtain the various engaging and timing movements. A control plate is also provided for timing the engaging movement of the control feelers during the machine operation. The notched disc assembly for controlling the various engaging movements of the totalizers consists of discs 801, 802, 804, 805 and 806 (Fig. 41, where the discs are shown in top plan view). The discs are located just outside the right side frame 180 as shown in Fig. 91B.

The discs 802, 803 and 806 (see also Figs. 39, 42, 43, 45, 47 and 52) are all set under control of the first transaction bank when the control slide 712 is adjusted under control of the keys 110 to 118. As described before, when the control slide 712 is adjusted, the square shaft 743 is rotated by the segment 737 (Fig. 8), the segment 739, and the ring gear 740. Each control disc 802, 804 and 806 is provided with internal teeth which mesh with a pinion 787 on the square shaft 743 so as to adjust the notched discs in accordance with the setting of the control slide 712 in the first transaction bank, in the same manner as the control slide 712 controls the setting of the type carriers described above.

The notched disc 801 (Figs. 40, 44 and 91B) is adjusted under control of the second transaction bank when the control slide 712 of that bank is set under control of the keys 101 to 109. As described before, when the control slide 712 therein is adjusted, the square shaft 763 is rotated by the pinion 757 (Fig. 38), the segment 758, and the ring gear 760 in the same manner as described for setting the type wheel under control of the second transaction bank. The notched control disc 801 (Figs. 39, 40 and 44) is provided with internal teeth which mesh with a pinion 788 on the square shaft 763, so that the control disc 801 is adjusted simultaneously with the adjustment of the type wheels upon rotation of the square shaft 763.

The disc 805 (Fig. 46) normally maintains all of the feeler studs (described later) out of engagement with the control discs until the proper time during the machine operation, when the disc 805 is rocked to release the feelers.

When it is desired to engage a totalizer with the actuator racks 304, 305 or 306 for an add operation, the selected totalizer rocking shaft 353, 373 or 398 is coupled to an add engaging spider 810 (Figs. 48 and 53) rotatably mounted on the shaft 302, which spider is actuated to rock in add timing. If it is desired to engage the selected totalizer shaft 353, 373 or 398 with the actuator racks 304, 305 or 306 in total-taking timing, the shafts are coupled with a total-taking spider 811 (Figs. 48 and 52), which spider is actuated to rock in total-taking timing for either read or reset operations.

The coupling connections between the spiders 810 and 811 and the totalizer engaging rocking shaft 353 for the front totalizer line include a stud 813 (Fig. 48) carried by a link 814 pivotally mounted on an arm 815 secured to the engaging shaft 353. The stud 813 normally lies in an intermediate position, in which it is disengaged from both the spiders 810 and 811. When the link 814 is rocked clockwise (Fig. 48) about its pivot on the arm 815, the stud 813 is seated into a notch 816 of the add spider 810. Then, upon rocking of the add spider 810, the front totalizer is engaged with and disengaged from the actuator racks 304 in add timing. If the link 814 is rocked counterclockwise (Fig. 48), the stud 813 is seated into a notch 817 of the total-taking spider. Thereupon, during the machine operation, the totalizer engaging shaft 353 will be rocked in either read or reset timing, depending upon the timed movement received by the total-taking spider 811.

*Front totalizer line engaging mechanism—add operations*

As mentioned before, the front totalizer is illustrated herein as a group totalizer and receives all entries made with a key A to M of row 2 depressed, alone or in combination with the Repeat key 114, List key 112, or "Notifier" key 111, of the keys of row 1.

The add engaging spider 810 (Figs. 48 and 53) is rocked in add timing by a pair of cams 820 (see also Fig. 13) secured to the beforementioned cam shaft 229. Coacting with the cam plates 820 are rollers 821 carried by a bell crank 822 pivoted on a stud 823 in the right side frame 180. A link 824 connects the bell crank 822 to the add engaging spider 810.

When the stud 813 for the front totalizer is rocked into engagement with the notch 816 during the operation of the machine, the cam plates 820, acting through the rollers 821, rock the bell crank 822 first clockwise (Fig. 53) and then counter-clockwise, thereby rocking the spider 810 first counter-clockwise and then clockwise. Counter-clockwise movement of the spider 810, through the stud 813, the link 814, the arm 815, and the shaft 353 (Fig. 48) rocks the shaft 353 counter-clockwise and then back in a clockwise direction. Counter-clockwise movement of the shaft 353 (Fig. 49), through the arm 356 and the cam slot 354 in the arm 352, rocks the totalizer wheels 350 into engagement with the actuators 304. The timing of the cam plates 820 is such that they will rock the spider 810 in its initial or counter-clockwise direction after the actuators 304 have been adjusted under control of the amount keys. After the totalizer has been engaged with the adjusted actuators 304, the actuators are returned to the normal positions, which movement enters the amounts standing thereon into the totalizer elements. Then, after the actuators 304 have entered the amounts set up thereon into the totalizer elements, the cam plates 820 rock the spider 810 clockwise, which, through the stud 813 and the connections just described, disengages the totalizer elements from the actuators 304.

The movement of the stud 813 into the notch 816 of the add spider 810 is under control of the discs 801, and 802 (Figs. 43, and 44). In addition to projecting into the plane of the notch 816 of the spider 810, the stud 813 projects into an opening 825 (Fig. 44) of a bell crank 826 pivoted on a stud 827 carried by the auxiliary frame 196. The bell crank 826 is provided with a stud 828, which is normally embraced by two spring-urged pawls 829 and 830. A spring 831, stretched between an ear on the pawl 829 and an ear on the pawl 830, normally holds the two pawls against opposite sides of the stud 828. The pawls 829 and 830 also embrace a stud 832 on a three-armed member 833 pivotally mounted on the shaft 302. The three-armed member 833 is connected to a bell crank 834 (Fig. 40) by a link 835. The bell crank 834 is mounted on the before-mentioned stud 823 and is provided with a pair of rollers 837 coacting with a pair of cams 836 (see also Fig. 12) on the main shaft 229.

The cams 836, through the bell crank 834, the link 835, and the three-armed member 833, determine the position of the stud 832. When in the normal or home position, the stud 832 controls the positioning of the pawls 829 and 830 (Fig. 44) so as to maintain the bell crank 826 and, through the opening 825 therein, maintain the stud 813 in its normal or ineffective position; that is, in a position in which it does not engage either the add spider 810 or the total-taking spider 811.

The timing of the cams 836 is such that they rock the three-armed member 833 clockwise at the beginning of the machine operation, and then, after the actuators 304 have been positioned, the cams 836 rock the three-armed member 833 counter-clockwise to and beyond its home position. Near the end of the machine operation, the cams 836 again restore the three-armed member 833 in a clockwise direction back to its normal position. If, during the counter-clockwise movement of the three-armed member 833 and the stud 832, the bell crank 826 is free to operate, the stud 828 rocks the pawl 830 clockwise and through the spring 831 rocks the pawl 829 likewise, thus carrying with it the stud 828 and the bell crank 826, to move the stud 813 into the notch of the add spider 810.

Whether or not the bell crank 826 is permitted to move in the clockwise movement to engage the stud 813 with the notch 816 is under control of the notched discs 801 and 802. The mechanism for controlling the movement of the bell crank 826 by said control discs includes a link 840 (Fig. 44), one end of which is pivotally connected to the bell crank 826 and the other end of which is carried between a pair of feeler members 841 and 842. The feeler members 841 and 842 are connected to move as a unit and are pivoted on a stud 843 (see also Fig. 19). The free end of the feeling member 841 is provided with a stud 844, which projects over, so as to coact with, the control disc 804 (Fig. 45). The feeler member 842 is provided with a stud 845 projecting into the path of, so as to cooperate with, the control discs 801 and 802 (Figs. 43 and 44).

If, during the counter-clockwise movement (Fig. 44) of the three-armed member 833, when the stud 832 is acting on the pawls 829 and 830, the bell crank 826 is free to move, the stud 813 will move into the notch 816 of the add spider. This condition prevails when notches in the discs 801 and 802 are opposite the stud 845 (Figs. 43 and 44).

As illustrated in Fig. 44, notches 849, provided in the disc 801, are positioned opposite the stud 845, under control of the "A" to "M" keys 104 to 109, of the second transaction bank. Also as illustrated herein, when either the Notifier key 111, List key 112, the Repeat key 114, or no key at all is depressed in the first transaction bank, it is desired to control the engaging movement of the front totalizer line so that the amounts will be added into the group totalizer. If the machine is operated with either the "Notifier" key or the List key depressed, the notch 846 (Fig. 43) is moved into the path of the stud 845. If the machine is operated with the Repeat key 114 depressed, a notch 847 is moved into the path of the stud 845, and, if no key is depressed in the first transaction bank, a notch 848 is moved into position in the path of the stud 845. The latter setting is shown in Fig. 43, where the symbols used on the type carriers for identifying the operation are used to illustrate the positioning of the plate 802 under control of row 1 keys.

When a notch 849, in combination with a notch 846, 847, or 848, is in the path of the stud 845 when the spider 833 (Fig. 44) is rocked counter-clockwise, the stud 828 in the bell crank 826 is free to move, since at this time the stud 845 is free to move into the notch in its path, and therefore the stud 813 is moved into the notch 816 of the add engaging spider (Fig. 53), and then, during the machine operation, the front totalizer line is engaged with the actuator racks 305 in add timing.

If, on the other hand, a key 101, 102, or 103 of the second transaction bank, or a key 110, 113, or 115 to 118 of the first transaction bank is depressed, then a high spot is presented into the path of the stud 845. During such an operation, when the spider 833 is rocked counter-clockwise and the pawl 830 is rocked counter-clockwise, the stud 828 is held against movement because the bell crank 826, the link 840, and the feeler member 842 are arrested by the control discs 801 or 802. During such an operation, the stud 813 does not move into the notch 816, and therefore the front totalizer line is not rocked into engagement with the actuators 304.

During operations in which the control discs 801 or 802 prevent clockwise movement of the bell crank 826, the pawl 830, when moved by the stud 832, stretches the spring 831, and, when the stud 832 returns to normal, the spring 831 restores the pawl 830 to its normal position.

The stud 813 is held in its intermediate position between the notches 816 and 817 (Fig. 48) by the bell crank 826 (Fig. 44) and is held in its lateral position by the engagement of the stud 813 with a shoulder 851 on the add engaging spider 810, and by the engagement of the arm 815 with a sleeve 852 on the stud 827 (Fig. 48). This construction also holds the engaging shaft 353 in its normal, or home, position.

*Front totalizer line engaging mechanism—reset and read operations*

Figure 51:
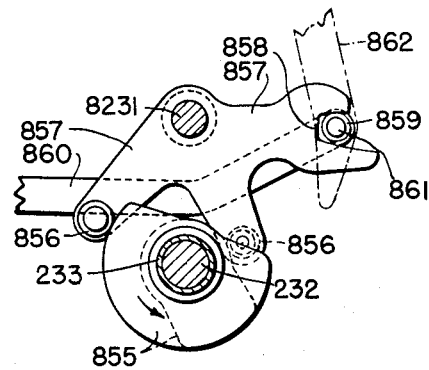
Fig. 51 is a detail view of the cam for rocking the total-taking engaging mechanism in reset timing.

The total-taking engaging spider 811 is actuated in Reset timing by a pair of cams 855 (Figs. 13 and 51). The cams 855 are mounted on, so as to rotate with, the beforementioned sleeve 233. Coacting with the cams 855 are a pair of rollers 856 carried by a rocking arm 857 mounted on a stud 8231. The arm 857 has a notch 858, normally engaging a roller 859 carried by a link 860, described hereinafter. The roller 859 is mounted on a stud 861, to which is also connected a link 862, the upper end of which is pivoted to the total-taking engaging spider 811.

When the cams 855 are rotated, the arm 857 is rocked counter-clockwise (Fig. 51) to raise the link 862 and thereby rock the total-taking engaging spider 811 counter-clockwise. If at this time the stud 813 is in the notch 817 of the spider 811, the selected front totalizer line is rocked into engagement with the actuators 304 before the actuators 304 are operated to reset the totalizer wheels to zero. After the totalizer wheels have been reset to zero, the spider is returned clockwise to its home position by the cams 855 thus disengaging the totalizer wheels from the actuators 304. After the totalizer elements have been disengaged from the actuators 304, the actuator racks are restored to their normal positions. At the end of this operation, the totalizer elements are standing at zero.

The roller 859 is normally maintained in the notch 858 of the cam arm 857 by a linkage actuated by a cam 863 (Fig. 52) on shaft 854. Coacting with the cam 863 is a roller 864 carried by a bell crank 865 pivoted on a stud 866. The bell crank 865 is connected to a lever 867 by a link 868. A spring 869, one end of which is attached to a stud 870 (see also Fig. 19) on the side frame 180 and the other end of which is attached to a stud 871 on the link 868, normally maintains the roller 864 against the periphery of the cam 863. The lever 867 is pivoted on a stud 872, and the upper end of the lever 867 has pivoted thereto the beforementioned link 860.

During the operation of the machine, when the cam 863 rotates clockwise (Fig. 52), the spring 869 moves the bell crank 865 clockwise, thus moving the link 868 to the left (Fig. 52) to cause a feeling finger 873 on the arm 867 to feel the periphery of the notched control disc 806. If the feeling finger 873 on the lever 867 engages a high point on the notched disc 806, the roller 859 remains in the notch 858 of the cam arm 857, and therefore the spider 811 is rocked in reset timing during the machine operation. The notched disc 806, which is adjusted under control of the first transaction bank, is notched only in the Read Group and Read key positions, and therefore, when the machine is operated with any other key in the row 1 bank depressed, a high point of the disc 806 will be opposite the feeler 873 to cause the roller 859 to remain in the notch 858 of the arm 857, and the spider 811 is rocked in reset timing. During this operation, the totalizer on the front totalizer line is reset to zero.

The total-taking engaging spider 811 is rocked in Read timing by the cams 855 in combination with a pair of cams 878. During read operations, the spider 811 is rocked counter-clockwise by the cams 855 and clockwise by the cams 878. The controls for obtaining this result are as follows:

When either the Read Group key 115 or the Read key 118 is depressed and the machine is operated, the first transaction bank differential mechanism adjusts the disc 806 to present a notch into the path of the feeler 873. During such a machine operation, after the totalizer has been engaged with the actuators and the totalizer has been reset to zero, the cam 863 releases the bell crank 865, the link 868, and the lever 867 to permit the feeler 873 to enter the notch in the notched disc 806. When the feeler finger 873 enters said notch in the disc 806, the spring 869 rocks the lever 867 clockwise from the position shown in Fig. 52 and moves the link 860 to the right to withdraw the roller 859 from the notch 858 and into a notch 874 in an arm 875 pivoted on the stud 823. The arm 875 is hubbed to a cam 876 provided with a pair of rollers 877 coacting with the pair of cams 878 (see also Fig. 13).

The cam 863 has secured thereto a gear 879, which is in mesh with the before-described gear 231. The cam 863 and the gear 879 are rotatable on a stud 854 on the right side frame 180.

The relative timing of the cams 855, 863, and 878 is such that the first movement of the cams 855 and 878 rocks the respective arms 857 and 875 counter-clockwise in unison. If, after the arms 857 and 875 have been rocked counter-clockwise, the cam 863 releasing the feeler 873, and the feeler engaging a high part on the control disc 806, the roller 859 remains in the notch 858 of the arm 857. The cam 855 then rocks the arm 857 clockwise to its normal or home position and carries the link 862 therewith, to disengage the totalizer from the actuators in reset timing. Inasmuch as the arm 857 is returned to its normal position prior to the return movement of the arm 875, the arm 875 is provided with a clearance slot for the roller 859 during this restoring movement of the link 862.

If, during the operation of the machine, the feeler 873 engages a notch in the disc 806, after the arms 857 and 875 have been moved to a counter-clockwise position, the roller 859 is moved into the notch 874 in the arm 875. Thereafter, the arm 857 is restored to its lower position, and, since the roller 859 has been withdrawn from the notch 858, the link 862 remains in its upper position. Later, during the machine operation, when the arm 875 is restored to its home position, the notch 874 carries the link 862 downwardly to move the reset spider 811 to disengage the totalizer from the actuators after the amount has been restored into the totalizers.

From the above it is seen that the arms 857 and 875 are moved in their counter-clockwise directions simultaneously, during which time the arm 857 engages the totalizer with the actuators. If, after the arms are set in such counter-clockwise position, the feeler 873 is moved to withdraw the roller 859 out of the notch 858 and into the notch 874, the arm 857 thereafter is restored idly, and the arm 875 restores the spider 811 to disengage the totalizer in read timing.

Figure 52:
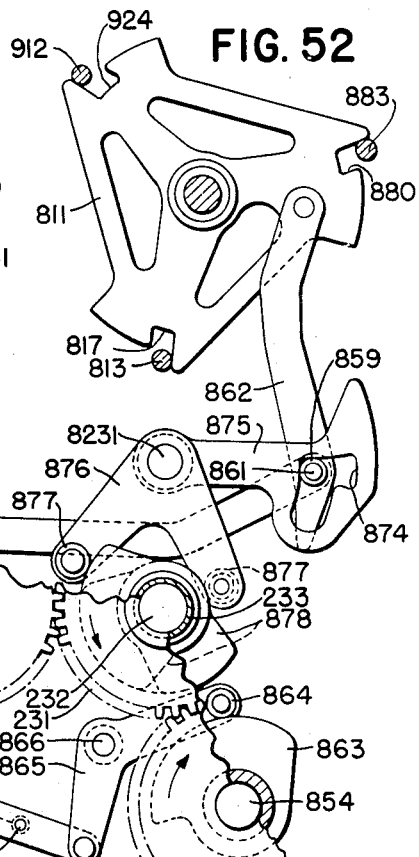
Fig. 52 is a detail view of the mechanism for controlling the movement of the total-taking engaging spider.
Figure 53:
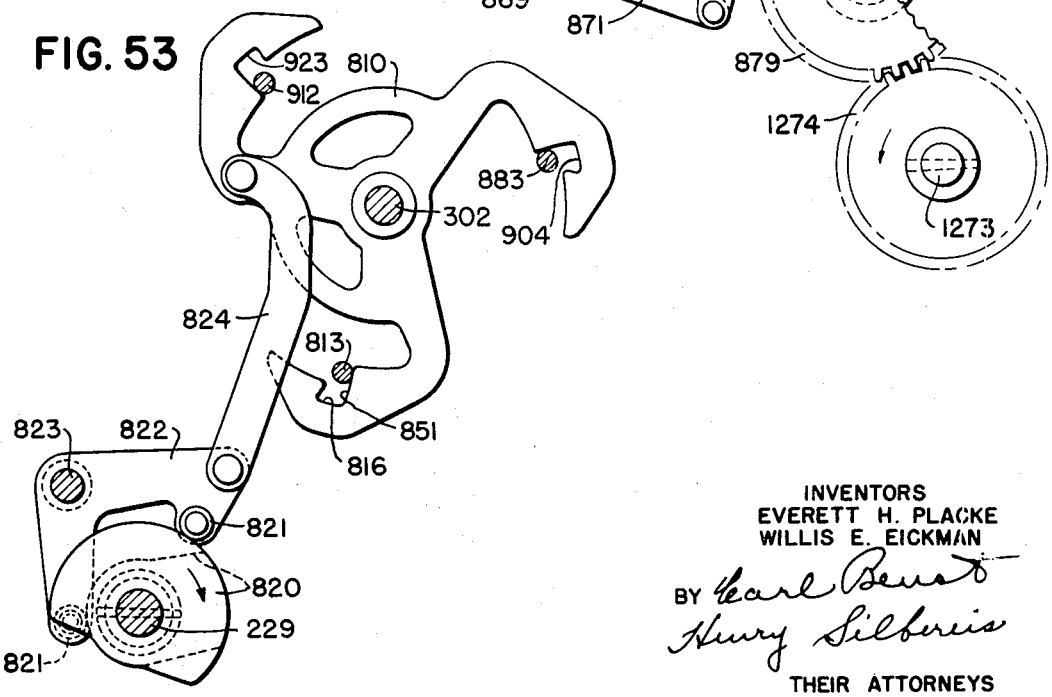
Fig. 53 is a detail view of the mechanism for operating the engaging mechanism in add timing.

At the end of each operation, the cam 863 restores the bell crank 865 and therefore the feeler 873 to their home position, shown in Fig. 52. At this time, the roller 859 is again moved into engagement with the notch 858 in the arm 857. Thus the roller 859 is restored into the notch 858 of the arm 857 at the end of each machine operation.

Thus the discs 801 and 802 determine when the stud 813 is to be moved into engagement with the reset spider 811, and the disc 806 determines whether the operation is to be in Read or in Reset timing.

*Rear totalizer engaging mechanism*

The engagement of the selected totalizer on the rear totalizer line with the actuators 305 (Fig. 35) is under control of the three notched discs 801, 802, and 804 (Figs. 39, 40, 41, and 42). As mentioned before, the discs 802 and 804 are adjusted under control of the first transaction bank, and the disc 801 is set under control of the second transaction bank. The setting of these discs is accomplished through the square shafts 743 and 763 in the manner described hereinbefore. The rear totalizer line shaft 373 (Fig. 19) has connected thereto an arm 881 (see also Fig. 48), which has pivoted thereto a link 882. The link 882 is adapted to be rocked either clockwise, to move a stud 883 thereon into engagement with the add spider 810, or counter-clockwise into engagement with the reset spider 811, in the same manner as described for the stud 813 on the link 814. The clockwise or counter-clockwise rocking movement of the link 882 is controlled by certain feelers coacting with the control discs 801, 802, and 804.

The stud 883 (Fig. 40) on the link 882 projects into an opening in an arm 884 pivoted on a stud 885 carried by the side frame 196 of the machine. Also mounted on the stud 885 is a pair of spring-actuated members 886 and 887, which are urged toward each other by a spring 888. Mounted on the arm 884 is a stud 8891, which projects between the spring-actuated members 886 and 887. Projecting from an arm of the multi-armed member 833 is a stud 890, which also is contacted on opposite sides by the spring-urged members 886 and 887.

When, as hereinbefore described, the multi-armed member 833 is rocked clockwise (Fig. 40), the stud 890 rocks the spring-urged member 886 counter-clockwise against the action of the spring 888. If at this time the arm 884 and the stud 8891 are free to move counter-clockwise, the stud 883 moves into engagement with a notch 880 in the reset spider 811. This counter-clockwise movement of the arm 884 is controlled by the disc 804 (Fig. 42). The arm 884 (Fig. 40) has pivoted thereto a link 891, which at its lower end is connected to a feeler arm 898 (see also Fig. 42), having a feeler stud 889 on its free end adapted to coact with the control disc 804.

When the multi-armed member 833 is rocked clockwise to stretch the spring 888 and thereby pull the member 887 against the stud 8891, the arm 884 tends to rock counter-clockwise, and the link 891 tends to move to the right (Fig. 40). This movement of the link 891 to the right tends to rock a two-armed lever 898 counter-clockwise to cause the stud 889 thereon to feel the periphery of the disc 804 (Fig. 42). If the stud 889 contacts the periphery of the disc 804, movement of the link 891 to the right is arrested, and therefore the arm 884 does not rock counter-clockwise to move the stud 883 into the notch 880 (see also Fig. 52) of the reset spider 811. If, on the other hand, the stud 889 is permitted to move into a notch in the periphery of the disc 804, the spring 888, acting through the spring-urged member 887 and the stud 8891, rocks the arm 884 counter-clockwise to move the stud 883 into the notch 880 of the reset spider 811. The disc 804 is so constructed that only the Reset key 117 and the Read key 118 control the setting of the disc 804 to present notches into the path of the stud 889.

Also connected to the lower end of the link 891 (Fig. 40) is an arm 892, supporting a pivoted pawl having a stud 894 coacting with the control disc 802 (Fig. 39) and with the control disc 804 (Fig. 42).

When the multi-armed member 833 is rocked counter-clockwise from its clockwise position past its normal position, the stud 890 rocks the spring-urged member 887 clockwise, thus causing the spring 888 to pull the arm 886 clockwise. If the arm 884 is free to move clockwise under action of the spring 888 by reason of notches being opposite the stud 894, the arm 884, through the stud 883 and the link 882, moves the stud 883 into a notch 904 (Figs. 48 and 53) in the add spider 810. If the stud 894 engages a high spot of either control disc 801 or 802, the link 891 is arrested and the stud 883 is prevented from engaging the add spider 810.

As mentioned before, the disc 802 is adjusted under control of the first transaction bank, and the stud 894 coacts with this disc. As illustrated herein, notches in disc 802 are positioned opposite the stud 894 when the machine is operated with either the "Notifier" key 111, the List key 112, or the Repeat key 114 depressed, or when no key at all is depressed in the first transaction bank.

The disc 801 (Fig. 42) is adjusted under control of the second transaction bank. This control disc is notched to present a notched portion opposite the stud 894 when any key of the second transaction bank, except the telephone number key 101, is depressed.

The rear totalizer line is engaged in read or reset timing in the same manner described for the front totalizer line. The mechanism for obtaining this result is shown in Figs. 51 and 52 and is controlled by the notched disc 806 coacting with the feeler finger 873 in the same manner described herein for the front totalizer line.

The time of operation of the feeler arms 841, 842, 892 and 898 is controlled by the disc 805 (Figs. 46 and 125). A link 900 connects the disc 805 with a bell crank 901 having a cam surface 902. A spring 903 maintains the lower arm of the bell crank 901 normally against a stud 908 carried by the machine side frame. The spring 903 normally tends to rock the disc 805 clockwise, thus tending to rock the bell crank 901 likewise around a stud 905. A stud 906, mounted on one plate of the pair of cam plates 723 for the first transaction differential mechanism, is provided to actuate the bell crank 901. The stud 906 is so located on the cam plate 723 that, after the control discs 801, 802 and 804 have been adjusted, the stud 906 engages the cam surface 902 and rocks the bell crank 901 counter-clockwise (Fig. 46), and this movement, through the link 909, rocks the control disc 905 counter-clockwise, thus releasing the arms 841 and 898 to the action of their respective springs.

Totalizer engaging mechanism—upper totalizer

The upper totalizer engaging mechanism for adding or total-taking operations is under control of the mechanism shown in Fig. 47.

The multiple-armed member 833 is provided with a stud 911 (Fig. 47) for controlling the movement of a stud 912 for engagement with the add spider 810 or the reset spider 811. The stud 911 is engaged at opposite sides by spring-actuated members 913 and 914. A spring 915 rocks the members 913 and 914 toward each other until arrested by the stud 911. Mounted on an arm 916, pivoted on a stud 917, is a stud 918, which also projects between the spring-urged members 913 and 914. The stud 912 is mounted on a link 919 (see also Fig. 48), pivotally connected to the engaging arm 920, for rocking the upper totalizer shaft 398. The arm 920 is rocked in either add timing or reset timing, depending on whether the stud 912 is engaged with a notch 923 of the add spider 810, or with a notch 924 of the reset spider 811.

Clockwise movement of the multi-armed member 833 rocks the spring-urged member 913 counter-clockwise, thus stretching the spring 915 and tending to move the spring-urged member 914 counter-clockwise. The spring-urged member 914 may be moved counter-clockwise if the arm 916, carrying the stud 918, is permitted to move counter-clockwise. This counter-clockwise movement is controlled by a finger 925, which normally lies in the path of movement of the stud 9201 on a feeler arm 921.

Upper totalizer—reset operations

The upper totalizer is controlled for reset operation by the Total key 110. In order to engage the upper totalizer with the spider 811, it is necessary for the feeler arm 921 to rock counter-clockwise. Counter-clockwise movement of the arm 921 is normally prevented by the finger 925 overlying the stud 9201. The finger 925 is pinned to a shaft 926, to which is also pinned a bell crank 927, which projects beneath the Total key 110. The bell crank 927 is provided with a finger which is normally held in engagement with a collar 930 by a spring 928 to properly position the finger 925 in the path of the stud 9201. Depression of the Total key 110 engages, through its stud 579, the bell crank 927 and rocks it clockwise, against the action of the spring 928, to remove the finger 925 from the path of the stud 9201. Thereafter during the operation of the machine, when the multi-armed member 833 is rocked clockwise, a link 922, connecting the feeler arm 921 with the arm 916, is free to move downwardly to rock the arm 921 counter-clockwise. Counter-clockwise movement (Fig. 48) of the arm 921, through the link 922, rocks the arm 916 counter-clockwise (Fig. 47) to move the stud 912 into the notch 924 of the reset spider 811.

Depression of the Total key 110 controls the positioning of the notched disc 806, through the differential mechanism of the first transaction bank, to position an unnotched section thereof into the path of the finger 873 (Fig. 52) to control the position of the roller 859 for reset operation in the manner described hereinbefore.

Depression of the Total key 110 positions the disc 806 to present an unnotched spot to the stud 9201 so that during Total reset operations the feeler arm 921 is held against clockwise movement, and therefore the stud 912 cannot be engaged with the add spider 810 during Total reset operations.

Upper totalizer—add operations

When the multi-armed member 833 (Fig. 47) is moved counter-clockwise beyond its normal or home position, the spring 915, acting through the spring-urged member 913, tends to move the arm 916 clockwise. This clockwise movement of the arm 916 is controlled by the control disc 806, with which the stud 9201 on the feller arm 921 coacts. If, when the multi-armed member 833 rocks counter-clockwise, a notch of the control disc 806 is opposite the stud 9201, the spring 915 can rock the arm 921 clockwise, thus raising the link 922 and rocking the arm 916 counter-clockwise to position the stud 912 into engagement with the notch 923 in the add spider 810.

The disc 806 is notched in the positions for controlling the upper totalizer for engagement in add timing when the List key 112 or the Add key 113 is depressed. Therefore, when either of these two keys is depressed, a notch in the disc 806 is positioned opposite the stud 9201, thus controlling the upper totalizer to be rocked in add timing.

*Machine release mechanism and cycling controls*

When the machine is released for operation, it performs either a one-cycle operation or a two-cycle operation, depending upon which keys in the first transaction bank are depressed. When the machine is released for an "add" operation, the machine performs a one-cycle operation. When the machine is released for taking a total from the upper, or non-shifting, totalizer, the machine performs one cycle of operation. A one-cycle total-taking operation from the upper totalizer is initiated by the depression of the Total key 110 in the first transaction bank. When the machine is released for a total-taking operation, to take a total either from the rear totalizer line or from the front totalizer line, which lines may include interspersed totalizers, the machine performs two cycles of operation. A total-taking operation from the rear totalizer line or the front totalizer line is initiated by the depression of either the Read Group key 115, the Reset Group key 116, the Reset key 117, or the Read key 118. During the first of the two cycles of operation, under control of the keys 115 to 118 inclusive, the main cam shaft 229 is arrested shortly after it starts its rotation, and the cams 723 and 779, together with a cycle control cam 936 (Figs. 13 and 15) to be described later, receive two complete rotations. The term "cycle" as used herein means a complete rotation of cams 723, 779 and 936.

During the first rotation of the cams 723, the selected interspersed totalizer is shifted to select the proper totalizer from which a total is to be taken. During the second rotation of the cams 723, the main shaft 229 is rotated therewith to complete its rotation. The novel cycle control mechanism is provided to simplify the total-taking operations when only one cycle is necessary, such as when a total is taken from a non-shifting totalizer line. A two-cycle total-taking operation is performed in those operations where it is necessary to select the totalizer during the first cycle of operation.

*Machine release mechanism*

In the manner described hereinbefore, depression of any of the motorized keys 101 to 109, inclusive, of the second transaction bank, or a key 110, 113, 115 or 116, of the first transaction bank (Figs. 17 and 56) moves the control slides 665 and 601, respectively, to rock the shaft 605 and the arm 606 to release the arm 608 and release the shaft 264 for releasing the machine for operation. (See also Fig. 67). Pinned to the release shaft 264 is an arm 937 connected to a plate 938 by a link 939 (Figs. 54 and 67). The plate 938 is pivoted on a shaft 940. A spring 941 is connected to a downwardly-extending arm 942 of the plate 938, and to a stud 943 carried by the side frames 181 of the machine. The spring 941 normally tends to rock the plate 938 clockwise, thus normally tending to rock the arm 937 and the release shaft 264 counter-clockwise. Counter-clockwise movement of the shaft 264 is normally arrested by the stud 607 engaging a shoulder of the arm 606. When a motorized key is depressed in the manner described hereinbefore, and the arm 606 is rocked counter-clockwise to withdraw its shoulder from contact with the square stud 607, the spring 941 rocks the plate 938 clockwise until a flange 932 on the plate 938 engages a rubber block 933 on a block 949 on the left side frame 181 of the machine.

Clockwise movement of the plate 938 (Figs. 54 and 67) withdraws a surface 944 thereof from contact with a square stud 945 of a bell crank 946 secured to a shaft 947. The bell crank 946 is normally urged counter-clockwise by a spring 948, which normally maintains the square stud 945 in engagement with the surface 944. When the plate 938 is rocked clockwise, a notch 949 is brought opposite the stud 945, whereupon the spring 948 rocks the bell crank 946 counter-clockwise and moves the square stud into the notch 949, and the arm 946 is arrested by a flange 9461 striking a rubber block 9462 secured to a block fastened to the frame 181. Counter-clockwise movement of the bell crank 946 rocks the shaft 947 (see also Fig. 66) to rock an arm 950, secured to the shaft 947, counterclockwise. A spring 951 is connected to a stud 952 at the upper end of the arm 950, and the other end is connected to a stud 953 on a switch operating arm 954, pivoted on the before-mentioned stud 454. The spring 951 normally holds a surface 955 on the arm 954 in engagement with the stud 952, and, when the arm 950 is rocked counterclockwise, it rocks the switch operating arm 954 clockwise. A link 956 connects the upper end of the switch operating arm 954 with a bell crank 957 pivoted on a stud 935 and having an insulating block 958 normally holding a switch blade 959 in open position. The switch blade 959 is pivoted on a stud 934. Clockwise rotation of the switch operating arm 954, through the link 956, rocks the bell crank 957 clockwise to permit a switch spring 960, connected to the switch blade 959, to rock the blade 959 clockwise to contact a switch blade 961 to thereby close an electric circuit through the motor 216 to operate the machine in the manner described hereinbefore.

The bell crank 946 is bifurcated to receive a stud 962 of an arm 963 pivoted on the beforementioned shaft 940. When the plate 938 is rocked clockwise, upon depression of a motorized key, to move the notch 949 into the path of the square stud 945, the spring 948, rocking the bell crank 946 counter-clockwise, rocks the arm 963 clockwise to move a surface 964 of the arm 963 into the path of a roller 965 carried between a disc 966 and a cam 975 (see also Fig. 68) pinned to the main cam shaft 229. Also, clockwise movement of the plate 938 moves a surface 967 thereon into the path of the roller 965.

At about midway of the rotation of the main cam shaft, as shown in the time chart, Fig. 140, the roller 965 engages the surface 964 and rocks the arm 963 counterclockwise to rock the bell crank 946 clockwise to withdraw the stud 945 from engagement with the notch 949. Clockwise movement of the bell crank 946 rocks the shaft 947 and the arm 950 clockwise to stretch the spring 951. At this time, the switch arm 954 cannot follow the arm 950, since a roller 968 (Fig. 66) of the switch arm 954 is in contact with the outer periphery of a cam 969 on the main cam shaft 229. Continued rotation of the disc 966 and the cam 975 brings the roller 965 (Fig. 67) into engagement with the surface 967 of the plate 938 and rocks the plate 938 counter-clockwise back to its normal position. Counter-clockwise movement of the plate 938, through the link 939 and the arm 937, moves the release shaft 264 beyond its normal position, wherein the arm 606 again moves into the path of the square stud 607. The springs 602 and 667 (Figs. 17 and 56) rock the shaft 605 and the arm 606 into engagement with the square stud 607 when the square stud is moved beyond the shoulder of the arm 606.

When the arm 950 (Fig. 66) is rocked counterclockwise upon depression of a motorized key, and the switch arm 954 is rocked clockwise to close the switch 961, the roller 968 is lifted out of the range of the cam 969. During the greater part of the rotation of the cam 969, its outer periphery comes into contact with the roller 968 and maintains a switch arm, and therefore a switch 959—961, in a closed position. Near the end of the machine operation, the outer periphery of the cam 969 passes from beneath the roller 968. At this time, the arm 954 which is under tension of the spring 951 snaps the switch arm 954 counter-clockwise to open the switch 961 and interrupts the electrical circuit through the motor 216.

When the electrical circuit through the motor 216 is interrupted, the machine is arrested in home position by a shoulder 9701 (Fig. 14) on the pawl 223 being wedged between a stud 9711 on the drive gear 224 and the upper end of a stop arm 972 secured to the beforementioned shaft 947. When the shaft 947 is rocked counter-clockwise upon depression of a motorized key in the manner described above, the stop arm 972 is withdrawn from the shoulder 9701 of the pawl 223, and thereafter a spring 973, connected to the free end of the clutch pawl 223 and on a stud on the gear 224, rocks the pawl 223 counter-clockwise to engage with the clutch member 222 to drive the cam shaft 229 in a manner hereinbefore described. When the arm 950 (Fig. 66) is restored to its home position by the roller 965, the arm 963, the bell crank 946, and the shaft 947, the upper end of the stop arm 972 (Fig. 14) is moved into the path of movement of the shoulder 9701, and therefore, when the shoulder 9701 comes into contact with the stop arm 972, the pawl 223 is withdrawn from engagement with the clutch member 222. Thus, when the shoulder 9701 engages the stop arm 972, the pawl 223 is withdrawn to interrupt the driving action of the motor, and, at the same time, the stop arm 972, the shoulder 9701, and the stud 9711 act as a positive stop to arrest the shaft 229 in its home position.

*Non-repeat mechanism*

In order to prevent a second operation of the machine, if a motorized key is held depressed during the entire machine operation, a means is provided to prevent the machine from releasing for a second operation until the motorized key is released and again depressed.

When the arm 606 (Fig. 67) is rocked to release the release shaft 264, the non-repeat pawl 971 normally moves into engagement with the lower edge of the stud 607. The non-repeat pawl 971 is normally held in engagement with a stud 974 on the release arm 606 by the spring 970. If the operator should hold the release key in its depressed position until the end of the operation of the machine, the connections hereinbefore described maintain the arm 606 in its moved position, and therefore, when the release shaft is restored past its normal position, the arm 606 does not engage the stud 607; therefore the release shaft 264 would be permitted to rock to release the machine again. However, at this time the non-repeat pawl 971 will have been moved counter-clockwise by the spring 970 and therefore engages behind the square stud 607 and prevents such a repeat operation. When the operator releases the depressed motorized key at the end of the machine operation, the release arm 606 is restored clockwise by the springs 602 and 667 into the position shown in Fig. 67, and, during such clockwise movement of the arm 606, the stud 974, engaging the non-repeat pawl 971, restores the non-repeat pawl to its normal position out of engagement with the square stud 607. Therefore the square stud 607 again comes into contact with the shoulder on the arm 606, and the machine is again in condition for release by depression of a motorized key.

*One-cycle-add operation*

As described hereinbefore, the clutch member 228 (Figs. 13 and 23), the cam 936 (Fig. 15), the two pairs of differential driving cams 723, and the driving gear 226 (Figs. 13, 15 and 23) are all mounted on the sleeve 227 to form a cluster which can be independently rotated on the main cam shaft 229. Normally this cluster of cams and the gear 226 are connected to the main cam shaft 229 by a clutch mechanism now to be described. The clutch mechanism forms a connection whereby the main cam shaft 229 is driven through the cam cluster.

Secured on the main shaft 229 (Figs. 15 and 23) is a disc 981. Pivoted on the disc 981 is a clutch pawl 982, normally held in operating connection with the clutch member 228 by a spring 983. The spring 983 connects the clutch pawl 982 with a retaining pawl 984, also normally in engagement with the clutch member 228. When the motor drives the gear 226 clockwise (Fig. 14), and with the pawl 982 in engagement with the clutch member 228, the clutch member 228 carries the pawl 982 therewith and thereby rotates the disc 981 and the main shaft 229 clockwise. During a one-cycle add operation, the clutch pawl 982 remains in engagement with the clutch member 228 throughout the entire operation, and therefore the cluster of cams, including the cam 936 and the two pairs of cams 723, rotate with the shaft 229. At the end of the operation, when the shoulder 9701 on the pawl 223 engages the end of the stop arm 972, the machine is arrested in the manner described above. During this one cycle of operation of the main shaft 229, the amount differentials are operated, and the engaging mechanisms for the totalizers are controlled to engage the totalizers with the actuators, as controlled by the transaction keys in the manner described hereinbefore.

*One-cycle total-taking operation*

When the machine is released for operation, with either the Total key 110 depressed, the clutch pawl 982 remains in operative engagement with the clutch member 228, and therefore, during this operation, the cluster of cams 936 and the two pairs of cams 723 rotate with the main shaft 229. During this operation, the Total key controls the engagement and disengagement of the front totalizer in the manner hereinbefore described, to take a total from the front totalizer.

*Two-cycle total-taking operation*

As above mentioned, the rear totalizer line consists of interspersed totalizers, and therefore it is necessary to make a preliminary operation of the machine so as to provide time to shift the selected totalizer line for selecting or aligning the proper one of the interspersed totalizers with the differential actuators before totals can be taken therefrom. However, it is neither necessary nor desirable to operate the amount actuators during the first cycle of a two-cycle operation. To prevent operation of the amount actuators during the first cycle of a two-cycle total-taking operation, the main cam shaft 229 is unclutched from the cluster of cams, including the cam 936 and the two pairs of transaction differential cams 723. This cluster of cams is operated during the first cycle of a two-cycle total-taking operation independently of the main cam shaft 229. The unclutching of the main cam shaft 229 from the cluster of cams is accomplished by rocking the clutch pawl 982 (Fig. 15) out of engagement with the clutch member 228 (Fig. 14) at the beginning of the machine operation. The unclutching of the clutch pawl 982 is under control of the Read Group key 115, the Reset Group key 116, the Reset key 117, and the Read key 118 (Figs. 2 and 15).

Depression of one of the keys 115 to 118 shifts the beforementioned cycle control slide 634 upwardly (Fig. 15) by wiping the respective stud 597 against the respective cam edge 991 of the control slide. Mounted at the right-hand end of the control slide 634 is a stud 992, resting in the bifurcated end of an arm 993 pivoted on the shaft 605. Hubbed to the arm 993, so as to move therewith, is a finger 994, whose free end engages over a stud 995 of a slide 996. The slide 996 is slotted to slide on a stud 997 and on the beforementioned stud 693. The slide 996 is normally held in elevated position by a spring 998, which maintains the bottom of the slot engaging the stud 997 in the position shown in Fig. 15. The slide 996 is provided with a flange 999 and a guide finger 1000. A cycle control arm 1001, loosely pivoted on a stud 1002 carried by the side frame of the machine, has near its upper end a finger which engages the flange 999 when the machine is released. The finger 1000 acts as a guide for the upper end of the cycle control arm 1001 to guide it laterally. Connected to the arm 1001 is a two-armed member 1003, so as to form a unitary pivoting member, consisting of the arms 1001 and 1003. A spring 1004 is stretched between a stud 1005 on the arm 1003 and a stud 1006 on a pawl 1007 pivoted on the shaft 947. The spring 1004 normally holds the stud 1006 in contact with a finger 1008 of a stop arm 1009 pinned to the shaft 947. The arm 1003 is provided with a flange 1010, which is normally held against the free end of the stop arm 1009 by the spring 1004.

Depression of any key 115 to 118 inclusive, acting through the control slide 634, lowers the slide 996 to move the flange 999 thereon out of the path of the upper end of the cycle control arm 1001 and positions the flange 999 opposite a notch in the arm 1001 so as to permit free movement of the latter when released. After the slide 996 has been lowered by depression of a key 115 to 118, and the machine is released for operation, the shaft 947 is rocked counter-clockwise, as described hereinbefore. The stop arm 1009 is thereby moved from the path of movement of the flange 1010, thus permitting the spring 1004 to rock the unit consisting of the arms 1001 and 1003 in a counter-clockwise direction (Fig. 15). Counter-clockwise movement of the arm 1001 is arrested when a tail 1011 comes into engagement with a stop stud 1012, carried by the side frame of the machine. When the arm 1001 is arrested by the stud 1012, a surface 1013 thereof is positioned into the path of an extension 1014 on the clutch pawl 982. When the machine starts to operate with the surface 1013 in the path of the extension 1014, the extension 1014 comes into engagement with the surface 1013 shortly after the machine starts to operate. Continued rotation of the disc 981, carrying the pawl 982, causes the pawl 982 to be rocked counter-clockwise to disengage the clutch pawl 982 from the clutch member 228 and to permit the clutch member 228 and the transaction differential driving cams 723 to continue to rotate. Since the clutch pawl 982 is disengaged from the clutch member 228, the disc 981 and the main cam shaft 229 remain stationary. The partial rotation of the main cam shaft 229 is not sufficient to start the amount differential mechanisms in operation. The transaction differential cam 723 of the cluster continues to rotate and, through the second bank transaction differential, actuates the totalizer shifting cams 388 to properly select a totalizer by aligning the selected totalizer with the amount actuators, in the manner described hereinbefore. After the clutch pawl 982 has been rocked from engagement with the shoulder of the clutch member 228, the pawl rides on the outer periphery of the clutch member 228. During the first cycle of operation, the cam 936 (Fig. 15), rotating with the transaction bank pairs of cams 723, comes into engagement with a roller 1015 on the arm 1003 and rocks the arm 1003, together with the cycle control arm 1001, clockwise past their home positions.

When the stop arm 1009 is rocked counter-clockwise to release the arm 1003, the flange 1010 moves between the stop arm 1009 and the pawl 1007. When the arm 1003 is restored past its home position by the cam 936, the stop arm 1009 remains in its moved position, and therefore, when the flange 1010 is moved from between the stop arm 1009 and the pawl 1007, the spring 1004 moves the pawl 1007 into engagement with the edge of the flange 1010, to hold the arms 1001 and 1003 in a position slightly out of home position, to maintain the surface 1013 out of the path of the extension 1014 of the clutch pawl 982. During the beginning of the second cycle of operation, when the shoulder of the clutch member 228 passes beneath the clutch pawl 982, the spring 983 is free to rock the pawl 982 into engagement therewith, and, during the second cycle of the two-cycle total-taking operation, the main cam shaft 229 is rotated by and with the cluster of transaction differential cams. Near the end of the second cycle of operation, the shaft 947 is given a restoring movement in the manner described hereinbefore, thus positioning the stop arm 1009 into the path of the flange 1010, and, through the finger 1008, engaging the stud 1006, removes the pawl 1007 from engagement with the flange 1010. When the depressed key 115 to 118 is released to return to its normal undepressed position, the spring 998 raises the slide 996 to again position the flange 999 in the path of the arm 1001.

From the above, it is seen that the cycle control mechanism controls the operation of the main cam shaft 229 so as to operate only when needed during total-taking operations. In those operations in which no shifting of the totalizer is required for selection, a total-taking operation is performed in one cycle of operation. In those operations where a totalizer must first be selected from a line of interspersed totalizers, the main cam shaft 229 is arrested so as to prevent the idle operation of the amount differential mechanisms. During the first cycle of the two-cycle operation, only the cams for operating the totalizer selecting mechanism, and the aligners therefor, are operated.

The roller 965 (Figs. 67 and 68) is carried between the disc 966 and the cam 975, secured to the main cam shaft 229, and, since the main shaft 229 does not rotate during the entire first cycle of operation, the shaft 947 is rocked to restore the release shaft 264, and stop the machine, only near the end of the second cycle of a two-cycle total-taking operation.

The disc 966 is provided with two ratchet teeth 1016 and 1017 (Fig. 67). When the tooth 1016 is in the home position, a pawl 1018, pivoted on a stud 1019, engages it. Upon the initial movement of the shaft 229 during the first cycle of a two-cycle operation, the pawl 1018 drops into the tooth 1017, which is spaced from the tooth 1016 an extent equal to the movement of the shaft 229 required for disengaging the clutch pawl 982 from the clutch member 228 (Fig. 15). A spring 1020 maintains the pawl 1018 in constant contact with the disc 966 to properly align the disc 966 in which ever one of the two positions it is arrested in.

KEY RELEASE MEANS

The key 119 (Figs. 1, 2 and 19) is provided to release any depressed key, except a motorized key, on the keyboard that has been depressed in error. Secured to the shank 1023 of the key 119 is a clip 1025, which is bifurcated to engage over a stud 1026 on a bell crank 1027 pivoted on a stud 1028 mounted on the side frame 180. The lower end of the key shank 1023 is bifurcated to fit over a shouldered stud 1024 on the side frame 180. The bifurcated lower end of the key shank and the bifurcated clip 1025 provide means for removing the key from the machine if desired, without disturbing the mechanism in the machine.

Secured to the bell crank 1027, by a hub 1029, is an arm 1030 having pivoted thereto a link 1031 slotted at its upper end to fit over a shouldered stud 1032. The stud 1032 is carried on the free end of an arm 1033 secured to the machine release shaft 264. A spring 1034, having one end fastened on a stud in the side frame 180 and the other end to a stud on the link 1031, normally maintains a finger 1035 on the bell crank 1027 in engagement with a stud 1036 on the side frame 180. The stud 1036 limits the movement of the bell crank 1027, the arm 1030, and the link 1031 so as to position the slot in the right-hand end of the link 1031 midway over the stud 1032, so that the arm 1033 is free to move either clockwise or counter-clockwise without moving the link 1031. Therefore the link 1031 does not interfere with the normal releasing and restoring movements of the release shaft 264.

If it is desired to release a depressed key in the key bank, the operator depresses the Release key 119, which, through the clip 1025, the stud 1026, the bell crank 1027, and the arm 1030, moves the link 1031 leftwardly (Fig.

19) to rock the arm 1033 and the release shaft 264 clockwise (Figs. 16, 24 and 55). Clockwise movement of the release shaft 264 rocks the arms 670, 265 and 615 clockwise to shift the detents from the amount banks and the first and second transaction banks to release the depressed keys. The movement of the link 1031 by the depression of the key 119 is sufficient to first take up the slack in the slot engaging the stud 1032, and to rock the arm 1033 far enough to effect the releasing movement of the keys. Upon release of the key 119 by the operator, the spring 1034 again restores the link 1031 to its normal position, and the spring 941 (Fig. 67) restores the release shaft 264 to its normal position.

CONSECUTIVE NUMBERING MEANS

A consecutive numbering means is provided in the machine to consecutively number all transactions recorded by the machine. A group of type wheels is provided in each of the three printing sections, so that the consecutive number is printed on the inserted slip, on the audit tape, and on the issuing tape. It is desired to consecutively number only transactions entered into the machine, under control of keys 101, 104 to 109, inclusive, and therefore the last previous consecutive number is printed on each of the record media during every other kind operation of the machine. However, when a transaction is entered, under control of any one of said keys the conseuective number is advanced one unit. The control over the consecutive numbering mechanism for advancing the consecutive number type carriers is effected by two notched control discs, one being adjusted by the first transaction bank differential means and the other by the second transaction bank differential means. The notched disc set by the first transaction bank differential means is such that, if any of the keys 110, 111, 112 or 114 to 118, inclusive, in the first transaction bank are depressed, the consecutive number advancing mechanism is disabled. The notched disc adjusted by the second transaction bank differential means is so constructed that the consecutive number is advanced when any one of the keys 101 or 104 to 109 is depressed. If a key 110, 111 and 114 to 118, inclusive, of the first transaction bank is depressed prior to the depression of a key 101 or 104 to 109, the notched disc adjusted by the first transaction bank differential means overrides the control of the notched disc adjusted by the second transaction bank to prevent the consecutive number from being advanced.

Figure 76:
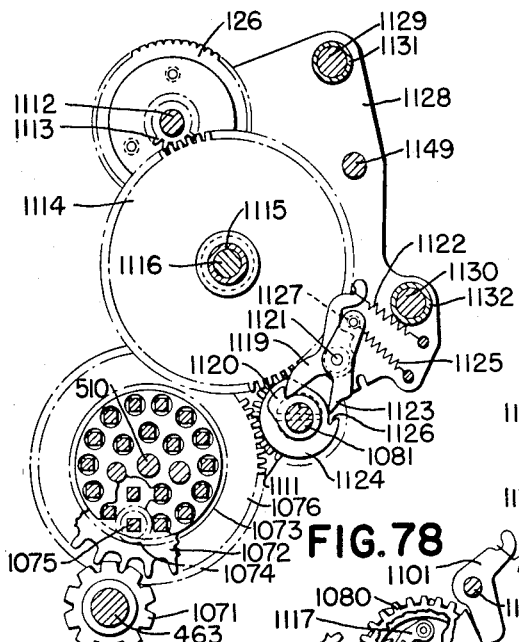
Fig. 76 is a detail view of the consecutive number reset mechanism.
Figure 78:
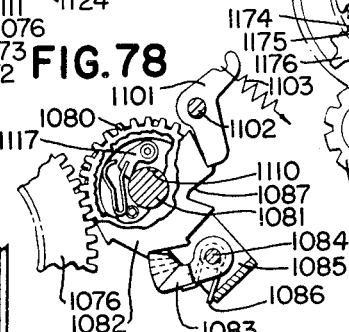
Fig. 78 is a detail view of a part of the turn-to-zero mechanism for the consecutive number device.
Figure 79:
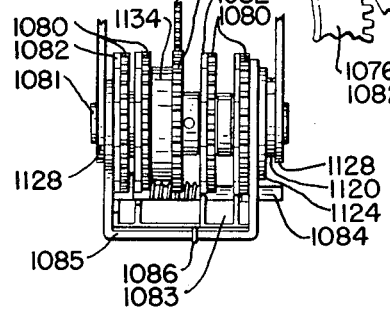
Fig. 79 is a side view of the driving gears for the consecutive number operating mechanism.

Mounted in each printing unit—namely, the slip printer, audit printer tape, and issuing tape printer units— are four type wheels 1071 (Figs. 76, 90A and 90B). The three sets of type wheels are mounted on the beforementioned shafts 463. Meshing with each type wheel 1071 is a ring gear 1072, having internal teeth 1073, meshing with a pinion such as the pinion 1074 (Fig. 76) for the units order type wheel. The pinion 1074 is mounted on a square shaft 1075, on which is mounted another pinion like pinion 1074, the latter being mounted on the square shaft 1075, extending to the left (Fig. 90A) of the left side frame 131. The pinion near the left-hand end of the shaft 1075 is in engagement with internal teeth, similar to the teeth 1073, of a ring gear 1076. Each of the type wheels for the tens, hundreds, and thousands orders is similarly connected through individual square shafts to a corresponding gear 1077, 1078 and 1079, respectively, located near the left end of the machine. Meshing with each ring gear 1076, 1077, 1078 and 1079 is a pinion 1080 (Figs. 78 and 79), rotatably mounted on a reset shaft 1081. Secured to, so as to rotate with, each pinion 1080 is a ratchet wheel 1082 engaged by a differentially tined pawl 1083 mounted on a shaft 1084 carried by a yoke 1085. A spring 1086 normally maintains the differentially tined pawl 1083 in engagement with the ratchet wheels 1082. Each ratchet wheel 1082 is provided with the usual and well-known deep notch 1087, to provide for tens carrying between the lower and higher order wheels of the consecutive numbering means. The yoke 1085 is pivotally mounted on the shaft 1081, and, when rocked clockwise during a machine operation, the differentially tined pawl 1083, acting on the ratchet wheel 1082, advances the pinion 1080 an extent equal to one step of movement of the type wheel 1071.

The yoke 1085 is pivoted on the shaft 1081 and is operated by the aforementioned cam 975 (Fig. 68), which restores the machine release mechanism. A roller 1088, carried by a bell crank 1089 pivoted on a stud 1090, is held in engagement with the periphery of the cam 975 by a spring 1091. The spring 1091 is connected to a stud on the left side frame 131 at one end, and the other end is connected to an operating arm 1092 pivoted on a stud 1093. The operating arm 1092 is provided with a stud 1094 in engagement with a bifurcation in the bell crank 1089. The left end (Fig. 68) of the operating arm 1092 is bifurcated to engage the beforementioned shaft 1084.

A control disc 1095 (Figs. 68 and 90A) is adjusted differentially by the first transaction bank differential means. The control disc 1095 is provided with a notch 1096, which notch is moved opposite a roller 1100 on the arm 1092 when the machine is operated with either the Repeat key 114, the List key 112, or with no key depressed in the first transaction bank. A second control disc, 1097 (Figs. 69 and 90A), is differentially adjusted by the second transaction bank differential mechanism and is provided with notches 1098 and 1099 in the positions which are moved opposite the roller 1100 when the machine is operated with the Telephone No. key 119, or one of the initial keys A to M, 104 to 109, depressed.

During the operation of the machine, when the cam 975 is rotated clockwise (Fig. 68), the spring 1091 causes the roller 1088 to follow the contour of the cam if notches are in the path of a roller 1100. If no notch is in the path of the roller 1100, the bell crank 1089 cannot follow the contour of the cam 975. If, however, notches are moved into the path of the roller 1100 by both discs 1095 and 1097, the roller 1100 is free to move into the notches, and therefore the operating arm 1092 is rocked clockwise by the spring 1091. Clockwise movement of the operating arm 1092 rocks the yoke 1085 counter-clockwise, thus causing the differentially tined pawl 1083 (Fig. 78) to ratchet over the teeth of the ratchet wheel 1082 and to be positioned behind the next ratchet tooth of said ratchet wheel. When the cam 975 restores the bell crank 1089 in its clockwise direction and the operating arm 1092 in a counterclockwise direction, the operating arm 1092, through its engagement with the shaft 1084, rocks the yoke 1085 clockwise to cause the tined pawl 1083 to advance the ratchet wheel 1082 and the pinion 1080 one step. This one step of movement is transmitted to the type wheel through the ring gear 1076 and the square shaft 1075 and the ring gear 1072 to position the type wheel 1071 one step in advance.

When a lower order wheel passes from 9 to 0, the differentially tined pawl drops into the deep notch 1087, thus permitting the next higher order tine of the pawl 1083 to engage the next higher order ratchet wheel 1082 to transmit one step of movement to the type wheel 1071 of the next higher order.

A retaining pawl 1101 is pivoted on a stud 1102 to engage the ratchet wheel 1082 to prevent retrograde movement of the ratchet wheel 1082 when the differentially tined pawl 1083 is moved in its counter-clockwise direction. A spring 1103 maintains the retaining pawl 1101 in constant engagement with the ratchet wheel 1082.

From the above it is apparent that the only time the consecutive number can be advanced is when the List key 112, Repeat key 114, or no key is depressed in the first transaction bank, which positions the notch 1096 into the path of the roller 1100, and either the Telephone No. key 101, or one of the keys 104 to 109, is depressed in the second transaction bank, which positions either the notch 1098 or 1099 into the path of the roller 1100 during the machine operation. If a key 110, 111, 113 or 115 to 118 is depressed in the first transaction bank, a high spot will be in the path of the roller 1100.

As will become apparent in the consideration of the printing mechanism of the machine, a consecutive number is printed on each of the record media during every printing operation of the machine. If the operation being performed does not advance the consecutive number mechanism, the consecutive number previously set up will be printed. For this reason, the records will have a series of like consecutive numbers printed thereon. However, when a transaction is entered which requires a new number, the machine advances the consecutive number one step, and therefore, a new consecutive number will be printed.

*Consecutive number reset mechanism*

A reset mechanism is provided so as to permit an authorized person to reset the consecutive number wheels 1071 to zero. The resetting of the consecutive number mechanism is under control of the lock slide 123 (Figs. 2 and 54). When the lock slide 123 is in the position shown in Figs. 2 and 54, the reset mechanism for the consecutive number is locked against movement. When the lock slide is operated to release the consecutive number reset mechanism, the reset wheel 126 (Figs. 2 and 76) can be manually rotated by the authorized person.

The reset wheel 126 (Fig. 76) projects through the keyboard near its left-hand end, as shown in Figs. 1 and 2, and is mounted on a short stud 1112, carried by two auxiliary frames 1128, mounted on the left side frame 181 of the machine. Secured to the side of the reset wheel 126 is a pinion 1113, meshing with an intermediate pinion 1114 on a sleeve 1115, rotatably mounted on a short shaft 1116. The intermediate pinion 1114 meshes with a pinion 1111 (see also Fig. 79), secured to the beforementioned reset shaft 1081. The reset shaft 1081 is provided with a notch 1110, extending between the four pinions 1080. Mounted inside each pinion 1080 is a pawl 1117, which is spring-urged to contact the reset shaft 1081. When the pinion 1080 is actuated by the differentially tined pawl 1083 in a clockwise direction to enter "1" into the consecutive numbering mechanism, the pawl 1117 moves clockwise around the shaft 1081 and ratchets past the notch 1110.

To reset the consecutive number wheels 1071, the wheel 126 is rotated in a clockwise direction. Clockwise rotation of the wheel 126 rotates the intermediate pinion 1114 counter-clockwise and the pinion 1111 and the shaft 1081 clockwise. Clockwise rotation of the shaft 1081 causes the notch 1110 to pick up the pawls 1117 from whichever position they are set in and restores the pinions 1111 and their connected type wheels to their home or zero positions.

The usual stop pawl 1119, engaging a stop arm 1120 on the shaft 1081, is provided to arrest the shaft 1081 when the type wheels reach their zero positions. The pawl 1119 is pivoted on a stud 1121 and is spring-urged by a spring 1122 in a clockwise direction. The stop arm 1120 is undercut on its effective surface so as to engage the stop pawl 1119 and maintain it in the position shown in Fig. 76, when the shaft 1081 reaches its zero position. Therefore, before the wheel 126 can be rotated in a clockwise direction to rotate the shaft 1081 in a clockwise direction, as described above, it is necessary first to back up the wheel 126 far enough to release the pawl 1119 to the action of the spring 1122. The backward movement of the shaft 1081 is limited by a pawl 1123, also pivoted on the stud 1121 and spring-urged against the periphery of a cam 1124 by a spring 1125. When the wheel 126 is backed up in a counter-clockwise direction, the cam 1124, being secured to the shaft 1081, is rocked counter-clockwise until arrested by the end of the pawl 1123. At this time, the spring 1122 is free to withdraw the stop pawl 1119, which is then moved an extent determined by a stop stud 1127 on the pawl 1123. The stud 1127 is so located in relation to the stop pawl 1119 that, when the stop pawl 1119 is moved into engagement with the stud 1127, the opposite end of the stop pawl 1119 is withdrawn from the path of the arm 1120 on the reset shaft 1081. After the reset shaft is released by the above backward movement of the wheel 126, the wheel will be free to be rotated clockwise. During this movement, the cam 1124, engaging the pawl 1123, rocks said pawl counter-clockwise. This counter-clockwise movement of the pawl 1123, through the stud 1127, rocks the stop pawl 1119 back into its effective position, so that the arm 1120 on the reset shaft can come into engagement with the free end of the pawl 1119 and arrest further movement of the shaft 1081 when the shaft reaches its zero position.

The consecutive number mechanism, including the resetting means therefor, is carried between the auxiliary frames 1128 (Figs. 54 and 76) and includes the stud 1112, the shaft 1116, the shaft 1081, and the stud 1121. This unit can therefore be assembled as a separate entity and assembled into the machine as a whole.

The two auxiliary frames 1128 are formed into a unitary framework by the sleeve 1115 and two sleeves 1131 and 1132. The sleeves 1131 and 1132 and 1115 are supported on shafts 1129, 1130 and 1116, respectively. After the unit has been assembled on the shafts 1116, 1129 and 1130, screws 1133 (Fig. 54) are entered into the ends of the shafts 1116, 1129 and 1130, to maintain the consecutive numbering unit in position in the machine.

Secured to the pinion 1111 (Figs. 54 and 79) is a disc 1134, having a notch 1135, with which coacts a spring-urged pawl 1136. When the reset shaft 1081 is in its zero position, the spring-urged pawl 1136 rests on the periphery of the disc 1134. When the reset rotation, in a clockwise direction (Fig. 54), of the reset shaft 1081 is started, it is necessary to complete the operation of the reset shaft, inasmuch as, shortly after the beginning of the clockwise rotation of the shaft, the pawl 1136 drops behind the notch 1135 and prevents return movement of the disc 1134. The pawl 1136 and the disc 1134 constitute what is known in the art as a "full-stroke device."

The disc 1134 is also provided with a notch 1137, which is normally engaged by a locking pawl 1138 (Fig. 54). The locking pawl 1138 is pivoted on the beforementioned stud 1102 and normally prevents reset operation of the consecutive number means. Before the consecutive numbering means can be reset to zero, it is necessary to withdraw the pawl 1138 from engagement with the disc 1134. This is accomplished in the manner presently described, under control of the lock slide 123.

*Lock control slide*

The machine is provided with a control slide 1139 (Fig. 54) slidably mounted on two studs 1140 and 1141, carried by the side frame 181 of the machine. The control slide can be moved into three different positions; in one position the machine is locked against operation; in another position the machine may be operated; and in a third position the consecutive number may be reset and the date may be changed.

Mounted on the control slide 1139 is the beforementioned lock slide 123, the lock on which projects through a slot 1142 of the cabinet 128. The slot 1142 is provided with an index pointer 1143 (Fig. 2) to aid the operator in positioning the slide 1139. When the slide 1139 is in its intermediate position—that is, with the legend "Register" opposite the index pointer 1143— the machine may be operated, but the consecutive number reset and date setting mechanisms are locked against operation. When the slide 1139 is moved upwardly (Fig. 2) to position the legend "Locked" opposite the index pointer 1143, the machine cannot be released for operation. When the slide 1139 is lowered to position the legend "Consecutive No. Reset" opposite the index pointer 1143, the consecutive number reset mechanism is unlocked, and the mechanism for setting the date, to be described hereinafter, is also unlocked.

The lock 123 is provided with a bolt 1144, which may be moved into locking contact with a keeper 1145, carried on the beforementioned studs 1140 and 1141. In order to shift the slide from its normal position to either of its two adjusted positions, it is necessary to first disengage the bolt 1144 from the keeper 1145 and thereafter to move the slide 1139 to the desired position.

The control slide 1139 is provided with a cam slot 1146 (Fig. 54), which engages a stud 1147 on a three-armed member 1148. The three-armed member 1148 is mounted on a stud 1149 supported by the frames 1128. A downwardly-extending arm of the three-armed lever 1148 is bifurcated to engage a stud 1150 on the beforementioned locking pawl 1138.

When the slide 1139 is lowered, as viewed in Fig. 2, to position the legend "Consecutive No. Reset" opposite the index pointer 1143, the cam slot 1146 raises the stud 1147 and rocks the three-armed member 1148 counter-clockwise. Counter-clockwise movement of the three-armed member 1148, through the stud 1150, rocks the locking pawl 1138 clockwise to withdraw it from engagement with the notch 1137 of the locking disc 1134. This frees the reset wheel 126 and permits the consecutive number wheels 1071 to be reset to zero in the manner described hereinbefore. When the control slide 1139 is moved upwardly, as viewed in Fig. 2, to position the legend "Locked" opposite the index pointer 1143, the stud 1147 remains in the horizontal section (Fig. 54) of the cam slot 1146, and therefore the locking pawl 1138 remains in its locked position.

A retaining pawl 1151 (Fig. 54), pivotally mounted on the beforementioned stud 1140, is spring-urged in a counter-clockwise direction by a spring 1152, to position a stud 1153 on the pawl 1151 into a notch in the lower edge of the control slide 1139 to maintain the slide in either of its three adjusted positions.

The three-armed member 1148 is provided with a leftwardly-extending arm (Fig. 54), which is bifurcated to engage a stud 1154 of a locking pawl 1155 in engagement with a locking wheel 1156 on the date setting wheel 124. When the three-armed member 1148 is rocked counter-clockwise by shifting the slide 1139 downwardly, as viewed in Fig. 2, to position the legend "Consecutive No. Reset" opposite the index pointer 1143, the three-armed member 1148, by engagement with the stud 1154, rocks the locking pawl 1155 clockwise to disengage it from the locking wheel 1156. The locking wheel 1156 is secured to rotate with the date setting wheel 124. Thus it is clear that, when the control slide 1139 is moved to the "Consecutive No. Reset" position, the date wheels can also be adjusted.

When the control slide 1139 is moved to its lower position to unlock the consecutive number reset mechanism and the date setting mechanism, the machine release shaft 264 (Fig. 54) is locked against movement. To lock the release shaft 264 against movement, the control slide 1139 is provided with a surface 1157, which is brought into the path of a stud 1158 when the control slide 1139 is moved into its "Consecutive No. Reset" position. The stud 1158 is mounted on the upper arm of a bell crank 1160, pivoted on the link 939, and the bell crank is spring-urged to normally maintain the stud 1158 in contact with the link. The flexible connection thus provided is to enable service men to obtain access to the machine when the machine requires service under certain conditions which are not pertinent to an understanding of the invention herein described. The surface 1157, when moved below the stud 1158, therefore, prevents any releasing movement of the shaft 264 while the date is being changed or the consecutive number is being reset to zero. The machine release shaft 264 is also locked against movement when the slide 1139 is moved upwardly (Fig. 2) into its locked position. When the slide is moved into its locked position, a cam surface 1159 on the slide 1139 engages the stud 1158 and rocks the link 939 upwardly, thus rocking the release shaft clockwise. Clockwise movement of the release shaft 264 releases all of the keys which may have been depressed on the keyboard. With the shaft 264 held in this clockwise position, any key on the keyboard may be depressed, but the key will immediately move into its undepressed position upon removal of the operator's finger from the key. The above mechanism, therefore, provides an effective means for preventing any operation of the machine while the slide 1139 is in its locked position. The effect of rocking the release shaft 264 in a clockwise direction by the cam surface 1159 is the same as though the Release key 119 is depressed to release keys on the keyboard as described hereinbefore. Therefore, if desired, the Release key 119 may be depressed first to raise the stud 1158 and thereafter move the slide 1139 into its locked position. This would eliminate some of the force necessary to cam the stud 1158 into its upper position by the slide 1139.

DATE SETTING MECHANISM

Type wheels 1161 (Figs. 77, 90A and 90B) are provided to print dates on the insertable slip and the issuing tape. No date printing wheels are provided for printing the date on the audit strip. Four type wheels 1161 are provided in the slip printing section of the printing mechanism, so that the month, the day, and the year can be printed on the deposit slip. Only three type wheels 1161 are provided in the issuing tape printing section, and these wheels are provided to print the month and the day only. No date printing wheels are illustrated in the audit tape printing section, inasmuch as it is not necessary to date the entries on the audit tape in the system illustrated herein.

Figure 77:
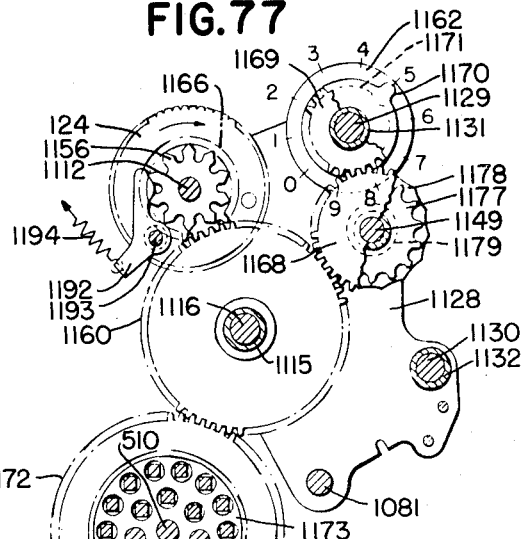
Fig. 77 is a detail view of the date-setting mechanism.

The date type setting wheels 1161 are adjusted by the date setting wheel 124 (Figs. 2 and 77). In addition to setting the type wheels 1161, indicating wheels, including a units indicator 1162, a tens of day indicator 1163, a month indicator 1164, and a year indicator 1165, are provided, which are visible through the opening 125 in the cabinet of the machine to aid the operator in properly adjusting the type wheels 1161.

The date setting wheel 124 has secured to its side a pinion 1166 (Figs. 54 and 77) meshing with a gear 1160 rotatably mounted on the sleeve 1115. The gear 1160 meshes with a gear 1168 rotatably mounted on the stud 1149. The gear 1168 meshes with a gear 1169 mounted to rotate on the sleeve 1131. The gear 1169, together with a Geneva tens transfer member 1170 and a locking disc 1171, is secured to the units indicator 1162.

Rotating the date setting wheel 124 clockwise, through the gears 1166, 1160, 1168 and 1169, adjusts the indicator 1162 in a counter-clockwise direction to advance the units date indicator.

Also meshing with the gear 1160 is a ring gear 1172 rotatably mounted on a disc 1173 carried by the shaft 510. The ring gear 1172 is provided with internal teeth meshing with a pinion 1174 mounted on a square shaft 1175. The square shaft 1175 extends across the machine, and a pinion, similar to the pinion 1174, is provided to adjust the units of day type wheel in the slip printer and the issuing tape printing sections. The pinion, similar to the pinion 1174 in the printer section, meshes with internal teeth of ring gears 1176, which mesh with the units of day type wheels 1161 in the slip and issuing tape printers.

Therefore, when the date setting wheel 124 is rotated until the proper numeral appears on the indicator, the type elements 1161 are adjusted a similar extent. When the units of day type wheel passes from 9 to 0, the Geneva tens transfer member 1170 engages in a tooth space of a Geneva transfer gear 1177, rotatably mounted on the stud 1149. A locking disc 1178, coacting with the locking disc 1171, prevents rotation of the Geneva tens transfer mechanism except when the tooth of tens transfer disc 1170 is effective to rotate the gear 1177 in a manner well known in the art. Secured to the assembly including the gear 1168, the Geneva tens transfer gear 1177, and the disc 1178, is a hub 1179, also connected to a gear 1180. The gear 1180 meshes with a gear 1181, secured to a tens of days date indicator. By this Geneva tens transfer mechanism, the tens of days indicator is advanced one step each time the units of day indicator passes from 9 to 0. A similar Geneva tens transfer mechanism is provided between the tens of days indicator and the month indicator 1164 and consists of a Geneva transfer member 1182, similar to the member 1170, which engages a gear 1183, secured to a gear 1184. The gear 1184 meshes with a gear 1185 secured to the month indicator 1164. The Geneva transfer mechanism between the tens of days indicator 1163 and the month indicator 1164 is so constructed that, each time the tens of days indicator moves from "3" to a blank position, the month indicator 1164 will be advanced one step. The month indicator 1164 is also provided with a Geneva tens transfer mechanism 1186, meshing with a Geneva gear 1187. A locking disc 1188 is provided on the month wheel and coacts with a locking disc 1189 secured to the gear 1187. The gear 1187 and the locking disc 1189 are pinned to the stud 1149, to which stud is also pinned a gear 1190, meshing with a gear 1191 on the year indicator 1165. The Geneva transfer member 1186 is arranged to advance the year wheel 1165 one step each time the month wheel 1164 passes from "December" to "January."

Each gear 1180, 1183, and 1190 meshes with a ring gear 1172, similar to that provided in the units type wheel setting mechanism, to adjust the corresponding type wheels in the manner described for the units of days type setting.

An aligning pawl 1192 (Fig. 77), pivoted on a stud 1193, carried by the right-hand frame 1128, is provided to maintain the date setting wheel 124 in its adjusted position to properly align the indicator wheels 1162 and the units type wheel 1161 in set position. A spring 1194, attached to the pawl 1192, constantly urges the pawl into engagement with the aligning wheel 1156.

The use of the Geneva tens transfer between the date setting indicators and wheels makes it possible to adjust the type wheels forwardly and reversely.

TYPE WHEEL ALIGNING MECHANISMS

After the type wheels have been adjusted by the ring gears, by their respective differential mechanisms, the ring gears are all aligned by aligners 1201 (Figs. 8, 71, 90A and 90B). An aligner is provided in each printing section; that is, for the slip printer, audit tape printer, and issuing tape printer sections, as shown in Figs. 90A and 90B. The three aligners 1201 are pinned to a shaft 1202 supported by, and extending between, the frames 203. Also pinned to the shaft 1202 is an arm 1203, conected to a cam arm 1204 by a link 1200 and an arm 12041. The cam arm 1204 is pivoted on the shaft 786 and is provided with two rollers 1205, coacting with a pair of cams 1206 (see also Fig. 23) pinned to the main cam shaft 229. The cam arm 1204 is resiliently connected to the arm 12041 by a spring 12043 which urges the arm 12041 into contact with a stud on the cam arm 1204.

Figure 71:
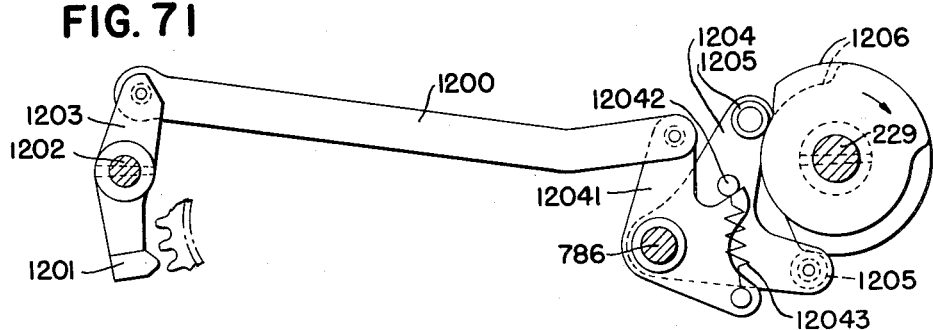
Fig. 71 is a detail view showing the mechanism for aligning the type-wheel-setting ring gears.

The cam plates 1206 are so formed that, immediately after the ring gears, carried by the shaft 510, are adjusted by their respective differential mechanisms, the cams 1206 rock the cam arm 1204 and arm 12041, counterclockwise to move the link 1200 to the left, as viewed in Fig. 71. This movement, through the arm 1203 and the shaft 1202, rocks the aligners into engagement with the ring gears to align them according to their differential setting. The aligners 1201 compensate for any lost motion between the ring gears and the differential mechanism, and the spring connection 12043 provides a cushion if the aligner 1202 should strike a tooth on the ring gears.

Figure 72:
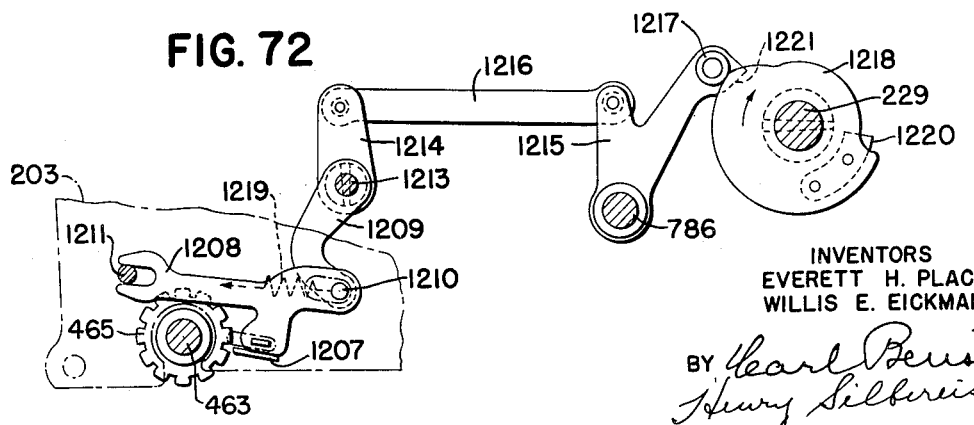
Fig. 72 is a detail view showing the mechanism for aligning the type wheels.

Just before the printing takes effect in the manner described hereinafter, a second aligner is moved into engagement with the type wheels themselves to align the type wheels accurately at the printing line. This aligner consists of a bar 1207 (Fig. 72), for each group of type wheels; that is, one in the slip printer section, one in the audit tape section, and one in the issuing tape section. Each bar 1207 is supported by two links 1208, connected at their right-hand ends, as viewed in Fig. 72, to an arm 1209 by a rod 1210. The left ends of the links 1208 are bifurcated to engage and slide on a rod 1211, which is supported in the plates 203. An aliner bar and its actuating mechanism are provided in each printer section. The arms 1209, one for each printer section, are all pinned to a shaft 1213, to which is also pinned an arm 1214. The arm 1214 is connected to a cam arm 1215 by a link 1216. The cam arm 1215 is pivotally mounted on the shaft 786 and carries a roller 1217 normally held in engagement with a cam 1218 by a spring 1219. The cam 1218 is secured to the main cam shaft 229. The cam arm 1215 is provided with a nose 1221, which is engaged by a block 1220, riveted to the side of the cam plate 1218 when the cam rotates.

The cam 1218 is so formed that, after the type wheels are positioned and the aligner 1201 has been engaged with the ring gears in the manner described above, the bar 1207 is snapped into position to align the type carriers just before the printing takes place. Clockwise rotation of the cam 1218 brings the surface of the block 1220 into the path of the nose 1221 on the cam arm 1215. When the block 1220 moves beyond the nose 1221, the spring 1219 snaps the link 1216 and the cam arm 1215 clockwise to rock the arm 1214, the shaft 1213, and the arms 1209 clockwise to snap the bar 1207 into engagement with the teeth on the type carriers.

Certain of the type wheels are ten-space wheels, while others are twelve-space wheels, such as those for setting up the date. In order to properly engage all of the type carriers of a group, the bar 1207 is slightly off-set, so that it will engage between teeth of the type carriers to properly align all of the printing characters at the printing line.

RECEIPT SYMBOL AND MACHINE NUMBER TYPE WHEELS AND ALIGNER

A type wheel 1225 and two type wheels 1226 (Fig. 90A) are provided to print the symbol, such as the word "Paid," and the company name as illustrated in Figs. 102 to 106, and a machine number, respectively, on the inserted slip. These type wheels are set when the machine is assembled and are not readjusted during a machine operation. An aligner 1227, mounted on the shaft 1202, engages with the teeth of ring gears 1228, meshing with the type wheels 1225 and 1226. The aligner is held in position to engage the ring gears 1228 by a screw 1229, which passes through a flange on the aligner and is screwed into the cross bar 201. To change the setting of the type wheels 1225 and 1226, the screw 1229 is removed, and the aligner is manually rocked on the shaft 1202 to release the ring gears 1228, whereupon the type wheels can be manually adjusted to any desired position, after which the aligner is again secured in place by the screw 1229. The data printed by the type wheels 1225 and 1226 is illustrated in Figs. 102 and 103 and appear between the date and the consecutive number.

A modification of the above structure is illustrated hereinafter when it is desired to use an insertable cashier's key to identify the cashier who is operating the machine. In such an event the type wheels 1226 are set by the insertion of a key and the stationary aligner 1227 is omitted.

INSERTABLE SLIP PRINTER

In the herein-illustrated system for a telephone company, the machine is adapted to print on insertable slips, such as a telephone bill (Fig. 102), a bank check (Fig. 103), a customer's receipt (Fig. 104), an accounting department slip (Fig. 106) or a telephone bill where the stub and bill have been separated (Fig. 105). The data to be printed includes the date, the symbol identifying the company with the word "Paid," the machine or cashier number, a consecutive number, a symbol for the transaction, a symbol representing the kind of entry and the amount of the payment. The printing mechanism for printing on the insertable slip is located at the lower left-hand corner of the machine, as shown in Fig. 1.

The machine is constructed for handling accounts in various ways. Bills sent to customers usually comprise a main section and a stub section (Fig. 102). Both sections are validated, and the main section is given to the customer as a receipt.

If the bill is paid in cash, the above validation is all that is necessary. However, when the bill is paid by check, the check is placed in the slip printer, and the machine operated by depressing the Repeat key 114, which prints the date (Fig. 103) which was previously printed on the two sections of the bill. By duplicating this data on the check, a method is provided for settling disputes if any should arise, by comparing the data on the receipt with the data on the check.

Fig. 105 illustrates the method of printing the data on the main section of the bill and on the stub section if the stub is separated from the bill.

In some transactions, such as when only a stub is presented, the stub alone is placed on the slip table and the data printed thereon under control of a transaction key (Fig. 104). During this operation only one impression is made to form a receipt for the customer. In this case the accounting department slip is formed by inserting a slip (Fig. 106) into the slip printer and the machine operated by the Repeat key 114. This duplicates the printing of the data previously entered on the accounting department slip.

Insertable slip printing mechanism

The statement 1241 (Fig. 102), the check 1242 (Fig. 103), the customer's receipt 1236 (Fig. 104), accounting slip 1239 (Fig. 106) or the stub 1238 and statement 1237 (Fig. 105) is positioned on a slip table 1243 (Figs. 1 and 94) supported on the frames 181 and 192 (Figs. 8 and 92A). Guide lines 1236 and 1244 (Fig. 1) are engraved on the slip table to guide the cashier in positioning the slips on the slip table 1243 in the proper relationship with the printing wheels in the slip printing section. The pertinent line is governed by the slip inserted. All of the slip printing mechanism is located between the frames 181 and 192, and the slip table 1243 is provided with an opening 1245, through which a printing hammer 1246 (see also Fig. 100) is moved to carry the inserted slip and a ribbon 1247 against the type wheels to make an impression. The printing hammer 1246 is carried by a support 1248 guided on a stud 1249 carried by the frame 192 and a similar stud 1249 carried by the frame 181. Each end of the supporting member 1248 has a stud 1250, which projects into a notch 1251 formed in each of the side frames 181 and 192 (see also Fig. 92A). The studs 1249 and 1250, therefore, provide a means for guiding the printing platen in its vertical or up-and-down printing movements.

Mounted on each end of the supporting member 1248 is a stud 1252 (Figs. 92A and 100), which are engaged by the bifurcated ends of bell cranks 1253 secured to a shaft 1254 pivotally supported in the frames 181 and 192. Connected to the bell crank 1253, adjacent the frame 192, is a link 1255, the right-hand end of which is slotted to engage over a stud 1256 to guide the link 1255 in its movements. A spring 1257, connected to the link 1255 and a suitable stud on the frame 192, normally maintains the hammer in its lower position, the stud 1256 acting as a stop for the link 1255 when held in its normal position, shown in Fig. 100. The right-hand end 1258 of the link 1255 is offset into the plane of a stud 1259, which acts as a pivot between an arm 1260 and a toggle link 1261. The stud 1259 is shouldered to provide space between the link 1261 and the arm 1260, into which space the end 1258 of the link projects. The arm 1260 is mounted on a stud 1262, carried by the frame 192. A stud 1263 on the frame 192 acts as a limiting stop for the arm 1260. A second toggle link 1264 is connected to the toggle link 1261 by a stud 1265, and the opposite end of the toggle link 1264 is pivoted to an arm 1266, pivoted on a stud 1267 carried by the frame 192. A stud 1268 on the frame 192 acts as a limiting stop for the arm 1266 when in its home position. The stud 1265 projects laterally from the link 1264 and into a bifurcated end of a cam arm 1269, pivoted on a shaft 1325 carried by the frames 181, 192, 193, and 180 (Fig. 92B).

The cam arm 1269 is provided with two antifriction rollers 1271, which are acted upon by a pair of cams 1272 secured on the printer shaft 1273.

The printer cam shaft 1273 is rotated from the main cam shaft 229 (Fig. 52) by the train of gears including the gears 230, 231, and 879. Meshing with the gear 879 is a gear 1274 (see also Fig. 92B), secured to the printer cam shaft 1273. The ratio of the train of gears 230, 231, 879, and 1274 is such that one complete rotation of the main cam shaft 229 rotates the printer cam shaft 1273 one complete rotation.

Counter-clockwise rotation of the cams 1272 (Fig. 100) rocks the cam arm 1269 first clockwise and then counter-clockwise, back to its home position. Clockwise movement of the cam arm 1269, acting on the toggle stud 1265, tends to straighten the toggle composed of links 1261 and 1264. If the arm 1266 is held against clockwise rotation, the toggle is straightened and the arm 1260 is rocked counter-clockwise. Counter-clockwise movement of the arm 1260 moves the link 1255 toward the left (Fig. 100) to rock the bell cranks 1253 clockwise, which, through the studs 1252, raises the printing hammer 1246 to take an impression from the type wheels onto the inserted slip.

The extent of rocking movement of the arm 1269 is such that the toggle links 1261 and 1264 are moved into a horizontal position and beyond to again break the toggle joint. Therefrom when the arm 1269 is restored in a counter-clockwise direction, the toggle links 1261 and 1264 are again straightened before they are broken, upon their return to their normal position. This movement is taken advantage of in controlling the printing hammer for making one or two impressions. The first impression is made when the toggle is straightened during the clockwise movement of the cam arm 1269, and the second impression is made when the cam arm 1269 is returned counter-clockwise to its home position.

Whether the platen is operated to make one impression, two impressions, or no impression at all depends upon whether or not the arm 1266 is blocked against clockwise movement. The blocking of the arm 1266 is effected by a segment 1275, pivoted on a shaft 1276, carried by the frames 181 and 192 (Fig. 92B). If the segment 1275 is rocked counter-clockwise before the cam arm 1269 is rocked clockwise, the segment 1275 moves under a stud 1240 on the arm 1266. If the segment 1275 is held under the stud 1240 during both the clockwise and counter-clockwise movements of the cam arm 1269, two impressions will be made. If only one impression is to be made, the segment 1275 is withdrawn from beneath the stud 1240 prior to the counter-clockwise return movement of the cam arm 1269. If, on the other hand, no impression at all is to be made during the machine operation, the segment 1275 is controlled to remain in the position shown in Fig. 100, and therefore no impression will be made during either the clockwise or the counter-clockwise movement of the cam arm 1269.

The selective movement of the segment 1275 is controlled by notched discs 1277 (Fig. 99) and 1278 (Fig. 100). The notched disc 1277 is adjusted under control of the second transaction bank through the square shaft 763 in a manner hereinbefore described for the setting of the other notched control plates. The notched disc 1277 is mounted on a disc 1279 and is provided with internal teeth meshing with a pinion on the square shaft 763, and the disc 1279 is mounted on the shaft 632.

The notched disc 1278 is provided with internal teeth mounted on a disc 1280, carried by the shaft 632, and said internal teeth mesh with a pinion on the square shaft 743, which shaft, as hereinbefore described, is adjusted under control of the first transaction bank of keys.

The discs 1277 and 1278 have notches, some of which are deeper than others. Coacting with the periphery of the notched discs 1277 and 1278 is a feeler mechanism, comprising a stud 1281 in the plane of the discs 1277 and 1278. The stud 1281 is mounted on a feeler link 1283.

The link 1283 is slotted to slide on a stud 1288 at its left end, and is pivoted on an arm 1289 at its right-hand end. The arm 1289 is pivotally mounted on a shaft 1290, and a rearwardly-extending arm 1291 of the arm 1289 has pivoted thereto a link 1292, the lower end of which is pivoted to the segment 1275. A spring 1293, one end of which is connected to the stud 1288, and the other end of which is connected to the pivot stud on the arm 1289, biases the link 1283 toward the discs 1277 and 1278. In the normal position of the arm 1291, a stud 1294 thereon rests on a shoulder of an arm 1295 (see also Fig. 101), secured to the shaft 1290. Also secured to the shaft 1290 is a cam arm 1296 (see also Figs. 92B and 108). The cam arm 1296 has two anti-friction rollers 1297, engaging a pair of cams 1298 on the main cam shaft 229 (Figs. 92B and 108).

During the operation of the main cam shaft 229, the cams 1298 rock the shaft 1290 and thereby lower the arm 1295 (Fig. 101), thus permitting the link 1292, together with the segment 1275, to move the latter beneath the stud 1240, if permitted to do so by notches in the discs 1277 and 1278.

If, when the arm 1291 starts to rock clockwise under control of the cams 1298, the stud 1281 contacts the outer periphery of one or the other of the control discs 1277 or 1278, the feeler link is immediately arrested, thus preventing the arm 1291 from moving clockwise, thereby holding the link 1292 in its normal position to thereby prevent the segment 1275 from moving beneath the stud 1240. Under this condition, no impression is made when the cam arm 1269 later moves the stud 1265. The resistance met by the stud 1259, due to the spring 1257 and the weight of the parts, including the link 1255, the bell crank 1253, and the hammer 1246, prevents the arm 1260 from rocking counter-clockwise. This causes the arm 1266 to rock clockwise, and therefore the link 1255 is not moved to operate the printing hammer.

If, when the arm 1291 is released under control of the cams 1298, the stud 1284 enters notches in both the discs 1277 and 1278, the arm 1291 is free to rock clockwise, thus lowering the link 1292 and moving the segment 1275 counter-clockwise beneath the stud 1240. Thereafter, upon rocking movement of the arm 1269, the arm 1266 is maintained against clockwise rotation, and therefore the toggle consisting of the links 1261 and 1264 is straightened to rock the arm 1260 to shift the link 1255 and the bell crank 1253 to raise the printing hammer 1246 to make an impression.

If the stud 1281 enters deep notches such as those shown in positions 4 to 9 of the notched disc 1277, which positions correspond to the "A" to "M" positions of the second transaction bank, and in positions 2, 3, 5, and 10 in the disc 1278, which positions correspond to the "Notifier," "List," "Repeat," and "Neutral" positions of the first transaction bank, means presently described controls the segment 1275 to remain under the stud 1240 during both the clockwise and counter-clockwise movements of the cam arm 1269, and therefore two impressions are made, one during the clockwise movement of the arm 1269 and the other during its counter-clockwise movement.

After the two impressions have been made, the cams 1298, coacting with the rollers 1297, restore the cam arm 1296, the shaft 1290, and the arm 1295 counter-clockwise to their home positions. During this movement, the arm 1295, engaging the stud 1294, restores the arm 1291, the link 1292, and the segment 1275 to their home positions and withdraws the stud 1281 from the notches in the discs 1277 and 1278.

In operations of the machine when the stud 1281 enters a shallow notch of either disc 1277 or 1278, the feeler link 1283 and therefore the arm 1291 are not moved so great an extent as when the stud 1281 enters deep notches. When this condition exists and the cam arm 1296 is rocked clockwise to rock the arm 1295 likewise, the arm 1291 and the link 1292 are moved an extent less than when the stud enters deep notches. Upon continued movement of the arm 1295, after the link 1292 is arrested, a surface 1300 of the arm 1295 (Fig. 101) is moved beyond a stud 1301 of a pawl 1302 pivotally mounted on a stud 1303, which forms a pivot point between the arm 1291 and the link 1292. A spring 1304, stretched between the stud 1301 and the stud 1294, normally tends to rock the pawl 1302 clockwise. Therefore, when the surface 1300 moves beyond the stud 1301, the spring 1304 rocks the pawl 1302 clockwise to follow an inclined surface 1305 of the arm 1295. This clockwise movement of the pawl 1302 positions its end 1306 into the path of a finger 1351 of a cam arm 1350, pivoted on the shaft 1290, the latter having a roller 1349 held in engagement with a cam 1348 (Figs. 100 and 101), on the main cam shaft 229, by a spring 1352. The cam 1348 permits the arm 1350 to rock first clockwise under the influence of the spring 1352 (Fig. 101) and then back to home position. When the cam 1348 restores the cam arm 1350 to its home position, the finger 1351 engages the end 1306 of the pawl 1302 and moves the pawl 1302, together with the link 1292, upwardly. This movement takes place prior to the time the cam arm 1269 receives its counter-clockwise movement, and therefore, when the link 1292 is moved upwardly by the finger 1351, the segment 1275 is withdrawn from beneath the stud 1240. Therefore the second impression does not take place.

When the stud 1281 enters the deep notches in discs 1277 and 1278, the link 1292 partakes of the entire movement of the arm 1295, and therefore the surface 1300 is never withdrawn from contact with the stud 1301, and the end 1306 of the pawl 1302 remains out of the path of the finger 1351. During the restoring movement of the arm 1350, the finger 1351 does not contact the end 1306 of the pawl 1302, and therefore the link 1292 is restored to its home position after the second impression has been made, in the manner described above.

Slip feeling mechanism

A slip feeling mechanism is provided in the machine so as to disable a second printing operation of the printing hammer if no slip is placed on the slip table 1243 (Fig. 94).

The slip feeling mechanism includes a feeler 1315 (Figs. 94 and 98), which is arranged to enter an opening 1316 of the slip table 1243 to feel for the presence of a slip. If no slip is on the table and the machine is operated, the slip feeler 1315 is raised to thereby present an obstruction into the path of movement of the link 1292, the arm 1289, and the pawl 1302 (Figs. 97 and 100) to such a position that the link 1292, the arm 1289, and the pawl 1302 can later withdraw the segment 1275 from beneath the stud 1240, so that the toggle links 1261 and 1264 will not actuate the arm 1269, the link 1255, and the hammer 1246 during the return stroke of the arm 1269, so that a second impression will not take place.

The feeler 1315 (Fig. 98) is guided in its upward and downward movements by the beforementioned shaft 1254 and a shaft 1317, carried by the frames 181 and 192. The lower end of the slip feeler 1315 is pivoted to a bell crank 1318, secured on a shaft 1319, carried by the frames 181 and 192. The lower arm of the bell crank 1318 has connected thereto a spring 1320, the other end of which is secured to a stud 1321 on the frame 192. Also secured on the shaft 1319 is an arm 1322, to which is pivoted a link 1323 at one end, the other end of the link being connected to an arm 1324 (see also Fig. 95) pivoted on the shaft 1325, carried by the frames 180, 181, 192, and 193. The arm 1324 has a finger 1326, which is normally held against a flange 1327 (Fig. 98) of a pawl 1328, pivoted on a stud 1329 of a cam follower arm 1330, by the spring 1320. The flange 1327, therefore, provides a means for locating the feeler finger 1315 in respect to the slip table 1243. The cam follower arm 1330 is pivoted on the shaft 1325 and has an anti-friction roller 1331, held in engagement with a cam 1332 on the printer cam shaft 1273 by a spring 1333 stretched between a stud on the arm 1330 and a stud on a segment 1334 secured to the shaft 1276.

Also secured to the shaft 1276 is a segment 1335 (Fig. 97), located in respect to a flange 1336 on the link 1292, so that, upon the segment 1335 being rocked counter-clockwise, the segment moves into the path of movement of the flange 1336 and limits a downward movement of the link 1292. The segment 1334 is integral with an arm 1337 (Fig. 96), the arm 1337 being provided with a stud 1338, which projects into a notch in an arm 1339, pivotally mounted on the shaft 1325. The arm 1339 is integral with a segment 1340, the outer periphery 1341 of which is slightly lower than the periphery 1342 of the arm 1324 (Fig. 95).

When the printer cam shaft 1273 is rotated counter-clockwise (Fig. 98), the spring 1333 rocks the cam follower arm 1330 counter-clockwise to carry the pawl 1328 and its flange 1327 away from the finger 1326 of the arm 1324. Movement of the flange 1327 away from the finger 1326 releases the arm 1324 and the link 1323 to the action of the spring 1320, rocking the bell crank 1318 counter-clockwise to raise the feeler 1315 to feel for a slip in the machine. If no slip is present on the slip table 1243, the slip feeler 1315 is permitted to rise, and therefore the spring 1320 moves the link 1323 to the right (Fig. 98) to cause the finger 1326 to follow the flange 1327. Counter-clockwise movement of the cam follower arm 1330 to its fullest extent moves the flange 1327 beyond the surface 1343 of the segment 1340 (Fig. 96), whereupon the flange 1327 drops behind the surface 1343. This movement is permitted by a notch 1344 in the arm 1324 and is effected by a spring 1345 stretched between a stud on the pawl 1328 and the cam arm 1330. When the flange 1327 is in the notch 1344 and behind the surface 1343 of the segment 1340, and the cam follower arm 1330 is restored to its home position by the cam 1332, the pawl 1328 rocks the segment 1340 clockwise, thus rocking the arm 1337 and the shaft 1276 counter-clockwise (Figs. 96, 97, and 98). Counter-clockwise movement of the shaft 1276 moves the segment 1335 (Fig. 97) into the path of movement of the flange 1336 to limit downward movement of the link 1292, which prevents the second operation of the printing hammer in the manner described above.

If a slip is present on the slip table 1243, then, when the slip feeler 1315 begins to rise, the feeler is arrested by coming into contact with the inserted slip, and therefore the feeler 1315, the bell crank 1318, the shaft 1319, the link 1323, and the arm 1324 are arrested. Thereafter, when the cam arm 1330 is rocked counter-clockwise, the flange 1327 of the pawl 1328 rides on the periphery 1342 of the segment 1324, and the flange 1327 cannot drop into the path of the surface 1343 of the segment 1340. If the flange 1327 cannot drop into the path of the surface 1343, the flange 1327 is held out of the path of the surface 1343 of the segment 1340, and therefore, upon return movement of the cam arm 1330, the flange of the pawl 1328 does not rock the segment 1340, which results in the shaft 1276 being held stationary, and the segment 1335 (Fig. 97) is held out of the path of the flange 1336 of the link 1292. Therefore, when a slip is on the slip table 1243, the link 1292 is free to operate to control the operation of the printing hammer, in a manner described hereinbefore.

Slip feed tension rollers

In order to space the printed data on the slips (Figs. 102 and 105), so that the two impressions can be made, one for each section thereof, mechanism is provided for feeding the slip between the two impressions. The feed rollers are normally separated so that the slips can be easily inserted into the machine. Immediately after the machine begins to operate, the feed rollers are brought together to grip the inserted slips, not only during the feeding movements but also at the time the printing takes place, to maintain the inserted slips in proper position.

The mechanism for controlling the tension rollers is shown in Figs. 108 and 111. Two upper feed rollers 1355 are rotatably mounted on the stationary shaft 204. Two tension rollers 1356 (Figs. 92A, 108, and 111) are provided, which are movable to come into contact with the stationary rollers 1355 immediately the machine begins to operate. The tension feed rollers 1356 are coupled together by a sleeve 1357 and are rotatably mounted on a shaft 1358 carried by two arms 1359 securely mounted on the beforesaid shaft 1317. Also secured to the shaft 1317 is an arm 1360 (Figs. 92A and 111), which is connected to a cam arm 1361, on the shaft 1325, by a link 1362 (see also Fig. 92B). The cam arm 1361 is provided with an anti-friction roller 1363, held in engagement with a cam 1364, secured to the hub of the beforementioned cam 1332 (see Fig. 92B), whereby the cam is secured to the printer cam shaft 1273. A spring 1365, connected at one end to one of the arms 1359 and at the other end to a stud on the frame 181, normally maintains the roller 1363 in contact with the periphery of the cam 1364. When the cam 1364 is in its home position, as shown in Fig. 111, the tension roller 1356, in its lower position, is out of contact with the stationary feed rollers 1355, thus clearing the opening for inserting the slip into proper position for receiving the impression.

Immediately upon the beginning of the operation of the machine, the cam 1364 rotates counter-clockwise, thus permitting the spring 1365 to rock the cam arm 1361 clockwise, which movement, through the link 1362 and the arm 1360, transmits similar clockwise rotation to the shaft 1317, thus raising the roller-supporting arms 1359 to bring the tension rollers 1356 into contact with the inserted slip and pressing it against the stationary feed rollers 1355. Near the end of the machine operation, after all impressions have been made, the cam 1364 rocks the cam arm 1361 counter-clockwise to restore the tension feed rollers 1356 to their normal positions, shown in Fig. 11.

Slip feed mechanism

After the tension rollers 1356 are rocked to their upper positions by the cam 1364 and the connecting mechanism therebetween, and after the first impression has been made upon the inserted slip, the tension rollers 1356 are given a counter-clockwise rotation to feed the slip an extent sufficient to present the next printing line to the printing position.

Means, to be presently described, is provided in the machine and can be manually set to vary the extent of the feeding of the insertable slip in accordance with a particular form being used in the machine. This variable feed provides a convenient means to adapt the machine to whatever form a user may want to adopt.

The mechanism for feeding the inserted slip is normally ineffective to rotate the feed rollers 1356 but is controlled from the keys of the first and second transaction banks, so that the feed mechanism will be operative only during the machine operation in which printing takes place. If the printing mechanism is automatically thrown off in the manner described hereinbefore, the feed mechanism is also thrown off. On the other hand, if the printing mechanism is thrown on to effect a print, the feed mechanism is also thrown on, so that the slip will be fed to space the two printed records.

Secured to one end of the shaft 1358 (Figs. 92A, 108, and 110) is a pinion 1370 in mesh with a rack 1371. The rack 1371 is connected to a lever 1372 by a link 1373. The lever 1372 is pivoted on a stud 1374 mounted on the side frame 181 and is provided with a stud 1375 at its lower end, normally held against the end of a pusher slide 1376 by a spring 1377. The pusher slide 1376 is slotted to slide on a guide stud 1378 mounted on the side frame 181. Pivoted at the rear end of the pusher slide 1376 is a cam arm 1379 pivoted on the beforementioned shaft 1325. The cam arm 1379 is provided with an anti-friction roller 1380, held in engagement with the periphery of a cam 1381, secured to the printer cam shaft 1273, by the spring 1377.

The pusher slide is provided with a stud 1382, which is normally engaged by a lateral extension 1383 of a vertically-movable pitman 1384. The pitman 1384 is controlled in its movements by control discs differentially set under control of the first and second transaction banks of keys, in a manner to be described hereinafter, so that, when no feed is required, the extension 1383 remains in the path of the stud 1382, and, when a feed is required, the vertical extension 1383 is lowered out of the path of the stud 1382.

If the extension 1383 is out of the path of the stud 1382 and the printer cam shaft 1273 rotates counter-clockwise, the spring 1377, acting through the lever 1372, the stud 1375, and the pusher slide 1376, causes the roller 1380 to follow the contour of the cam 1381 and thereby rock the cam arm 1379 counter-clockwise. Counter-clockwise movement of the cam arm 1379 moves the pusher slide 1376 to the right (Fig. 108), and the spring 1377 moves the link 1373 to the left, thus moving the rack 1371 to the left to rotate the pinion 1370 clockwise. Clockwise movement of the pinion 1370 rotates the shaft 1358 likewise. However, at this time the shaft 1358 is uncoupled from the feed rollers 1356, and therefore the feed rollers are not rotated. Upon further rotation of the cam 1381, its contour rocks the cam arm 1379 clockwise, thus moving the pusher slide 1376 to the left (Fig. 108), and, through the lever 1372, moves the link 1373 and the rack 1371 to the right, thus rotating the pinion 1370 and the shaft 1358 counter-clockwise. During the counter-clockwise rotation of the shaft 1358, a clutch between the shaft 1358 and the feed rollers 1356 is effective, as will be described hereinafter, to rotate the feed rollers 1356 to space the inserted slip to receive the second impression.

The extent of feeding movement to be given to the inserted slip is controlled by a plate 1385, rotatably mounted on the shaft 1276. The plate 1385 is provided with a plurality of steps 1386 of varying distances from its pivot point. Any of the steps 1386 may be brought into the path of the stud 1382 by removing a screw 1387, which is screwed into the side frame 181 of the machine. Upon removal of the screw 1387, the plate 1385 can be manually positioned in any of its disclosed positions, and, upon reinsertion of the screw 1387, the plate 1385 is held in the desired position. When the pusher slide 1376 is released for movement to the right (Fig. 108) by the contour of the cam 1381, the stud 1382 thereon comes into contact with the step 1386 in its path. The movement given to the slide 1376 is determined by the space between the stud 1382 and the selected step 1386. In the machine used to illustrate the present invention, the steps 1386 are so arranged that the distance between prints on the insertable slip can be varied from .6" to 2" in steps of "2." These dimensions are illustrative only, and any desired dimensions may be used in building the machine.

The clutch arrangement between the shaft 1358 and the feed rollers 1356 is illustrated in enlarged scale in Fig. 112. Secured to the shaft 1358 is a disc 1390 (see also Fig. 110) having a divided cylindrical portion 1391, which projects inwardly into the inner diameter of a ratchet ring 1392. Slidably mounted in the runways in the cylindrical portion 1391 are a pair of one-way drive pawls 1393, which are forced into teeth of a ratchet ring by a spring 1394. The spring 1394 passes through an opening drilled through the shaft 1358, so that the pawls 1393 may be forced outwardly to engage the inner ratchet teeth of the ring 1392. The ratchet ring 1392 is secured to one of the feed rollers 1356 by two studs 1395.

When the shaft 1358 receives its clockwise rotation at the beginning of the operation of the feed mechanism, the feed pawls 1393, camming against the ratchet teeth, are both moved inwardly to disconnect the driving connection between the shaft 1358 and the feed roller 1356. A brake mechanism, described hereinafter, prevents accidental rotation of the feed rollers 1356 during this operation. Upon the counter-clockwise rotation of the shaft 1358, the pawls 1393 form a driving connection between the cylinder 1391 and the ratchet ring 1392, thus rotating the feed rollers 1356 in a counter-clockwise direction to feed the inserted slip from one printing position to the other.

The clutch mechanism shown in Fig. 112 is provided in only one of the feed rollers 1356. However, inasmuch as the two feed rollers are connected together by the sleeve 1357 in the manner hereinbefore described, both feed rollers partake of the rotating movement.

The brake mechanism for the feed rollers 1356, mentioned hereinbefore, consists of a spring-actuated brake 1396 (Figs. 94 and 108), which has a formed end normally held in engagement with one feed roller 1356 by a spring 1397. The brake member 1396 is pivoted on a stud 1398 on an extension of one of the tension arms 1359.

If, when the shaft 1358 receives its initial or clockwise rotation, the feed roller 1356 should tend to be moved clockwise by the clutch pawls 1393, the coaction between the periphery of the feed roller 1356 and the formed end of the brake member 1396 is such that the roller 1356 is wedged against the brake member 1396, and rotation thereof is prevented. The reason for this wedging action is that the point of contact of the formed member of the brake member 1396 is below center of the line drawn between the pivot point of the brake member 1396 and the shaft 1358. Clockwise rotation of the feed roller 1356, therefore, has a tendency to rock the brake member 1396 counter-clockwise thus causing a wedging action, which prevents such rotation of the feed roller 1356.

As disclosed in Fig. 110, each of the feed rollers 1356 is provided with a surface of resilient material such as rubber, to effect a better gripping action therebetween and the stationary rollers 1355.

Means is also provided on the shaft 1358 to prevent any excess rotation of the feed rollers 1356 at the end of a feeding operation. This means includes the cam member 1400 (Fig. 109) secured on the end of the shaft 1358. Normally—that is, when the machine is at rest—the cam 1400 lies in the path of a pawl 1401 connected to a second pawl 1402 by a stud 1403 and holds the pawl 1402 in contact with a ratchet wheel 1404 coupled to the right-hand feed roller 1356. As long as the cam 1400 blocks movement of the pawl 1401, the pawl 1402 is locked in engagement with the teeth of the ratchet wheel 1404, thus preventing any rotation of the feed rollers 1356. However, upon initial clockwise rotation of the shaft 1358, after the feed rollers have been raised into feeding position, the cam 1400 moves away from the pawl 1401, thus permitting a spring 1405, connected to the pawl 1402 at one end and to a stud on one of the arms 1359 at its other end, to withdraw the nose of the pawl 1402 from engagement with the ratchet wheel 1404, thus freeing the rollers 1356 to the action of the feeding mechanism hereinbefore described.

*Automatic slip feed control discs*

The position of the pitman 1384 and its lateral extension 1383 is automatically controlled by notched discs 1410 and 1411 (Figs. 107 and 108). The disc 1410 is provided with internal teeth rotatably mounted on a disc 1412 carried by the shaft 632. The internal teeth of the disc 1410 are in engagement with a pinion 1413 mounted on the beforementioned shaft 763, which is adjusted under control of the second transaction bank in the manner hereinbefore described.

The disc 1411 (Fig. 108) is provided with internal teeth which rotate on a disc 1414, rotatably mounted on the shaft 632. The internal teeth of the disc 1411 mesh with a pinion 1415 carried by the shaft 743, which is differentially positioned under control of the first transaction bank in a manner hereinbefore described.

A stud 1416 is provided to engage the periphery of, or notches in, the discs 1410 and 1411. The stud 1416 is carried by a slide 1420. The slide 1420 is slotted to slide on the beforementioned stud 1288. The beforementioned spring 1299 having one end connected to the stud 1288 and the other end to the pivot stud for the slide 1420, said pivot stud provides a connection between the slide 1420 and the yoke 1423, rotatably mounted on the shaft 1290. The yoke 1423 has one arm 1424 projecting to the right (Fig. 108) carrying the stud 1425, normally held against an arm 1427, pinned on shaft 1290, by the spring 1299. The yoke 1423 is provided with a second arm 1426, to which the upper end of the beforementioned pitman 1384 is pivoted.

When the cam 1298 rocks clockwise as described hereinbefore, to permit the arm 1296 to move clockwise, the stud 1425 and the yoke 1423 are released to the action of the spring 1299, whereupon the slide 1420 tends to move leftwardly (Fig. 108) to bring the stud 1416 into contact with the peripheries or notches of the discs 1410 and 1411. If notches of both said discs are in the path of movement of the stud 1416, the yoke 1423 is rocked clockwise to lower the pitman 1384 and thereby to remove the lateral extension 1383 from the path of the stud 1382, which, as described hereinbefore, results in a feeding movement of the feed rollers 1356.

If an unnotched portion of the periphery of either disc 1410 or 1411 is in the path of the stud 1416, then, during this operation, when the yoke 1423 is released by the cam 1298, the slide 1420 is immediately arrested due to the stud 1416 coming into contact with the periphery of a disc 1410 or 1411. During this operation, the yoke 1423 is not permitted to move, and therefore the pitman 1384 remains in the position shown in Fig. 108, wherein the lateral extension 1383 remains in the path of the stud 1382. During this operation of the machine, the slide 1376 cannot move, and therefore the feed rollers 1356 are not rotated.

AUDIT TAPE PRINTER

An audit tape printing mechanism is provided to receive data comprising a cashier number or the machine number, the consecutive number of the transaction, a symbol identifying the kind of transaction entered into the machine, the amount of the transaction, and a symbol indicating the kind of operation performed when amounts are entered into the machine. When a telephone number is recorded, the audit tape printing mechanism records the cashier's number or machine number, a consecutive number, and the telephone number. The data printed on the audit tape is illustrated in Fig. 120.

The audit tape printer is located in the central front section of the machine (Fig. 1) between the frames 192 and 193 (Figs. 7, 92A, and 92B). The audit tape printing mechanism is carried in a removable carriage, which can be removed from or inserted into the machine at will. The removable audit tape printer slides in and out of the machine on tracks in the base of the machine. The removable printer carriage is normally locked in the machine under the control of the unit lock 123 (Figs. 1, 2, and 54). Moving the unit lock 123 forwardly releases a door latch on the front of the removable carriage, which door is pivoted at its lower end to expose manually operable latches, which latches, when operated, release the removable carriage and permit the operator to pull the carriage forwardly. If the carriage is to be moved forwardly merely for replacing a supply of paper in the audit tape printer, the carriage is slid forward until a positive stop arrests its movement. In this position, all of the feed and guide rollers of the audit tape printer are easily accessible, making it a simple matter to remove any portion of the audit tape therefrom, or to replace a supply of audit tape paper. Withdrawing the audit tape carriage from the machine is a distinct improvement over the usual printer construction, wherein the audit tape feed and guide rollers remain in the machine, making it difficult to remove the audit tape or to replace a supply of paper into a printer.

A further feature of applicants' novel audit tape printing mechanism is that the audit tape carriage can be entirely removed from the machine, if desired, by simply raising the forward end of the carriage after the carriage has been stopped by the positive stop, and pulling the carriage out of the machine. By so doing, certain novel results can be obtained, some of them being as follows:

(1) The carriage, having therein the audit tape, which bears a record for the day's business, can be removed from the machine and stored in a vault for safe keeping, if desired.

(2) If a system established by the user of the machine is much that it would be desired to have a separate audit tape for each clerk, each clerk is provided with his own audit tape carriage, which can be inserted into the machine when the clerk goes on duty.

(3) Another feature of the removable carriage is that, if it is desired to require the signature of a customer on the audit tape for any particular reason, the audit tape carriage can be removed from the machine and brought to the customer, where the customer can sign the audit tape through an autographic opening provided therefor, whereupon the carriage can again be inserted in the machine and a printed record made adjacent the signature.

The above three uses of the removable carriage are illustrative only, and it is obvious that the usefulness of a removable printer carriage is such that it can be adapted to many uses as required in different system in which the machine may be used. By placing the carriage under control of the unit lock 123, it is possible to prevent unauthorized persons from removing the carriage from the machine.

The framework of the audit tape carriage is illustrated in Figs. 117 and 118 and comprises two side frames 1231 and a bottom plate 1232 secured thereto. Secured to the bottom plate 1232, near its front, or at the left-hand end, as viewed in Fig. 117, is a door 1233 hinged to the bottom plate 1232 by a pair of hinges 1234 (see also Figs. 113 and 121). The door 1233 comprises a vertical section and a horizontal section, as shown in Fig. 113, and the horizontal section is provided with an opening 1235, which is normally closed by a window (Figs. 113, 121 and 122) comprising a stationary section 1237 and a movable section 1236, of glass to prevent unauthorized tampering with the audit tape beneath the glass.

The audit tape carriage, comprising the side frames 1231, the bottom plate 1232, and the door 1233, is slidable into the machine on a pair of tracks 1238 (Figs. 92A, 113, 117 and 118), supported on six lugs 1239. Screws 12401 are provided to secure the tracks 1238 to the lugs 1239, as shown in Fig. 117. Mounted on each side frame 1231, at their rear ends, is a stud 12411 facing inwardly so as to engage the under sides of the tracks 1238 when the carriage is in the machine. Two notched blocks 12421, one mounted on each frame 1231, near their front ends, project inwardly to straddle the tracks 1238 (see Fig. 118) when the carriage is in the machine. Each track 1238 is provided with a notch 12431. Movement of the carriage 1231 to the rear of the machine with the studs 12411 under the tracks 1238 brings the notches in the blocks 12421 into engagement with the notches 12431 in the tracks 1238, thus maintaining the carriage in a proper position in the machine.

The tracks 1238, on their facing edges, are provided with notches 12441, which are engaged by a pair of latches 12451 pivoted on a stud 12461 on the bottom plate 1232. A spring 12471, attached to the right-hand ends (Fig. 117) of the latches 12451, normally tends to spread the latches at their forward ends to engage the notches 12441. A stud 12481, mounted on the under side of the bottom plate 1232, engages slots 12491 of the latches 12451 to limit their movement when the carriage is removed from the machine.

The notches 12441 are so formed that, when the latches 12451 engage therein, the carriage is firmly latched in position. When it is desired to remove the carriage from the machine, the operator grasps the finger pieces 12501 of the latches 12451 and forces them toward each other, thus releasing the latches from the notches 12441, whereupon the carriage can be pulled forwardly. Downwardly-extending flanges 12511 on the bottom plate 1232 come into contact with a cross bar 12521 (see also Fig. 92A) to arrest the carriage when it is withdrawn sufficiently to give access to the audit tape. If it is desired to remove the carriage from the machine, the operator tilts the carriage upwardly to raise the flanges 12511 above the cross bar 12521, whereupon the carriage may be withdrawn further.

From the above it is clear that the studs 12411 provide means for maintaining the carriage in a horizontal position when the carriage is drawn forward without removing the carriage from the machine, due to their engagement with the under sides of the tracks 1238, when the carriage is moved forwardly far enough to tilt downwardly due to the weight of the forward end of the carriage when it extends beyond the opening in the machine.

Certain mechanisms for driving the printing platen and the paper shifting and feeding mechanisms, and for controlling their operations, are operated from the main cam shaft of the machine, which cam shaft and operating mechanisms remain in the machine when the carriage is removed therefrom. The mechanisms which are a part of the carriage must register with the operating mechanism when the carriage is positioned in the machine. In order to properly align the elements of these mechanisms when the carriage is inserted into the machine, the side frames 1231 are provided with guiding notches 12531 (Fig. 115), which engage studs 12541 on the frames 192 and 193 when the carriage approaches its innermost position. The studs 12541 are provided with annular grooves which have tapered walls to properly guide the side frames 1231 into positions in which the mechanism for operating the platen, paper shift, and paper feed control mechanisms, carried by the carriage, register with their operating means. The annular groove in the studs 12541 is best shown in Fig. 92B, where the machine is shown with the carriage removed therefrom.

*Audit tape door lock*

As mentioned before, the door for the audit tape carriage is under control of the unit lock 123 (Fig. 54). The stud 1147, described hereinbefore, projects into the cam slot 1146 in the lock slide 1139 and has pivoted thereto a link 1460 (Figs. 54, 92B and 113). The lower end of the link 1460 is pivoted to an arm 1461 of a yoke 1462, pivoted on the shaft 1290 and located between the side frame 181 and the frame 192. The yoke 1462 is provided with a second arm 1463, which lies adjacent the frame 192 and has connected thereto a link 1464 extending forwardly, where it is slotted to slide on a stud 1465. The forward end of the link 1464 is provided with a flange 1466 lying in the plane of a stud 1467 on a door latch 1468. The latch 1468 is securely mounted on a shaft 1469 pivotally mounted in the carriage frames 1231. Also secured to the shaft 1469 is a latch 1470, which is identical with the latch 1468 but has no stud 1467 thereon. When the audit tape carriage is latched in the machine, the latches 1468 and 1470 engage over, and into notches 1471 of, latch brackets 1472 and 1473, respectively (see also Figs. 121 and 122), which brackets are mounted on the door 1233 by screws 1474 and 1475, respectively.

When the latches 1468 and 1470 are in the position shown in Fig. 113, they engage the latch brackets 1472 and 1473 and therefore hold the door 1233 in its closed position. Upon moving the unit lock forwardly, the cam slot 1146 therein raises the link 1460 to rock the arm 1461 and the yoke 1462 in a clockwise direction. Clockwise movement of the arm 1461 and the yoke 1462, through the arm 1463, moves the link 1464 leftwardly, as viewed in Fig. 113, to cause the flange 1466 on its forward end to engage the stud 1467 and rock the latch 1468, together with the shaft 1469 and the latch 1470, in a clockwise direction to withdraw the latches from engagement with the notches 1471 in the brackets 1472 and 1473. This permits the operator to rock the door 1233 around the hinge 1234 as a pivot into the chain-line position illustrated in Fig. 121, to gain access to the latching fingers 12501 (Fig. 117) to thereby release the audit tape carriage from the tracks 1238. This enables the operator to pull the carriage forwardly until the flanges 12511 strike the bar 12521, in which position the studs 12411, engaging the under side of the tracks 1238, maintain the carriage in a horizontal position, where the audit tape is accessible. When the audit tape is accessible, the printed portion of the audit tape may be removed from the carriage and the end of the paper again inserted into the rewind spool.

Either before the carriage is inserted in the machine, or after the carriage is positioned in the machine, the unit lock 123 is again moved into operating position, wherein the link 1460 is lowered, thus rocking the arm 1461 and the yoke 1462, together with the arm 1463, counter-clockwise. Counter-clockwise movement of the arm 1463 moves the link 1464 to the right (Fig. 113) to permit the latches 1468 and 1470 to be rocked into engagement with the notches 1471 of the latching brackets 1472 and 1473 mounted on the door, near the left and right sides, respectively, thereof. In order to so rock the latches 1468 and 1470, a spring 1476 is provided on the hub of the latch 1468. One end of the spring 1476 is hooked over the latch, and the other end bears against a stud 1477, carried by the left-hand carriage side frame 1231. The spring 1476 is so tensioned that, when the flange 1466 is withdrawn from engagement with the stud 1467, the spring 1476 rocks the latches, together with the shaft 1469, in a counter-clockwise direction into engagement with the notches 1471 of the brackets 1472 and 1473.

In order to limit the movement of the door 1233 when it is opened, to avoid damage to the hinges 1234 and the cabinet of the machine, a pair of toggle links 1481 and 1482 (Fig. 122) are provided, which are connected together by a stud 1483. The upper end of the link 1482 is pivoted on a shaft 1484, carried by the carriage side frame 1231. The upper end of the link 1481 is provided with a stud 1485, which is mounted to slide in a slot 1486 in the left-hand door bracket 1473.

After the door 1233 is released by movement of the latches 1468 and 1470, the door is moved forwardly around the hinges 1234, at which time the toggle links 1481 and 1482 are straightened and the movement of the door 1233 is limited by the stud 1485 coming into contact with the bottom of the slot 1486. When the door is in its limit of counter-clockwise movement, the front of the door is in approximately horizontal position, as shown in chain lines in Fig. 122, thus giving full access to the audit tape or any other mechanism on the carriage.

*Audit tape support and guiding means*

The audit tape is fed from a supply roll 1491 (Fig. 115), which is provided with a hollow core or sleeve 1492, supported at its right-hand end, as viewed from the front of the machine, on a stud 1493 carried by the right carriage frame 1231. The left carriage side frame 1231 has mounted therein a slidable stud 1494 (see Fig. 116), on which the left end of the sleeve 1492 is rotatably mounted. The stud 1494 is provided with an annular groove 1495, in which a spring-pressed plunger 1496 engages when the supply roll is in position. The plunger 1496 is slidably mounted in a housing 1497, which also has mounted therein a spring 1498, engaging the upper end of the plunger 1496 to force it into engagement with the annular groove 1495. A crimped annular flange 1490 is formed in the housing 1497 to limit the downward movement of the plunger 1496. When it is desired to remove the sleeve 1492 from the machine, the stud 1494 is moved leftwardly (Fig. 116) by the operator, who grasps a knurled knob 1500 and forces the stud 1494 leftwardly until an annular groove 1501 comes into the path of a spring plunger 1496. The annular grooves 1495 and 1501 are beveled, so that forcing the stud 1494 leftwardly cams the plunger 1496 upwardly until the annular groove 1501 comes into its path, whereupon the spring 1498 forces the plunger 1496 into the annular groove 1501. The right-hand wall of the annular groove 1501 is straight, so that the stud 1494 cannot be moved entirely from its bearing in the side frame 1231. After the stud 1494 is in its leftward position, the exhausted sleeve 1492 can be lifted from the carriage and a new supply roll positioned on the stud 1493, whereupon the stud 1494 is again forced inwardly to maintain the new supply roll in the machine.

The web 1502 (see also Fig. 115) of the audit tape is guided around a roller 1503 mounted on the before-mentioned shaft 1469, thence under a roller 1499 carried on a shaft 1504 mounted between two arms 1517 forming a shifting frame. The frame is pivoted on a stud 1506 carried by the carriage side frames 1231. From the roller 1499, the web 1502 is fed around a roller 1505 on a shaft 1518 carried by the side frames 1231 of the carriage. From the roller 1505, the web is fed around a roller 1507 carried by a shaft 1508 and over a writing table 1509. The shaft 1508 and the writing table 1509 are supported by the carriage side frames 1231. From the table 1509, the web 1502 is fed over a roller 1510 mounted on the shaft 1511, also carried by the side frames 1231 and under a roller 1512 supported by a shaft 1541 carried by the rocking frame 1517, and over a roller 1513 mounted on a shaft 1514 carried by the carriage frames 1231, and thence to a receiving spool 1515 (see also Figs. 115 and 123). The web 1502 is held on the receiving spool by any well-known clip (not shown).

During the operation of the machine, the receiving spool 1515 is given steps of movement to feed the audit tape from the supply roll 1491 and over the guide rollers described above, and the strip is thereby wound on the spool 1515 in a manner to be described presently.

*Audit tape shifting mechanism*

When the machine is at rest, the last six printed lines of data are visible under the glass 1237 (Figs. 113 and 122). During the machine operation, the audit tape web 1502 is shifted to bring the last printed data from a point designated "Reading Line" (Fig. 115) to a point designated "Printing Line," and, at the same time, the web is fed to line-space the printed data by mechanism described hereafter. The impression is taken at the point marked "Printing Line," and thereafter the tape is shifted back to bring the last printed data to the point marked "Reading Line."

To shift the paper from the "Reading Line" to the "Printing Line," the frame 1517 (Fig. 115) is rocked clockwise to raise the guide roller 1499 to give up slack in the web 1502, and to lower the guide roller 1512 to take up said slack. This shifting movement, together with the line-spacing movement described hereinafter, is sufficient to move the audit tape into its proper printing position.

To rock the frame 1517 clockwise, a link 1520 (Figs. 115 and 119) is pivoted on a stud 1521 carried by an ear 1522 formed on one arm of the frame 1517. The opposite end of the link 1520 is pivoted to a bell crank 1533, mounted on a stud 1523 of the left carriage side frame 1231.

The bell crank 1533, the link 1520, and the rocking frame 1517 are carried by the carriage side frames 1231, and therefore, when the carriage is removed from the machine, these elements are carried therewith. In order to rock the frame 1517 during the machine operation, this mechanism is automatically connected to an operating mechanism operated from the printer cam shaft 1273 when the carriage is inserted into the machine. To this end, the bell crank 1533 is provided with a notch 1524, which is open and beveled so as to be guided onto a stud 1525 carried by a bell crank 1526 pivoted on the stud 12541, carried by the side frame 192 (Fig. 92B). The bell crank 1526 has pivoted thereto a link 1527, the rear end of which is provided with a notch 1528, which may be lowered into engagement with a stud 1529 carried on the lower end of a cam arm 1530. The cam arm 1530 is pivoted on the beforementioned shaft 1325 and is provided with a pair of anti-friction rollers 1531, coacting with a pair of plate cams 1532 on the printer cam shaft 1273.

The notch 1528 of the link 1527 is normally disengaged from the stud 1529 but is automatically lowered to engage the stud 1529 during those operations in which an impression is to be made on the audit tape. In the system described herein, to illustrate one application of the invention, the only operation in which no impression is made on the audit tape is when the machine is used as an adding machine; that is, with the "Add" key in row 1 depressed, preparatory to operating the machine. In all other operations of the machine, the link 1527 is lowered to bring the notch 1528 into engagement with the stud 1529, in a manner to be described hereinafter.

When the machine is operated with the link 1527 coupled to the cam arm 1530, the cams 1532, rotating counter-clockwise, rock the cam arm 1530 first counter-clockwise, thereby moving the link 1527 to the right, as shown in Fig. 115, to rock the bell crank 1526 counter-clockwise. Counter-clockwise rocking movement of the bell crank 1526 rocks the bell crank 1533 clockwise, thus moving the link 1520 to the left (Fig. 115) to rock the frame 1517 clockwise to shift the audit tape to present the proper line for receiving the impression during the machine operation. After the impression has been made, further counter-clockwise rotation of the cam plates 1532 reverses the movement of the train of mechanism, including the cam arm 1530, the link 1527, the bell cranks 1526 and 1533, and the link 1520, to rock the frame 1517 counter-clockwise, and during this operation the roller 1512 gives up the slack and the roller 1499 shifts the last printed data to the "Reading Line."

The receiving spool 1515 is mounted in the same manner as the supply roll and is controlled by a knob like the knob 1500 (see also Fig. 116) in the same manner as the supply roll is mounted and controlled.

*Line spacing control*

The shaft 1541, which supports the guide roller 1512 on the rocking frame 1517, extends into the path of a finger 1542 of an arm 1543 pivotally mounted on a stud 1544, upon which the receiving spool 1515 is also mounted. A spring 1545 (Fig. 123) normally maintains the finger 1542 in contact with the extension of the shaft 1541. The arm 1543 is provided with a toe normally in the path of a stud 1547 in a plate 1548 (see also Fig. 123). A coil spring 1549, having one end in contact with the stud 1547 and the other end in contact with a stud 1550 on the arm 1543, normally tends to move the stud 1547 into contact with the toe 1546, so that, when the arm 1543 is rocked clockwise, the plate 1548 moves therewith.

Mounted on the plate 1548 is a feed pawl 1551, provided with teeth held in engagement with a ratchet wheel 1552 by a spring 1553. The ratchet wheel 1552 is secured to the receiving spool 1515, and therefore, when the ratchet wheel 1552 is rotated counter-clockwise (Figs. 115 and 123), the web 1502 is wound on the spool.

The plate 1548 is rocked counter-clockwise to feed the web 1502 onto the spool 1515 by the spring 1545 (Fig. 115) when the shifting frame 1517 is rocked clockwise. Clockwise movement of the frame 1517 releases the arm 1543 to the action of the spring 1545, and, during the movement of the latter, the toe 1546 thereon engages the stud 1547 and rocks the plate 1548 counter-clockwise to cause the feed pawl 1551 to rotate the ratchet wheel 1552 counter-clockwise to wind the audit tape web 1502 on the receiving spool 1515.

At the time the feed pawl 1551 is effective to rotate the ratchet wheel 1552 counter-clockwise, the audit tape web is in its slackened condition. This slackened condition of the web is effected by the roller 1499, which, when rocked upwardly, releases the web 1502 and the roller 1512 pulls the web to the right (Fig. 115) far enough to shift the last printed record to the printing line. During this shifting movement, the feed pawl 1551, when actuated by the spring 1545, through the plate 1548, feeds the web far enough to line-space the web. After the web 1502 arrives in printing position, the feed pawl 1551 will have pulled the paper taut and presented a new printing line at the printing line.

During the return movement of the rocking frame 1517, the roller 1512 provides slack which is taken up by the roller 1499 to shift the paper back to the reading line. At this time, the arm 1543 is rocked clockwise back to its normal position by the extension on the shaft 1541 contacting the finger 1542 thereon. During the clockwise movement of the arm 1543, the spring 1549 pulls the plate 1548 in a clockwise direction to restore the feed pawl into its feeding position for the next machine operation. During this return movement, the teeth on the feed pawl 1551 ratchet over the teeth of the ratchet wheel 1552. To prevent retrograde movement of the ratchet wheel 1552 when the plate 1548 and its feed pawl 1551 are restored to their normal positions, two spring-urged pawls 1554 are provided, which engage the teeth of the ratchet wheel 1552 in such a manner that the wheel 1552 cannot be turned clockwise. The pawls 1554 are pivotally mounted on studs 1555, respectively, on the carriage side frame 1231. Springs 1556 urge the pawls into engagement with the ratchet wheel 1552.

As the receiving spool 1515 becomes filled, its outside diameter becomes greater, and therefore a smaller angular rotating movement of the receiving spool is required for properly line-spacing the printed items. This difference in angular movement of the receiving spool is compensated for automatically in the mechanism provided herein.

The roller 1512 on the rocking frame 1517 is nearer the pivot point of the rocking frame than is the roller 1499. When the rocking frame rocks clockwise, the roller 1499 gives up sufficient slack to shift the last printed line one line space beyond the "Printing Line." During this clockwise movement of the rocking frame 1517, the spring-urged arm 1543, acting through the toe 1546 and the stud 1547, rocks the plate 1548 counter-clockwise to wind the excess slack onto the receiving spool 1515. The extent of clockwise rotation of the receiving spool 1515 is dependent upon the diameter of the roll of tape thereon. As the roll of web increases in diameter, the angular movement of the arm 1543 and the plate 1548 becomes progressively shorter. This difference of angular movement is obtained by actuating the arm 1543 by the spring 1545, which spring is strong enough to stretch the web 1502 taut, but not strong enough to pull the web off of the supply roll 1491. The finger 1542 of the arm 1543 follows the extension of the shaft 1541 only far enough to stretch the web taut. During the reverse or counter-clockwise movement of the frame 1517, the roller 1499 moves a greater extent than the roller 1512, and, since at this time the receiving roll is held against retrograde movement by the retaining pawls 1554, the roller 1499 pulls sufficient tape off of the supply roll 1491 to allow for the line-space movement thereof.

*Supply roll brake*

In order to prevent the excessive rotating movement of the supply roll 1491 when the web 1502 is pulled therefrom by the rocking frame 1517, a brake device 1560 (Figs. 113 and 115) is provided. The brake device 1560 comprises a plate pivoted on a shaft 1561 carried by the carriage frames 1231. A coil spring 1562, coiled around the shaft 1561 and having one end anchored on a stud on the shaft 1561, is provided with an upstanding extension engaging the back of the brake plate 1560 to normally hold the plate 1560 against the outer diameter of the supply roll 1491. Proper tension can be maintained on the brake plate 1560 by tightening the spring 1562 on the shaft 1561 by an adjusting disc 1563 on one end of the shaft 1561. The shaft 1561 is held in its adjusted position by a screw 1564 entering a notch 1565, four of which are provided in the disc 1563. The screw 1564 is secured to the left-hand carriage frame 1231. By rotating the shaft 1561 counter-clockwise, the tension of the spring 1562 can be increased, and, by rotating the shaft 1561 clockwise, the tension thereon can be eased, so that the action of the brake plate 1560 can be adjusted to place the proper tension on the periphery of the supply roll 1491, so that the paper shifting frame will not be overloaded, or, conversely, to adjust the tension on the brake plate 1560, so that the supply roll 1491 will not rotate clockwise after the paper has been properly shifted into printing position.

When a new supply roll is to be placed in the carriage, it is desirable to hold the brake device 1560 out of the operator's way, so that the replacement of the new supply roll can be accomplished without interference. In order to hold the brake 1560 out of the operator's way, the operator pushes the plate 1560 in a clockwise direction (Fig. 115) until a stud 1566 thereon comes into the path of a notch 1567 on a latch pawl 1568. The latch pawl 1568 is pivoted on a stud 1569 on one of the carriage frames and is spring-urged in a clockwise direction (Fig. 119) by a spring 1570, one end of which engages the shaft 1561 and the other end of which is in contact with a stud 1571 on the pawl 1568. When the brake plate 1560 is manually rocked clockwise far enough to present the stud 1566 into the path of the notch 1567, the spring 1570 snaps the latch pawl 1568 into position to cause the notch 1567 to latch over the stud 1566, as shown in Fig. 119. When in this position, the brake plate 1560 is held out of the operator's way, so that he can place a new supply roll in the machine without any interference therefrom.

To make it more convenient to feed the web around the various guide rollers, and particularly the guide roller 1499, when a new supply roll is placed in the machine, the operator rocks the rocking frame 1517 in a clockwise direction (Fig. 119) to bring the guide roll 1499 into its upper position. This rocking of the rocking frame 1517 is done before the supply roll is placed in the machine, and therefore, when the operator subsequently moves the brake plate 1560 in a clockwise direction, where it is latched by the latch pawl 1568, the upper end of the latch pawl 1568 comes into the path of the guide roller 1499. After the paper has been wound around the guide roller 1499 and over the guide rollers 1505 and 1507, and down over the guide roller 1510, the operator again rocks the shifting frame counter-clockwise to lower the feed roller 1499 and raise the guide roll 1512 into a more accessible position. During this clockwise rotation of the rocking frame 1517, the guide roller 1499 comes into contact with the latching pawl 1568 and rocks it counter-clockwise, thus withdrawing the notch 1567 from engagement with the stud 1566 and permitting the spring 1562 to bring the brake plate 1560 into engagement with the supply roll 1491 to effectively brake the supply roll against over-rotation.

To better guide the web 1502 around the rollers 1505 and 1512, when a new web is being manually threaded into the machine, guide plates 1572 and 1573, respectively, are provided on the rocking frame 1517, which act as baffles to guide the web around the respective guide rollers.

Manual audit tape feed

When a manual notation is written on the audit tape, the web must be spaced so that the next printed item will not be printed over the written notation. Also in the machine as illustrated herein, the opening through which the written notations are made is normally closed by the glass plate 1236 (Figs. 113 and 123) and must be opened to give access to the audit tape. A lever 1575 (Fig. 121) is provided to simultaneously space the audit tape and to slide the glass plate 1236 toward the front of the machine.

The lever 1575 is pivotally mounted on a stud 1484 (Figs. 113 and 121), in the left side frame 1231, and is provided with an upwardly-extending finger 1576. When the lever 1575 is manually rocked counter-clockwise, the finger 1576 engages a stud 1577 on a slide 1578 slidably supported in the brackets 1472 and 1473 on the door 1233 (see also Fig. 122). The slide 1578 supports the glass plate 1236 and is normally held in closed position by springs 1574, one on each side of the slide 1578. When the lever 1575 is rocked counter-clockwise and the finger 1576 engages the stud 1577, the slide 1578 is moved forwardly to provide access to the audit tape.

Simultaneously with the sliding of the glass plate 1236 forwardly to provide access to the audit tape, the lever 1575, by a notch 1579 therein, in engagement with a stud 1580 (Fig. 113) on an arm 1581, secured to a shaft 1582, rocks said shaft clockwise. Near the right-hand side of the carriage, a second arm 1581 is provided, which has a stud 1580 projecting into a notch of an arm 1583, pivoted on a stud 1484 carried by the right side frame 1231. A link 1585 connects the arm 1583 to a bell crank 1586 pivoted on a stud 1587, to which is pivoted the forward end of a link 1588. The link 1588 is connected to a feed pawl 1589 pivoted on a stud 1590 on the right-hand carriage side frame 1231. A spring 1592, connected to the bell crank 1586, normally maintains the bell crank 1586 in a position in which the lever 1575 is in its upward position.

Downward movement of the lever 1575 rocks the shaft 1582 and the arm 1583 to raise the link 1585, and rocks the bell crank 1586 clockwise. Clockwise movement of the bell crank 1586 pulls the link 1588 forwardly (to the left as viewed in Fig. 113), thus rocking the feed pawl 1589 clockwise. Clockwise movement of the pawl 1589 coming into contact with a stud 1591 rocks the feed plate 1548 counter-clockwise, which, through the feed pawl 1551, spaces the audit strip a distance sufficient to provide space for a hand-written notation.

The writing table 1509 (Fig. 115) lies beneath the opening provided by moving the glass plate 1236 forwardly, thus providing a table for backing the audit tape when the hand-written notations are made thereon.

Audit strip shifting frame latch

Means is provided to latch the audit tape shifting mechanism in normal position when the carriage is withdrawn from the machine and the notch 1524 in the bell crank 1533 (Fig. 115) is withdrawn from engagement with the stud 1525. The mechanism to be latched includes the bell crank 1533, the link 1520, and the rocking frame 1517, together with the arm 1543. A latch 1600 is provided, which maintains the above train of mechanism in the normal position, shown in Fig. 115, until such time as the operator desires to rock the frame 1517 clockwise for the purpose of inserting a new audit tape into the machine, in the manner described hereinbefore.

To accomplish the above objectives, the latch 1600 (Figs. 114, 115 and 119) is provided, which latch is pivoted on a stud 1601 carried by the left side frame 1231 of the carriage. The latch 1600 is normally urged counter-clockwise by a coil spring 1602 wound around the stud 1601 and engaging the flange of the latch 1600 at one end, the other end of the spring engaging a stud 1603 carried by the printer side frame 1231. The latch 1600 is provided with a forwardly-projecting finger 1604, which engages a stud 1605 on the side frame 192 when the carriage is in the machine, as shown in Fig. 101. When in this position, the latch 1600 is held with a latching shoulder 1606 thereon out of engagement with the stud 1521 on the rocking frame 1517, forming a pivot for the link 1520. When the carriage is moved forwardly, the finger 1604 becomes disengaged from the stud 1605, whereupon the spring 1602 rocks the latch 1600 counter-clockwise until the shoulder 1606 comes into engagement with the stud 1521, as shown in Fig. 119. The timing of the movement of the latch 1600 is such that the shoulder 1606 is in effective position in engagement with the stud 1521 prior to the complete disengagement of the notch 1524 from the stud 1525 on the driving bell crank 1526. Thus, when the carriage is removed from the machine, the rocking frame 1517 is latched in the position shown in Fig. 119. The position of the latch 1600, when the carriage is in the machine, is shown in Fig. 115 by dotted lines. The position which the latch 1600 assumes when the carriage is removed from the machine is shown in Fig. 119, where the latch 1600 is in engagement with the stud 1521.

When it is desired to insert a new audit tape into the machine, in the manner hereinbefore described, the latch 1600 is rocked clockwise from the position shown in Fig. 113, manually, by the operator, the latch 1600 then being in accessible position, which releases the rocking frame 1517 to the action of the spring 1545 on the arm 1543, thus permitting the rocking frame 1517 to rock clockwise. After the tape has been properly threaded in the machine around the guide roll 1505, the operator manually rocks the frame 1517 in a counter-clockwise direction until the latch 1600 again engages the stud 1521 to maintain the rocking frame 1517 in its normal position, as shown in Figs. 113 and 115.

Automatic control of audit tape shift mechanism

As mentioned hereinbefore, the shifting mechanism for the audit tape is normally in ineffective position; that is, the notch 1528 (Fig. 113) of the link 1527 is normally disengaged from the stud 1529. When it is desired to shift and feed the audit tape, the right-hand end of the link 1527 is lowered to engage the notch 1528 over the stud 1529. The lowering movement of the link 1527 is automatically controlled by a notched disc 1621 (Figs. 113 and 115).

The notched disc 1621 is provided with internal teeth 1623 meshing with a pinion 1624 on the square shaft 743. The square shaft 743 is differentially adjusted under control of the keys in the first transaction bank in the manner described hereinbefore.

A link 1625 is pivoted at its lower end to the link 1527 and at its upper end to one arm 1626 of a yoke 1627 (see also Fig. 92B). The second arm 1628 of the yoke 1627 is provided with a stud 1629, normally held in engagement with an arm 1630 secured to the beforementioned shaft 1290. The arm 1626 is provided with a tail 1631, to which is pivoted a feeling link 1632, slotted at 1633 to slide on a stud 1634 on the side frame 192. The forward end of the link 1632 is provided with a stud 1635, which projects into the plane of the disc 1621. A spring 1636 normally tends to move the feeling link 1632 to bring the stud 1635 into engagement with the notched disc 1621. The normal position of the feeling link 1632, and therefore of the yoke 1627, is determined by the position of the arm 1630.

When the cams 1298 (Fig. 108) are rotated in a clockwise direction to release the arm 1296 to permit the shaft 1290 to rock clockwise, the arm 1630 (Fig. 115) also moves clockwise, thus releasing the yoke 1627 to be rocked clockwise under the action of the spring 1636. If, during this clockwise movement of the yoke 1627, a notch is presented to the stud 1635 by the disc 1621, the feeler 1630 can move to the left (Fig. 115), thus permitting the yoke 1627 to rock clockwise, thereby lowering the link 1625 and bringing the notch 1528 into engagement with the stud 1529. Thereafter, when the cam plates 1532 rock the cam arm 1530, the audit tape shift and feed mechanisms are operated in the manner described hereinbefore.

If, during the time of movement of the feeler 1632 to the left (Fig. 115), the stud 1635 encounters the high spot in the notched disc 1621, the yoke 1627 is immediately arrested, and therefore the link 1625 is not lowered, thus maintaining the notch 1528 out of engagement with the stud 1529. During this operation, when the cams 1532 operate the arm 1530, the audit tape shift and feed mechanisms do not operate.

The disc 1621 is illustrated herein to control the audit tape shift and feed mechanisms for the system illustrated herein to describe the invention. In this system, the only time no impression is made on the audit tape, and therefore the only operation during which the audit tape is not shifted and fed, is when the machine is used with an "Add" key depressed. For this reason, a high spot is provided in the "+" position of the disc 1621, which is set under control of the first transaction bank. It is to be understood that the notching of the disc 1621 can be varied in accordance with any particular system to which the machine is to be adapted.

Audit tape printing mechanism

After the audit tape is shifted from the "Reading Line" (Fig. 115) to the "Printing Line" and line-spaced to receive the next impression, a printing platen 1650 (Fig. 113) is raised to force the audit tape into engagement with the type characters which have been positioned in accordance with the data set up on the keyboard. The platen 1650 is carried by a printing hammer 1651 and is provided with two studs 1652, which engage the sides of notches 1653 (Fig. 113) in the side frames 1231 of the carriage, to guide the printing platen in its printing movements. The printing hammer is provided with two bifurcated legs, one adjacent each frame 1231, to straddle studs 1654 carried by the carriage frames 1231, one stud being provided on each frame to guide the printing platen at each end thereof. Mounted on each end of the printing hammer is an eccentric 1655 engaged by arms 1656 pinned to a shaft 1657. One arm 1656 (Fig. 113) is provided with a downwardly-extending projection 1658, to which is pivoted link 1659, the right-hand end (as viewed in Fig. 113) being slotted to slide on a stud 1660 carried by the right-hand carriage frame 1231. A spring 1661 normally maintains the slot in the link 1659 in engagement with the stud 1660 to maintain the free end 1662 of the link 1659 in the path of a stud 1663, carried by an arm 1664 pivoted on one of the beforementioned studs 12541 (see Fig. 92B). The lower end of the arm 1664 is provided with a finger 1665 normally held in engagement with a stud 1666 carried by the machine frame 193. Pivoted to the stud 1663 is a link 1667, also pivoted to a link 1668 to form a toggle joint. The free end of the link 1668 is pivoted to a stud 1669 of a bell crank 1670 carried by a stud 1671 on the side frame 193. The bell crank 1670 is provided with a finger 1672, normally in engagement with a stud 1673 carried by the side frame 193. The links 1667 and 1668 are pivoted together by a stud 1674, which stud is engaged by the bifurcated end of a cam arm 1675 carried by the beforementioned shaft 1325. The cam arm 1675 is provided with two rollers 1676, which engage a pair of cams 1677 on the printer cam shaft 1273.

When the printer cam shaft 1273 is rotated counter-clockwise, the cam arm 1675 is rocked first clockwise and then back to its normal position in a counter-clockwise direction. During the clockwise and counter-clockwise movements of the cam arm 1675, the links 1667 and 1668, forming the toggle, are first straightened to rock either the arm 1664 or the bell crank 1670, whichever one is free to operate. Upon further movement of the cam arm 1675, the toggle is again broken, and during the return movement the same operation is repeated. If the bell crank 1670 is free to rock clockwise when the toggle comprising the links 1667 and 1668 is straightened, the arm 1664 is not moved, and therefore the printing hammer is not operated. If, on the other hand, the bell crank 1670 is held against clockwise rotation, then, upon straightening of the toggle comprising the links 1667 and 1668, the arm 1664 is rocked counter-clockwise, causing the stud 1663 thereon to shift the link 1659 toward the left (Fig. 113), thus rocking the arms 1656 and the shaft 1657 clockwise to raise the hammer 1651 to effect a printing operation on the audit tape. Normally the bell crank 1670 is free to rock clockwise, and therefore, in the normal setting of the mechanism, no impression will be made on the audit tape. When it is desired to make an impression on the audit tape, a segment 1680 (Fig. 113), pivotally mounted on a shaft 1681, is rocked counter-clockwise to position its outer periphery 1682 beneath a stud 1683 on the bell crank 1670. Thereafter, when the cam arm 1675 is rocked to straighten the toggle comprising the links 1667 and 1668, the bell crank 1670 is blocked against clockwise rotation, and therefore the arm 1664 is rocked counter-clockwise, whereupon the stud 1663, engaging the end 1662 of the link 1659, rocks the projection 1658 of the arm 1656 clockwise to raise the platen 1650 to take an impression on the audit tape.

The counter-clockwise movement of the segment 1680 is timed to move into the path of the stud 1683 just before the cam arm 1675 is returned counter-clockwise to its home position, and therefore the printing takes place during the return stroke of the cam arm 1675.

The movement of the segment 1680 is controlled by the beforementioned notched disc 1621 under control of the yoke 1627. The right-hand arm 1628 of the yoke 1627 has pivoted thereto a link 1684, the lower end of which is pivoted to the segment 1680. Therefore, when the feeler 1632 is moved to the left (Fig. 113) in a manner described hereinbefore, to feel for a notch in the disc 1621, and if the stud 1635 enters notches in the disc 1621, the yoke 1627 is rocked clockwise, thus lowering the link 1684 and thereby rocking the segment 1680 counter-clockwise to position the periphery 1682 thereof into the path of the stud 1683.

ISSUING TAPE PRINTER

In the business system described herein to illustrate the present invention, the cashier provides the Accounting Department with "Notifiers" which comprise a ticket for use in said department in controlling past due, or delinquent accounts. The ticket has two entries thereon, one entry including the telephone number, and the other the amount paid. This ticket, called a "Notifier," is illustrated in Fig. 131. In addition to the "Notifier," the machine issues a printed tape when using the machine as an adding machine (Fig. 133), or when listing items (Fig. 132). When a total is printed from any selected transaction totalizer, a ticket, such as illustrated in Fig. 130, is issued.

The issuing tape printer is located at the right front of the machine between the printer frame 193 and the side frame 180 (Figs. 7, 92A and 92B). The issuing tape printing mechanism is carried in a removable carriage, which can be removed from, or inserted into, the machine at will. The removable issuing tape printer carriage slides in and out of the machine on tracks provided in the base of the machine.

The door of the issuing tape printer is released manually by depression of a table at the front of the printer, which permits the swinging forward of a door on hinges at its lower end near the base of the machine. Opening of the door exposes manually-operable latches, which latches, when operated, release the removable carriage and permit the operator to pull the carriage forwardly. If the carriage is to move forwardly merely for replacing a supply of paper in the issuing tape printer, the carriage is slid forward until a positive stop arrests its movement. In this position, all of the feed and guide rollers for the issuing tape are easily accessible, together with the bin in which the paper packet is positioned, thus making it a simple matter to replace the issuing strip paper packet when necessary. If desired, the issuing tape printing carriage can be entirely removed from the machine by tilting the forward end of the carriage upwardly after the carriage has been arrested by the positive stop, thereafter pulling the carriage out of the machine.

The construction of the issuing tape carriage, together with the manually-operable latches for latching the carriage in the machine, is identical with that described for the audit tape printer, and reference will be made to certain detailed drawings illustrating the construction of the latches in the audit tape printer in the description of the issuing tape carriage.

Issuing tape carriage

The framework of the issuing tape carriage is illustrated in Figs. 124, 127 and 134 and comprises two side frames 1690 and a bottom plate 1691. A cross rod 1692 braces the side frames at their rear ends, and a paper chute 1693, secured to the side frames 1690 by means of two screws 1694, coacting with ears on each side of the paper chute, provides a cross bracing for the carriage near its front. A door 1695 is pivoted to the bottom plate 1691 by hinges 1696. A bar 1697, interposed between the hinge 1696 and the bottom plate 1691, forms a brace for securely holding the hinges 1696 in proper position. The carriage is movable into the machine on a pair of tracks in the same manner as the audit tape carriage slides on the tracks 1238 (Fig. 117). Latches 1699, similar to the latches 12451 (Fig. 117) are provided for latching the issuing tape carriage in the machine on the tracks 1698. Studs 1700, like the studs 12411 (Fig. 117), are provided on the issuing tape carriage frames 1690 for engaging the under sides of the tracks 1698 to maintain the carriage in the horizontal position, when pulled forwardly on the tracks, in the same manner as the studs 12411 maintain the audit tape carriage in horizontal position.

Issuing tape door latch

The door 1695 (Fig. 134) is latched in its closed position by a latch 1701 pivoted on a stud 1702 on the left-hand carriage frame 1690. A spring 1703 normally tends to rock the latch 1701 counter-clockwise into engagement with a stud 1704 on an angle bracket 1705 secured to the inner face of the door. The latch 1701 is provided with an upwardly-extending cam finger 1706, held in engagement with a stud 1707 on a pivoted release member 1708 by the spring 1703. The member 1708 is pivoted on a rod 1709 carried by the carriage frames 1690. The member 1708 is provided with a downwardly-extending finger 1710, which normally bears on the inner face of the door 1695.

When it is desired to open the door 1695, the operator presses on the member 1708 near its right-hand end, as viewed in Fig. 134, to rock the member 1708 clockwise. Clockwise movement of the member 1708 causes causes the stud 1707 to engage the cam finger 1706 to rock the latch 1701 clockwise against the tension of the spring 1703 to lift the latch off of the stud 1704. Simultaneously the clockwise movement of the member 1708, through the finger 1710, bearing against the inner face of the door 1695, starts the door 1695 moving counter-clockwise, whereupon the operator can grasp the door and open it.

The extent of movement permitted the door is controlled by a pair of toggle links 1711 and 1712, connected togethed by a stud 1713. The upper end of the link 1711 is pivoted to the angle bracket 1705, and the upper end of the link 1712 is pivoted on a stud 1714 carried by one of the carriage side frames 1690. When the door is rocked counter-clockwise, the extent of such movement is limited by the links 1711 and 1712 when they are moved to a position in which they are extended their fullest extent. When so extended, the links occupy a position similar to the chain-line position of the links 1482 (Fig. 121) for the audit tape door.

Issuing tape support and guide means

The issuing tape supply is in the form of a paper pack, which is placed in a box 1720 (Fig. 127) on the bottom plate 1691 of the carriage. An upwardly-extending flange 1721 of the base 1691 forms a locating means for the supply pack box. The web 1723 of the supply pack is guided around a guide roller 1722, rotatably mounted on studs 1730, one on each carriage frame 1690. From the guide roller 1722, the web 1723 is fed forwardly between a roller 1724 and a feed roller 1725. The roller 1724 is rotatably mounted on the beforementioned shaft 204, and the feed roller 1725 is mounted on a shaft 1726 in a manner described hereinafter. From the feed rollers, the web 1723 is passed through an opening 1727 and beneath a stationary tear-off knife 1728 on the front of the cabinet (see also Fig. 1). From the knife 1728, the web 1723 is fed between two upstanding flanges 1729 on the paper chute 1693, where the paper normally rests as it is being fed out of the machine during the machine operations.

A weighted frame comprising two arms 1790 (Fig. 124), connected by a shaft 1791, projecting into a slot 1792 in each frame 180 and 193, and a roller 1793, acts to keep the bight of the web 1723 in engagement with the guide roller 1722 when the carriage is moved into the machine. When the carriage is moved forwardly to replace a tape in the machine, the roller 1722 moves with the carriage and out of engagement with the roller 1793 and the shaft 1791. Thus, when the carriage is out of the machine, the web 1723 can be freely fed around the roller 1722, and, when the carriage is again inserted into the machine, the roller 1793 and the shaft 1791 maintain the web in contact with the roller 1722. This is necessary when the web is fed off of the paper packet from the right-hand end thereof, as viewed in Fig. 124. The roller 1793 guides the web to the roller 1722 and maintains the desired tension thereon.

*Issuing strip feed mechanism*

The feed mechanism for the issuing strip is similar to the feed mechanism for the slip feed, and reference may be had to that mechanism for a description of the details of construction thereof. The shaft 1726 is mounted between a pair of tension arms 1735 and 1736 (Figs. 124 and 127). A spring 1719, connected to an extension on the arm 1735, maintains the feed rollers 1725 in contact with the rollers 1724. One end of the shaft 1726 (see Fig. 127) has secured thereto a pinion 1737, which meshes with a rack 1738 (see also Fig. 124) guided on a shaft 1739 carried by the carriage frames 1690. At its rear end, the rack 1738 is pivoted to a link 1740. The rear end of the link 1740 is secured to a two-armed lever 1741 pivoted on a stud 1742 carried on one side frame 1690. A spring 1743, connected at one end to the two-armed lever 1741 and at its other end to a stud in the carriage frame, normally maintains a stud 1744 on the lever 1741 in contact with the end of a pusher slide 1745. The pusher slide 1745 is slotted to slide over a stud 1746, by means of which it is guided at its free end. The rear end of the slide 1745 is pivotally connected to a cam arm 1747 pivoted on the beforementioned shaft 1325. The cam arm 1747 is provided with a roller 1748, held in engagement with a cam plate 1749, secured to the printer cam shaft 1273, by the spring 1743. The above-described feed mechanism is similar in every respect to the feed mechanism for the slip disclosed in Fig. 108.

If, during the operation of the machine, the slide 1745 is free to move rightwardly, when the cam 1749 is rotated, the stud 1744 follows therewith. An automatic control is provided to determine when and to what extent the slide 1745 is permitted to move toward the right (Fig. 124) when released by the cam 1749.

Counter-clockwise rotation of the cam 1749 releases the slide 1745 to be pushed by the stud 1744 when the spring 1743 rocks the two-armed lever 1741 counter-clockwise. Counter-clockwise rocking movement of the two-armed lever 1741, through the link 1740, moves the rack 1738 toward the left to rotate the pinion 1737 and the shaft 1726 clockwise. A ratchet mechanism, similar to the mechanism shown in Fig. 112, is provided between the shaft 1726 and the feed rollers 1725, and therefore, when the rack 1738 rotates the shaft 1726 clockwise, the stud 1726 moves idly, without turning the rollers 1725. On further clockwise movement of the cam plate 1749, it rocks the cam arm 1747 clockwise, thus moving the pusher slide 1745 toward the left (Fig. 124) to rock the two-armed lever 1741 clockwise to pull the link 1740 and the rack 1738 rightwardly. This movement of the rack 1738 rotates the pinion 1737 counter-clockwise, and at this time the ratchet, similar to the ratchet shown in Fig. 112, picks up the feed rollers 1725 and rotates them counter-clockwise, thus feeding the web 1723 toward the left and out of the machine, past the stationary tear-off knife 1728.

A brake member 1750, engaging the feed roller 1725 adjacent the arm 1735, provides a means for preventing overthrow of the feed roller 1725. The brake member 1750 is pivoted on a stud 1752 mounted on the arm 1735 and is spring-actuated by a spring 1751. The brake member 1750 functions similarly to the brake 1396, shown in Fig. 108.

*Feed roll lock*

To positively arrest and lock the feed rollers 1725 at the end of their feeding rotation, a locking pawl 1753 (Fig. 135) is provided, which is held in engagement with a pinion 1754, rotatable on shaft 1726, and clutched to the right hand feed roller 1725, as shown in Fig. 127. A notched pawl 1756 is rotatably mounted on a stud 1755 on the arm 1736, and the notched pawl is secured to the locking pawl 1753. A one-toothed member 1737 is pinned to the shaft 1726.

Normally the one-toothed member engages the notch in the notched member 1756 to hold it and the pawl 1753 in a position where the latter prevents rotation of the feed rollers 1725. Upon initial rotation of the shaft 1726, when the rack 1738 moves leftwardly, the one-toothed member rotating clockwise cams the pawls 1753 and 1756 counter-clockwise (Fig. 135) to withdraw the pawl from engagement with the pinion 1754. Upon reverse rotation of the shaft 1726, when the feeding operation takes place the one-toothed member moves back toward the pawl 1756, and at the end of the return movement thereof, the tooth on the member 1737 enters the notch in the pawl 1756 to restore the locking pawl 1753 into locking engagement with the pinion, thus arresting the feed rollers positively to prevent overfeeding operations.

While the one-toothed member is in moved position a stud 1757 engaging shoulder on the arm 1736, holds the notch in the pawl 1756 in proper alignment to receive the tooth of the one-toothed member near the end of the feeding operation.

*Automatic control of issuing tape feed mechanism*

The issuing tape is provided for listing items and totals thereof, for listing items and totals when the machine is used as an adding machine, and for producing the "Notifier." In listing items, or when the machine is used as an adding machine, the tape is line-spaced during each item entry operation, but, when totals of the items are printed, the issuing tape is given a long feed to feed the tape far enough to feed the printed total past the tearoff knife. When producing the "Notifier" the two lines of printing are spaced farther apart than when Listing, or Adding items. (Compare Figs. 132 and 133 with Fig. 131.) When the amount paid is printed on the "Notifier," the tape is given a long feed to feed the "Notifier" out of the machine.

The automatic controls over the feeding of the issuing tape are controlled by notched discs 1760 (Fig. 129) and 1761 (Fig. 128). The disc 1760 is differentially positioned under control of the first transaction bank of keys, and the disc 1761 is differentially positioned under control of the second transaction bank of keys. The peripheries of the discs are notched at the positions commensurate with the keys depressed. To obtain the various feeds pointed out above the discs are provided with notches of various depths. To illustrate the controls for obtaining various lengths of feeds the following dimensions are used for the purpose of disclosure, it being understood that the dimensions can be varied according to the particular system for which the machine is to be used.

No notch _____ long feed.
Shallow notch _____ .6 inch feed.
Intermediate notch _____ .2 inch feed.
Deep notch _____ No feed.

The disc 1760 (Fig. 129) is provided with internal teeth 1763, which mesh with a pinion 1764 mounted on the beforementioned square shaft 743, the latter being differentially rotated under control of the keys in the first transaction bank. The teeth 1763 of the disc 1760 are rotatable on a disc 1765, carried by the beforementioned shaft 632.

The disc 1761 is provided with internal teeth 1766, which mesh with a pinion 1767 carried by the beforementioned square shaft 763, which shaft is differentially positioned under control of the keys of the second transaction bank. The internal teeth 1766 rotate on a disc 1768 carried by the beforementioned shaft 632.

The discs 1760 and 1761 are differentially adjusted by the first and second transaction banks to present notched or unnotched sections thereon to a stud 1775, carried on the forward end of a feeler link 1776 pivoted on a bell crank 1777 pivotally mounted on the beforementioned shaft 1290. The feeler link 1776 is normally urged toward the left (Fig. 129) by a spring 1789 and is guided in its movement by a stud 1778 carried by the side frame 193 (see also Fig. 92B). The bell crank 1777 is provided with a rearwardly-extending arm 1779, which arm has a stud 1780, normally held in engagement with an arm 1781 secured to the beforementioned shaft 1290. The arm 1779 has pivoted thereto a link 1782, which is connected at its lower end to a segment 1783, pivoted on the beforementioned shaft 1681. The segment 1783 is provided with a high section 1784 and a low section 1785 and an intermediate section 1762 on its periphery. The sections 1784—1761, and 1785 may be brought into selective relationship with a stud 1786 on the slide 1745 under control of the notched discs 1760 and 1761.

When a high spot of either disc 1760 or 1761 is presented into the path of the stud 1775, the feeler link 1776 cannot be moved to the left (Fig. 129) by its spring 1789. As illustrated herein, this condition exists when the Total key 110, the Notifier key 111, the Read Group key 115, the Reset Group key 116, the Reset key 117, or the Read key 118 is depressed and the machine is operated, as indicated by the unnotched spots on the disc 1760 in the first, second, sixth, seventh, eighth, and ninth positions. When the List key 112 or the Add key 113 is depressed and the machine operated, the disc 1760 presents a shallow notch to the stud 1775, as indicated by the 3 and 4 positions of Fig. 129, and, when the Repeat key 115 is depressed, a deep notch of the disc 1760 is presented to the stud 1775, as indicated in the "5" position of Fig. 129.

The disc 1761 has no unnotched spots but has an intermediate spot in its "1" position and deep notches in its "2" and "9" positions, as indicated in Fig. 128. When the intermediate spot is positioned into the path of the stud 1775 under control of the Telephone Number key 101, the feeler link 1776 can move a distance sufficient to position the intermediate section 1762 into the path of the stud 1786. If deep notches of both discs 1760 and 1761 are simultaneously positioned in the path of the stud 1775, the feeler link 1776 can move its fullest extent.

When the feeler link 1776 moves its fullest extent upon rocking of the shaft 1290 by the cam 1298 (Fig. 108), as described above, the bell crank 1777 shifts the link 1782 downwardly far enough to lower the segment 1783 to position the high section 1784 thereon into the path of the stud 1786. With the high section 1784 in the path of the stud 1786, when the cam 1749 rotates counter-clockwise to release the slide 1756, the slide will be held against movement, and therefore no feed will take place.

If an intermediate notch on the disc 1761 is in the path of the stud 1775, the link 1776 will move an intermediate extent, thus positioning the section 1762 of the segment 1783 in the path of the stud 1786, and therefore, when the slide 1745 is released for movement by the cam 1749, the slide will move a distance sufficient to feed the issuing tape a distance of .600 inch, as here illustrated in Fig. 131.

If a shallow notch in the disc 1760 is in the path of the stud 1775, the segment 1783 is moved to position the section 1785 into the path of the stud 1786, and the slide 1745 is moved far enough to line space the entries, as here illustrated in Figs. 132 and 133.

If, on the other hand, an unnotched spot represented by the positions 1, 2, 6, 7, 8 and 9 on the disc 1760, is in the path of the stud 1775 and the link 1776 can not move, the segment 1783 will be maintained in the position shown in Fig. 129, and therefore the slide 1745 will move its fullest extent. This full extent of movement of the slide 1745 permits the issuing tape to be fed a long feed, which is sufficient to feed the last impression past the tear-off knife 1728 (Fig. 124).

Issuing tape feed—notifier

The issuing tape is illustrated in Fig. 131, as produced in "Notifier" transactions, and is provided to enable the accounting department of the telephone company to control delinquent accounts. Whenever a cashier accepts payment of a delinquent, or past due account, he first sets up the telephone number on the keyboard and depresses the Telephone No. key 101. The Telephone No. key 101 controls the positioning of the disc 1761 to position the intermediate notch thereon in the path of movement of the stud 1775, and since no key is depressed in the first bank, the deep notch in position "N" of disc 1760 is positioned opposite the stud 1775. During the operation of the machine the intermediate section 1762 is moved into the path of the stud 1786, and therefore after the telephone number has been printed the tape is fed .600 of an inch. During the next succeeding operation the amount paid is set up and the machine is released by depressing the "Notifier" key 111 and the proper Classification key 104 to 109. The "Notifier" key controls the disc 1760 to position an unnotched spot thereon into the path of the stud 1775, thus preventing any movement of feeler slide 1776, and segment 1783. This causes a long feed following the entry of the data illustrated on the second line in Fig. 131, which long feed is sufficient to feed the issuing slip past the tear off knife to the illustrated "Notifier."

The above is one example of how the notched discs 1760 and 1761 control the extent of feed of the issuing tape.

Issuing tape printing mechanism

The printing mechanism for the issuing tape is identical in construction with the printing mechanism for the audit tape, shown in Fig. 113, and comprises a printing platen 1800 (Figs. 124 and 127) having a stud 1801 on each end thereof projecting into notches in arms 1802 secured to a shaft 1803. One of the arms 1802 is provided with a downwardly-projecting ear, to which is pivoted a link 1804, the free end of which is slotted to slide on a slide 1805. A spring 1799 normally maintains the left end of the slot through which the stud 1805 projects in engagement with said stud. The free end of the link 1804 lies in the path of a stud 1806 carried by an arm 1807 pivoted on a stud 1808 carried by the side frame 180. The arm 1807 is provided with a toe engaging a stud 1809 on the side frame 180 to limit the clockwise rotation of the arm 1807. Also pivoted on the stud 1806 is one link 1810 of a toggle including a second link 1811, the links 1810 and 1811 being connected by a stud 1812. The link 1811 is also pivoted on a stud 1813 carried by a bell crank 1814, pivoted on a stud 1815 carried by the side frame 180. The bell crank 1814 is provided with a toe normally engaging a stud 1816 carried by the side frame 180, to limit its counter-clockwise rotation. The stud 1812 projects into the bifurcated end of a cam arm 1817, pivotally mounted on the before-mentioned shaft 1325. The cam arm 1817 is provided with rollers 1818, which engage cam plates 1819 carried by the printer cam shaft 1273.

The bell crank 1814 is provided with a stud 1820, which projects into the path of movement of a control segment 1821, pivoted on the shaft 1681. In order to control the operation of the printing platen 1800, the segment 1821 may be rocked counter-clockwise beneath the stud 1820 to prevent clockwise rotation of the bell crank 1814 when the cam plates 1819 are rotated to rock the cam arm 1817. When the cam plates 1819 rock the cam arm 1817 clockwise, the bifurcated end thereof, engaging the stud 1812, raises the stud to straighten the toggle consisting of the links 1810 and 1811. If the segment 1821 is beneath the stud 1820, the bell crank 1814 cannot move clockwise, and therefore the toggle, comprising the links 1810 and 1811, is straightened to rock the arm 1807 counter-clockwise. Counter-clockwise movement of the arm 1807 causes the stud 1806 to engage the free end of the link 1804 to shift the link 1804 toward the left (Fig. 124) to rock the shaft 1803 and the arms 1802 clockwise to raise the platen 1800 into engagement with the type carriers on the shaft 463. If the segment 1821 is not moved beneath the stud 1820, then, when the cams 1819 rock the arm 1817 clockwise, the bell crank 1814 is not arrested, and therefore the bell crank 1814 is free to rock clockwise when the toggle comprising the links 1810 and 1811 is straightened. In this operation, the arm 1807 is not rocked counter-clockwise, and therefore the platen 1800 is not raised to take an impression of the issuing strip.

The positioning of the control segment 1821 is controlled by notched discs 1830 (Fig. 125) and 1831 (Fig. 124). The notched disc 1831 is differentially positioned under control of the keys in the first transaction bank in the manner hereinbefore described, through the square shaft 743. The square shaft 743 is provided with a pinion 1832, meshing with internal teeth on the disc 1831. The notched disc 1831 is provided with internal teeth which ride on a disc 1833 carried by the shaft 632.

The notched disc 1830 is differentially positioned under control of the keys in the second transaction bank, which transaction bank differentially positions the shaft 763 in the manner described hereinbefore. The shaft 763 has mounted thereon a pinion 1834, which meshes with internal teeth of the notched disc 1830. The internal teeth of the notched disc 1830 ride on a disc 1835 carried by the beforementioned shaft 632.

The control segment 1821 is connected to a bell crank 1840 by a link 1839. The bell crank 1840 is pivotally mounted on the beforementioned shaft 1290 and is provided with a stud 1845 normally resting on an arm 1842 secured to the beforementioned shaft 1290. One arm of the bell crank 1840 has pivoted thereto a feeler link 1841, slotted near its free end to slide on a stud 1837 carried by the side frame 180. A spring 1843 normally maintains the stud 1845 in engagement with the arm 1842. The forward end of the feeler link 1841 is provided with feeler fingers 1846 and 1847, carried by a block 1844 pivoted on the feeler link 1841. The feeler finger 1846 coacts with the control disc 1831, and the feeler finger 1847 coacts with the control disc 1830.

If either feeler finger 1846 or 1847 engages a low spot in the discs 1830 and 1831, the link 1841, when moved by the spring 1843, moves toward the left (Fig. 124), thus rocking the bell crank 1840 clockwise to lower the link 1839 and position the segment 1821 into the path of the stud 1820. When this condition occurs, the toggle comprising the links 1810 and 1811 is straightened, and the arm 1807 is rocked counter-clockwise to cause an impression to be taken in the manner described hereinbefore. However, if both fingers 1846 and 1847 engage high spots (or, in other words, the periphery of both discs 1830 and 1831), the feeler link 1841 is not permitted to move, and therefore the control segment 1821 is held out of the path of the stud 1820, and therefore no impression will be taken.

The discs 1830, which is adjusted under control of the second transaction bank, is provided with a notch in the 1 position, which corresponds to the telephone No. key 101. Thus, when the machine is operated with the telephone No. key 101 depressed, a notch is presented to the feeler finger 1847, and therefore the link 1841 is moved to position the control segment 1821 into the path of the stud 1820.

If any other key in the second transaction bank is depressed, a high spot of the control disc 1830 is moved into the path of the finger 1847, and therefore, when the machine is operated, the link 1841 is arrested; therefore no impression is made on the issuing strip.

Ink ribbon mechanism

The ink ribbon 1247 (Fig. 137) is carried on a removable frame, and the frame may be inserted into the machine from its right-hand side. The insertable frame is of sufficient length to position the ribbon over all three of the groups of type carriers, so that a single ribbon serves for the insertable slip, the audit tape, and the issuing tape printing mechanisms.

The removable ink ribbon frame comprises a horizontally-disposed plate 2000 (Figs. 92A, 93 and 137) and is secured to a vertically-disposed end plate 2001 by means of rivets 2002. The ink ribbon frame is provided with a guiding member 2003, provided with flanges 2004 extending in opposite directions. The flanges 2004 are inserted into a channel member 2005 (Fig. 136) supported by the end printer frames 203 and by screws 2006. The channel member 2005 extends across the three printer sections beneath the six printer frames 203. After the ink ribbon frame has been inserted in the machine, it is latched in position by a latching member comprising two arms 2007. The arms 2007 are moved into engagement with annular grooves in two studs 2008 carried by the side frame 180. A spring 2009, stretched between one of the arms 2007 and a stud 2010 on the ink ribbon end plate 2001, maintains the arms 2007 in engagement with the annular grooves of the studs 2008 when the ink ribbon frame is in the machine.

When it is desired to remove the ink ribbon frame from the machine, the arms 2007 are rocked counter-clockwise by a knob 2011 secured thereto and mounted to rotate on the stud 2012 carried by the end plate 2001. A stud 2013, carried by the end plate and projecting into a slot in the arm 2007, limits the movement of the arms 2007 in a counter-clockwise direction when the ribbon frame is being removed from the machine.

The ends of the ink ribbon are secured to spools which may be rotated in either direction to feed the ribbon one step during each machine operation, and, when the end of the ribbon is reached, a reversing mechanism reverses the direction of movement of the ribbon. One spool 2015 is rotatably mounted on a stud 2016 carried by the end plate 2001. The ribbon is fed from the spool 2015 over a guide roller 2017 rotatably mounted on a stud 2018 on the end frame 2001. The end of the ink ribbon horizontal plate 2000 is formed at an angle 2019 (Fig. 92A), and the ribbon is guided across the plate to its left-hand end, as viewed from the front of the machine and as shown at the upper right in Fig. 93, where the plate is also cut at an angle and the ribbon is fed over the angle and underneath the plate and over the top of an angle on the left (Fig. 93) back over the plate 2000 and under an angle 2020 to a guide roller 2021 rotatably mounted on a stud 2022 carried by the end plate 2001. From the roller 2021, the ribbon is guided to a second spool 2023, where the ribbon is wound thereon. When the ribbon feeding mechanism is reversed in the manner described hereinafter, the ribbon is fed from the spool 2023 back to the spool 2015.

Secured to the spool 2023 is a ratchet wheel 2024, which may be engaged by a feed pawl 2025 (Fig. 137) pivotally mounted on a stud 2026 on a feed arm 2027. The feed arm 2027 is pivotally mounted on a stud 2028 carried by the end plate 2001. A spring 2029, having one end hooked over the pawl 2025 and the other end hooked over a stud 2030, normally maintains a stud 2031 in engagement with the ratchet wheel 2024. Clockwise rotation of the feed arm 2027 rotates the ratchet wheel 2024 clockwise an extent sufficient to feed the ribbon one space. At the time the spool 2023 is rotated clockwise to pull the ribbon from the spool 2015, the spool 2015 is free to rotate, thus giving up ribbon which is wound on the spool 2023. In order to prevent too rapid rotation of the spool 2015 when the spool is unwound, a brake arm 2033 is provided, which arm is pivoted on a stud 2034 carried by the end plate 2001. A similar brake arm 2035, pivoted on a stud 2036, is provided for preventing too rapid rotation of the spool 2023. A spring 2037, secured to the ends of the brake arms 2033 and 2035, normally maintains concave portions of the brake arms in contact with the respective spools 2015 and 2023. The spring 2037 is strong enough to effect a proper braking action on the spools.

The spool 2015 has secured thereto a feed ratchet wheel 2040, which may be engaged by a pawl 2041, pivoted on a stud 2042 carried by a feed arm 2043 pivoted on the stud 2016. A spring 2044 maintains a stud 2045 on the pawl 2041 in engagement with a shoulder 2046 formed on the end plate 2001 to maintain the pawl 2041 out of engagement with the ratchet wheel 2040 when the ribbon is feeding off the spool 2015 and onto the spool 2023. When the feed arm 2043 is rocked counter-clockwise in a manner hereinafter described, the stud 2045 is moved off the shoulder 2046, thus permitting the pawl 2041 to drop into engagement with a tooth of the ratchet wheel, and, upon continued counter-clockwise movement of the feed arm 2043, the feed pawl 2041 picks up the ratchet wheel 2040 and rotates the spool 2015 to wind the ribbon thereon. At this time, the ribbon is fed off the spool 2023, and the stud 2031 is on a shoulder 2032; therefore the feed pawl 2025 is held out of engagement with the ratchet wheel 2024, thus permitting free rotation of the spool 2023 to permit it to play out ribbon as it is wound up on the spool 2015.

Mounted on the stud 2036 is a non-retrograde movement pawl 2050. The pawl 2050 normally tends to rock clockwise under the action of a spring 2051 to engage with the ratchet wheel 2024 to prevent retrograde movement of the ratchet wheel 2024 and therefore also of the spool 2023. When the ribbon is being wound on the spool 2015, a ledge 2053 is moved beneath a stud 2052 on the pawl 2050 to hold the pawl out of engagement with the ratchet wheel 2024.

The ribbon feed arms 2027 and 2043 are operated selectively by a pair of cams 2060 (Fig. 136) secured to the printer cam shaft 1273. Coacting with the cam plates 2060 are rollers 2061 carried by an arm 2062 pivotally mounted on the beforementioned shaft 1325. Pivotally connected to the arm 2062 is a link 2063 bifurcated at its left-hand end (Fig. 136) to slide on a stud 2064. Pivotally mounted on a stud 2066, carried by the link 2063, is a coupling pawl 2065. A spring 2067, stretched between an ear 2068 on the link 2063 and an upstanding finger 2069 of the pawl 2065, maintains a stud 2070, on the pawl 2065, either in a notch 2071 or in a notch 2072, for a purpose described hereinafter. The notches 2071 and 2072 are formed in a slide 2073, slidably mounted on studs 2064 and 1074. The slide 2073 is provided with a notch 2075 for engaging a stud 2038 on the feed arm 2027, and with a notch 2076 for engaging a stud 2077 carried by the feed arm 2043 (Figs. 136 and 137). The studs 2038 and 2077 may normally be in engagement with either the right or left walls of the respective notches 2075 and 2076. In Fig. 136, the stud 2038 is shown in engagement with the right-hand wall of the notch 2075, and the stud 2077 is illustrated in contact with the left-hand wall of the notch 2076. When the studs 2038 and 2077 are in such positions and the stud 2070 on the coupling pawl 2065 is in the notch 2071 and the machine is operated, the cams 2060 rock the arm 2062 first clockwise to shift the link 2063 leftwardly (Fig. 136). During this movement, the stud 2070, being held in engagement with the notch 2071 by the spring 2067, shifts the slide 2073 leftwardly. Leftward movement of the slide 2073, with the right-hand wall of the notch 2075 in engagement with the stud 2038, rocks the feed arm 2027 clockwise to effect a feeding movement of the ratchet wheel 2024 in a manner described hereinbefore.

After the ribbon has been fed the required distance, the cam plates 2060 rock the arm 2062 counter-clockwise to restore the slides 2063 and 2073 toward the left into the position shown in Fig. 136. During this restoring movement of the slide 2073, when the notch 2075 releases the stud 2038, a spring 2080 (Fig. 137), stretched between the lower ends of the feed arms 2027 and 2043, restores the feed arm 2027 into the position shown in Fig. 137.

A reversing mechanism is provided for causing the feed arm 2043 to effect the feeding operation of the ribbon in a reverse direction when the end of the ribbon is reached on the spool 2015. The spool 2015 (Fig. 139) is provided with a flange made up of two sections 2081 and 2082, the latter being pivoted to the flange 2081 by a stud 2083. The flange 2082 is provided with a turned-in ear 2084, which lies in a flat portion of the spool 2015, and the ribbon is wound over the ear 2084. As long as the ribbon is over the ear 2084, the flange 2082 lies with its periphery in coincidence with the periphery of the flange 2081, thus providing a complete circle. If, however, the end of the ribbon is reached and the ribbon passes beyond the ear 2084, the flange 2082 may be rotated on the stud 2083 to release a control means to reverse the direction of feeding movement of the ribbon. This reversing control is effected by a pawl 2085 (Fig. 136) pivoted on the beforementioned stud 2064. The pawl 2085 is provided with a flange 2086, which bears on the periphery of the flange comprising the sections 2081 and 2082. As long as the peripheries of the sections of the flanges 2081 and 2082 are in coincidence, the pawl 2085 is maintained in the position shown in Fig. 136. However, when the end of the ribbon is reached, to permit the section 2082 to rock around the stud 2083, the pawl 2085 is permitted to rock counter-clockwise under the action of a spring 2087, having one end secured to a reversing pawl 2088 and the other end connected to a stud on the frame 180. The upper end of the reversing pawl 2088 bears on a flange formed in the upper end of the pawl 2085, and therefore the pawl 2085 determines the position of the pawl 2088.

The pawl 2088 is provided with a coupling shoulder 2089, which may be rocked into engagement with a shoulder 2090 on the slide 2073 when the section 2082 is rocked around the stud 2083. The pawl 2088 is mounted on a stud on the side frame 180 and therefore cannot move with the slide 2073. Therefore, when the end of the ribbon on the spool 2015 is reached and the section 2082 of the flange of the spool is permitted to rock around the stud 2083, the pawl 2088 is rocked counter-clockwise to arrest the leftward movement of the slide 2073. When this occurs, and the cams 2060 rock the arm 2062 to shift the link 2063 leftwardly (Fig. 136), the slide 2073 cannot move therewith. Therefore the stud 2070, engaging the cam surface between the notches 2071 and 2072, cams the stud 2070 out of the notch 2071, and the spring 2067 snaps the stud 2070 into engagement with the notch 2072. Upon restoring movement of the link 2063, the link 2063 shifts the slide 2073 to the right (Fig. 136), and during this movement the left-hand wall of the notch 2076 picks up the stud 2077 and rocks the feed arm 2043 counter-clockwise to cause the feed pawl 2041 to be released from the ledge 2046 and to rotate the ratchet wheel 2040 counter-clockwise to wind the ribbon onto the spool 2015 and off the spool 2023.

The spool 2023 is provided with a collapsible flange, like the flange 2082 of the spool 2015, and also with pawls similar to those shown for the spool 2015 to control the reversing movement of the ribbon feed when the end of the ribbon is reached on the spool 2023. When this occurs, a pawl 2100 is permitted to drop into the path of the shoulder 2101 on the slide 2073, thus arresting movement of the slide 2073 to the right (Fig. 136), and therefore, during this operation of the machine, when the cam plates 2060 move the link 2063 to the right, with the stud 2070 in the notch 2072, the slide 2073 will be arrested, and therefore the stud 2070 will be cammed out of the notch 2072 and back into the notch 2071, whereupon the reversing mechanism is again in the position shown in Fig. 136 and ready to rewind the ribbon onto the spool 2023.

When the ink ribbon frame is removed from the machine, it is desirable that the ratchet studs 2038 and 2077 be moved toward the central section of the notches 2075 and 2076, so that, upon reinsertion of the ribbon frame into the machine, the studs 2038 and 2077 will properly move into said notches. The latch arms 2007 are provided with extensions to rock the feed arms 2027 and 2043 a slight extent, which movement is sufficient to move the studs 2038 and 2077 toward the central sections of the said notches. To rock the arm 2027 slightly clockwise, the upper latch arm 2007 is provided with a finger 2105 (Fig. 136), which is moved into engagement with an extension 2102 on the feed arm 2007 when the latch arm is manually rocked counter-clockwise to release the ink ribbon frame from the studs 2008. Latching the ribbon frame in the machine, after it is reinserted, by moving the latch arms 2007 clockwise, removes the finger 2105 and the surface 2104, respectively, to permit the spring 2080 to restore the feed arms 2027 and 2043 to their normal positions, with the studs 2038 and 2077 against their respective walls in the notches 2075 and 2076.

*Cashier's key*

If desired, the machine illustrated herein can be provided with a cashier's key 2210 (Figs. 54, 84, and 85), which is insertable into the slot 89 near the lower left-hand corner of the machine (Figs. 1 and 2) just below the date and consecutive number wheels 124 and 126. When inserted into the slot 89, the cashier's key 2210 sets the type wheels 1226 to position a two-digit number, or other desirable symbol, at the printing line in the three printer sections, to identify the cashier entering the transaction into the machine, and also operates an interlock which normally prevents release of the machine.

The slot 89 is formed in a housing 2211 (Figs. 81, 82, 83, and 87), secured to the left side frame 181 (Fig. 54) by two studs 2214. Two racks 2212 are slidably mounted in guideways formed in the housing 2211, and each of said racks meshes with a pinion 2213, rotatably carried on a sleeve on one of the studs 2214. Each pinion 2213 is secured to a gear 2215, which in turn meshes with a ring gear 2216 (see also Fig. 90A), the latter also having internal teeth 2217. Each ring gear 2216 is supported on a disc 2218, carried on the shaft 510. The internal teeth 2217 of each ring gear mesh with a pinion 2219. The pinions 2219 mesh with a pinion 2221 on a square shaft 2222. The shaft 2222 spans the three printer sections. The square shaft has pinions similar to the pinions 2221 thereon located so as to mesh with pinions 2119, and the pinions 2119 mesh with the ring gears 1228, described above, for setting the machine number type wheels 1226. When a cashier's key is provided, the fixed aliner 1227 is omitted to permit adjustment of the type wheels 1226 by a cashier's key, in which event no machine number is set up and printed.

The type wheels 1226 are adjusted by the cashier's key through the above connections when the key 2210 is inserted into the slot 89 and depressed.

The upper end of each rack 2212 is provided with a finger terminating at the edge of the slot 89. A cam slot 2223 is formed at the upper end of each rack 2212, embracing a rod 2224. The cashier's key has a block 2225 secured to one side thereof, and, when the cashier's key is inserted into the slot 89 and depressed, the block 2225 engages the top of the racks 2212 and forces the racks 2212 downwardly. Downward movement of the racks 2212 causes the cam slot 2223, acting on the fixed rod, to tilt the upper ends of the racks toward the key and force the fingers thereon into slots 2226 in the cashier's key 2210. Continued depression of the cashier's key 2210 moves the racks downwardly to adjust the type wheels to set characters at the printing line commensurate with the location of the block 2225 and the slots 2226 in the key. The block 2225 is located and shaped to cause any one of ten digits to be set on each type wheel, thus providing a means to identify the cashier operating the machine, each cashier being supplied with an individual key.

A spring plate 2227 normally maintains the racks 2212 in their upper positions, to which positions they are returned when the cashier's key is withdrawn. The slots 2226, being engaged by the fingers on the racks, lift the slides, and the cam slot 2223 engages the rod 2224 near the end of their upward movement, whereby the fingers are cammed out of the slots, and the racks are forced into contact with the spring plate 2227.

The machine release shaft 264 (Fig. 54) is locked against releasing movement when no cashier's key 2210 is in position to set the type wheels 1226. To this end, the link 939 (Figs. 54 and 81) is provided with a square stud 2230, overlying a flange 2231 on a link 2232, slotted to be supported on the stud 1019 on the side frame 181. The left-hand end (Fig. 81) of the link 2232 is supported on the end of a link 2234, pivoted on a stud 2235 in the bracket 2211. The link 2232 is bent at right angles to locate a sensing finger 2236 thereon into alinement with a slot 2237 (Fig. 85) in the key 2210, when the key is positioned into the slot 89. A spring 2238 presses the right-hand end of the slot in the link 2234 against the stud 1019, as shown in Fig. 81, to position the sensing finger 2236 beneath the slot 89.

When a key 2210 is inserted into the slot 89, its lower end engages a cam edge on the sensing finger 2236 and thereby shifts the link 2232 to the right (Fig. 81) to remove the flange 2231 from beneath the square stud 2230, and, as the key cams the link 2232 its fullest extent, a shoulder 2239 moves beneath the square stud to prevent release of the machine until the key is fully depressed. When the key 2210 reaches its fully depressed position, the nose of the sensing finger enters the slot 2237 to permit the spring 2238 to restore the link part way toward normal position, wherein both the flange 2231 and the lug 2239 are out of the path of movement of the square stud 2230, thus permitting the stud 2230 to move between the flange 2231 and the lug 2239 when the machine is released. This also prevents withdrawal of the key 2210 during a machine operation, since an attempt to do so is prevented by the stud 2230.

There is one position of the sensing finger during the depressing movement where both the flange 2231 and the lug 2239 are out of the path of movement of the stud 2230. A dishonest operator could release the machine by partially depressing the cashier's key far enough to remove the flange from the path of the stud 2230 and release the machine, thus falsifying the printed record by printing a cashier's symbol other than the one represented by the key. To prevent this sort of misoperation, a second link 2240 (Fig. 87) is provided.

The link 2240 is slotted to slide on the stud 1019 and has, on its left-hand end, a stud 2241 (Fig. 87), which projects into a slot formed in the bracket 2211. A spring 2242 normally maintains the right-hand end of the slot in the link 2240 against the stud 1019. When the link is in this position, a lug 12243 thereon underlies the stud 2230 and prevents releasing movement of the link 939.

Secured to the side of the link 2240 is a sensing finger 2243 having a cam edge 2244 normally in the path of movement of the key 2210. The location of the nose of the sensing finger 2243 in respect to the key is such that the link 2240 is not moved far enough to remove the lug 12243 from beneath the stud 2230 until after the lug 2239 on the link 2232 has been moved under the stud 2230.

OPERATION

To explain the various operations and entries made by the machine, the entries illustrated on the audit tape (Fig. 120) will be used by way of typical transactions.

The entry on line 1 indicates a payment of $4.50, and the amount was entered into the A totalizer.

The entry line 2 indicates a payment of $25.00 and the amount was entered into the B totalizer. The telephone bill (Fig. 102) was in the slip printer, and the machine was released with the "B" key 108 depressed. During the operation, the "B" key 108 controlled the setting of disc 1277 (Fig. 99) to position a deep-notched section thereof into the path of movement of the stud 1281, and, since no key 110 to 118 was depressed, the deep notch in the "N" position of disc 1278 lies in the path of said stud 1281, and the printing hammer is operated twice, once to print on the main section and once to print on the stub, the feeding mechanism being similarly controlled to cause the form to be fed between printing operations. Also, during this operation, the notched disc 1621, having a notch in the "B" position, causes an imprint to be made on the audit tape. Since there is no notch in the "B" position of disc 1835 (Fig. 125) or in the "N" position of disc 1831, no impression is made on the issuing tape.

The entry on line 3 indicates that the previous entry was paid by a check. During this operation, the check 1242 (Fig. 103) is placed in the slip printer face down, and the Repeat key 114 and the Check key 102 are depressed. The Repeat key controls the machine to repeat printing the previous entry and sets the repeat symbol at the printing line. The Check key selects the "Check" totalizer, so that a total of all checks is accumulated at the end of a given period of time. The slip printer is controlled to print once, and the data is printed on the audit tape. The issuing tape is not printed or fed.

The data on line 4 indicates that a bill of $10.00 was paid in classification "C." In this transaction, only the stub 1236 (Fig. 104) was presented, and the stub is located in the machine to receive the entry near the bottom thereof. During this operation, the slip printer is automatically controlled to print once, and the data is printed on the audit tape.

The data on line 5 indicates that a duplicate stub (Fig. 106) was printed. In this entry, the duplicate stub is positioned on the slip table, and the Repeat key 114 and the Duplicate key 103 are depressed. This repeats the previous data on the stub and on the audit tape, together with the symbol "DP" and the repeat symbol. No impression is made on the issuing tape.

The data on lines 6 and 18 indicates totals taken from the front, or "adding," totalizer. In the addition of a number of items, the items are not printed on the audit tape but are listed on the issuing tape. However, these items are listed on the issuing tape, together with a plus symbol (compare line 18 with Fig. 133). In this instance, the slip printer is not operated.

The data on line 7 indicates an entry similar to line 1. Comparing line 7 with Fig. 105 illustrates a method of printing the main section of the bill and the stub, when they are detached. In this case, the stub is placed on top of the main section, and the data is printed on each section.

The data on lines 8, 9, 10, and 11 are similar to those explained above.

Line 12 illustrates the printing of a telephone number on the audit tape, and during such operation a "Notifier" (Fig. 131) is issued by the issuing tape printer. Two machine operations are performed to issue a "Notifier." In the first operation, the data on line 12 (Fig. 120) is printed both on the audit tape and on the "Notifier." During the second operation, the data including the amount paid is printed as illustrated in Figs. 120 and 131. The symbol "—" on the second line of printing on the "Notifier" and on line 13 (Fig. 120) is set under control of the "Notifier" key 111. During the entry of the telephone number, the zero-setting mechanism is controlled to prevent the normal setting of zeros on the units and tens order type wheels.

Lines 14 to 17 indicate that the machine was operated to list a number of items, as shown in Fig. 132. In this series of operation, with the List key 112 depressed, the items are printed both on the audit tape (Fig. 120) and on the issuing tape (Fig. 132). The symbol "L" identifies the kind of operation, and the star opposite the total indicates that the front totalizer was reset to zero.

The last three lines on the audit tape indicate that the totalizers "A," "B," and "C" were sub-totalized, which operation is identified by the symbol X. During these operations, the totals are printed on the issuing tape as illustrated in Fig. 130.

While the forms of the invention shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. In a machine of the class described, a type carrier; a differentially-settable means to set the type carrier to position a plurality of digits, 0 to 9, or a blank at the printing line; a totalizer element; an actuator movable from a normal position into a plurality of differentially adjusted positions to enter an amount in the totalizer element; a zero stop pawl to arrest the actuator in zero position after the actuator moves one step from a normal position; data-setting manipulative devices to differentially arrest the actuators to enter digits from 1 to 9 into the totalizer element; means operable during each machine operation to move the settable means into a position to move the blank on the type carrier to the printing line; means to couple the actuator to the setting means after the actuator has been differentially positioned under control of a data-setting manipulative device and the settable means has been set to said blank position; means to restore the actuator to normal position after the coupling means is in effective position, whereby the settable means is adjusted commensurate with the differentially set position of the actuator; a device movable into engagement with the actuator when the actuator is arrested in zero position; means to operate the device to restore the actuator to normal position before the coupling means becomes effective to prevent moving the settable means out of the blank position when the actuator is arrested in zero position by the zero stop pawl, to thereby maintain the blank space of the type carrier at the printing line; a first element normally in engagement with certain ones of the devices to prevent movement thereof into engagement with the actuators; a second element normally disengaged from certain other of said devices; a transaction manipulative device; and means operable under control of the transaction manipulative device to disengage said first element from said certain devices and to engage the second element with said certain other devices, thereby selectively causing zeros to be set in certain denominational order type carriers.

2. In a machine of the class described, the combination of a plurality of type carriers; differentially settable means to set each type carrier to position a plurality of digits 0 to 9, or a blank, at the printing line of each type carrier; totalizer elements; actuators movable from a normal position into a plurality of differentially adjusted positions to enter amounts into the totalizer elements; zero stop pawls to arrest the actuators to zero position after each actuator moves one step from a normal position; manipulative devices to differentially arrest the actuators to enter digits from 1 to 9 into each totalizer element; means operable during each machine operation to move the settable means into positions to move the blanks on each type carrier to the printing line; means to couple the actuators to the settable means after the actuators have been differentially positioned under control of the manipulative devices and the settable means have been set to said blank positions; means to restore the actuators to normal positions after the coupling means are in effective position, whereby the settable means are adjusted commensurate with the differentially set position of the actuator; a device movable into engagement with each one of the actuators when the actuators are arrested in zero positions; means to operate the device to restore the actuators to normal position before the coupling means become effective to prevent moving the settable means out of their blank positions when the actuators are arrested in zero positions by the zero stop pawls to thereby maintain the blank spaces of each type carrier at the printing line; means controlled by a higher order actuator to prevent the device from moving into engagement with a lower order actuator when the said higher order actuator is positioned under control of a manipulative device to cause the actuator to remain in zero position until the coupling means becomes effective to thereby cause the means to restore the actuator to move the settable means and the type carriers to zero positions; an element normally latching a plurality of lowest order devices in ineffective positions; a second element normally ineffective to latch a higher order device in ineffective position; a transaction manipulative device; and means operable under control of the transaction manipulative device to move the first-named element into unlatching position and the second element into effective position, to vary the setting of zeros in certain denominational orders.

3. In a machine of the class described, in combination with manipulative devices and a zero stop, an actuator differentially adjustable under control of said manipulative devices and zero stop from a normal position, and an operating means to restore the actuator to normal position during each machine operation, of a second operating means to restore the actuator to normal position after the actuator is adjusted to zero position; a type carrier; a settable means connected to the type carrier and movable into a zero eliminated position; coupling means to couple the settable means to the actuator after the actuator has been differentially adjusted and before the first-named operating means restores the actuator to normal position to thereby adjust the type carriers commensurate with the differential setting of the actuator under control of said manipulative devices, said second operating means operating before the coupling means is moved to couple the setting means to the actuator; connections between the first-named operating means and the second operating means whereby the second operating means is operated by the first-named operating means; means controlled by the actuator to disable one element of the second operating means when the actuator is adjusted under control of a manipulative device, said last-named means being ineffective when the actuator is adjusted under control of the zero stop; a transaction manipulative device; and a latch set under control of the manipulative device to disable said one element when the actuator is set under control of the zero stop.

4. In a zero setting mechanism, in combination with manipulative devices and a zero stop, an actuator differentially adjustable under control of said manipulative devices and zero stop from a normal position, and an operating means to restore the actuator to normal position during each machine operation, of a second operating means to restore the actuator to normal position after the actuator is adjusted to zero position; a type carrier; a settable means connected to the type carrier and movable into a zero eliminated position; coupling means to couple the settable means to the actuator after the actuator has been differentially adjusted and before the first-named operating means restores the actuator to normal position to thereby adjust the type carrier commensurate with the differential setting of the actuator under control of said manipulative devices, said second operating means operating before the coupling means is moved to couple the setting means to the actuator; a latch to latch one element of the second operating means in ineffective position when the actuator is differentially adjusted under control of said manipulative devices; means on said actuator to disable the latch when the actuator is in normal and zero positions to enable the second operating means; a second latch to disable said one element; and a transaction key to control the effectiveness of the second latch.

5. In a zero setting mechanism, in combination with manipulative devices and a zero stop, an actuator differentially adjustable under control of said manipulative devices and zero stops from a normal position, and an operating means to restore the actuator to normal position during each machine operation, of a second operating means to restore the actuator to normal position after the actuator is adjusted to zero position; a type carrier; a settable means connected to the type carrier and movable into a zero eliminated position; coupling means to couple the settable means to the actuator after the actuator has been differentially adjusted and before the first-named operating means restores the actuator to normal position to adjust the type carrier commensurate with the differential setting of the actuator under control of said manipulative devices, said second operating means operating before the coupling means is moved to couple the setting means to the actuator, said second operating means including a cam arm, means on the first-named operating means to operate said cam arm, a pawl on said cam arm movable into engagement with said actuator when the actuator is setting in zero position, a latch to latch the pawl in an ineffective position, and means on the actuator to normally maintain the latch in an ineffective position and releasable to move into effective position when the actuator is adjusted under control of a manipulative device to disable the latch and thereby disable the second operating means when the actuator is moved to represent a digit 1 to 9; a manipulative means; and connections actuated by the manipulative means, including a second latch, to latch the pawl in ineffective position when the actuator is moved to represent a zero.

6. In a zero setting mechanism, in combination with manipulative devices and a zero stop, an actuator differentially adjustable under control of said manipulative devices and zero stop from a normal position, and an operating means to restore the actuator to normal position during each machine operation, of a second operating means to restore the actuator to normal position after the actuator is arrested in zero position; a type carrier; a settable means connected to the type carrier and movable into a zero-eliminated position; coupling means to couple the settable means to the actuator after the actuator has been differentially adjusted and before the first-named operating means restores the actuator to normal position to thereby adjust the type carrier commensurate with the differential setting of the actuator under control of the set of manipulative devices, said second operating means operating before the coupling means is moved to couple the setting means to the actuator, said second operating means including a cam arm, means on the first-named operating means to operate said cam arm, a pawl on said cam arm movable into engagement with said actuator when the actuator is setting in zero position, a spring-urged latch to latch the pawl in ineffective position, and a projection on the actuator engaging the latch when the actuator is in normal or zero position to disable the latch, said projection movable out of engagement with the latch when the actuator is adjusted to represent a digit 1 to 9, to thereby render the latch effective to latch the pawl in ineffective position to thereby disable the second operating means; a second latch to latch the pawl in ineffective position during certain operations during which the pawl is released from the first-named latch; a manipulative means; and connections controlled by the manipulative means to control the effectiveness of the second latch.

7. In a zero setting mechanism, in combination with manipulative devices and a zero stop, an actuator differentially adjustable under control of said manipulative devices and zero stop from a normal position, and an operating means to restore the actuator to normal position during each machine operation, of a second operating means operable by the first operating means to restore the actuator to normal position after the actuator is adjusted to zero position; a type carrier; a settable means connected to the type carrier and movable into a zero eliminated position; coupling means to couple the settable means to the actuator after the actuator has been differentially adjusted and before the first operating means restores the actuator to normal position to thereby adjust the type carrier commensurate with the differential setting of the actuator under control of said manipulative devices, said second operating means operating before the coupling means is moved to couple the setting means to the actuator, said second operating means including a cam arm, means on the first-named operating means to operate said cam arm, a spring-urged pawl on said cam arm, and means on the first-named operating means to normally maintain said pawl in an ineffective position, said pawl released to the action of its spring when the operating means is operated to release the actuator, to move into engagement with the actuator when the actuator is arrested in zero position by the zero pawl, and before the second operating means is operated to move the actuator to normal position before the coupling means becomes effective; a manipulative means; and a latch settable under control of the manipulative means to latch the pawl in ineffective positions during certain operations in which the said pawl is released to the action of its spring.

8. In a machine of the class described, the combination of a plurality of type carriers; a totalizer including a plurality of totalizer elements; differentially settable means to set each type carrier to position a plurality of digits 0 to 9, or a blank, at the printing line of each type carrier; totalizer actuators movable from a normal position into a plurality of differentially adjusted positions to enter amounts in the totalizer elements; zero stop pawls to arrest the actuators in zero positions after each actuator moves one step from a normal position; manipulative devices to differentially arrest the actuators to enter digits from 1 to 9 into each totalizer element; means operable during each machine operation to move the settable means into positions to move the blanks on each type carrier to the printing line; means to couple the actuators to the setting means after the actuators have been differentially positioned under control of manipulative devices and the settable means have been set to set blank positions; means to restore the actuators to normal positions after the coupling means are in effective positions, whereby the settable means are adjusted commensurate with the differentially set position of the actuators; an element movable into engagement with the actuators when the actuators are arrested in zero position; a cam operated by the means to restore the actuators to operate the element to restore the actuators to normal position before the coupling means becomes effective to prevent moving the settable means out of their blank positions when the actuators are arrested in zero positions by the zero stop pawls to thereby maintain the blank spaces of each type carrier at the printing line; and interponent controlled by a higher order actuator to prevent the element from moving into engagement with lower order actuators when said higher order actuator is positioned under control of a manipulative device to cause the lower order actuators to remain in zero position until the coupling means becomes effective to thereby cause the means to restore the actuator to move the settable means and type carriers to zero positions; a manipulative means; latches movable to disable certain ones of the elements; and connections controlled by the manipulative means to select one or the other latch to move into position to disable one of the elements.

9. In a machine of the class described, the combination of a plurality of type carriers; a totalizer including a plurality of totalizer elements; differentially settable means to set each type carrier to position digits 0 to 9 or a blank at the printing line; actuators movable from a normal position into a plurality of differentially adjustable positions to enter amounts in the totalizer elements; zero stop pawls to arrest the actuators in zero position after each actuator moves one step from a normal position; manipulative devices to differentially arrest the actuators to enter digits from 1 to 9 in each totalizer element; means operable during each machine operation to move the settable means into positions to move the blanks on each type carrier to the printing line; means to couple the actuators to the setting means after the actuators have been differentially positioned under control of the manipulative devices and the settable means have been set to said blank positions; means to restore the actuators to normal position after the coupling means are in effective position, whereby the settable means are adjusted commensurate with the differentially set position of the actuators; a cam member operated by the means to restore the actuators; a pawl on each cam member; a projection on each actuator; means to move the pawls into engagement with the projections on the actuators when the actuators are arrested in zero positions, said cam members thereafter operated to restore the actuators to normal position before the coupling means become effective to prevent moving the settable means out of their blank positions when the actuators are arrested in zero positions by the zero stop pawls to thereby maintain the blank spaces of each type carrier at the printing line; an interponent controlled by a higher order actuator to prevent the pawls from moving into engagement with lower order actuators when the said higher order actuator is positioned under control of the manipulative device to cause the actuator to remain in zero position until the coupling means becomes effective to thereby cause the means to restore the actuators to move the settable means and the type carriers of said lower orders to zero positions; latches to render certain ones of the pawls ineffective; control plates to position the latches in one or another position; and a manipulative means to control the setting of the control plates.

10. In a machine of the class described, the combination of a keyboard having a plurality of banks of keys, a differential means controlled by each bank of keys, a control plate settable into a fixed position during each machine operation, and thereafter being reset under control of the differential means to represent the value of a depressed key, a type carrier settable by the control plate, said type carrier being set to a zero eliminated position by the control plate when the control plate is moved into said fixed position, coupling means to couple the differential means to the control plate, means to restore the differential means to home position after the control plate has been coupled to the differential means to thereby set the type carrier into a position commensurate with the setting of the differential means under control of a depressed key, restoring means controlled by the differential means when in zero position to restore the differential means to home position before the coupling means becomes effective to prevent setting of zeros at the printing line, means to disable the restoring means for a plurality of lower order differential means to cause printing of zeros in said lower orders, a normally disabled restoring means for a higher order differential means, a manipulative device, and means actuated under control of said manipulative device to render the restoring means for the said plurality of lower order differential means effective and to render the restoring means for the said higher order differential means ineffective.

11. In a machine of the class described, the combination of a keyboard having a plurality of banks of keys, a differential means controlled by each bank of keys, a control plate settable into a fixed position during each machine operation, and thereafter being reset under control of the differential means to represent the value of a depressed key, a type carrier settable by the control plate, said type carrier being set to a zero eliminated position by the control plate when the control plate is moved into said fixed position, coupling means to couple the differential means to the control plate, means to restore the differential means to home position after the control plate has been coupled to the differential means to thereby set the type carrier into a position commensurate with the setting of the differential means under control of a depressed key, restoring means controlled by the differential means when in zero position to restore the differential means to home position before the coupling means becomes effective to prevent setting of zeros at the printing line, a normally effective means comprising a latch engageable with one element of the restoring means to disable the restoring means for the plurality of lower order differential means, to thereby cause printing of zeros in said lower orders, a normally ineffective means comprising a latch engageable with one element of the restoring means to disable the restoring means for the said higher order differential means, a manipulative device, and means settable under control of the manipulative device to render the normally effective restoring means ineffective and to render the normally ineffective restoring means effective.

12. In a machine of the class described, the combination of a plurality of type carriers; differentially-settable means to set each type carrier to position a plurality of digits 0 to 9, or a blank, at the printing line of each type carrier; actuators movable from a normal position into a plurality of differentially-adjusted positions; zero stop pawls to arrest the actuators in zero position after each actuator moves one step from a normal position; manipulative devices to differentially arrest the actuators; means operable during each machine operation to move the settable means into positions to move the blanks on each type carrier to the printing line; means to couple the actuators to the settable means after the actuators have been differentially positioned under control of the manipulative devices and the settable means have been set to said blank positions; means to restore the actuators to normal positions after the coupling means are in effective position, whereby the settable means are adjusted commensurate with the differentially-set position of the actuator; a device associated with each actuator and each device movable into engagement with the associated actuator when arrested in zero position; means to operate the devices to restore the actuators to normal position before the coupling means become effective to prevent moving the settable means out of their blank positions when the actuators are arrested in zero positions by the zero stop pawls to thereby maintain the blank spaces of each type carrier at the printing line; means controlled by a higher order actuator to prevent the devices associated with lower order actuators from moving into engagement with the lower order actuators when the higher order actuator is to represent a digit 1 to 9 to cause the lower order actuator to remain in zero position until the coupling means becomes effective to thereby cause the means to restore the lower order actuators to move the settable means and the type carriers to zero positions; an element normally latching a plurality of lowest order devices in ineffective positions; a second element normally ineffective to latch a higher order device in ineffective position; a transaction manipulative device; and means operable under control of the transaction manipulative device to move the first-named element into unlatching position and the second element into effective position, to vary the setting of zeros in certain denominational orders.

13. In a machine of the class described, a lower order actuator, differentially movable from a normal position to a position representing digits from 0 to 9; a type carrier; a settable device for the type carrier to move the type carrier to represent a digit 0 to 9, or to a zero eliminated position; operating means to move the actuator into any of said positions; a second operating means to move the settable means into zero eliminated position during every operation of the machine and to restore the actuator from any position representing digits 1 to 9 into normal position; coupling means to couple the settable means to the actuator prior to the time the actuator is moved to normal position by said means, whereby the settable means is adjusted into a position commensurate with a digit represented by the differential setting of the actuator; secondary means to restore the actuator from zero position to normal position during an operation in which the actuator is arrested in zero position, said secondary means being effective before the coupling means becomes effective to couple the settable means to the actuator, to thereby cause the settable means to remain in eliminated position; a higher order actuator; means controlled by the actuator of higher order when the higher order actuator is set into a position representing digits 1 to 9 to disable the secondary restoring means to permit the settable means to be moved to zero position under control of the lower order actuator when the lower order actuator is restored to normal position; a transaction manipulative means; and two latches controlled by the manipulative means, one of said latches normally engaging one element of the secondary means for a lower order actuator to disable the secondary means in the said lower order, and the other latch movable to engage one element of the secondary means for a higher order actuator, to control the setting of zeros in different orders as controlled by the position of the manipulative means.

14. In a machine of the class described, in combination with manipulative devices and zero stops, actuators differentially adjustable under control of said manipulative devices and zero stops from normal positions, and an operating means to restore the actuators to normal position during each machine operation, of a second operating means to restore the actuators to normal position after the actuators are adjusted to zero position; a type carrier adjustable in accordance with the setting of each actuator; settable means connected to the type carriers and normally movable into zero eliminated positions; coupling means to couple each settable means to each actuator after the actuators have been differentially adjusted and before the first-named operating means restores the actuators to normal positions to thereby adjust the type carriers commensurate with the differential setting of the actuators under control of said manipulative devices, said second operating means, operating before the coupling means is moved to couple the setting means to the actuators, to thereby restore the actuators from zero position to normal position without moving the setting means out of eliminated position; a latching means normally engaging an element of the second operating means for a lower order actuator to disable the second operating means for said lower order; a second latching means normally in unlatching position with an element of a higher order second operating means but movable into latching engagement with said one element; a manipulative means; and means controlled by the manipulative means to withdraw the first latch and to move the second latch into latching position.

15. In a machine of the class described, in combination with manipulative devices and zero stops, a plurality of actuators differentially adjustable under control of said manipulative devices and zero stops from a normal position, and operating means to restore the actuators to normal position during each machine operation, of a second operating means to restore the actuators to normal position after the actuators are adjusted to zero position; type carriers; a settable means connected to each type carrier and movable into a zero eliminated position; coupling means to couple the settable means to the actuators after the actuators have been differentially adjusted and before the first-named operating means restores the actuators to normal position to thereby adjust the type carriers commensurate with the differential settings of the actuators under control of said manipulative devices, said second operating means operating before the coupling means are moved to couple the setting means to the actuators; connections between the first-named operating means and the second operating means whereby the second operating means is operated by the first operating means; said second operating means each including an interponent movable into or out of engagement with the respective actuators to control the effectiveness of the second operating means, and each interponent including a connection to control the effectiveness of the interponent of the next lower decimal order interponent; a depressible key; and connections operative under control of the depressed key to move into or out of engagement with one or another of said interponents to selectively control one or another plurality of said interponents to render the second operating means ineffective to restore certain ones of said actuators to normal positions, whereby the automatic zero setting is controlled in different groups of decimal orders.

16. In a machine of the class described, in combination with manipulative devices and zero stops, actuators differentially adjustable under control of said manipulative devices and zero stops from normal positions, and an operating means to restore the actuators to normal position during each machine operation, of a second operating means to restore each actuator to normal position after the actuator is adjusted to zero position; type carriers; a settable means connected to each type carrier and movable into zero eliminated positions; coupling means to couple each settable means to each actuator after the actuators have been differentially adjusted and before the first-named operating means restores the actuators to normal position to thereby adjust the type carriers commensurate with the differential setting of the actuators under control of said manipulative devices, said second operating means operating before the coupling means are moved to couple the setting means to the actuators; a means operated by the actuator to disable one element of each second operating means when the actuators are adjusted under control of manipulative devices, said one element of each second operating means being effective to restore each actuator to normal position when the actuators are adjusted to zero positions; a manipulative means; a control member to normally disable the said one element of a lower decimal order; connections between the said one element of the said lower order decimal order to disable all the elements in the next lower decimal orders; a second control member movable to engage and disable the one element of a decimal order higher than the decimal order of the said one element; and means actuated under control of the manipulative means to render the first-mentioned control member ineffective and to render the second-named control member effective, whereby the setting of zeros can be varied in different decimal orders under control of the manipulative means.

17. In a zero setting mechanism, in combination with manipulative devices and zero stops, actuators differentially adjustable under control of said manipulative devices and zero stops from normal positions, and an operating means to restore the actuators to normal positions during each machine operation, of a plurality of second operating means to individually restore the actuators to normal positions after the actuators are adjusted to zero positions; type carriers; a settable means connected to each type carrier and movable into a zero eliminated position; coupling means to couple each settable means to each actuator after the actuators have been differentially adjusted and before the first-named operating means restores the actuators to normal position to thereby adjust the type carriers commensurate with the differential setting of the actuators under control of said manipulative devices, said second operating means operating before the coupling means are moved to couple the setting means to the actuators; a latch to latch one element of each of the second operating means in positions in which the second operating means is rendered ineffective to restore the actuators to normal positions when the actuators are differentially adjusted under control of said manipulative devices; means on said actuators to disable the latches when the actuators are in normal and zero positions to enable the second operating means; a second latch to disable the said one element of a lower order decimal order, said second latch overriding the control of the first latch in said lower order; a third latch coacting with the said one element of a higher order decimal order, said third latch also overriding the control of the first latch of the said higher decimal order; and a transaction key to control the effectiveness of the second and third latches.

18. In a zero setting mechanism, in combination with manipulative devices and zero stops, actuators differentially adjustable under control of said manipulative devices and zero stops from normal positions, and an operating means to restore the actuators to normal positions during each machine operation, of a secondary operating means to restore each actuator to normal position when the actuators are arrested to zero positions; a type carrier adjusted under control of each actuator; a settable means connected to each type carrier and movable into zero eliminated positions; couplings means to couple each settable means to each actuator after the actuators have been differentially adjusted to a position to represent a digit 1 to 9 and before the first-named operating means restores the actuator to normal position to adjust the type carriers commensurate with the differential setting of the actuators under control of said manipulative devices, said secondary operating means operating before the coupling means are moved to couple the setting means to the actuators, said secondary operating means each including a cam arm, means on the first-named operating means to operate said cam arms, a pawl on said cam arm movable into engagement with said actuator when the actuator is setting in zero position, a latch to latch the pawl in an effective position, and means on the actuator to normally maintain the latch in an ineffective position and releasable to move into effective position when the actuator is adjusted under control of a manipulative device to disable the latch and thereby disable the second operating means when the the actuator is moved to represent a digit 1 to 9; a manipulative means; and connections actuated by the manipulative means, including a pair of disabling devices, to alternately disable the pawls of certain decimal orders when the actuators in said certain decimal orders are moved to represent a zero.

19. In a zero setting mechanism, in combination with manipulative devices and zero stops, actuators differentially adjustable under control of said manipulative devices and zero stops from a normal position, and an operating means to restore the actuators to normal position during each machine operation, of a secondary operating means to restore the actuators to normal position when the actuators are arrested in zero position; a type carrier associated with each actuator; a settable means connected to each type carrier and movable into a zero-eliminated position; coupling means to couple the settable means to the actuators after the actuators have been differentially adjusted and before the first-named operating means restores the actuators to normal positions to thereby adjust the type carriers commensurate with the differential setting of the actuators under control of the manipulative devices, said secondary operating means operating before the coupling means are moved to couple the setting means to the actuators, said secondary operating means each including a cam arm, means on the first-named operating means to operate said cam arms, a pawl on each cam arm movable into engagement with an associated actuator when the actuator is setting in zero position, a spring-urged latch to latch each pawl in ineffective position, and a projection on each actuator engaging its associated latch when the actuator is in normal or zero position to disable the latch, said projection movable out of engagement with the latch when the actuator is adjusted to represent a digit 1 to 9, to thereby render the latch effective to latch the pawl in ineffective position to thereby disable the secondary operating means; a second latch to latch the pawl of a lower decimal order in ineffective position during certain operations during which the pawl of said lower decimal order is released from its associated first-named latch; a third latch, normally disengaged from but movable into position to latch the pawl of a higher decimal order pawl in ineffective position during certain operations during which the pawl is released from its associated first-named latch; a manipulative means; and connections controlled by the manipulative means to control the effectiveness of the second and third latches.

20. In a zero setting mechanism, in combination with manipulative devices and zero stops, actuators differentially adjustable under control of said manipulative devices and zero stops from normal positions, and an operating means to restore the actuators to normal positions during each machine operation, of a secondary operating means operated by the first operating means to restore the actuators to normal position when the actuators are arrested in zero positions; a type carrier adjusted under control of each actuator; a settable means connected to each type carrier and normally movable into a zero-eliminated position; coupling means to couple the settable means to the actuators after the actuators have been differentially adjusted under control of manipulative devices representing 1 to 9 and before the first-named operating means restores the actuators to normal positions to adjust the type carriers commensurate with the differential setting of the actuators under control of said manipulative devices, said secondary operating means operating before the coupling means is moved to couple the setting means to the actuators; means on the actuators to control the effectivity of the secondary operating means; a latch to normally engage one element of the secondary operating means of a certain decimal order to disable the secondary operating means for said certain decimal order; a second latch movable to latch one element of the secondary operating means of a decimal order higher than said certain decimal order; and a key to alternately control the effectivity of the latches.

References Cited in the file of this patent
UNITED STATES PATENTS

| | | |
|---|---|---|
| 1,247,670 | Greve | Nov. 27, 1917 |
| 1,761,571 | Kropff | June 3, 1930 |
| 1,790,790 | Breitling | Feb. 3, 1931 |
| 2,077,180 | Muller | Apr. 13, 1937 |
| 2,202,948 | Fettig | June 4, 1940 |
| 2,239,807 | Breitling | Apr. 29, 1941 |
| 2,272,079 | Anderson | Feb. 3, 1942 |
| 2,616,623 | Goodbar et al. | Nov. 4, 1952 |
| 2,668,659 | Swanson | Feb. 9, 1954 |